(12) United States Patent
Nashiki

(10) Patent No.: US 7,911,107 B2
(45) Date of Patent: Mar. 22, 2011

(54) AC ELECTRIC MOTOR

(75) Inventor: Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 342 days.

(21) Appl. No.: 11/920,651

(22) PCT Filed: May 23, 2006

(86) PCT No.: PCT/JP2006/310272
§ 371 (c)(1),
(2), (4) Date: Dec. 17, 2007

(87) PCT Pub. No.: WO2006/126552
PCT Pub. Date: Nov. 30, 2006

(65) Prior Publication Data
US 2008/0197739 A1 Aug. 21, 2008

(30) Foreign Application Priority Data

May 24, 2005 (JP) ................................ 2005-151257
Jul. 19, 2005 (JP) ................................ 2005-208358

(51) Int. Cl.
H02K 3/04 (2006.01)
H02K 17/00 (2006.01)
H02K 19/00 (2006.01)
H02K 21/00 (2006.01)
H02K 23/26 (2006.01)
H02K 27/02 (2006.01)

(52) U.S. Cl. ...... 310/208; 310/44; 310/49.01; 310/68 D; 310/156.55; 310/185; 310/216.008; 310/268

(58) Field of Classification Search ............ 310/44, 310/49, 68 D, 156.55, 185, 208, 216.008, 310/268; H02K 21/12, 3/04, 17/00, 19/00, 21/00, 23/26, 27/02
See application file for complete search history.

(56) References Cited

U.S. PATENT DOCUMENTS 3,652,884 A * 3/1972 Vuffray .................... 310/156.08
(Continued)

FOREIGN PATENT DOCUMENTS

DE 198 11 075 A1 9/1999
(Continued)

OTHER PUBLICATIONS

German Patent and Trademark Office Action dated Nov. 22, 2007, German language.

(Continued)

Primary Examiner — Quyen Leung
Assistant Examiner — John K Kim
(74) Attorney, Agent, or Firm — Oliff & Berridge, PLLC

(57) ABSTRACT

A motor is provided, which includes: a rotor having rotor pole groups, in which N-poles and S-poles are alternately arranged in the circumferential direction; an N number (N is a positive integer) of stator pole groups, in which a plurality of stator poles are arranged for individual phases along or in the vicinity of the respective circumferences so as to be positioned at substantially the same rotational phase position in terms of electrical angle; and an (N−1) number of loop windings axially arranged between the stator pole groups, with the same phase being arranged at axial ends, wherein each of the loop windings is arranged radially inner than the outer diameter of each rotor pole group. This simplified winding structure can enhance productivity, reduce size, enhance efficiency and reduce cost.

35 Claims, 84 Drawing Sheets

U.S. PATENT DOCUMENTS

| | | | | |
|---|---|---|---|---|
| 3,796,039 | A * | 3/1974 | Lucien | 368/155 |
| 4,127,802 | A * | 11/1978 | Johnson | 318/696 |
| 4,206,374 | A * | 6/1980 | Goddijn | 310/49.04 |
| 4,250,442 | A * | 2/1981 | McCammon | 318/723 |
| 4,306,164 | A * | 12/1981 | Itoh et al. | 310/49.32 |
| 4,672,247 | A * | 6/1987 | Madsen et al. | 310/49.46 |
| 5,105,141 | A * | 4/1992 | Ernest | 318/805 |
| 5,283,487 | A * | 2/1994 | Oki et al. | 310/49.17 |
| 5,446,361 | A * | 8/1995 | Van Der Broeck | 318/747 |
| 5,694,015 | A * | 12/1997 | Luniewicz et al. | 318/611 |
| 5,747,958 | A * | 5/1998 | Van Der Broeck et al. | 318/747 |
| 5,973,426 | A * | 10/1999 | Fujinaka et al. | 310/49.39 |
| 6,465,973 | B1 * | 10/2002 | Kato et al. | 318/400.32 |
| 6,479,911 | B1 * | 11/2002 | Koike et al. | 310/49.24 |
| 6,794,776 | B1 * | 9/2004 | Gabrys | 310/74 |
| 6,897,595 | B1 * | 5/2005 | Chiarenza | 310/216.043 |
| 7,002,275 | B2 * | 2/2006 | Hans | 310/156.47 |
| 7,821,221 | B2 * | 10/2010 | Kragh et al. | 318/774 |
| 2002/0033689 | A1 | 3/2002 | Minagawa et al. | |
| 2003/0057784 | A1 * | 3/2003 | Kanebako | 310/90.5 |
| 2005/0012427 | A1 | 1/2005 | Seki et al. | |
| 2005/0099082 | A1 * | 5/2005 | Nashiki | 310/164 |
| 2006/0006744 | A1 * | 1/2006 | Nashiki | 310/49 R |
| 2007/0176505 | A1 * | 8/2007 | Trzynadlowski et al. | 310/114 |
| 2008/0197739 | A1 * | 8/2008 | Nashiki | 310/156.55 |

FOREIGN PATENT DOCUMENTS

| | | |
|---|---|---|
| DE | 102 40 704 A1 | 4/2004 |
| JP | A-50-013808 | 2/1975 |
| JP | A 59-063972 | 4/1984 |
| JP | A-63-031455 | 2/1988 |
| JP | A-04-185267 | 7/1992 |
| JP | A-06-261513 | 9/1994 |
| JP | A-08-322230 | 12/1996 |
| JP | A-2000-069780 | 3/2000 |
| JP | A-2000-078820 | 3/2000 |
| JP | A-2002-125394 | 4/2002 |
| JP | A-2003-259610 | 9/2003 |
| JP | A-2003-268442 | 9/2003 |
| JP | A-2003-274590 | 9/2003 |
| JP | A-2004-072858 | 3/2004 |
| JP | A-2004-166354 | 6/2004 |
| JP | A-2005-020981 | 1/2005 |
| JP | A-2005-020991 | 1/2005 |
| JP | A-2005-033941 | 2/2005 |
| JP | A-2005-080362 | 3/2005 |
| JP | A-2005-094876 | 4/2005 |

OTHER PUBLICATIONS

English language translation of German Patent and Trademark Office Action dated Nov. 22, 2007.

* cited by examiner (a) AA-AA  (b) AB-AB  (c) AC-AC (a)

(b)

(c)

(d)

(e)

(f)

(a)

(b)

BI—BI (a) BJ–BJ (b) BL–BL (c) BN–BN (d) BO–BO (e) BM–BM (f) BP–BP (a) BF-BF (b) BG-BG (c) BH-BH (a) BV-BV (b) BW-BW (c) BX-BX (a) DA—DA, DE—DE (b) DB—DB (c) DC—DC (d) DD—DD

BJ−BJ (b) CP-CP (a) CO-CO (a) CL-CL  (b) CM-CM (C) CL-CL (a) DF—DF, DH—DH (b) DG—DG, DI—DI (c) DJ—DJ (d) DK—DK (e) DL—DL (a) EA−EA (b) EC−EC (c) EE−EE (d) EG−EG (a)

(b)

(c)

(a)                                           (b)

(a) (b)

AC ELECTRIC MOTOR

TECHNICAL FIELD OF THE INVENTION

The present invention relates to a motor which is loaded, for example, on an automobile or a truck.

TECHNICAL BACKGROUND

Brushless motors have been known, in which coils of individual phases are concentrically wound about respective stator poles (e.g., see Patent Document 1). FIG. 130 is a schematic vertical cross section illustrating such a conventional brushless motor. FIG. 129 is a cross section taken along a line AA-AA of FIG. 130. These figures show a 4-pole 6-slot type brushless motor. The stator has a so-called concentrated winding structure in which the stator poles are concentrically imparted with turns of coils of the respective phases. FIG. 131 shows a state where the stator has been developed along the circumference by one cycle. The figure shows an arrangement of the windings U, V, W and the like. The horizontal axis indicates electrical angle in which one cycle corresponds to 720°. N- and S-pole permanent magnets are circumferentially and alternately arranged on a surface of a rotor 2. U-phase stator poles TBU1 and TBU2 of a stator 4 are imparted with turns of U-phase windings WBU1 and WBU2, respectively. Similarly, V-phase stator poles TBV1 and TBV2 are imparted with turns of V-phase windings WBV1 and WBV2, respectively. W-phase stator poles TBW1 and TBW2 are imparted with turns of W-phase windings WBW1 and WBW2, respectively. Brushless motors having such a structure are widely spread, currently, for industrial and household uses.

FIG. 128 is a transverse cross section illustrating a configuration of another stator. The stator shown in FIG. 128 has a 24-slot configuration which may enable distributed winding for 4-pole motors. This stator may allow its circumferential magnetomotive force distribution to have a comparatively smooth sinusoidal form. For this reason, this type of stator is widely used, for example, for brushless motors, field winding type synchronous motors and induction motors. In particular, rotating magnetic fields are desired to be accurately formed by a stator in case, for example, of synchronous reluctance motors and various types of motors applying reluctance torque, or induction motors. For these motors, a concentrated-winding stator structure shown in FIG. 112 is suitable.

Patent Document 1: Japanese Patent Laid-Open No. 6-261513 (See page 3 and FIGS. 1 to 3.)

DISCLOSURE OF THE INVENTION

Problems to be Solved by the Invention

The conventional brushless motor shown in FIGS. 129, 130 and 131 and disclosed in Patent Document 1 entails a complicated structure because of the necessity of giving turns of a motor winding to each of the stator poles. For this reason, each motor winding has been required to be arranged at the back of each slot, which in turn has raised a problem of deteriorating productivity in terms of giving turns of motor windings. This structure has also raised a problem of difficulty in reducing size, enhancing efficiency and reducing cost. Moreover, because of the structure where only three salient stator poles are arranged within a range of 360° in electrical angle, it has been difficult to form the magnetomotive force generated by the stator into a sinusoidal form to produce rotating magnetic fields with accuracy. Therefore, there has been a problem that applications of such a motor to synchronous reluctance motors and various types of motors applying reluctance torque, or induction motors, is difficult. There is a method that each tooth of a stator core is divided into some parts for giving turns of winding, and then the parts are coupled to each other. However, this method has a problem of complicating the fabricating processes.

The stator structure shown in FIG. 128, which enables distributed winding, can form the magnetomotive force distribution into a smooth sinusoidal form. However, the necessity of inserting each winding from an opening of a slot has reduced the space factor, while increasing the axial length of each coil end. Accordingly, there has been a problem of difficulty in reducing the motor size, as well as a problem of low productivity of windings.

The present invention has been made in view of these problems and has as its object to provide a motor which is able to reduce motor size, enhance efficiency and reduce cost. In particular, the motor of the present invention is able to enhance the productivity and the winding space factor by providing a simple looped winding structure. In addition, the stator of the motor of the present invention has magnetic paths and magnetic poles, which are separated for every phase for the purpose of simplification, although it depends on the types of the stators.

Means for Solving the Problems

The present invention relates to a motor including a rotor having rotor pole groups, in which N-poles and S-poles are alternately arranged in the circumferential direction and; an N number (N is a positive integer) of stator pole groups, in which a plurality of stator poles are arranged for every phase along or in the vicinity of the circumference so as to be positioned at substantially the same rotational phase position in terms of electrical angle.

This motor is so configured that loop windings of a certain phase are turned around, sandwiching a stator pole group of the same phase in the rotor shaft direction, and are connected so that currents are reversely passed therethrough, whereby the stator poles of the relevant phase are applied with a magnetomotive force generated by the currents of the relevant phase.

In case the number of phases NN is three or more, better efficiency may be attained by turning around windings of a certain phase at positions distanced by nearly NN/2 number of stator pole groups from a certain stator pole group to pass reverse currents therethrough, rather than by reversely passing currents of the same phase, sandwiching the stator pole group in question in the rotor shaft direction.

By separating a looped winding from stator poles and rotor poles, the winding can be simplified into a looped shape to improve productivity and enhance space factor of the winding.

The present invention also relates to a motor in which a stator pole group and a rotor pole group of one phase may be arranged so as to be opposed to each other, with stator pole groups of other phases and rotor pole groups of other phases being separately arranged.

Such a structure of a motor can simplify the structure and shape of the windings and the stator. At the same time, efficiency and productivity of the motor in its entirety may be improved.

Each of the loop windings may be fixed to the stator, while the entire or a portion of the loop winding may be configured to extend to a recessed portion at the rotor side. Thus, copper loss and flux leakage can be reduced.

Each of the loop windings may be arranged between the stator pole groups to apply a magnetomotive force of currents to each stator and rotor pole group. Mode of the loop windings can be variously improved. Specifically, recesses may be provided at an outer peripheral surface of the rotor, which surface is opposed to the stator, to locate a portion or all of each of the loop windings at positions inner than the outer diameter of the rotor pole groups. Locating the loop windings at inner-diameter side can realize reduction of the winding length, copper loss, amount of used copper, which is led to the reduction in the cost, and reduction in the weight. Further, windings can be arranged between the stator and rotor poles of the individual phases. This has an effect of reducing static-magnetically applied magnetomotive force between phases to thereby reduce flux leakage between phases. As will be described later, arrangement of flattened winding conductors may have an effect of inducing eddy currents for the increase/decrease of magnetic fluxes passing through the flattened conductors and of mitigating the increase/decrease of magnetic fluxes. Thus, flux leakage between phases can be reduced. In addition, the spaces for arranging the loop windings are the empty spaces left after arranging the magnetic poles and the magnetic paths of the individual phases. Thus, empty spaces can be effectively utilized.

Referring to flux leakage, increase in the flux leakage may lower the power factor of the rotor and cause magnetic saturation in the magnetic paths, creating a problem of lowering maximum torque of the motor. This is a very serious problem in reducing the size of motors.

In the loop windings of the individual phases, two or more loop windings located in the same space may be combined into a single loop winding. This has an effect of simplifying the winding configuration of the motor. Also, this has an effect of reducing copper loss because the amplitude of the combined current becomes small in case both currents before combining the two windings have different phases from each other.

The loop windings arranged outside the two stator pole groups arranged both ends in the rotor shaft direction may be removed, because these loop windings have considerably small electromagnetic effect. Thus, the motor can be simplified.

When the phase difference between two adjacent stator pole groups is configured to be about 180°, the empty spaces of both of the stator poles may very advantageously be utilized to allow the stator poles to be mutually extended in the rotor shaft direction. In this configuration, the length of each stator pole in the rotor shaft direction can be increased, leading to reduction in the flux leakage between stator poles, and reduction in the magnetic saturation in the magnetic paths of the individual phases. In addition, the empty spaces on the surface of the rotor can also be reduced to thereby enhance torque of the motor. In this case, each winding may be made wavy in the rotor shaft direction in conformity with the stator pole configuration. Thus, the flux leakage can be reduced between the stator poles, being caused by the magnetomotive force that works on the mutual stator poles, which is led to the reduction of magnetic saturation. Therefore, maximum torque of the motor may be enhanced and thus the motor size can be reduced.

The degree of freedom in the structure of the stator poles and the rotor poles can be raised by providing a soft magnetic portion (RSP1) which is magnetically linked to the back yoke of the rotor and is opposed a soft magnetic portion of the stator through an air-gap portion between the rotor and the stator, and a soft magnetic portion (SSP1) which is magnetically linked to the back yoke of the stator and is opposed to the soft magnetic portion of the rotor through an air-gap portion between the rotor and the stator.

Torque can be increased by providing magnetic flux inducing means (MRN) in the vicinity of rotor poles and stator poles of one phase, for directing magnetic flux components (φRN) of a phase having a phase difference of about 180° in electrical angle from a magnetic flux (φN) of the relevant phase.

In this case, the stator poles arranged at the front and rear of permanent magnets may have different phases to more effectively configure the motor.

Stator poles of the individual phases may be arranged opposed to permanents magnet of the rotor poles along the same circumference. Thus, magnetic paths and loop windings of the individual phases may be structured being separated in the rotor shaft direction or in the radial direction.

In a two-phase motor, a circumferential phase difference between an A-phase magnetic pole group and a B-phase magnetic pole group may be 100° or more rather than 90° to increase average torque.

A motor may be configured by utilizing magnetic fluxes at both of front and rear surfaces of one permanent magnet, as magnetic fluxes of the same phase.

A motor may be configured by providing a magnetic pole group (PMP9) in which soft magnetic portions are circumferentially alternated with permanent magnets whose poles are oriented to a direction perpendicular to the circumferential direction, and a similar magnetic pole group (PMP10) arranged being opposed to the magnetic pole group (PMP9).

A motor may be provided with a magnetic pole group (PMP11) in which soft magnetic portions are circumferentially alternated with permanent magnets whose poles are oriented to a direction of the soft magnetic portions, the soft magnetic portions providing an alternation of N- and S-poles along the circumference.

A motor may be configured by using a stator or a rotor in which soft magnetic portions are circumferentially alternated with permanent magnets arranged in parallel in the radial direction.

A motor may be configured by circumferentially providing indented soft magnetic rotor poles and stator poles.

A motor may be configured by imparting each rotor or stator pole with a circumferentially sinusoidal shape in terms of area so that the motor may be driven by sinusoidal currents to cause only a little harmonic torque and small torque ripple.

Each of the motors mentioned above may alternatively be configured as a so-called outer-rotor motor having rotor arranged at an outer peripheral side and a stator arranged at an inner peripheral side. Alternatively, each of the above motors may be configured as an axial-gap motor in which rotor poles and stator poles are opposed to each other in the rotor shaft direction.

Portions of the rotor poles and portions of the stator poles that are opposed to each other may be indented, so that a rotation rate $d\phi/d\theta$ of a magnetic flux $\phi$ that works thereon may be raised and that torque may be increased.

For the motors of the invention, in which magnetic fluxes are also directed along the rotor shaft direction, electromagnetic steel plates (SP1) may be used as members for constituting the soft magnetic portions of the motor and arranged in a direction perpendicular to the axial direction, while electromagnetic steel plates (SP2) may be arranged at a hole or recessed portion of the electromagnetic steel plate (SP1) in a direction crossing the electromagnetic steel plates (SP1). Thus, the magnetic fluxes in the motor can be passed in three-dimensional directions.

The motor of the present invention may use members obtained by subjecting soft magnetic metal powder to compression molding. Dust cores are effective because magnetic fluxes can be directed in any directions.

The motor of the present invention may be configured by using parts obtained by bending magnetic steel plates so as to have a simple structure.

The motor of the present invention may be configured by using soft magnetic members obtained by stacking electromagnetic steel plates and amorphous films.

Portions or all of the windings of the motor of the present invention may be made up of metal pipes, being imparted with a cooling mechanism having a structure in which liquid or gas is passed through the metal pipes serving as conductors.

Each stator pole may be expanded so as to establish a relation MLP>ML/SN, where ML is a length of the stator in the rotor shaft direction, SN is the number of salient stator pole groups, each group being made up of a plurality of salient poles arranged along the circumference of the stator at substantially the same electrical angle, and MLP is a length of each stator pole group in the rotor shaft direction.

In this case, each winding may have substantially a looped form imparted with a wavy form in the rotor shaft direction, in conformity with the arrangement of the salient stator poles in each phase and the indents of the salient stator poles in each phase in the rotor shaft direction.

Each winding as a conductor may be made up of a flattened wire so as to have a structure for mitigating increase/decrease of leaked magnetic flux components passing through the wire.

The motor of the present invention may be configured in such a way that stator poles of the same phase may be arranged at an electrical angular pitch of 720°, in order, for example, to reduce flux leakage or magnetic saturation in the magnetic paths.

In an N-phased P-pole motor, the number of stator poles may be less than (P×N/2). In this case, the stator poles may be arranged by circumferentially shifting the positions of individual stator poles so as to be close to the individual phases, rather than arranging them along the circumference with an even interval therebetween. Thus motor torque can be enhanced.

In a three-phase motor of the present invention having a configuration provided with two windings, the two windings may be connected in series, with outputs of a three-phase inverter being connected to three points, that is, both ends and a connecting portion. Thus, control can be effected by supplying balanced three-phase currents with a three-phase inverter.

In the motor of the present invention having an N number (N is a positive integer) of phases and an (N−1) number of windings, the windings may be star-connected to obtain an (N−1) number of terminals and one terminal at the center point of the star connection. Thus, a sum of the N number of motor terminals are obtained, which terminals can be connected to an N-phased inverter to effect control with N-phased balanced voltages and currents.

In the motor of the present invention having an N number (N is a positive integer) of phases and an (N−1) number of windings, the windings may be delta-connected, while leaving open the windings at both ends, i.e. a first terminal and an (N−1)$^{th}$ terminal, without being connected to obtain an (N−2) number of winding connecting portions and both end portions. Thus, a sum of the N number of motor terminals are obtained, which terminals can be connected to an N-phased inverter to effect control with N-phased balanced voltages and currents.

Two or more of the motors of the present invention and the conventional motors may be incorporated into a single motor. For example, such a motor may be configured by mounting an outer-rotor motor at an inner-diameter side of the motor, mounting an inner-rotor motor at an outer-diameter side of the motor, and bringing both of the rotors into integration.

Advantages of the Invention

The present invention can provide a motor which is able to reduce motor size, enhance efficiency and reduce cost. In particular, the present invention can enhance the productivity and winding space factor of the motor by providing a simple looped winding structure. In addition, magnetic paths and magnetic poles of the stator may be separated for every phase for simplification, although it depends on the types of stators.

BRIEF DESCRIPTION OF THE DRAWINGS

FIG. 120 illustrates connection for driving a motor having two windings in three phases by using two single-phase inverters;

FIG. 121 is a linear development of stator poles and windings of a five-phase motor;

FIG. 122 illustrates flux vector components and current vector components of each stator pole;

FIG. 123 illustrates current vector components in a star-connection arrangement;

FIG. 124 illustrates by (a) a configuration in which the windings of the motor illustrated in FIG. 121 are star connected to draw out a center point as one terminal, and by (b) a configuration in which the windings of the motor illustrated in FIG. 121 are delta connected to obtain five motor terminals including two ends across the windings and two connecting points of the individual windings;

FIG. 125 illustrates currents of the motor illustrated in FIG. 121;

FIG. 126 illustrates voltages and average voltages of the windings of the motor illustrated in FIG. 121;

FIG. 127 illustrates voltage differences between the average voltages illustrated in FIG. 127 and the voltages at the terminals illustrated in FIG. 124;

FIG. 128 is a transverse cross section illustrating a structure of a 3-phase 4-pole 24-slot motor;

FIG. 129 is a transverse cross section illustrating a 3-phase 4-pole 6-slot motor of concentrated winding;

FIG. 130 is a vertical cross section illustrating the motor illustrated in FIG. 129; and FIG. 131 is a linear development illustrating the stator arrangement and the windings of the motor illustrated in FIG. 130.

DESCRIPTION OF SYMBOLS

Figure 1:
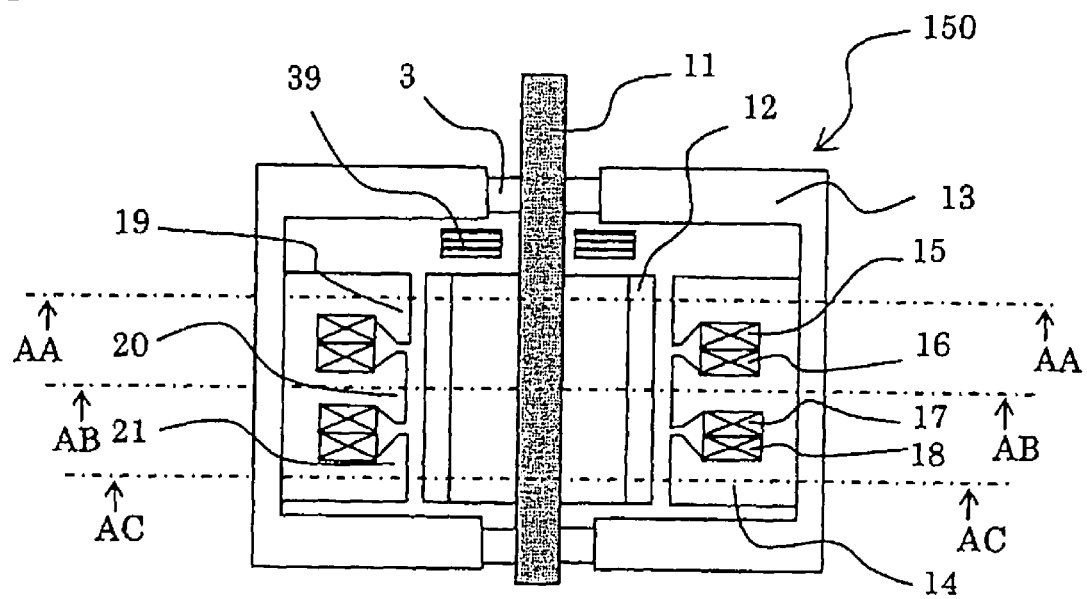
FIG. 1 is a schematic vertical cross section illustrating a three-phase motor having loop windings.
Figure 2:
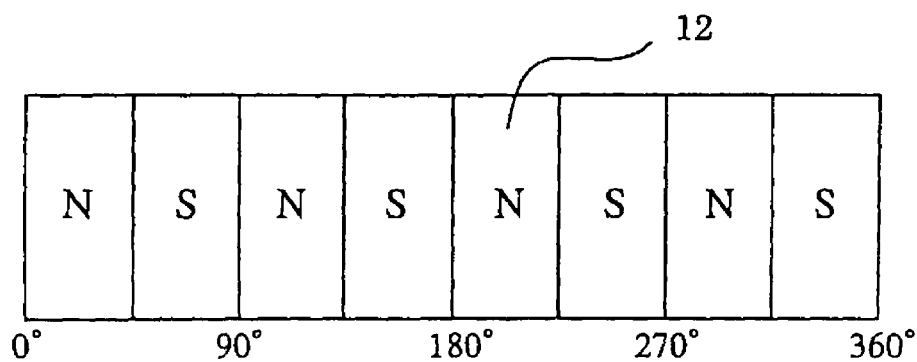
FIG. 2 is a circumferential linear development illustrating a surface configuration of the rotor illustrated in FIG. 1.

1 Rotor shaft
50 U-phase rotor poles
51 V-phase stator poles
54 V-phase rotor poles
55 V-phase stator poles
58 W-phase rotor poles
59 W-phase stator poles
82 Windings for the phases U and V
83 Windings for the phases V and W
453 Back yoke
454 Back yoke

BEST MODE FOR EMBODYING THE PRESENT INVENTION

With reference to the drawings, hereinafter will be described motors according to an embodiment to which the present invention is applied.

First of all, a basic conventional configuration will be described in association with the motor related to the present invention. Then, a description will be given on configurations and operations that provide features peculiar to the present invention.

[Basic Configuration]

FIG. 1 is a cross section illustrating a brushless motor related to the basic configuration. A brushless motor 150 shown in FIG. 1 is an eight-pole motor operated with three-phase alternating current, including a rotor 11, permanent magnets 12 and a stator 14.

Figure 12:
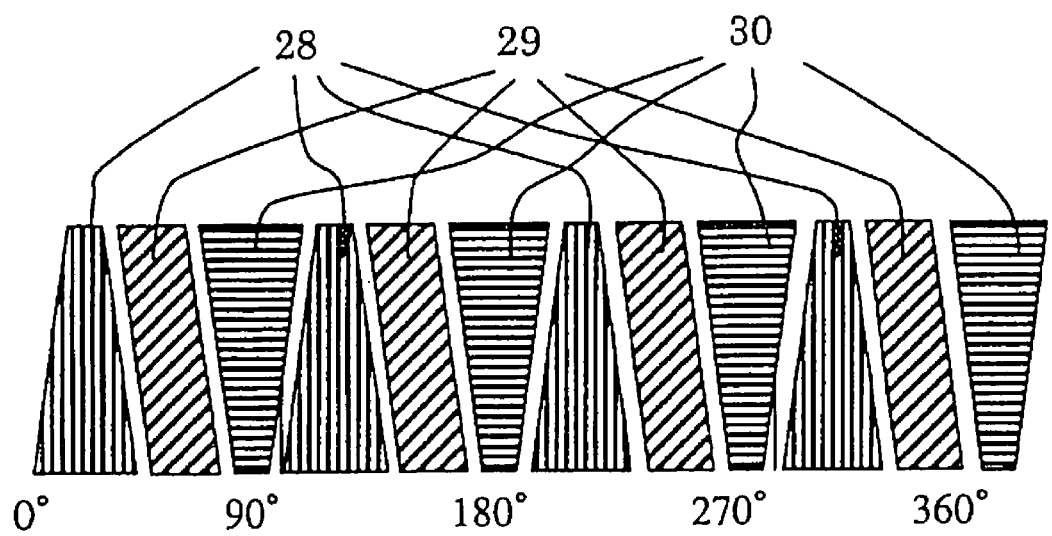
FIG. 12 illustrates a modification of the inner peripheral surface of the stator poles of the motor illustrated in FIG. 1.

The rotor 11 is provided with the plurality of permanent magnets 12 arranged on a surface thereof. In the permanent magnets 12, N-poles and S-poles are circumferentially and alternately arranged along the surface of the rotor 11. FIG. 12 is a circumferential development of the rotor 11. The vertical axis indicates mechanical angle. A position at 360° in mechanical angle corresponds to a position at 1440° in electrical angle.

Figure 4:
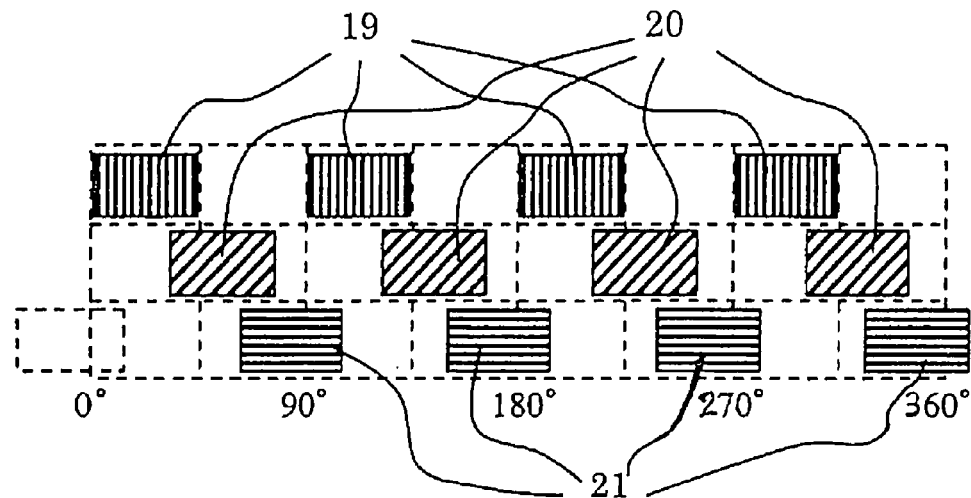
FIG. 4 is a circumferential linear development illustrating an inner peripheral surface of the stator illustrated in FIG. 1.

The stator 14 includes four U-phase stator poles 19, four V-phase stator poles 20 and four W-phase stator poles 21. Each of the stator poles 19, 20 and 21 has a shape salient toward the rotor 11. FIG. 4 is a development illustrating an inner peripheral configuration of the stator 14 as seen from the side of the rotor 11. The four U-phase stator poles 19 are arranged along a single circumference with an even interval therebetween. Similarly, the four V-phase stator poles 20 are arranged along a single circumference with an even interval therebetween. The four W-phase stator poles 21 are arranged along a single circumference with an even interval therebetween. The four U-phase stator poles 19 are referred to as a U-phase stator pole group. The four V-phase stator poles 20 are referred to as a V-phase stator pole group. The four W-phase stator poles 21 are referred to as a W-phase stator pole group. Among these stator pole groups, the U- and W-phase stator pole groups arranged at axial end portions are referred to as stator-end pole groups, and the remaining V-phase stator pole group is referred to as an intermediate pole group.

The U-, V- and W-phase stator poles 19, 20 and 21 are arranged being shifted from each other in the axial and circumferential positions. In particular, the stator pole groups are arranged being shifted along the circumference so as to have a relative phase difference of 30° in mechanical angle corresponding to 120° in electrical angle. Broken lines in FIG. 4 indicate the opposed permanent magnets 12 of the rotor 11. A pitch of the rotor poles that belong to the same pole (i.e. the N-pole permanent magnets 12 or the S-pole permanent magnets 12) is 360° in electrical angle. Meanwhile, a pitch of the stator poles that belong to the same phase is also 360° in electrical angle.

Figure 6:
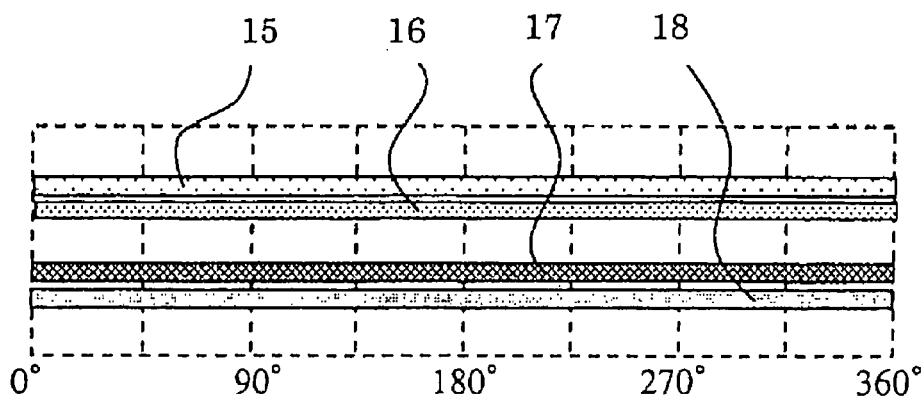
FIG. 6 is a circumferential linear development illustrating the loop windings illustrated in FIG. 1.

A U-phase winding 15, V-phase windings 16 and 17, and a W-phase winding 18 are arranged between the U-, V- and W-phase stator poles 19, 20 and 21 of the stator 14, respectively. FIG. 6 is a circumferential development of the windings of the individual phases. The U-phase winding 15 is provided between the U-phase stator poles 19 and the V-phase stator poles 20 and has a shape looped along the circumference. When a clockwise current as seen from the side of the rotor 11 is positive (the same is intended to apply to the windings of other phases), a current Iu that flows through the U-phase winding 15 is negative (−Iu). Similarly, the V-phase winding 16 is provided between the U-phase stator poles 19 and the V-phase stator poles 20 and has a shape looped along the circumference. A current Iv that flows through the V-phase winding 16 is positive (+Iv). The V-phase winding 17 is provided between the V-phase stator poles 20 and the W-phase stator poles 21 and has a shape looped along the circumference. The current Iv that flows through the V-phase winding 17 is negative (−Iv). The W-phase winding 18 are provided between the V-phase stator poles 20 and the W-phase stator poles 21 and has a shape looped along the circumference. A current Iw that flows through the W-phase winding 18 is positive (+Iw). These three types of currents Iu, Iv and Iw are three-phase alternating currents whose phases are shifted from each other by 120°. Indicated by numeral 39 is a winding for cancelling an axial magnetomotive force.

Figure 3:
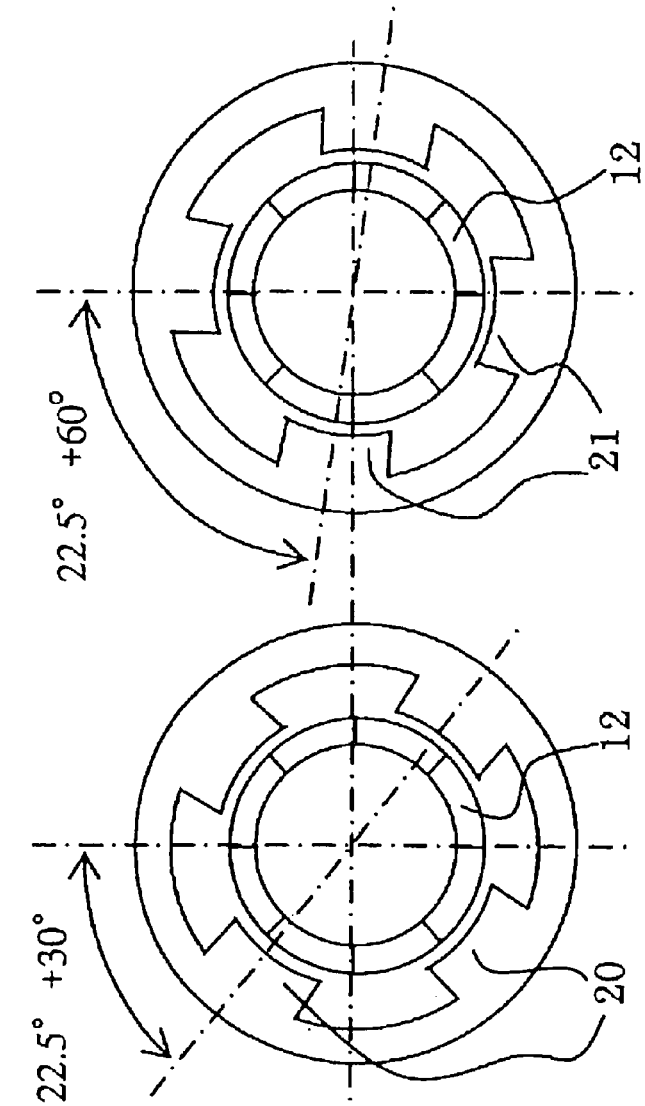
FIG. 3 illustrates schematic transverse cross sections of the stator illustrated in FIG. 1.

A stator pole configuration and a winding configuration of each phase of the stator 14 will be described in detail below. FIG. 3 shows cross sections of the stator 14 shown in FIG. 1. FIG. 3 shows by (a) a cross section taken along an AA-AA line, by (b) a cross section taken along an AB-AB line, and by (c) a cross section taken along an AC-AC line. As shown, each of the U-, V- and W-phase stator poles 19, 20 and 21 has a shape salient toward the rotor 11. The U-, V- and W-phase stator poles 19, 20 and 21 are arranged so as to establish a positional relationship that provides a relative phase difference of 30° in mechanical angle corresponding to 120° in electrical angle.

Figure 5:
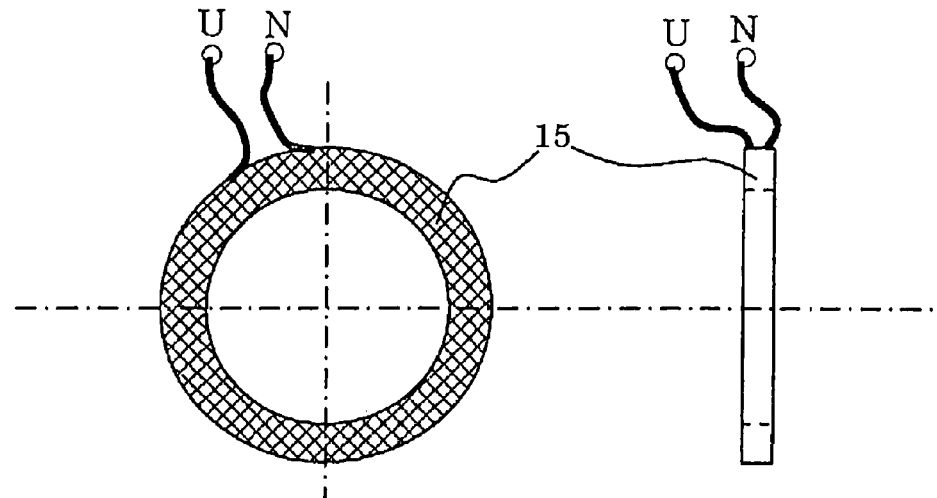
FIG. 5 illustrates front and side elevations of one of the stator windings illustrated in FIG. 1.

FIG. 5 schematically shows a shape of the U-phase winding 15 in front and lateral views. The U-phase winding 15 has a winding-start terminal U and a winding-end terminal N. Similarly, each of the V-phase windings 16 and 17 has a winding-start terminal V and a winding-end terminal N. The W-phase winding 18 has a winding-start terminal W and a winding-end terminal N. When these phase windings are subjected to three-phase Y-connection, the winding-end terminals N of the phase windings 15, 16, 17 and 18 are connected. The currents Iu, Iv and Iw that flow through the phase windings 15, 16, 17 and 18 are controlled to be current phases that generate torque between the stator poles 19, 20 and 21 of the individual phases, and the permanent magnets 12 of the rotor 11. The control is effected so as to satisfy a relation Iu+Iv+Iw=0.

Figure 8:
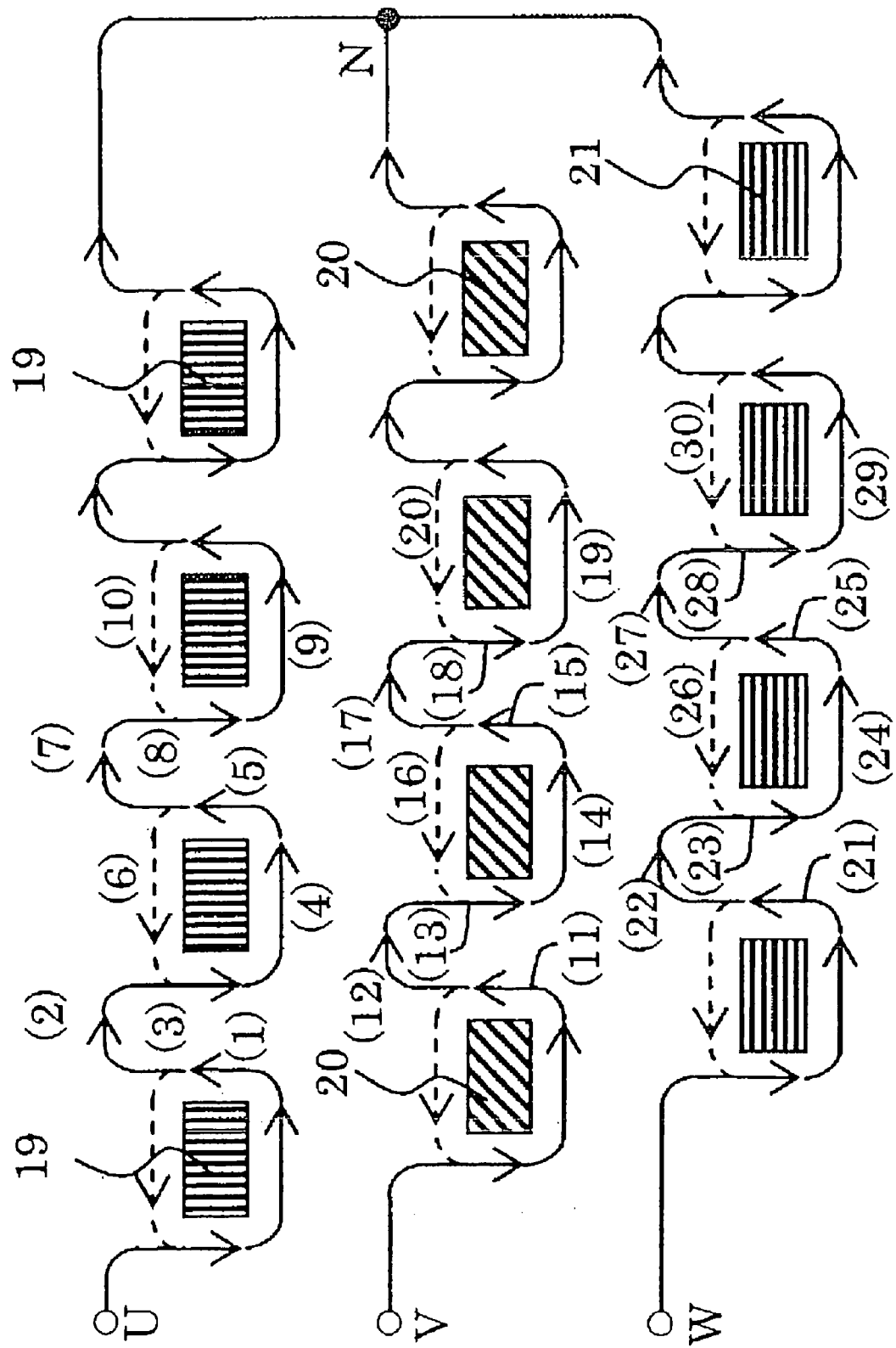
FIG. 8 illustrates a relationship between the stator poles and the windings illustrated in FIG. 1.

The description hereinafter is provided on a relationship between the phase currents Iu, Iv and Iw, and the magnetomotive force given to the stator poles 19, 20 and 21 of the individual phases by these phase currents. FIG. 8 shows equivalent windings of the individual phase currents, which are added to the development (FIG. 4) of the stator poles 19, 20 and 21 of the individual phases as seen from the side of an air-gap plane (the side of the rotor 11).

The U-phase winding is serially and unidirectionally wound about the four U-phase stator poles 19. Accordingly, the U-phase stator poles 19 are imparted with a unidirectional magnetomotive force. For example, the U-phase winding wound about the second U-phase stator pole 19 from the left in FIG. 8 is formed by wires (3), (4), (5) and (6). These wires are wound, in this order, about the U-phase stator pole 19 for a plurality of times. Wires (2) and (7) are connecting wires connecting the adjacent U-phase stator poles 19 and thus exert no electromagnetic effect.

Detailed study on portions of the current Iu flowing through such a U-phase winding reveals that magnitudes of the currents in the wires (1) and (3) are the same but the currents flow in the opposite direction from each other, so that the magnetomotive force ampere turn is offset. Accordingly, these wires can be regarded as being in a state equivalent to the state where no current is passed. Similarly, as to currents in the wires (5) and (8), the magnetomotive force ampere turn is offset. Thus, these wires can be regarded as being in a state equivalent to the state where no current is passed. Thus, since the currents passing through the wires disposed between the U-phase stator poles 19 are constantly offset, there is no need to pass currents, leading to the possible removal of the wires concerned. As a result, it can be regarded that the U-phase loop current Iu passing along the circumference of the stator 14 for the wires (10) and (6) flows simultaneously with the U-phase loop current −Iu passing along the circumference of the stator 14 for the wires (4) and (9).

Moreover, the U-phase loop current Iu passing along the circumference of the stator 14 for the wires (10) and (6), is a looped current that passes outside the stator core. Outside the stator core, there exists air, for example, having large magnetic resistance, and therefore the loop current can exert little electromagnetic effect on the brushless motor 15. Thus, omission of the loop current may involve no influence, leading to possible removal of the loop winding positioned outside the stator core. (Although this loop winding is omitted in the above example, it may be left without being removed.) Consequently, the effects of the U-phase winding shown in FIG. 1 can be regarded as being equivalent to those of the U-phase loop windings 15 shown in FIGS. 1 and 6.

The V-phase winding shown in FIG. 8 is convolutedly and serially wound about the four V-phase stator poles 20 as in the case of the U-phase winding. In the winding, currents flowing through the wires (11) and (13) have the same magnitude but are oppositely directed, so that the magnetomotive force ampere turn is offset. Accordingly, these wires can be regarded as being in a state equivalent to the state where no current is passed. Similarly, the magnetomotive force ampere turn is offset as to the currents flowing through the wires (15) and (18). As a result, it can be regarded that the V-phase loop current Iv passing along the circumference of the stator 14 for the wires (20) and (16) flows simultaneously with the V-phase loop current −Iv passing along the circumference of the stator 14 for the wires (14) and (19). Consequently, the effects of the V-phase winding shown in FIG. 1 can be regarded as being equivalent to those of the V-phase loop windings 16 and 17 shown in FIGS. 1 and 6.

The W-phase winding shown in FIG. 8 is convolutedly and serially wound about the four W-phase stator poles 21 as in the case of the U-phase winding. In the winding, currents flowing through the wires (21) and (23) have the same magnitude but are oppositely directed, so that the magnetomotive force ampere turn is offset. Accordingly, these wires can be regarded as being in a state equivalent to the state where no current is passed. Similarly, the magnetomotive force ampere turn is offset as to the currents flowing through the wires (25) and (28). As a result, it can be regarded that the W-phase loop current Iw passing along the circumference of the stator 14 for the wires (30) and (26) flows simultaneously with the W-phase loop current −Iw passing along the circumference of the stator 14 for the wires (24) and (29).

Moreover, the W-phase loop current −Iw passing along the circumference of the stator 14 for the wires (24) and (29) mentioned above is a loop current that passes outside the stator core. Outside the stator core, there exists air, for example, having large magnetic resistance, and therefore the loop current can exert little electromagnetic effect on the brushless motor 15. Thus, omission of the loop current may involve no influence, leading to possible removal of the loop winding positioned outside the stator core. Consequently, the effects of the W-phase winding shown in FIG. 8 can be regarded as being equivalent to those of the looped W-phase winding 18 shown in FIGS. 1 and 6.

As described above, windings and current that impart the phase stator poles 19, 20 and 21 of the stator 14 with electromagnetic effects can be replaced by simplified loop windings. In addition, the loop windings at the axial ends of the stator 14 can be removed. As a result, the amount of copper used for the brushless motor 15 can be significantly reduced to thereby enable achievement of high efficiency and high torque. Also, since there is no need of circumferentially arranging winding (wires) between the stator poles of the same phase, a multipole structure beyond the conventional structure can be achieved. In particular, the simplified winding structure can enhance the productivity of motors with reduced cost.

Figure 109:
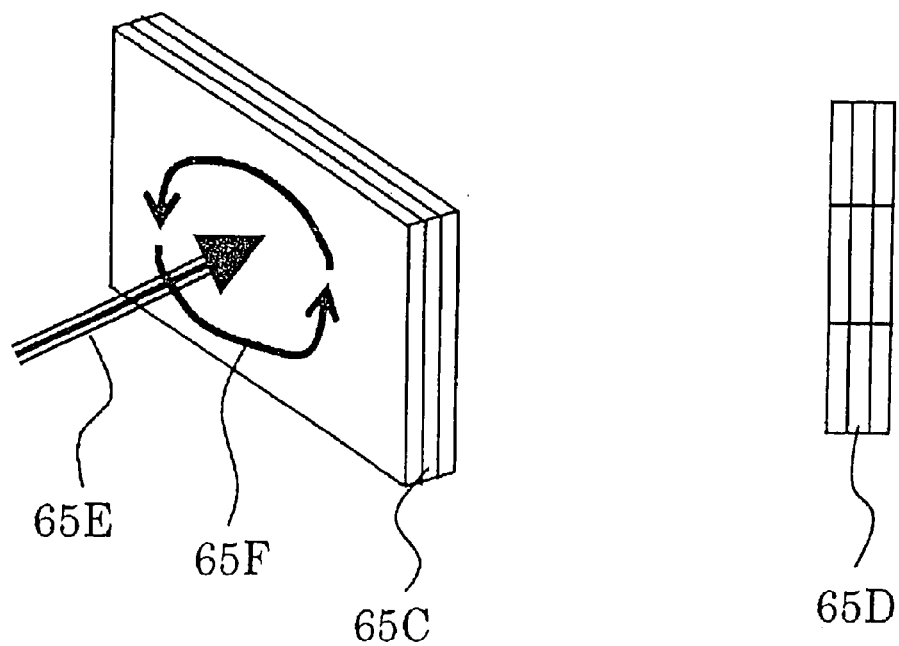
FIG. 109 illustrates flattened windings, a leaked flux passing through the winding, and induced eddy currents.
Figure 110:
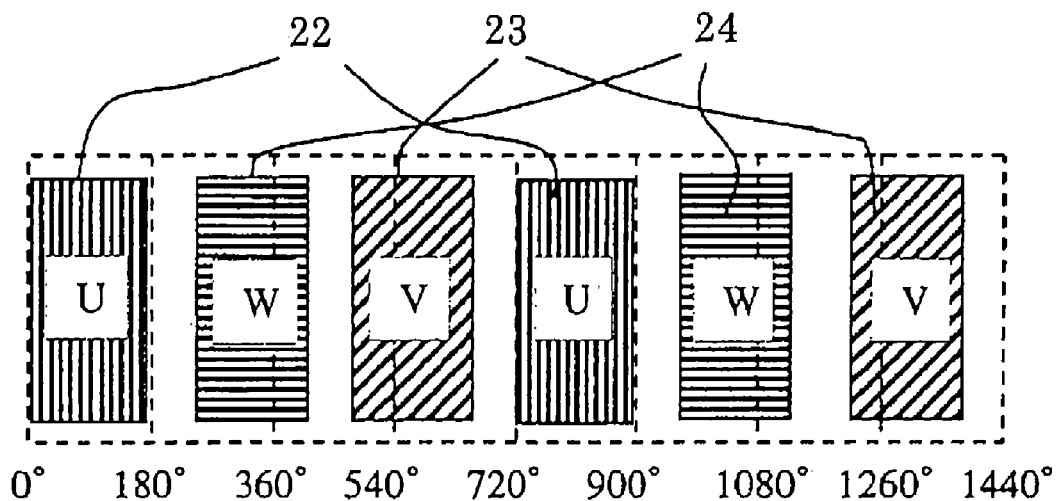
FIG. 110 is a linear development illustrating stator poles of a motor, in which stator poles of individual phases are arranged at an electrical angular pitch of 720°.
Figure 111:
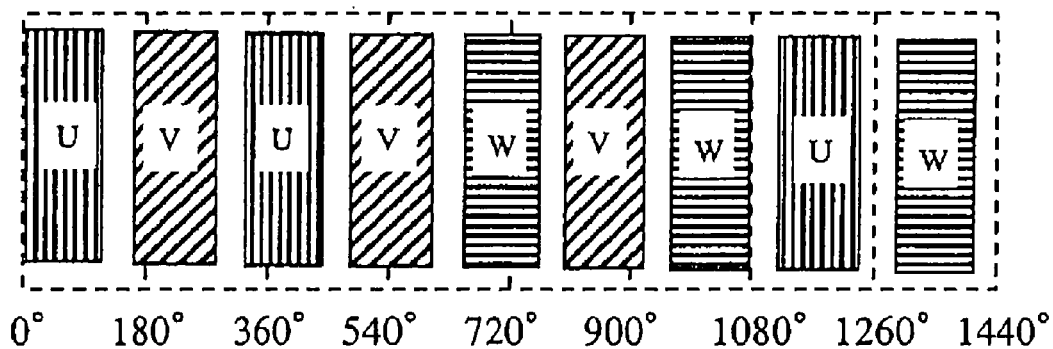
FIG. 111 is a linear development illustrating stator poles of a motor, in which nine stator poles are arranged for eight poles.

It should be appreciated that magnetic fluxes φu, φv and φw that pass through the U-, V- and W-phase stator poles, respectively, merge together at a back yoke to establish a relation in which a sum total of the 3-phase AC magnetic fluxes is "0" as expressed by an equation: φu+φv+φw=0. The conventional structure shown in FIGS. 109, 110 and 111 is a structure where two each of the salient poles 19, 20 and 21, i.e. six in total, shown in FIG. 8 are arranged along the same circumference, with each of the salient poles exerting the same electromagnetic effect and torque generation as in the brushless motor 15. However, unlike the brushless motor 15 shown in FIGS. 1 to 7, the conventional brushless motor shown in FIGS. 109 and 110 cannot be removed with portions of the winding or cannot have simplified winding for structural reasons.

Figure 9:
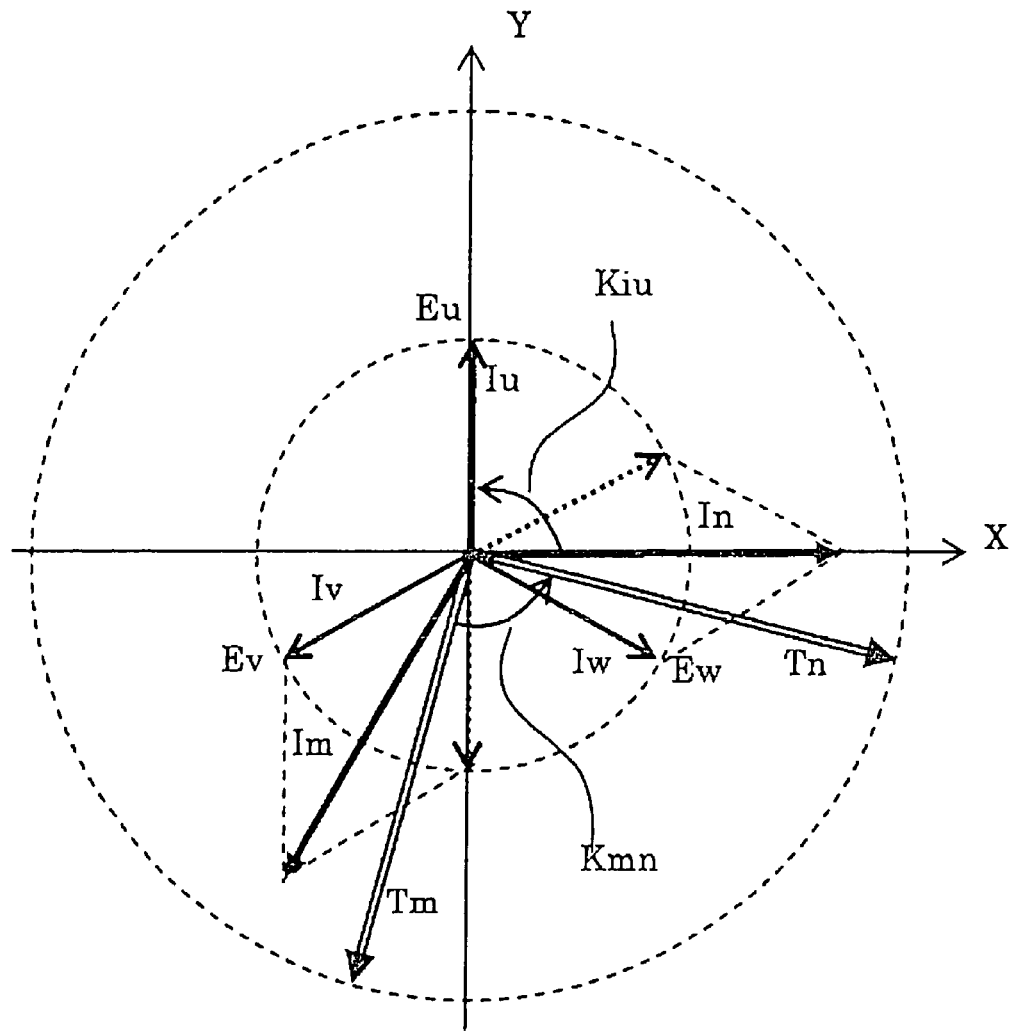
FIG. 9 is a vector diagram vectorially illustrating a relationship between currents, voltages and torque of the motor illustrated in FIG. 1.

The brushless motor 15 has the configuration as described above. The operation of the brushless motor 15 will now be explained. FIG. 9 is a vector diagram illustrating currents, voltages and output torque of the brushless motor 15. The X-axis corresponds to a real axis and the Y-axis corresponds to an imaginary axis. Counterclockwise angles with respect to the X-axis are vector phase angles.

The rotation angle rate of the fluxes φu, φv and φw that are present in the stator poles 19, 20 and 21 of the individual phases of the stator 14 are referred to herein as a "unit voltage", and thus relations are provided as Eu=dφu/dθ, Ev=dφv/dθ and Ew=dφw/dθ. The relative positions of the phase stator poles 19, 20 and 21 for the rotor 11 (permanent magnets 12) are shifted by 120° in electrical angle as shown in FIG. 4. Accordingly, as shown in FIG. 9, the unit voltages Eu, Ev and Ew induced by one turn of the phase windings 15 to 18 result in 3-phase AC voltages.

On condition that the rotor rotates at constant rotation dθ/dt=S1, and the number of turns of the phase windings 15 to 18 are Wu, Wv and Ww with each of these values being equal to Wc, the induction voltages Vu, Vv and Vw of the windings 15 to 18 are expressed by the following Formulas. It should be appreciated that ignorance of flux components leaked from the stator poles may result in the number of flux linkages as being Wu×φu in the U-phase winding, Wv×φv in the V-phase winding and Ww×φw in the W-phase winding.

$$Vu = Wu \times \left(-\frac{d\phi u}{dt}\right) \quad (1)$$
$$= -Wu \times d\phi u/d\theta \times d\theta/dt$$
$$= -Wu \times Eu \times S1$$

Similarly, $$Vv = Wv \times Ev \times S1 \quad (2)$$

$$Vw = Ww \times Ew \times S1 \quad (3)$$

Particular relationship between the windings and the voltages are as follows. The unit voltage Eu of the U-phase is a voltage generated at one reverse turn of the U-phase winding 15 shown in FIGS. 1 and 6. The U-phase voltage Vu is a voltage generated in a reverse direction in the U-phase winding 15. The unit voltage Ev of the V-phase is a voltage generated across a serial connection of one turn of the V-phase winding 16 and one reverse turn of the V-phase winding 17. The V-phase voltage Vv is a voltage across a serial connection of the V-phase winding 16 and the reverse V-phase winding 17. The unit voltage Ew of the W-phase is a voltage generated at one turn of the W-phase winding 18 shown in FIGS. 1 and 6. The W-phase voltage Vw is a voltage generated in a reverse direction in the W-phase winding 18.

In order to efficiently generate torque in the brushless motor 15, the phase currents Iu, Iv and Iw are required to be fed to the same phases as the unit voltages Eu, Ev and Ew, respectively, of the phase windings. In FIG. 9, Iu, Iv and Iw are assumed to reside in the same phases as Eu, Ev and Ew, respectively, and the voltage vector and the current vector of the same phase are represented by a single vector arrow for simplification of the vector diagram.

An output power Pa and phase powers Pu, Pv and Pw of the brushless motor 15 are expressed by the following Formulas:

$$Pu=Vu\times(-Iu)=Wu\times Eu\times S1\times Iu \quad (4)$$

$$Pv=Vv\times Iv=Wv\times Ev\times S1\times Iv \quad (5)$$

$$Pw=Vw\times Iw=Ww\times Ew\times S1\times Iw \quad (6)$$

$$Pa=Pu+Pv+Pw=Vu\times Iu+Vv\times Iv+Vw\times Iw \quad (7)$$

Further, an output torque Ta and phase torques Tu, TV and Tw of the brushless motor 15 are expressed by the following Formulas:

$$Tu = Pu/S1 = Wu \times Eu \times Iu \quad (8)$$

$$Tv = Pv/S1 = Wv \times Ev \times Iv \quad (9)$$

$$Tw = Pw/S1 = Ww \times Ew \times Iw \quad (10)$$

$$\begin{aligned}Ta &= Tu + Tv + Tw \\ &= Wu \times Eu \times Iu + Wv \times Ev \times Iv + Ww \times Ew \times Iw \\ &= Wc \times (Eu \times Iu + Ev \times Iv + Ew \times Iw)\end{aligned} \quad (11)$$

It should be appreciated that the vector diagram associated with the voltages, currents and torques of the brushless motor 15 according to the present embodiment is the same as the vector diagram associated with the conventional brushless motor shown in FIGS. 109, 110 and 111.

An explanation will now be given on an approach for modifying the phase windings and currents shown in FIGS. 1 and 6, which modification may attain higher efficiency. The U-phase winding 15 and the V-phase winding 16 are loop windings, which are adjacently arranged between the U-phase stator poles 19 and the V-phase stator poles 20. These windings can be combined into a single winding. Similarly, the V-phase winding 17 and the W-phase winding 18 are loop windings, which are adjacently arranged between the V-phase stator poles 20 and the W-phase stator poles 21. These windings can be combined into a single winding.

Figure 7:
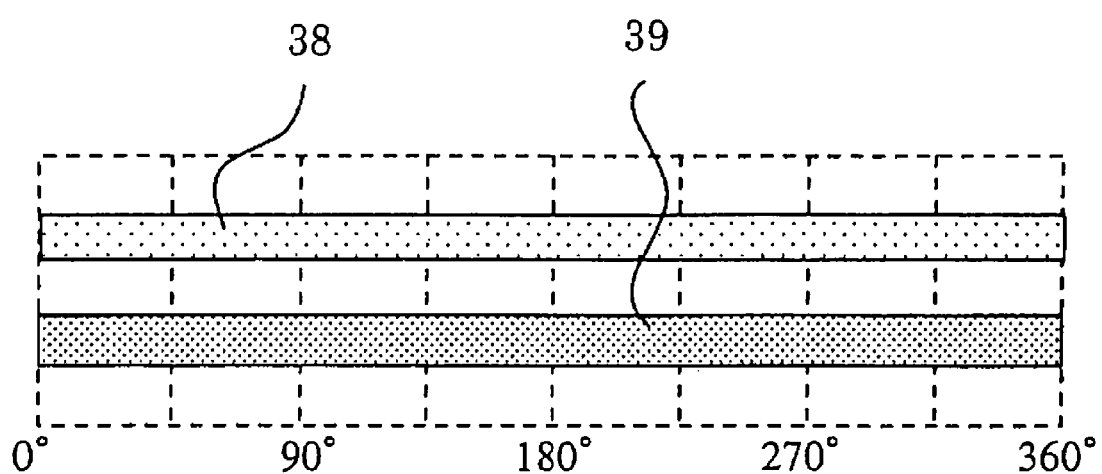
FIG. 7 illustrates the windings shown in FIG. 6, which are combined two by two.

FIG. 7 shows the modification in which two windings are combined into a single winding. As is apparent from the comparison between FIGS. 7 and 6, the U-phase winding 15 and the V-phase winding 16 are replaced by a single M-phase winding 38, and the V-phase winding 17 and the W-phase winding 18 are replaced by a single N-phase winding 39. The current (−Iu) of the U-phase winding 15 and the current (Iv) of the V-phase winding 16 are added to obtain an M-phase current Im (=−Iu+Iv) for passing through the M-phase winding 38. The condition of magnetic flux generated by the M-phase winding 38 results in the same as that of the magnetic flux obtained by combining the magnetic fluxes generated by the U- and V-phase windings 15 and 16, thereby attaining electromagnetic equivalence between these conditions. Similarly, the current (−Iv) of the V-phase winding 17 and the current (Iw) of the W-phase winding 18 are added to obtain an N-phase current In (=−Iv+Iw) for passing through the N-phase winding 39. The condition of magnetic flux generated by the N-phase winding 39 results in the same as that of the magnetic flux obtained by combining the magnetic, fluxes generated by the V- and W-phase windings 17 and 18, thereby attaining electromagnetic equivalence between these conditions.

These conditions are reflected on FIG. 9. A unit voltage Em of the M-phase winding 38 and a unit voltage En of the N-phase winding 39 shown in FIG. 9 are expressed by the following Formulas:

$$Em=-Eu=-d\phi u/d\theta$$

$$En=Ew=d\phi w/d\theta$$

Further, vector calculations of voltage V, power P and torque T of the individual windings result in the following Formulas:

$$Vm = Wc \times Em \times S1 \quad (12)$$

$$Vn = Wc \times En \times S1 \quad (13)$$

$$\begin{aligned}Pm &= Vm \times Im \\ &= Wc \times (-Eu) \times S1 \times (-Iu + Iv) \\ &= Wc \times Eu \times S1 \times (-Iu + Iv)\end{aligned} \quad (14)$$

$$\begin{aligned}Pn &= Vn \times In \\ &= Wc \times Ew \times S1 \times (-Iv + Iw)\end{aligned} \quad (15)$$

$$\begin{aligned}Pb &= Pm + Pn \\ &= Vu \times (-Iu + Iv) + Vw \times (-Iv + Iw)\end{aligned} \quad (16)$$

$$\begin{aligned}Tm &= Pm/S1 \\ &= Wc \times (-Eu) \times (-Iu + Iv)\end{aligned} \quad (17)$$

$$\begin{aligned}Tn &= Pn/S1 \\ &= Wc \times Ew \times (-Iv + Iw)\end{aligned} \quad (18)$$

$$\begin{aligned}Tb &= Tm + Tn \\ &= Wc \times ((-Eu \times Im) + Ew \times In) \\ &= Wc \times (-Eu \times (-Iu + Iv) + Ew \times (-Iv + Iw)) \\ &= Wc \times Eu \times Iu + Wc \times Iv \times (-Eu - Ew) + Wc \times Ew \times Iw \\ &= Wc \times (Eu \times Iu + Ev \times Iv + Ew \times Iw)\end{aligned} \quad \begin{aligned}(19)\\\\\\\\(20)\end{aligned}$$

$$\text{because, } Eu + Ev + Ew = 0 \quad (21)$$

The torque formula indicated by Formula (11) is expressed by three phases, while the torque formula indicated by Formula (19) is expressed by two phases. Although the expressions of these torque formulas are different, expansion of Formula (19) results in Formula (20). As can be seen, therefore, these Formulas are mathematically equivalent. In particular, in case the voltages Vu, Vv and Vw and the currents Iu, Iv and Iw are balanced 3-phase alternating currents, the torque Ta expressed by Formula (11) results in a steady value. In this case, the torque Tb expressed by Formula (19) is obtained as a sum of square function of the sine wave which is a phase difference, i.e. Kmn=90°, between Tm and Tn, and results in a steady value.

Formula (19) is an expression of a mode of a 2-phase AC motor, and Formulas (11) and (21) are expressions of modes of a 3-phase AC motor. These values are the same. However, in Formula (19), a copper loss is different between a case where the current Im for (−Iu+Iv) is supplied to the M-phase winding 38 and a case where the currents −Iu and Iv are supplied to the U- and V-phase windings 15 and 16, respectively, although there is no electromagnetic difference. As shown in the vector diagram of FIG. 9, a real axis component of the current Im is reduced to a value obtained by multiplying Im with cos 30°. Accordingly, supplying the current Im to the M-phase winding 38 may result in a copper loss of 75%, exerting an effect of reducing copper loss by 25%.

Combination of the adjacently arranged loop windings may not only reduce copper loss, but also enhance productivity of motors owing to the more simplified winding structure, whereby cost can be further reduced.

Hereinafter will be described a modification in the shapes of the poles in gap surfaces, associated with the configuration of the stator 14 of the motor shown in FIG. 1. The shapes of the poles of the stator 14 give significant influences on torque characteristics, and are closely related to cogging torque ripple, or torque ripple induced by supply current. A specific example will be described, in which shapes of the stator poles in the individual groups of stator poles are modified, so that a configuration and amplitude of each unit voltage, that is, a rotation change rate of the magnetic flux that resides in each group of stator poles may be substantially kept at a certain level and that a phase difference of 120° in electrical angle can be maintained.

Figure 10:
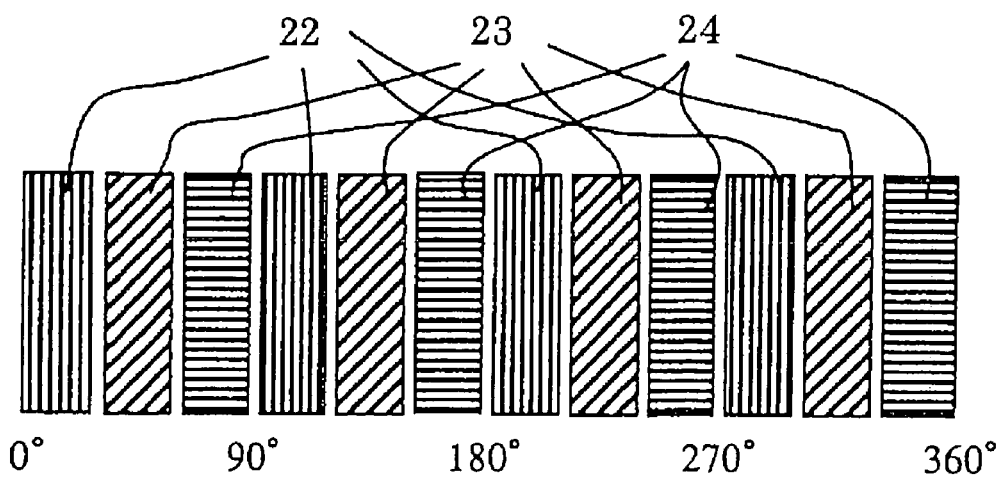
FIG. 10 illustrates a modification of the inner peripheral surface of the stator poles of the motor illustrated in FIG. 1.

FIG. 10 is a circumferential development of modified stator poles. Stator poles 22, 23 and 24 of the individual phases shown in FIG. 4 have basic shapes, being arranged parallel to the rotor shaft 11. The stator poles in each phase have the same shapes and are arranged so as to have a relative phase difference of 120° in electrical angle. There is concern that use of the stator poles 22, 23 and 24 having such shapes may induce larger torque ripple. In this regard, formation of domed indents in a radial direction of the stator poles 22, 23 and 24 may allow smooth electromagnetic effects at border portions, by which torque ripple can be reduced. Alternatively, domed indents may be formed in individual pole surfaces of the permanent magnets 12 of the rotor 11 to realize a sinusoidal magnetic flux distribution in a circumferential direction, by which torque ripple can be reduced. The angles indicated by the horizontal axis of FIG. 10 are mechanical angle along the circumference, with one cycle that starts from the left end to the right end being 360°.

Figure 11:
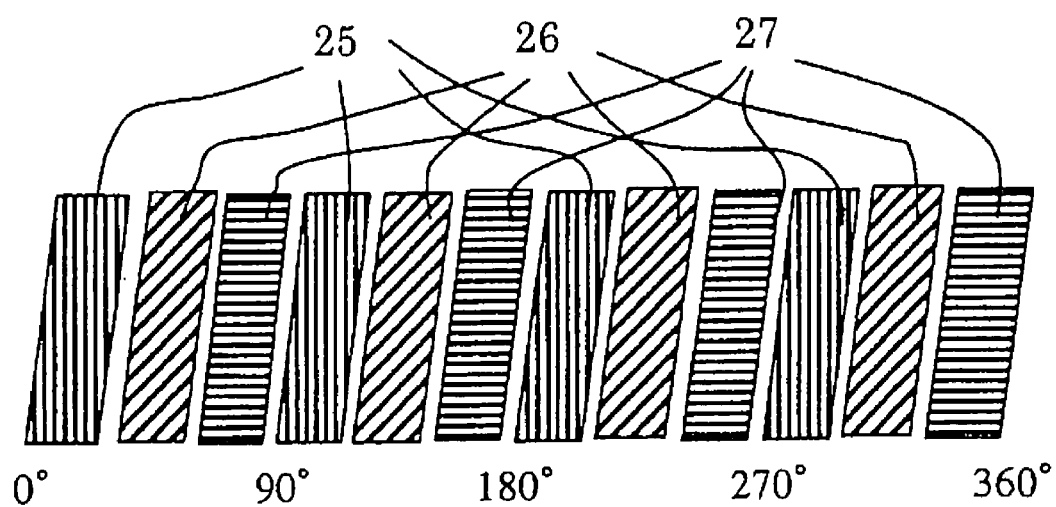
FIG. 11 illustrates a modification of the inner peripheral surface of the stator poles of the motor illustrated in FIG. 1.

FIG. 11 is a circumferential development illustrating another modification of the stator poles. Stator poles 25, 26 and 27 of the individual phases shown in FIG. 11 are skewed by about 60° in electrical angle with respect to the basic shapes shown in FIG. 10 (circumferentially inclined by about 60° in electrical angle with respect to a direction parallel to the rotor shaft 11). This has an effect of reducing torque ripple. Further, since the widths of the stator poles 25, 26 and 27 of the individual phases are smaller than 180°, there is no reduction in the maximum magnetic fluxes passing through the stator poles 25, 26 and 27 of the individual phases, giving a feature that reduction of torque average value is small.

In case the shapes of the stator poles shown in FIGS. 10 and 11 are employed, air-gap surface configurations of the stator poles are realized by allowing ends of the stator poles of the individual phases to come out between the phase windings 15, 16, 17 and 18, and the air-gap portions along the axial direction of the rotor. This requires spaces for magnetic paths so that the ends of the stator poles can axially come out, raising a problem that an outer shape of the motor tends to be enlarged because of the necessity of ensuring the spaces.

FIG. 12 is a circumferential development illustrating another modification of the stator poles, i.e. a modification of the stator pole shapes for mitigating the problem. FIG. 12 shows an example, in which, the shapes of the stator poles 28, 29 and 30 of the individual phases have been modified so that a phase difference of 120° in electrical angle is maintained, while the configurations and amplitudes of the unit voltages Eu, Ev and Ew of the individual phases are substantially the same, on condition that: the U-phase unit voltage corresponding to a rotation angle rate of the magnetic flux $\phi u$ that resides in the U-phase stator pole 28 is Eu (=d$\phi$u/d$\theta$); the V-phase unit voltage corresponding to a rotation angle rate of the magnetic flux $\phi v$ that resides in the V-phase stator pole 29 is Ev (=d$\phi$v/d$\theta$); and the W-phase unit voltage corresponding to a rotation angle rate of the magnetic flux $\phi w$ that resides in the W-phase stator pole 30 is Ew (=d$\phi$w/d$\theta$) in the stator 14. The shapes of these stator poles are characterized in that the length of each of the air-gap surfaces of the stator poles 28, 29 and 30 is mostly small for intermediate portions of individual teeth, i.e. the individual stator poles, so that the magnetic fluxes from the rotor 11 can easily pass the stator pole surfaces and the intermediate portions of the teeth and can further pass through magnetic paths toward the back yoke of the stator 14. Accordingly, comparing with the stator pole shapes shown in FIGS. 10 and 11, the stator pole shapes shown in FIG. 12 can reduce the spaces between the phase windings 15, 16, 17 and 18, and the air-gap portions. As a result, the outer shape of the brushless motor can be reduced.

Figure 13:
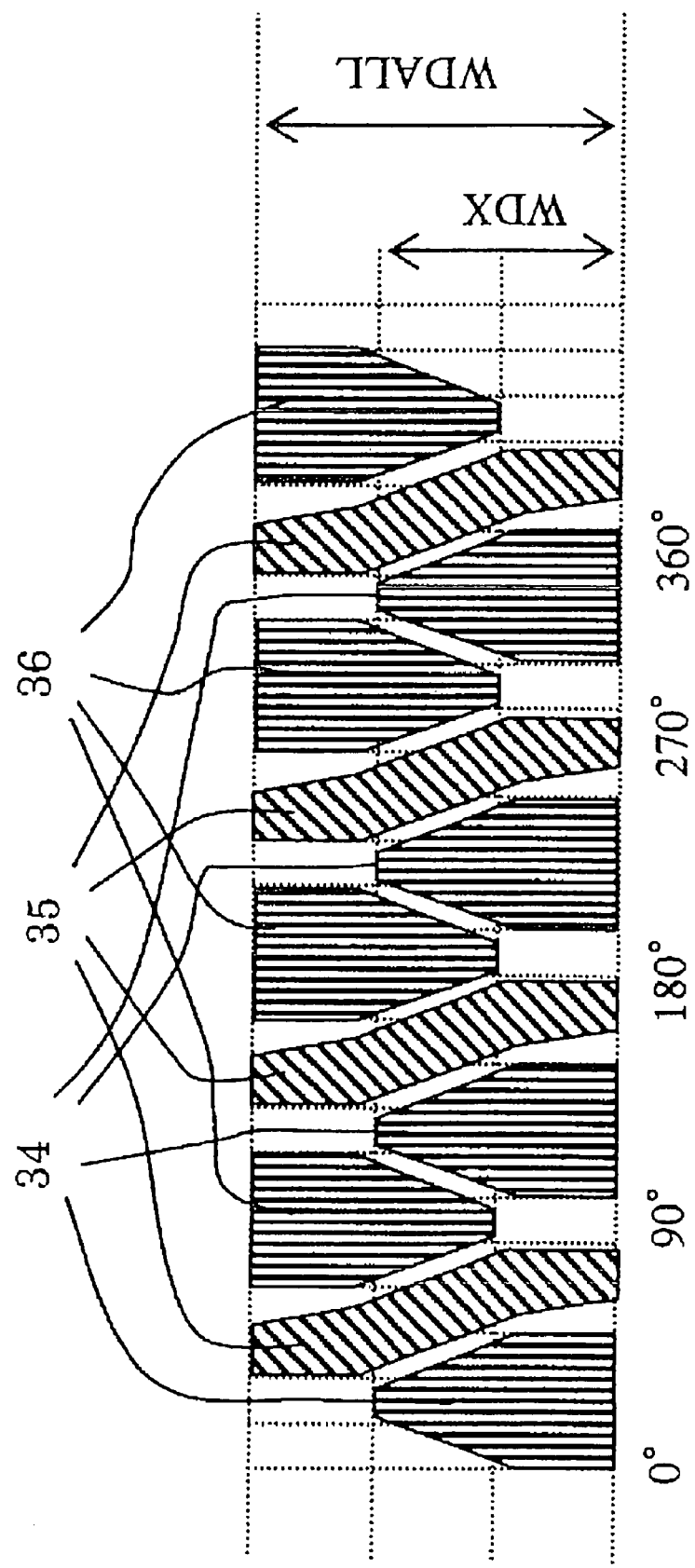
FIG. 13 illustrates a modification of the inner peripheral surface of the stator poles of the motor illustrated in FIG. 1.
Figure 14:
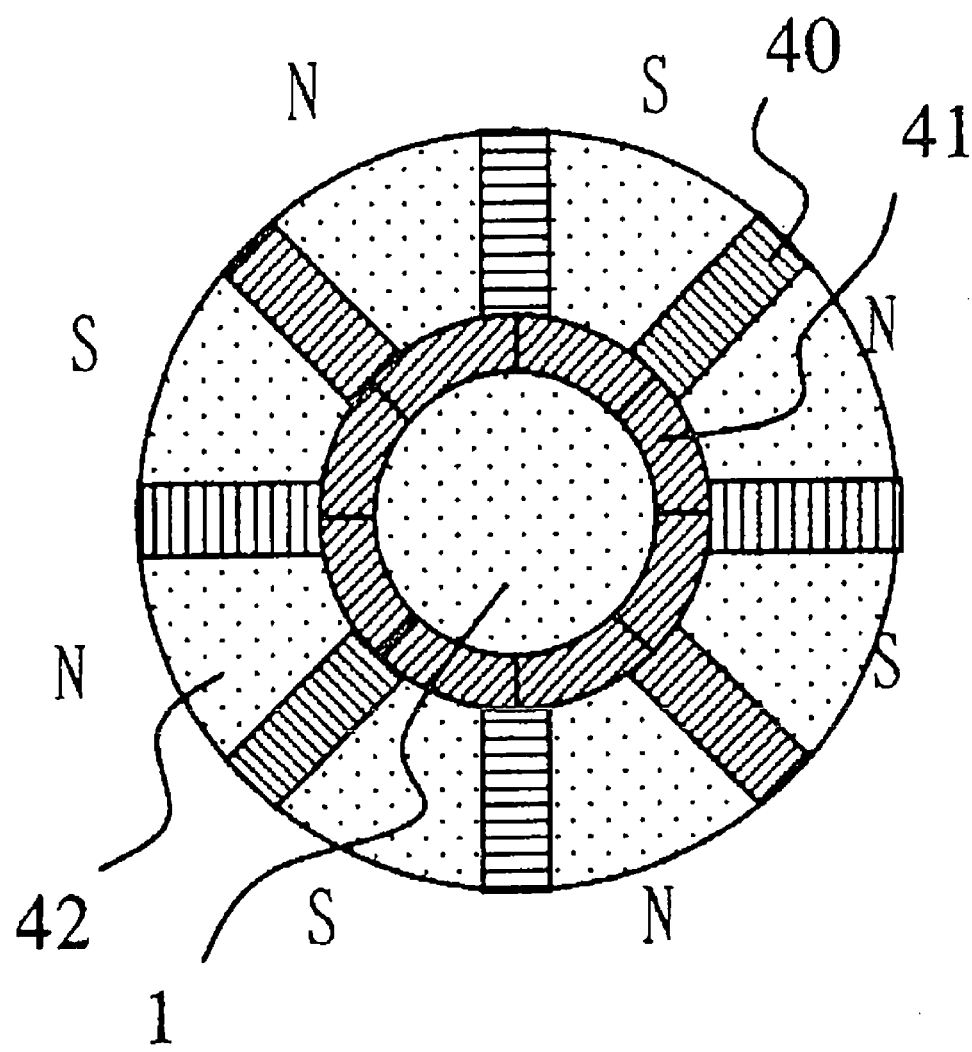
FIG. 14 is a transverse cross section illustrating each of various types of rotors incorporating permanent magnets.
Figure 15:
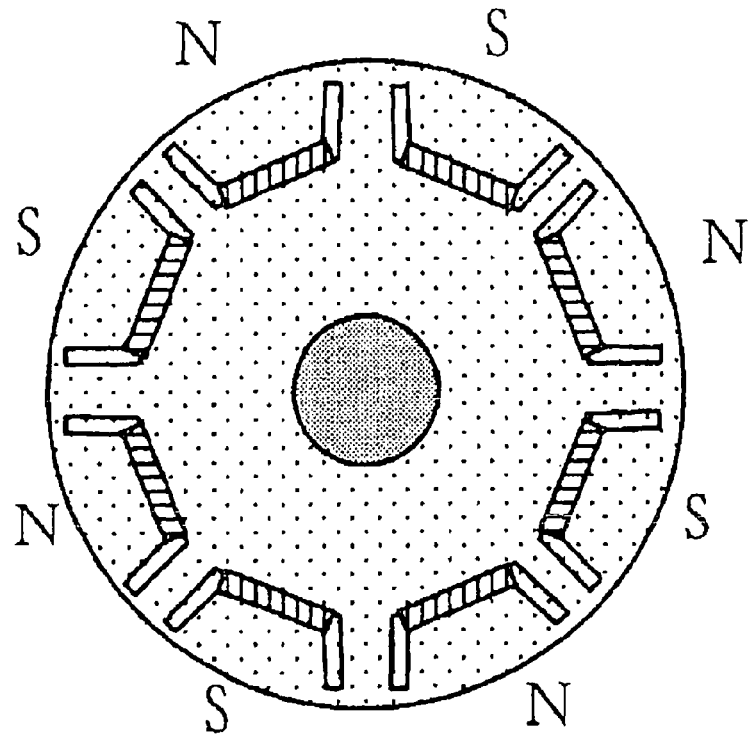
FIG. 15 is a transverse cross section illustrating each of various types of rotors incorporating permanent magnets.
Figure 16:
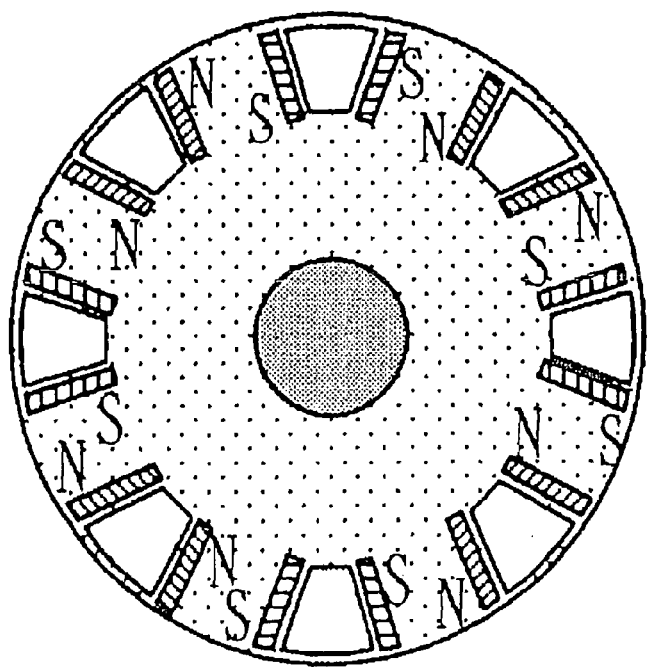
FIG. 16 is a transverse cross section illustrating each of various types of rotors incorporating permanent magnets.
Figure 17:
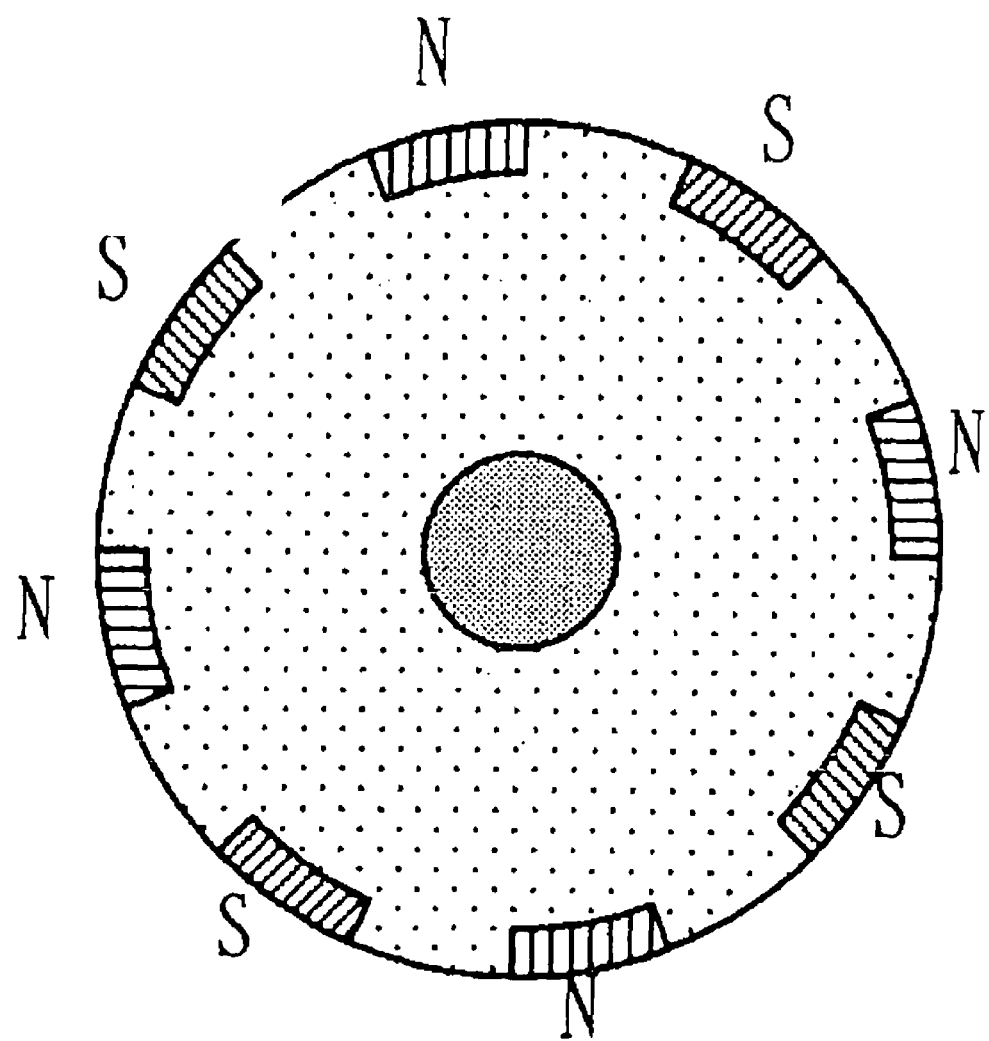
FIG. 17 is a transverse cross section illustrating each of various types of rotors incorporating permanent magnets.
Figure 18:
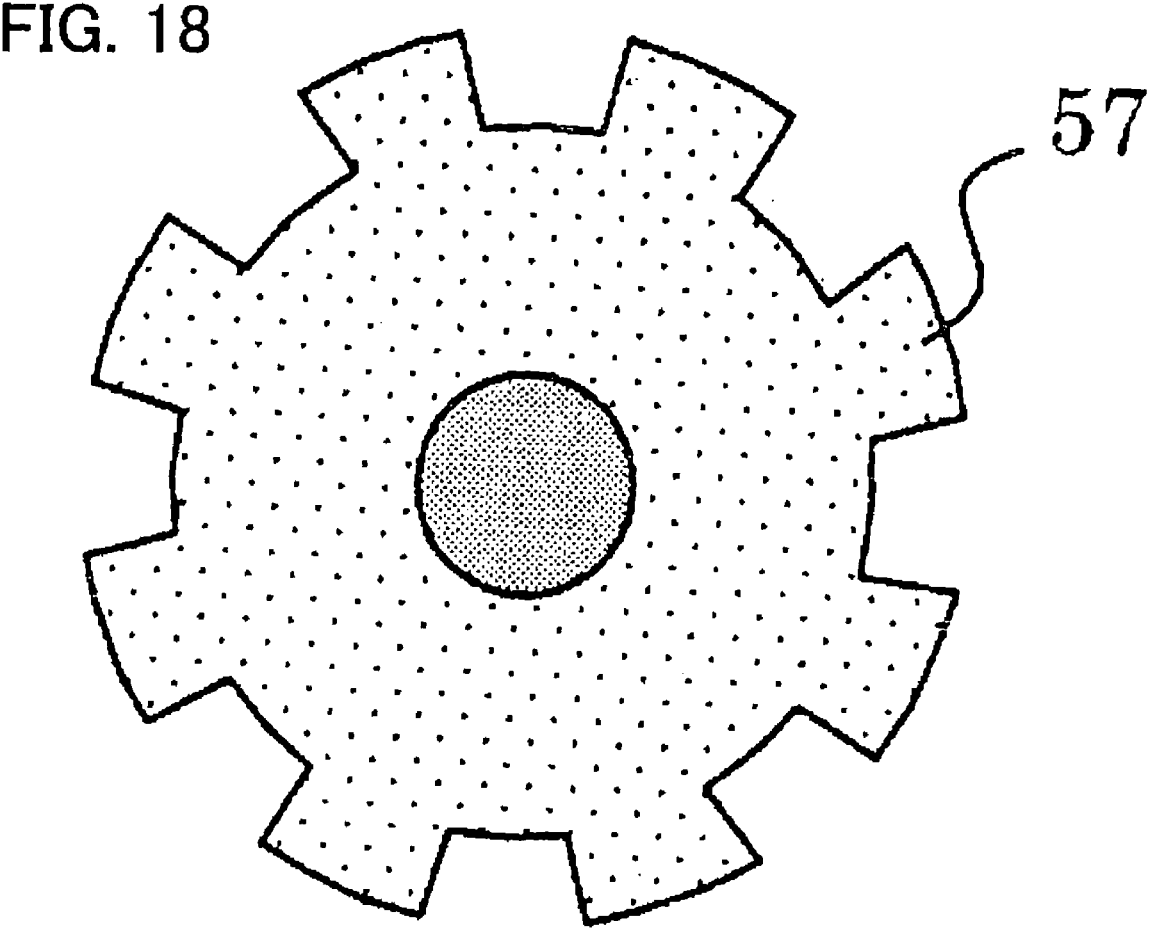
FIG. 18 is a transverse cross section exemplifying a rotor of a reluctance motor provided with salient poles.
Figure 19:
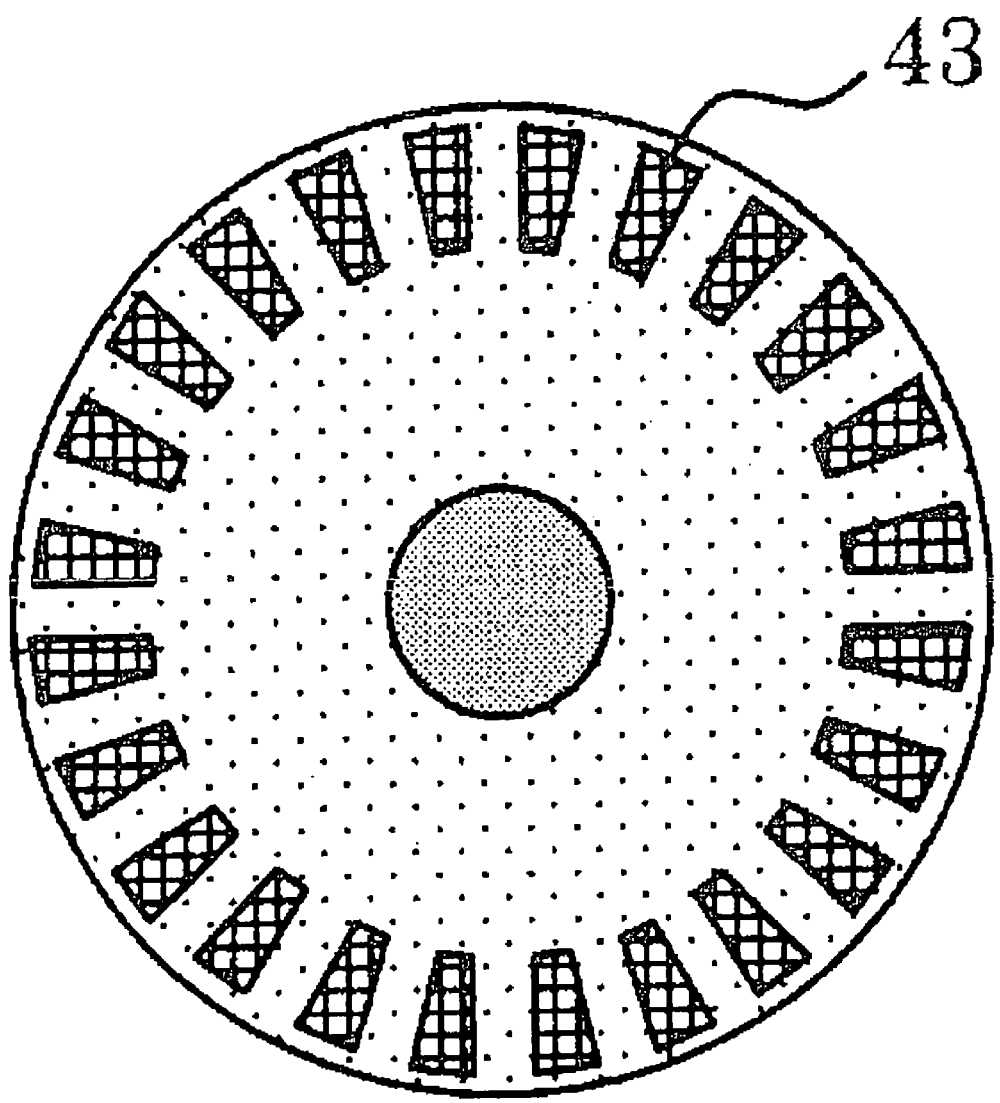
FIG. 19 is a schematic transverse cross section illustrating a rotor of an induction motor.

FIG. 13 is a circumferential development illustrating another modification of the stator poles, in which the stator pole shapes shown in FIG. 10 are further modified. In the example shown in FIG. 13, the U- and W-phase stator poles 34 and 36, respectively, at the axial ends of the rotor shaft 11 are circumferentially expanded in the pole width by 180° in electrical angle. The remaining space is distributed and located so as to balance the V-phase stator poles 35. As to the portions of the teeth of the U- and W-phase stator poles 34 and 36, respectively, whose surfaces are located far from the back yoke, end portions thereof are removed because these end portions are so thin that they are difficult to be fabricated. Indicated by numeral 35 are the V-phase stator poles. The rotation angle rates, i.e. the unit voltages Eu, Ev and Ew, at the surfaces of the stator poles of the individual phases having such shapes are modified so as to have the same value, although the phases are different. As a result, the shapes of these stator poles can allow for passage of comparatively large effective magnetic fluxes and can be comparatively easily fabricated.

The above description has been given on the well-known basic configurations and operations of the motors as shown in FIGS. 1 to 13. Thus, for discussing a motor structure that can increase the maximum torque as much as possible, a motor is required to be studied from a different viewpoint. For example, in the motor configuration shown in FIG. 1, the shapes of the U-, V- and W-phase stator poles 19, 20 and 21 in a plane facing the rotor may be modified into the shapes shown in FIG. 12 for the purpose of increasing torque. Assuming that Ne-, Fe- or B-based rare earth magnets are used for the permanent magnets 12 of the rotor, flux density of about 1.2 T may be obtained. Meanwhile, useful flux density of electromagnetic steel plates is about 1.8 T. Therefore, supplying high current, in particular, for the purpose of generating large torque may create a problem of generating magnetic saturation at the soft magnetic portion that extends from an end portion of each stator pole to the back yoke of the stator. In this case, flux leakage from between the stator poles of the individual phases will have a large value because the stator poles are adjacently provided. Thus, this not only reduces the power factor of the motor but also becomes one of the causes of the problem of magnetic saturation. Also, attaining the end shapes of the stator poles of the individual phases as shown in FIG. 12 may create a problem of complicating the magnetic-path configuration on the inner-diameter side of the stator shown in FIG. 1, and a problem of reducing spaces for arranging the windings 15, 16, 17 and 18.

These problems may be resolved by the motors related to the present invention, which will be described referring to the following embodiments.

Embodiments

Figure 128:
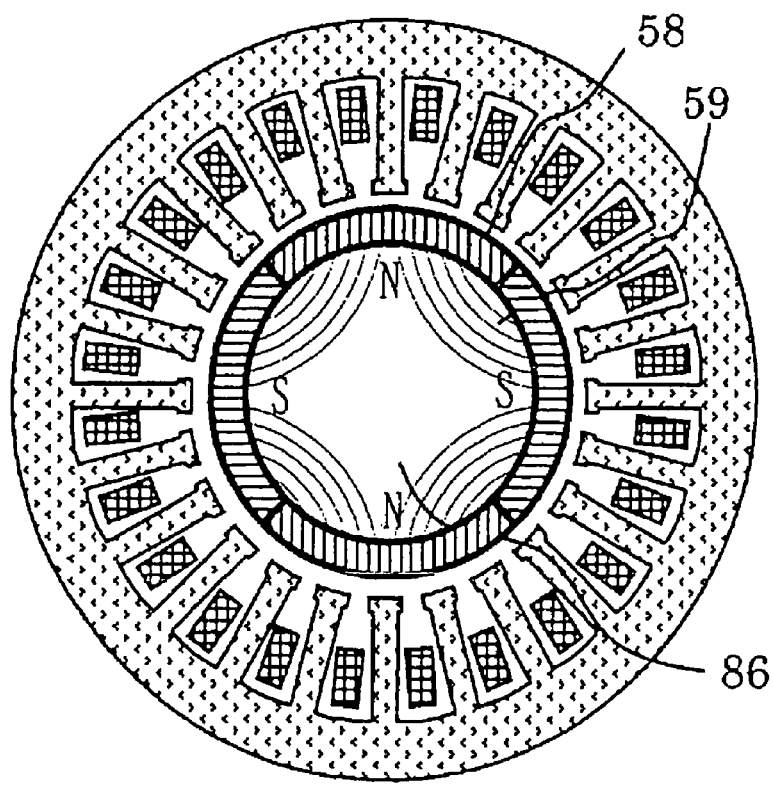
Figure 129:
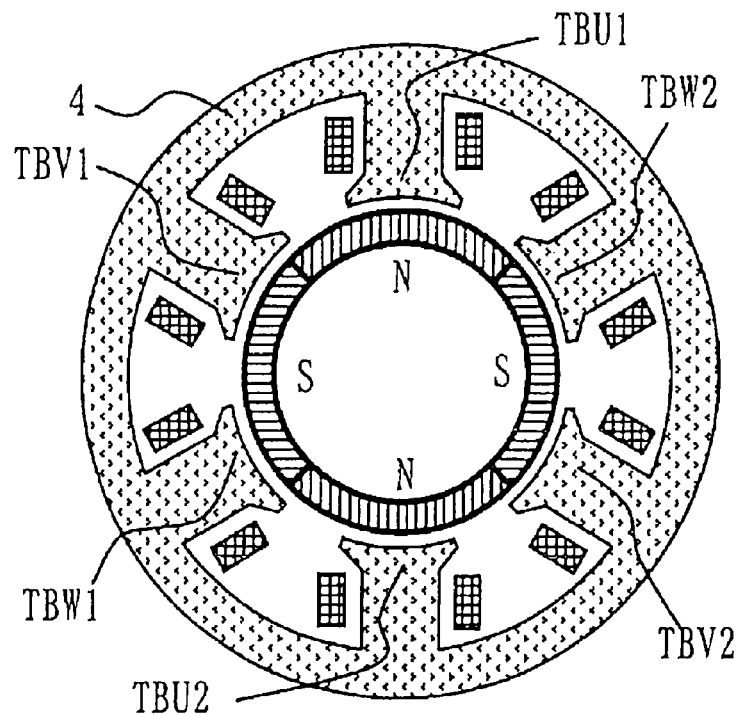
Figure 130:
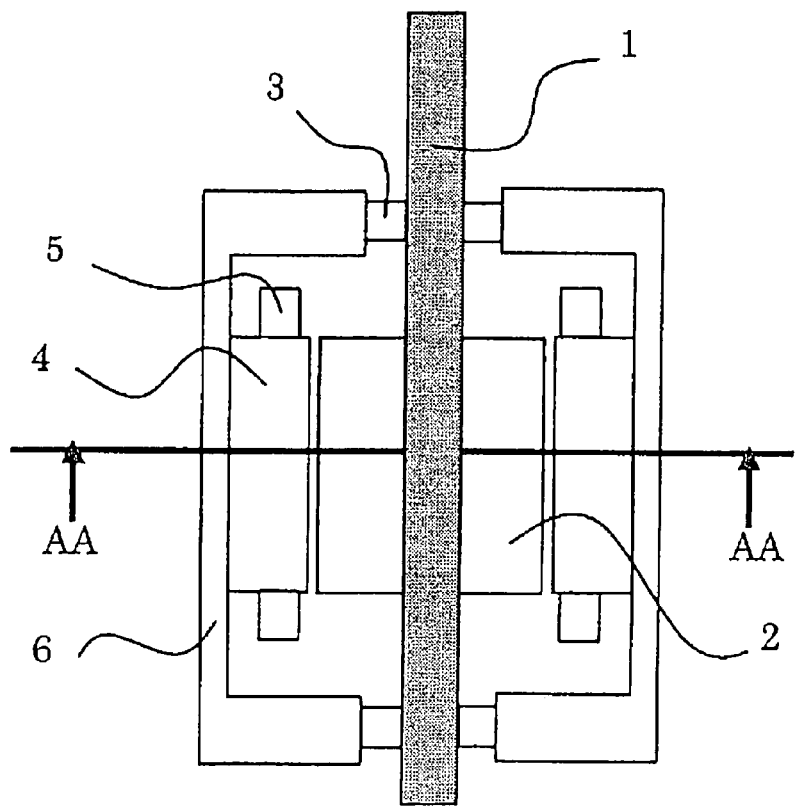
Figure 131:
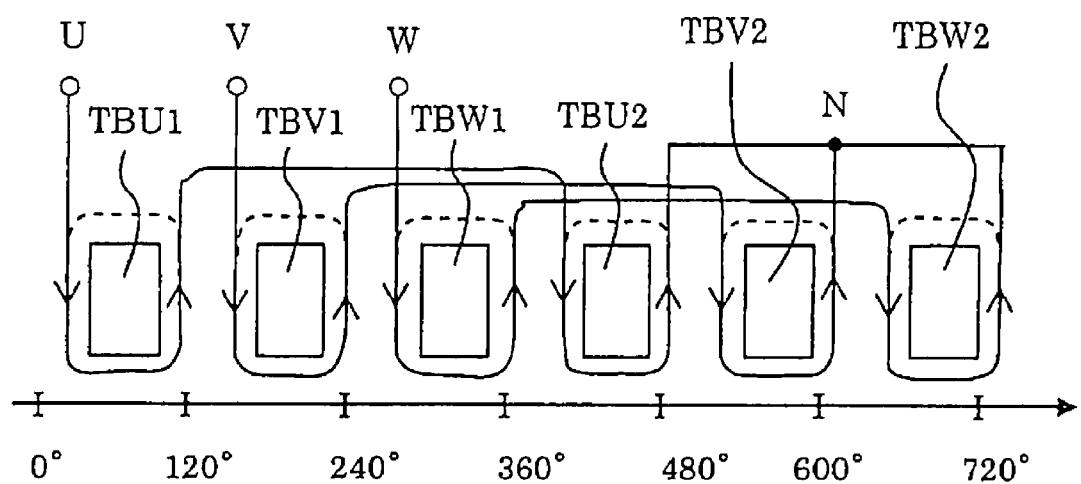

The present invention has been made to resolve the structural problem that resides in the motors shown in FIGS. 128 and 129, and the problem created by the motor as shown in FIG. 1 in generating large torque. The present invention will suggest arrangement relationships between stator poles, rotor poles and loop windings, and specific configurations of stator poles and rotor poles.

Figure 20:
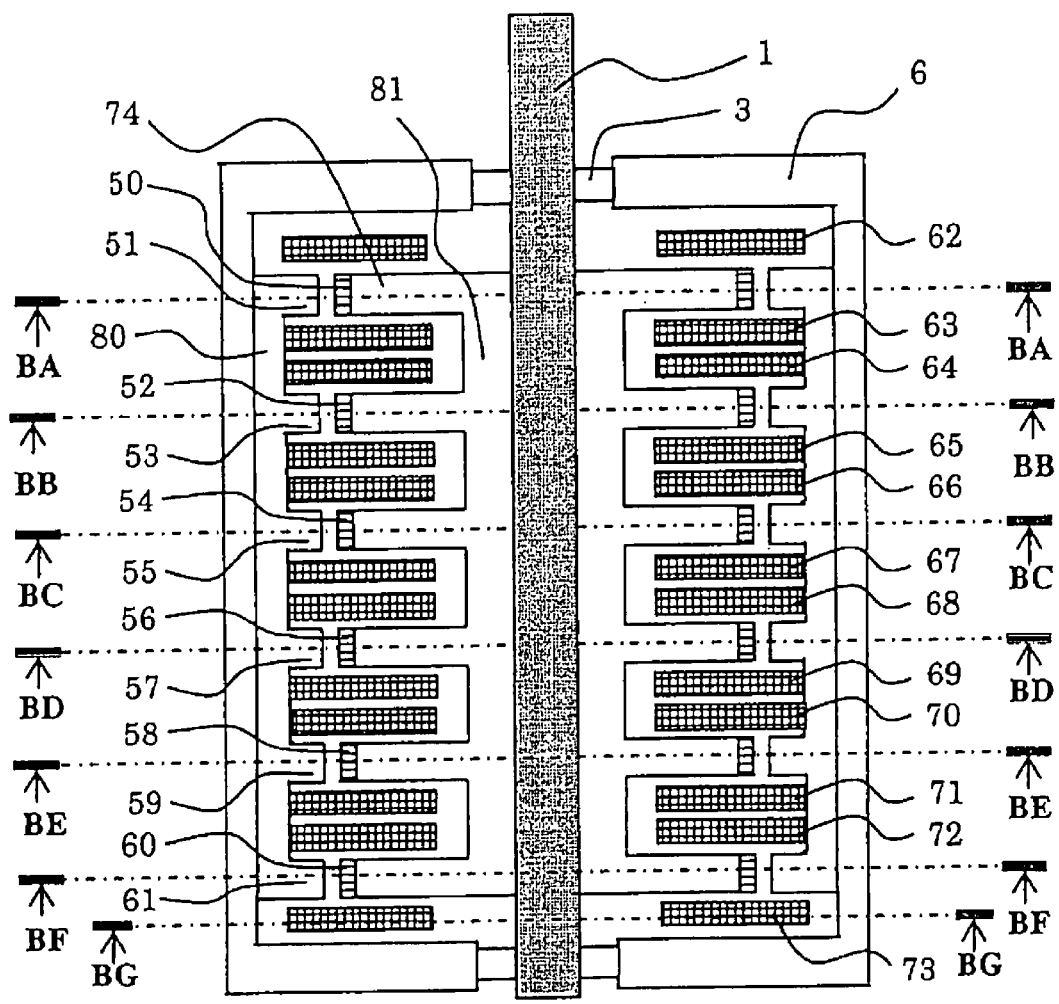
FIG. 20 is a schematic vertical cross section illustrating a six-phase motor having loop windings.

FIG. 20 shows an example of a six-phase motor of the present invention. This figure shows an arrangement relationship between stator poles, rotor poles and loop windings. Indicated by numeral 1 is a rotor shaft, by 6 is a motor case and by 3 are bearings. The configuration including these parts is not necessarily required in describing the electromagnetic effects of the motor, and therefore may hereinafter be mostly omitted from the figures of the motors of the present invention.

Indicated by numeral 51 are A-phase stator poles, by 53 are B-phase stator poles, by 55 are C-phase stator poles, by 57 are D-phase stator poles, by 59 are E-phase stator poles and by 61 are F-phase stator poles. Indicated by numeral 80 is a back yoke of the stator, which serves as a magnetic path to be shared between the stator poles of the individual phases.

Rotor poles 50, 52, 54, 56, 58 and 60 of phases A, B, C, D, E and F, respectively, of the rotor are opposed to the respective stator poles. An outer peripheral configuration of the rotor is separated in the rotor shaft direction. In particular, recesses are provided between rotor poles, each recess being deeply recessed from the outer-diameter side to the inner-diameter side. Stator windings 62, 63, 63, 65, 66, 67, 68, 69, 70, 71, 71 and 73 are arranged each extending from the outer-diameter side to the inner-diameter side of the rotor. Thus, the cross-sectional areas of the winding can be increased. In addition, since a winding has a short circumference at a portion where the diameter is small, significant effect can be exerted in terms of the reduction in the resistance. Accordingly, resistance of the windings can be reduced, and thus supplying high current may attain generation of large continuous rated torque. A magnetic flux passing through a rotor pole passes through an inner-diameter side magnetic path 81, for example, inside the rotor and is directed to another rotor pole. The stator poles 51, 53, 55, 57, 59 and 61 are opposed to the rotor poles of the respective phases. A magnetic flux passing through a stator pole passes through an outer-diameter side magnetic path 80, for example, of the stator and is directed to another pole. A motor having such a configuration can be utilized deep into the rotor and thus may enable outputting of large continuous rated torque.

Figure 22:
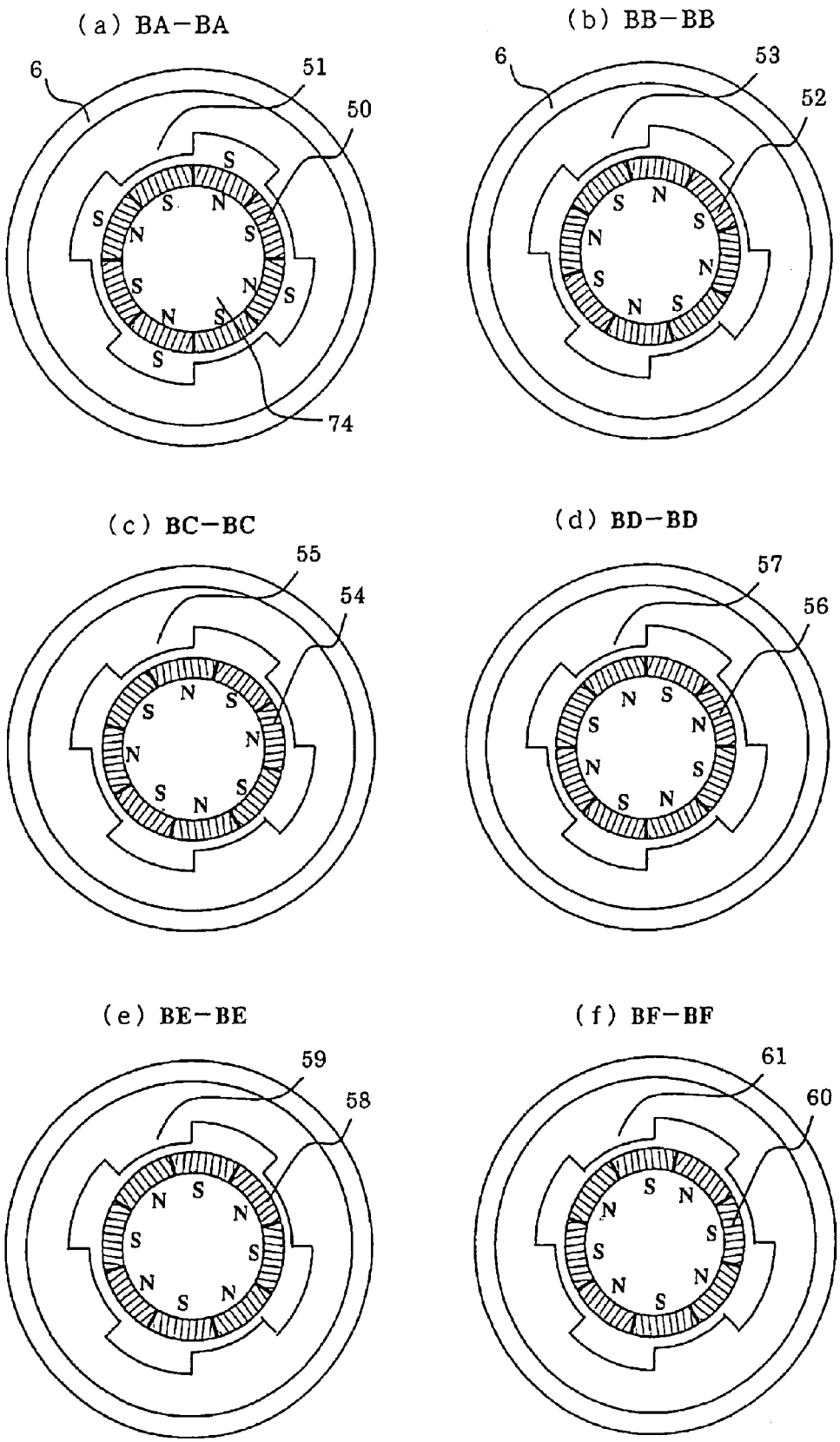
FIG. 22 illustrates schematic transverse cross sections of the stator illustrated in FIGS. 20 and 21.

The example of the motor configuration shown in FIG. 20 has the permanent-magnet rotor and the circumferentially indented stator poles as shown in FIG. 22. In this motor configuration, the stator poles and the rotor poles are separately provided for each phase to avoid complicating a structure between the phases. Thus, each phase can be independently configured to realize a peculiar pole structure. Specific configurations of the magnetic poles will be described later.

Various modifications can be made in the rotor structure. The magnetic flux of each pole may be devised to be large. Specifically, the air-gap portion through which a rotor pole and a stator pole are opposed to each other may be shifted to the outer-diameter side to the utmost limit, and the axial width of these poles may be increased as much as possible, while an axial width of a winding portion at the air-gap portion may be decreased. In this case, it is advantageous to increase as much as possible the axial width of the winding located at the inner-diameter side of the rotor, being extended from the outer diameter thereof, so that the winding resistance can be reduced. The rotor poles and the stator poles of each phase are paired so that their relative phase alone may particularly influence properties, and that absolute positions of the magnetic poles of each phase may not be limited. In this regard, degree of freedom in the design is increased. As shown in FIG. 20, the permanent magnets 50 are attached to the rotor while the stator is indented to provide salient forms. Alternatively, for example, the stator poles and the rotor poles may be reversely positioned and the permanent magnets may be attached to the stator. In this case, since the magnets can be attached to a fixed side, no centrifugal force is imposed to facilitate fixation of the magnets by using an adhesive or the like. In addition, the outer-diameter side location of the magnets may increase the amount of magnetic fluxes, whereby torque may be increased that much.

Hereinafter will be described a first method as to how the windings 62, 63, 64, 65, 66, 67, 68, 69, 70, 71, 72 and 73 are positioned, how currents are passed therethrough, and how connection is established therebetween. Indicated by numerals 62 and 63 are A-phase windings. The winding 62 is supplied with an A-phase current while the winding 63 is supplied with a minus (−) A-phase current, i.e. an A-phase current designated with a negative symbol. Similarly, the winding 64 is supplied with a B-phase current while the winding 65 is supplied with a minus (−) B-phase current. The winding 66 is supplied with a C-phase current while the winding 67 is supplied with a minus (−) C-phase current. The winding 68 is supplied with a D-phase current while the winding 69 is supplied with a minus (−) D-phase current. The winding 70 is supplied with an E-phase current while the winding 71 is supplied with a minus (−) E-phase current. The winding 72 is supplied with an F-phase current while the winding 63 is supplied with a minus (−) F-phase current.

When the number of the windings is increased to increase the elements of the magnetic circuits, it is difficult to categorically define with words and explain as to where of the motor the magnetomotive force induced by the current of each winding is applied, or how the magnetomotive force is applied thereto, or how the electromagnetic effects are exerted. However, on condition that the stator back yoke and the rotor back yoke are shared between the individual phases and that the magnetic circuits of each phase constitute balanced multiphase magnetic circuits, somewhat definite explanation may be given based on the Ampere's law and the asymmetric property of the magnetic circuits. Let us take the A-phase stator poles 51 of the motor shown in FIG. 20 as an example. In the motor, A-phase currents are reversely passed through the windings 62 and 63, and thus the stator poles 51 and the rotor poles 50 are regarded as being applied with the magnetomotive force equivalent to the number of ampere turns of the winding 62. As to other windings, the electromagnetic effect is exerted in the same fashion to the magnetic poles of the individual phases to thereby constitute the six-phase motor.

The circumferential positional relationships between the stator and rotor poles of the individual phases are as shown by (a) to (f) of FIG. 22. The relative phases of the stator and rotor poles of the respective phases are mutually differentiated from each other by 60° in electrical angle to constitute the six-phase motor. The windings of each phase may be reversely connected in series for star connection to attain six phases which are balanced both in currents and voltages, whereby control may be effected by a six-phase inverter without causing any problem. Further, since the phases A and D are reversed, they may be reversely connected in series. Similarly, the phases C and F may be reversely connected in series, and the phases E and B may be reversely connected in series. By making these connections into star connections, a three-phase inverter may be used for effecting control.

Figure 24:
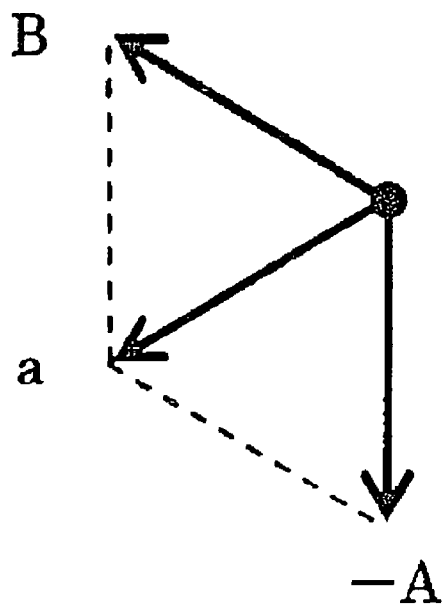
FIG. 24 illustrates relationships associated with vector synthesis of two in six phases.
Figure 24:
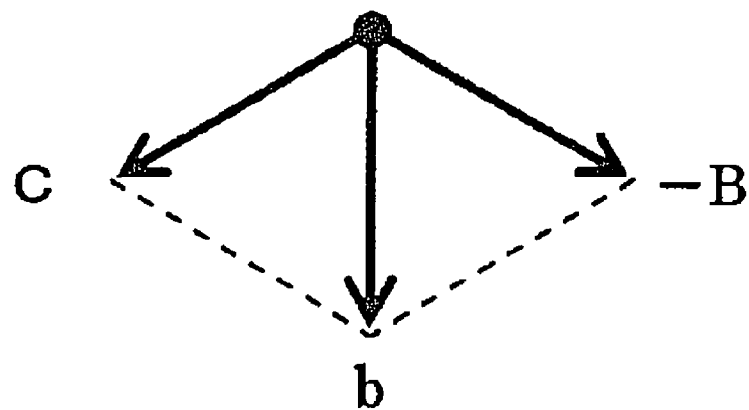

The currents in the motor shown in FIG. 20 may resultantly flow as explained below. That is, while windings 63 and 64 are arranged in the same space, a current passing through this space may be a current corresponding to vector "a" as shown by (a) of FIG. 24, which is equivalent to an additional value of the vector of the –A-phase current –A of the winding 63 and the vector of the B-phase current B of the winding 64. Similarly, a current passing through the windings 65 and 66 may be a current corresponding to vector "b" as shown by (b) of FIG. 24. Thus, the motor shown in FIG. 20 may be explained as passing a current by a factor of two, as exhibiting low driving efficiency of current and as having a winding coefficient of 0.5.

Figure 21:
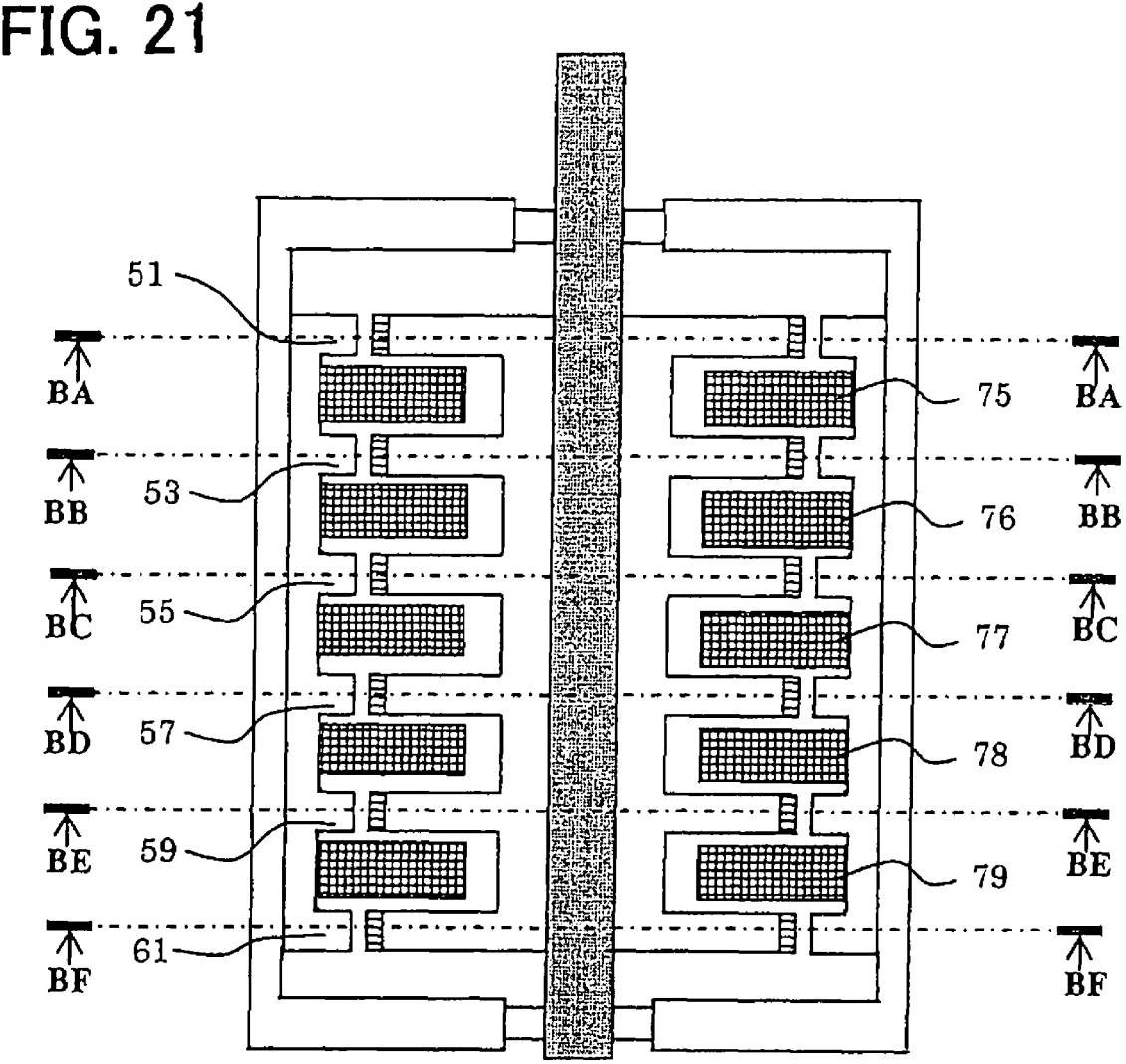
FIG. 21 is a schematic vertical cross section illustrating a six-phase motor having loop windings.
Figure 23:
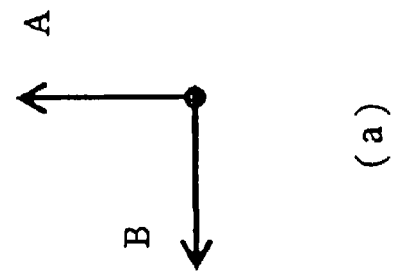
FIG. 23 illustrates vectorial relationships associated with two to six phases.
Figure 23:
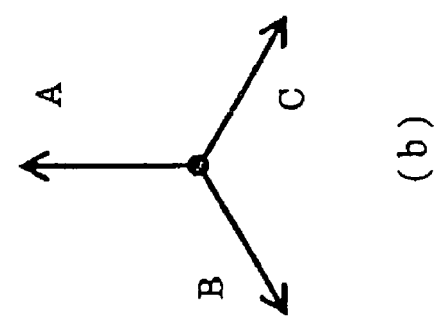
Figure 23:
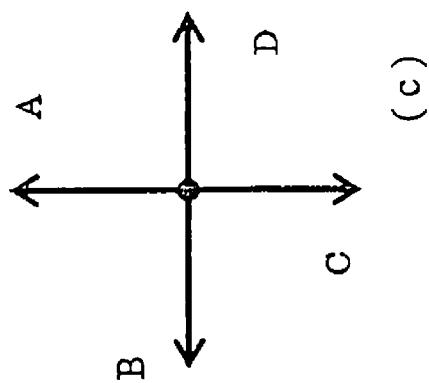
Figure 23:
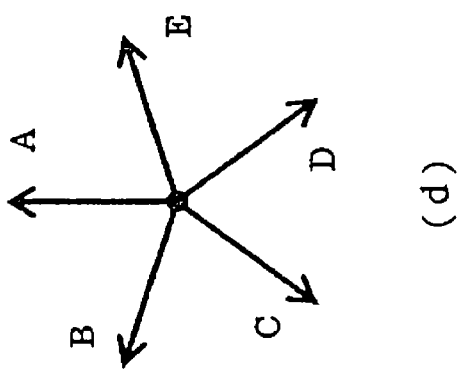
Figure 23:
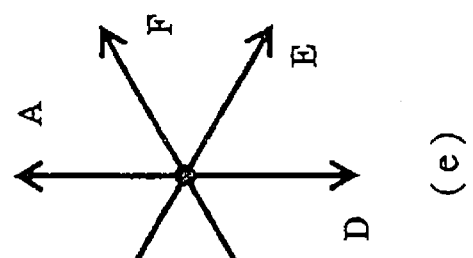
Figure 23:
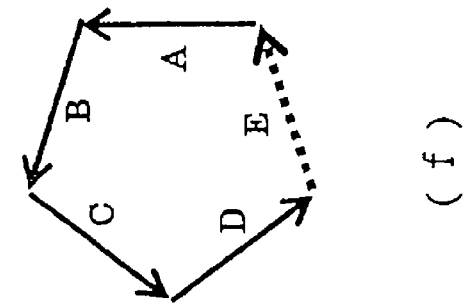
Figure 25:
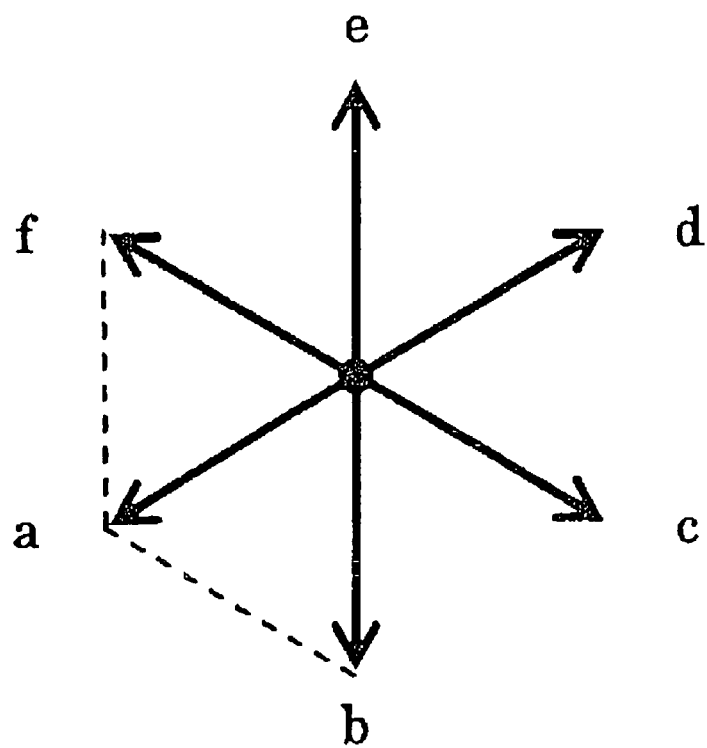
FIG. 25 illustrates six-phase vectors made up of synthesized vectors.

Hereinafter will be described a second method associated with the windings of the motor shown in FIG. 20. On the basis of the above description, with the windings in the space of each slot of the motor shown in FIG. 20 as being one set, optimum currents may be supplied to the windings. FIG. 21 shows the specific configuration. In this motor, the two windings arranged between the individual magnetic poles of the motor shown in FIG. 20 are combined into a single winding. Each of the windings may be supplied with a current having a value which is a sum of the currents to be passed through the two windings before combination. The windings arranged at both ends that are outside the soft magnetic portions of the motor are omitted because their electromagnetic effects on torque generation are very small. Windings 75, 76, 77, 78 and 79 may be supplied with currents that correspond to vectors "a", "b", "c", "d" and "e", respectively, indicated in FIG. 25 when the magnetomotive forces to be applied to the respective stator and rotor poles then are represented by A, B, C, D, E and F as indicated in FIG. 23 by (e). Comparing with the motor shown in FIG. 20, the motor shown in FIG. 21 can reduce copper loss to one half.

Although the motor configuration shown in FIG. 21 includes six phases, six magnetic paths and five sets of windings, the phases may be varied from two to multiple phases. The reduction rate of copper loss resulting from the combination of the windings depends on the number of phases. For three phases, for example, the reduction rate of copper loss will be 25%.

The voltages induced in the individual windings, and the phases of the motor shown in FIG. 21 present considerably different values from the case of balanced six phases. For example, the magnetic fluxes interlinked with the winding 75 are only those which pass through the A-phase stator poles 51. The magnetic fluxes interlinked with the winding 77 are a sum of the magnetic fluxes that pass through the A-phase stator poles 51, the B-phase stator poles 53 and the C-phase stator poles 55. The difference in the sizes of the magnetic fluxes may be easily inferable. Thus, this may result in unbalanced five-phase voltages and currents.

As described above referring to the motor shown in FIG. 20, the windings having phase difference of 180° in electrical angle can be reversely connected in series to realize star-connected three phases. In the same way, the motor shown in FIG. 21 may attain balanced three phases by devising the connection of the windings. Specifically, the windings 75 and 77 may be reversely connected in series, the winding 77 may be left as it is, and the windings 79 and 76 may be reversely connected in series, followed by star-connecting these three sets of the windings. Thus, windings with balanced three-phase currents and voltages can be attained. However, although this method is applicable to motors having even number of phases, no balanced multiphase windings can be attained in case of odd number of phases, such as three, five and seven. In this regard, the first method for the windings shown in FIG. 20 can attain windings with balanced multiphase currents and voltages for odd number of phases as well, although the winding coefficient may be small.

Hereinafter will be described a third method associated with the windings of the motor shown in FIG. 20. In the motor shown in FIG. 20, the B-phase current is passed through the winding 62 while the –B-phase current is passed through the winding 67 having a phase difference of 180°. Similarly, the C-phase current is passed through the winding 64 while the –C-phase current is passed through the winding 69 having a phase difference of 180°. The D-phase current is passed through the winding 66 while the –D-phase current is passed through the winding 71 having a phase difference of 180°. The E-phase current is passed through the winding 68 while the –D-phase current is passed through the winding 73 having a phase difference of 180°. The F-phase current is passed through the winding 70 while the –F-phase current is passed through the winding 63 having a phase difference of 180°. The A-phase current is passed through the winding 72 while the –A-phase current is passed through the winding 65 having a phase difference of 180°. The respective two windings may be reversely connected in series with a supply of currents of the relevant phases. In this state, the windings will have balanced six-phase currents and voltages. In this case, for example, the –F-phase current is passed through the winding 63 and the C-phase current is passed through the winding 64. Meanwhile, since both of these currents are of the same phase, the two windings in the same slot may resultantly be supplied with the same current. Thus, the winding coefficient will be "1", meaning that current has been efficiently supplied. It should be appreciated that the windings 62 and 73 at both ends may be omitted because the magnetic fluxes interlined with these windings are very small.

In the example shown in FIG. 20, which is imparted with six phases, the reverse-phase six sets of windings may be further reversely connected in series to obtain three-phase windings, so that the windings can be driven by a three-phase inverter.

In applying this method to the even number of phases shown in FIG. 20, reverse and serial connections are established, as described above, between the windings having a phase difference of 180°. Where the phase number is odd, the method may be slightly modified to allow for the application. That is, the method includes selecting a value of NX that is an integral multiple of 360°/N, where N is the number of phases, so as to be close to 180°, and establishing a reverse and serial connection with windings having a phase difference of (360°/N)×NX for supply of currents. In case of the six phases, NX will be "3" and a relation (360°/N)×NX=180° is established, which is in conformity with the above description.

In case of five phases, (360°/N)=72° is established, and therefore NX=2 or 3. When NX=2, the same phase windings may be connected in series sandwiching two stator poles therebetween in the rotor shaft direction. In FIG. 20, as a specific model of such five phases, a model may be assumed, in which the sixth phase, or the phase F, is eliminated. That is, a model may be assumed, which is eliminated with the stator poles 61, the rotor poles 60 and the windings 72 and 73 and having a relative phase difference of 360/5=72° between the stator poles. In this case, the windings 62 and 65 are reversely connected in series with a supply of a current having an intermediate phase between the phases A and B. The windings 64 and 67 are reversely connected in series with a supply of a current having an intermediate phase between the phases B and C. The windings 66 and 69 are reversely connected in series with a supply of a current having an intermediate phase between the phases C and D. The windings 68 and 71 are reversely connected in series with a supply of a current having an intermediate phase between the phases D and E. The windings 70 and 63 are reversely connected in series with a supply of a current having an intermediate phase between the phases E and A.

In performing current supply to the windings that are connected in this way, currents of the two windings arranged in the same slot, or the same space, will have a phase difference of 36°. For example, as can be considered from the five-phase vectors shown by (d) of FIG. 23, the phase difference of the currents of the windings 63 and 64 will be 72°/2=36°, because the current of the winding 63 corresponds to vector C which is an intermediate phase between vectors E and A and reversely directed, and because the current of the winding 64 is an intermediate of vectors B and C. The winding coefficient in this case will be COS((180−72°×NX)/2)=COS 18°=0.951. In case of five phases, the value may be NX=3. In this way, this method can also be applied to motors having odd number of phases. Also, this method may achieve a sufficiently large winding coefficient with efficient driving, and may achieve balanced multiphase currents and voltages so as to enable efficient driving with an N-phased inverter. In case of even-number phases, N/2-phased winding connection may be enabled, thus also enabling driving with an N/2-phased inverter.

Hereinafter will be described a fourth method associated with the windings of the motor shown in FIG. 20. In the fourth method, the two windings arranged in the space of the same slot as shown in FIG. 20 are combined into a single winding as shown in FIG. 21 to obtain a total of (N−1) number of windings, whose voltages are imparted with amplitudes and phases considerably different from those of the balanced multiphase voltages. The (N−1) number of windings are star-connected and a center point of the star connection is permitted to serve as one terminal to provide a total of an N number of motor terminals, for performing driving being connected to an N-phased inverter. In this case, the currents and voltages of the motor as seen from the side of the inverter constitute balanced N-phased currents and voltages.

Figure 121:
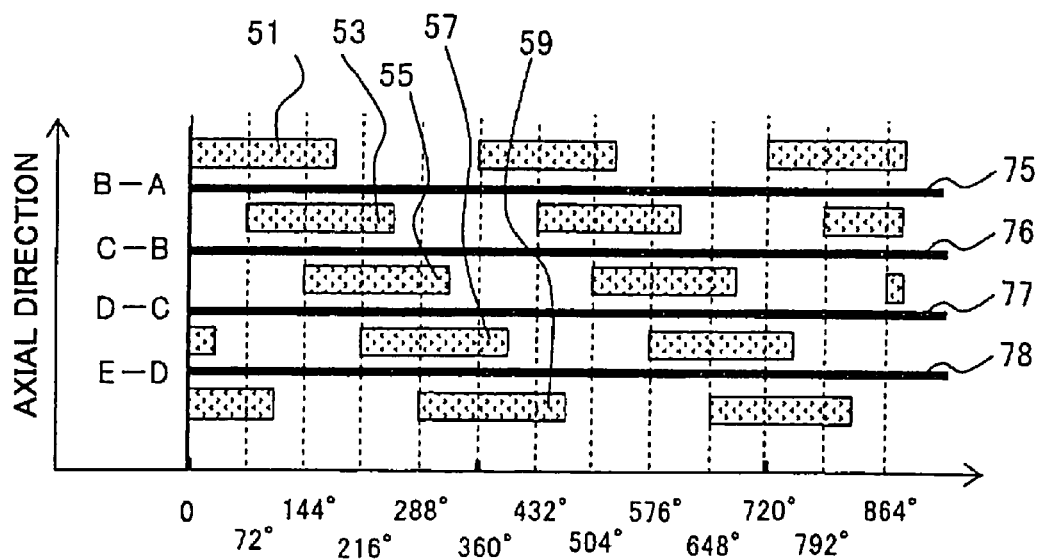
Figure 122:
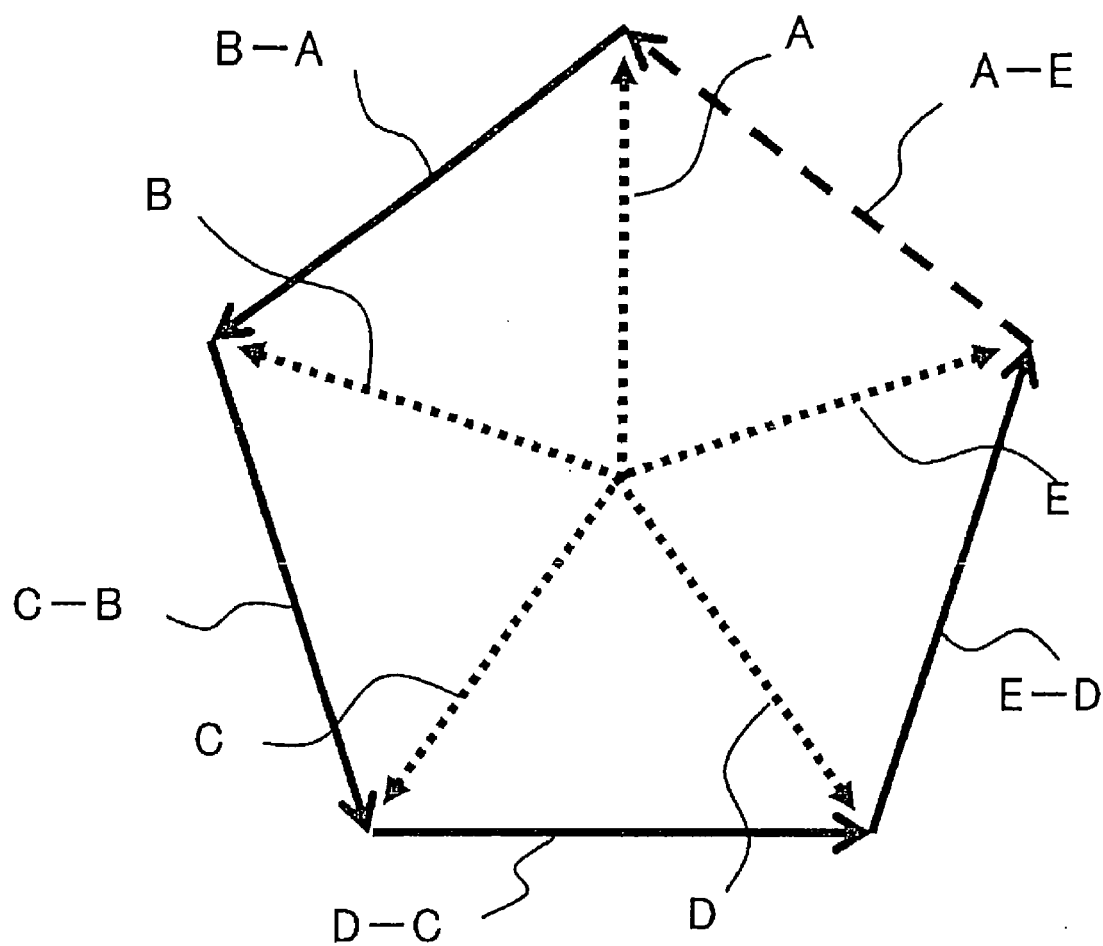
Figure 123:
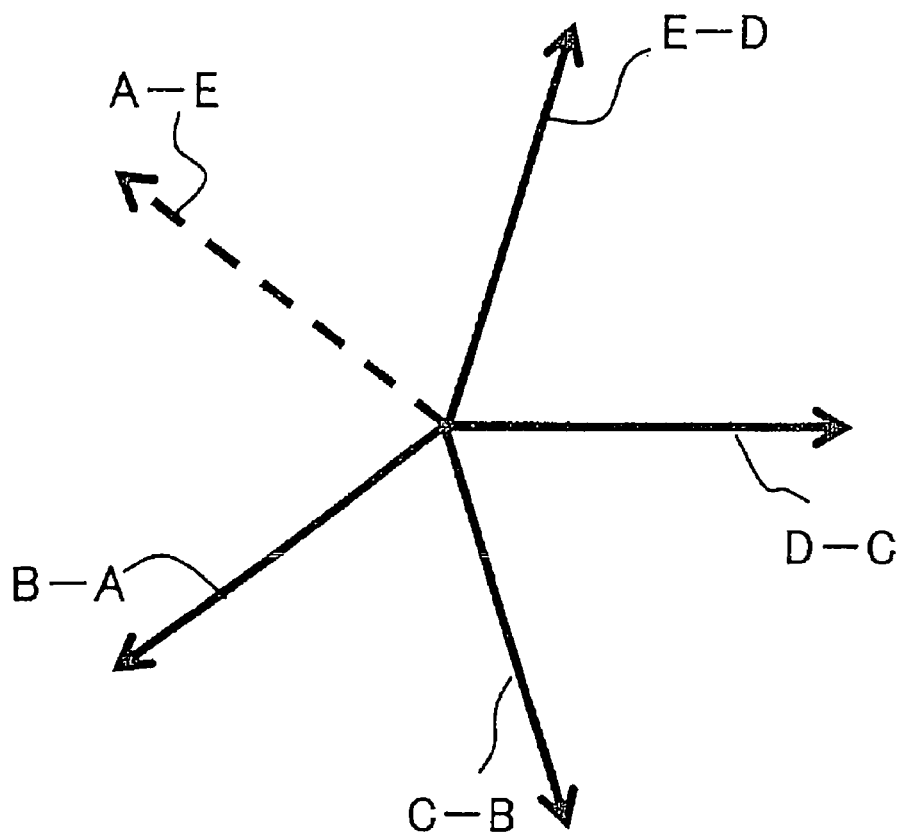
Figure 124:
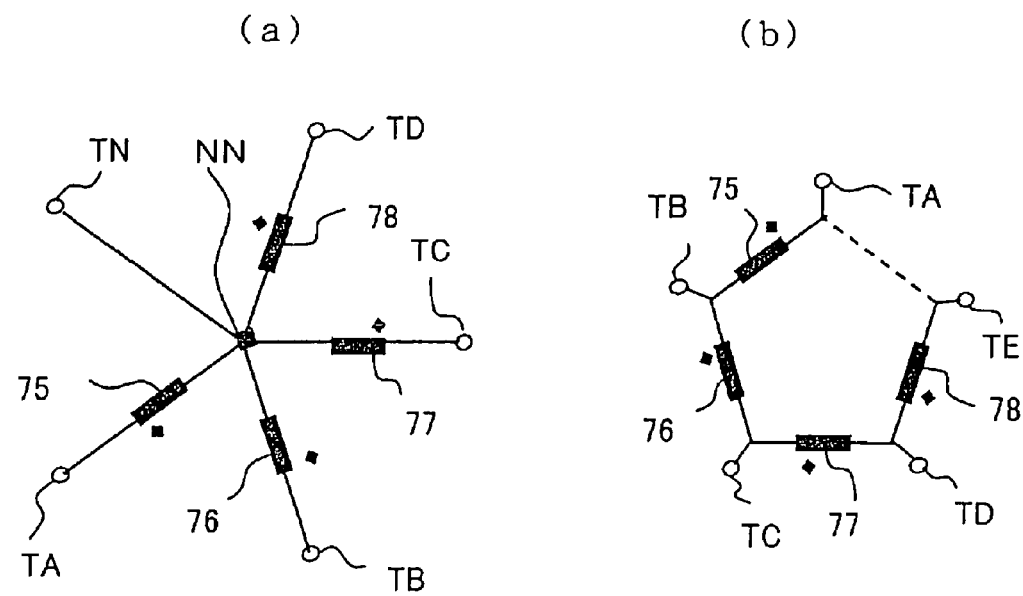
Figure 125:
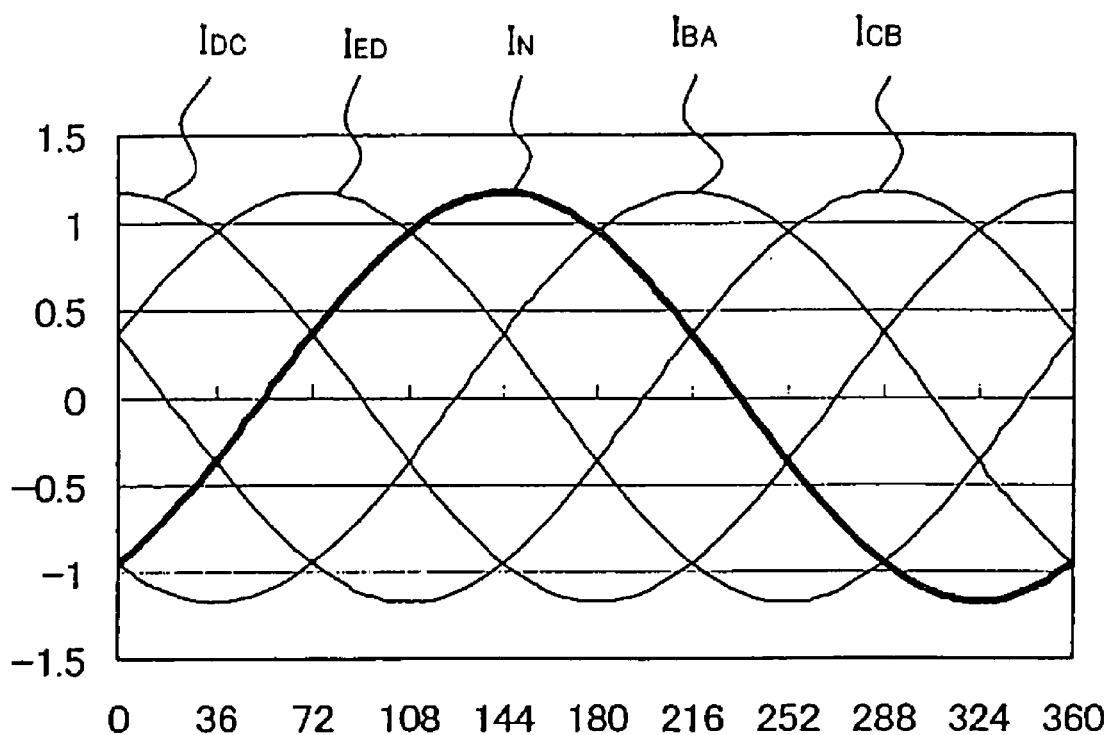

In order to prove the availability in odd number of phases, specific examples of five phases are shown in FIGS. 121 to 127. FIG. 121 is a circumferential linear development illustrating salient stator poles and windings in an air-gap plane where stator and rotor poles are opposed to each other, in a five-phase motor which is a modification of the motor shown in FIG. 21. The horizontal axis indicates the circumferential direction in terms of electrical angle. The vertical axis indicates the rotor shaft direction. In the figure, the stator poles and the windings are indicated by the identical references, with an addition of current vectors B-A, C-B, D-C and E-D. FIG. 122 shows vectors A, B, C, D and E of the individual stator poles and the vectors B-A, C-B, D-C and E-D of the individual currents. FIG. 123 shows a rearrangement that has been made assuming that the current vectors of FIG. 122 are star-connected. Currents $I_{BA}$, $I_{CB}$, $I_{CD}$, $I_{ED}$ and $I_N$ may also be indicated as shown in FIG. 125. The horizontal axis indicates electrical angle.

Figure 126:
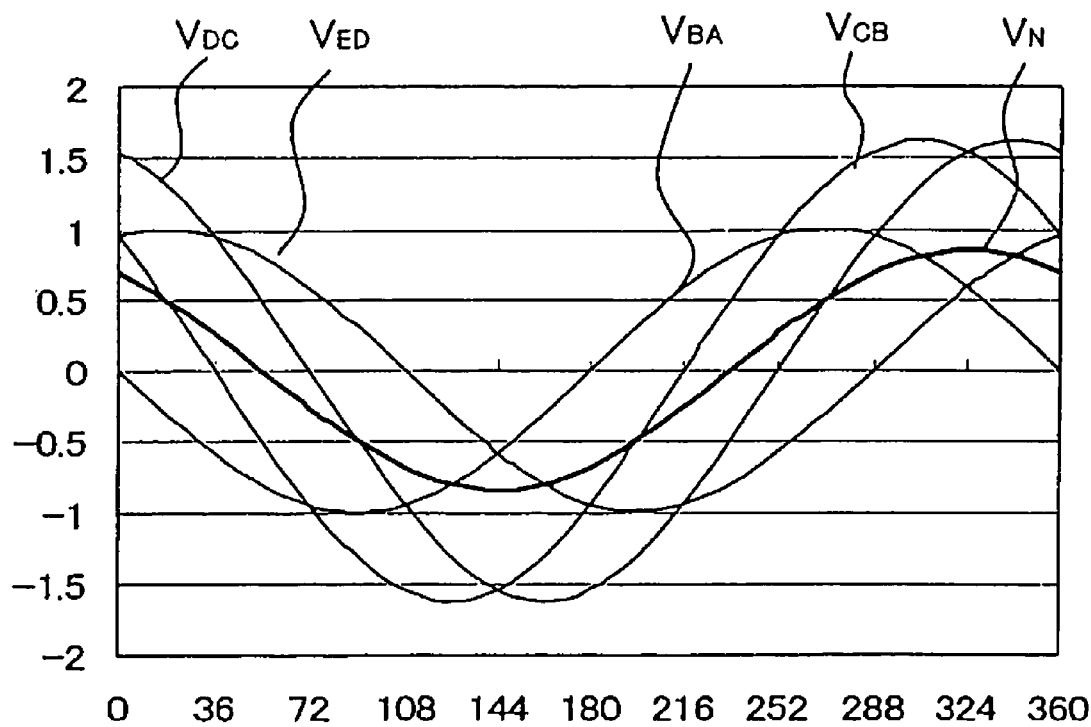

FIG. 126 shows an example of voltages induced in the windings of the motor shown in FIG. 121. Voltages of the windings 75, 76, 77 and 78 are $V_{BA}$, $V_{CB}$, $V_{DC}$ and $V_{ED}$, respectively, an average of which is $V_N$. The voltages and phases of the individual windings are far from the balanced five-phase voltages and phases.

Figure 127:
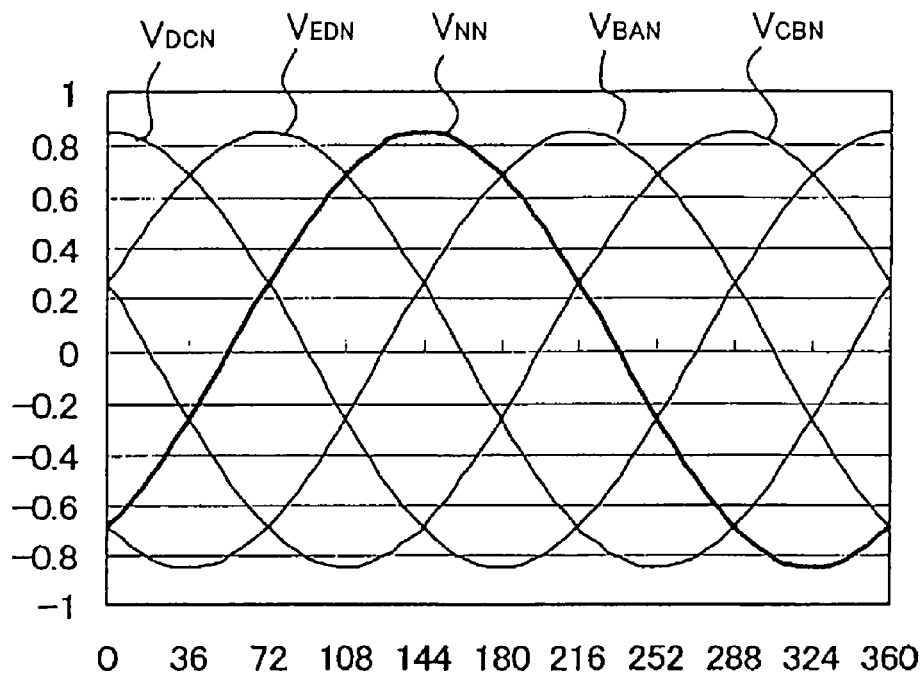

However, voltages $V_{BAN}$, $V_{CBN}$, $V_{DCN}$, $V_{EDN}$ and $V_{NN}$ shown in FIG. 127 can be obtained when voltages of the individual terminals are calculated for the average voltage $V_N$ indicated in FIG. 126, under the conditions that the windings are star-connected as shown in FIG. 124, and that a center point NN of the star connection is drawn out as one terminal to obtain a total of five terminals TA, TB, TC, TD and TN. FIG. 127 shows five-phase voltages balanced in the amplitudes and phases. Thus, when the connection shown by (a) of FIG. 124 is established, the motor characteristics as seen from outside can be regarded as being balanced five-phase loading, which means that efficient driving can be performed with the use of a five-phase inverter. In this case, this example can attain a value "1" in the driving efficiency of the windings and the winding coefficient, creating no problem as far as efficiency is concerned. Even in the case of odd number of phases, the motor can be driven without raising any problem.

Hereinafter will be described a fifth method associated with the windings of the motor shown in FIG. 20. In the fourth method, the two windings arranged in the space of the same slot as shown in FIG. 20 are combined into a single winding as shown in FIG. 21 to obtain a total of (N−1) number of windings, whose voltages are imparted with amplitudes and phases considerably different from those of the balanced multiphase voltages. The (N−1) number of windings are star-connected and a center point of the star connection is permitted to serve as one terminal to provide a total of an N number of motor terminals, for performing driving being connected to an N-phased inverter. In this case, the currents and voltages of the motor as seen from the side of the inverter constitute balanced N-phased currents and voltages. In the fifth method, the two windings arranged in the space of the same slot as shown in FIG. 20 are combined into a single winding as shown in FIG. 21 to obtain a total of (N−1) number of windings, whose voltages are imparted with amplitudes and phases considerably different from those of the balanced multiphase voltages. The (N−1) number of windings are delta-connected, leaving the windings at both ends unconnected to permit them to serve as single motor terminals. Thus, with an (N−2) number of connecting points and with the two points at both ends, a total of N number of motor terminals are obtained, for performing driving being connected to an N-phased inverter. In this case, the currents and voltages of the motor as seen from the side of the inverter constitute balanced N-phased currents and voltages.

FIG. 124 shows by (b) a specific example of a five-phase motor in which windings are delta-connected. In this case as well, as in the case of the star-connected example shown by (a) of FIG. 124, voltages and phases of the individual motor terminals exhibit balanced five-phase voltages and phases. As a result, when a connection is established as shown by (b) of FIG. 124, the motor characteristics as seen from outside the motor may be regarded as being balanced five-phase loading, which means that efficient driving can be performed with the use of a five-phase inverter. Also, in this case, this example can attain a value "1" in the driving efficiency of the windings and the winding coefficient, creating no problem as far as efficiency is concerned. Even in the case of odd number of phases, the motor can be driven without raising any problem.

The current component indicated by A-E in FIG. 122 and the current components passed through the windings 62 and 73 of the inventive motor described by referring to FIG. 20, mostly do not contribute to the torque generation of the motor. However, these current components, which partially consist the balanced multiphase currents, have a function of cancelling the magnetomotive force effected on the rotor shaft 1 of the motor. Therefore, it may be practical to arrange windings at the positions, for example, of the winding 39 of FIG. 1 or the windings 62 and 73 of FIG. 20 to cancel the magnetomotive force along the rotor shaft of the motor.

The description so far has been provided on the stator poles, rotor poles, windings, currents passed through the windings and methods for connecting the windings in multiphase motors, by referring to the example of the configuration of the inventive motor shown in FIG. 20. The description hereinafter will now be focused, for example, on specific configurations, shapes and characteristics of the stator poles, the rotor poles and the like.

Figure 26:
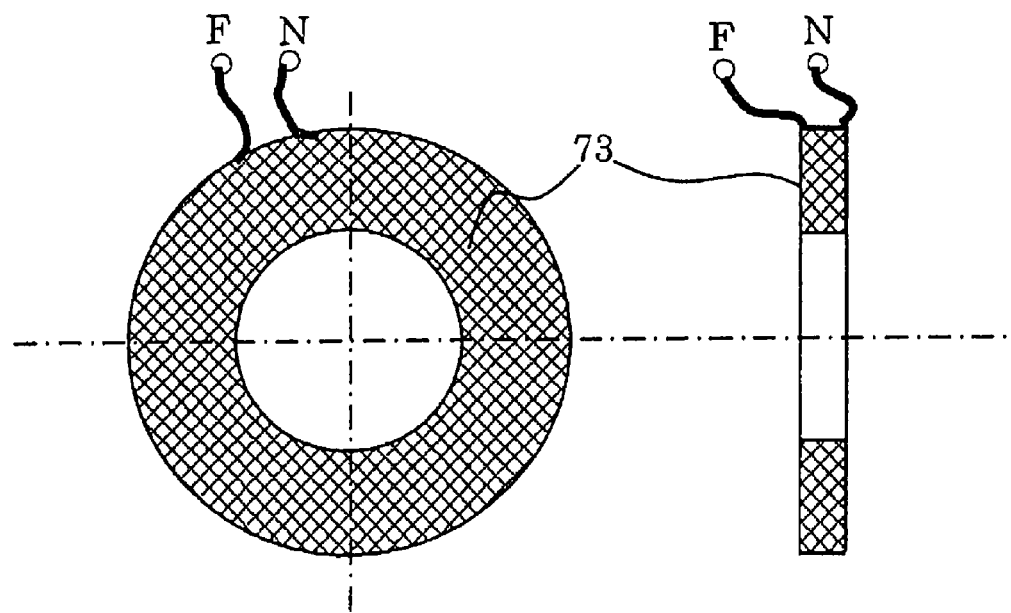
FIG. 26 illustrates an example of a winding configuration of the motor illustrated in FIG. 20.

FIG. 26 shows front and lateral views of a loop winding that can be used for the motor shown in FIG. 20. As can be seen, since the winding 73 can be usefully arranged from the inner-diameter side to the outer-diameter side of the motor, winding resistance can be made small. In particular, the length of the inner-diameter side circumference is so small that characteristics of small winding resistance can be obtained.

The example shown in FIG. 20 has a configuration where the windings of each phase are extendedly located in the rotor. However, the windings may alternatively be configured so as not to be extended into the rotor. Also, the simple disk-like configuration of the winding shown in FIG. 26 may be a loop winding, which is wavy in the rotor shaft direction or in the radial direction in conformity with the shapes, for example, of the stator poles. As will be described in later paragraphs by referring to an example shown in FIGS. 106 to 109, a cross section of a winding may have a rectangular shape instead of a circular or square shape to obtain a flattened winding which works effectively. With this shape, fluxes leaked from between the stator poles may traverse the places where the windings are located to increase/decrease the fluxes for the production of eddy currents, whereby the flux leakage an be reduced. The degree of the flatness may be selected depending on the degree of the reduction of the flux leakage.

Figure 27:
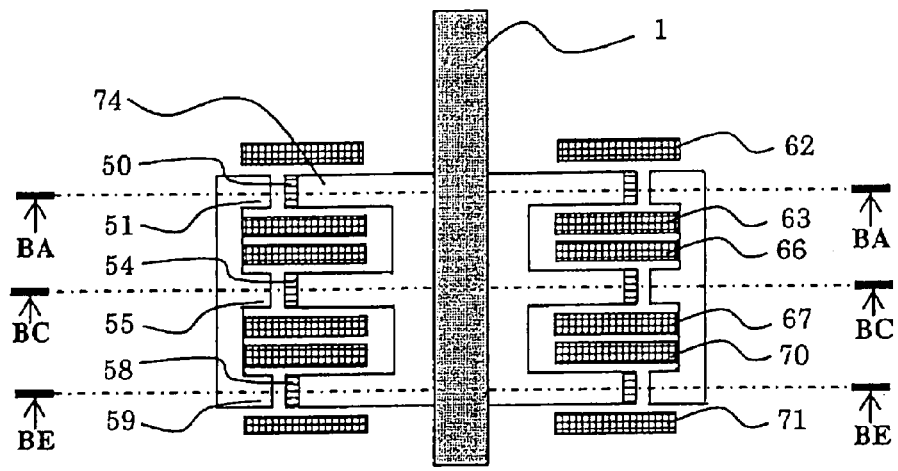
FIG. 27 is a schematic vertical cross section of a three-phase motor having loop windings.

FIG. 27 shows an example of a three-phase motor which is a modification of the motor shown in FIG. 20. Specifically, the motor shown in FIG. 27 has been obtained by taking out the A-, C- and E-phase portions of the six-phase motor shown in FIG. 20. A motor case is omitted from the figure because such a motor case is not related to the present invention from a technical viewpoint and because the figure will be vexatiously complicated.

Figure 28:
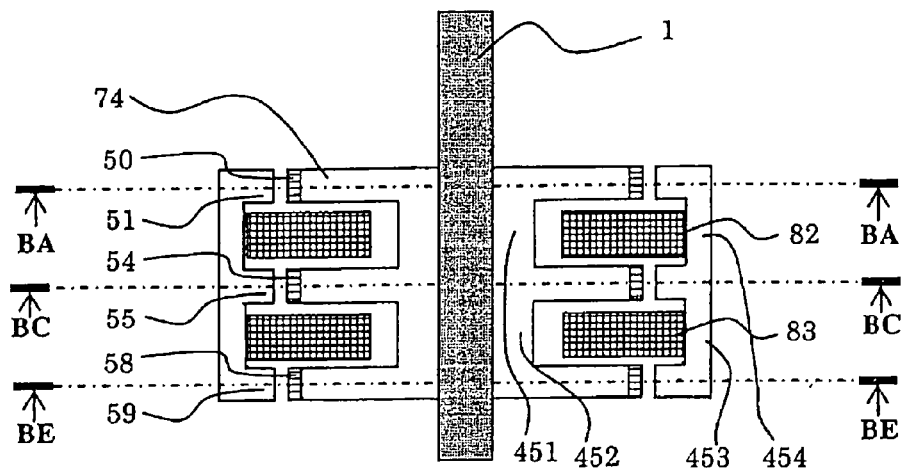
FIG. 28 is a schematic vertical cross section of a three-phase motor having loop windings.

FIG. 28 shows a motor in which the windings of the motor shown in FIG. 27 are combined and the windings at the ends are omitted. Based on a model-level calculation, this motor is capable of reducing copper loss by 25% comparing with the motor shown in FIG. 27. In addition, this motor is advantageous in implementation, owing, for example, to the removal of a space for insulating paper from each slot and removal of a gap from between the windings. The simplified windings may contribute to reducing fabrication cost. Currents to be supplied to the two windings are represented by two current vectors in the three-phase current vectors shown by (b) of FIG. 23. The remaining one phase is not required to be fed with currents. The characteristics and advantages explained referring to the motor shown in FIG. 20 are also true in the motor shown in FIG. 28. This configuration may be applicable to other motor model examples of the present invention, which will be described later.

Figure 29:
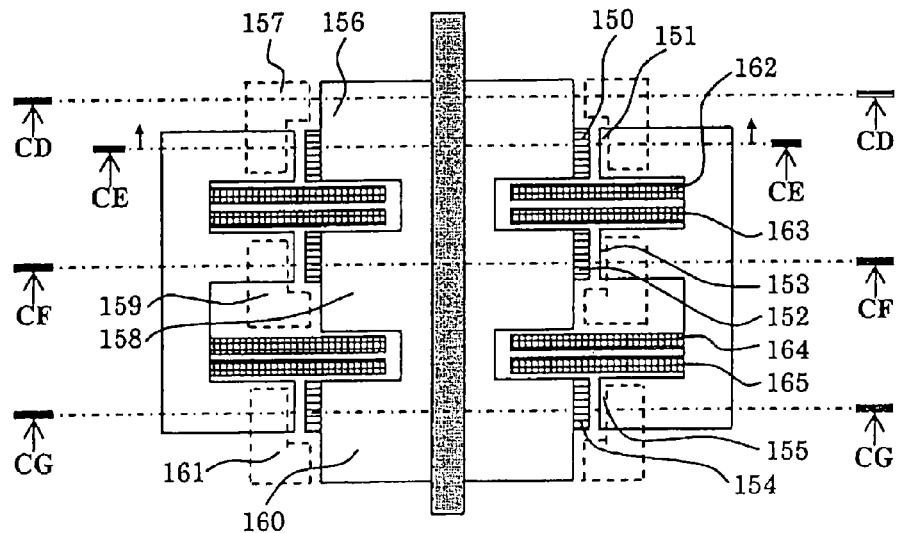
FIG. 29 is a schematic vertical cross section of a three-phase motor having loop windings.
Figure 30:
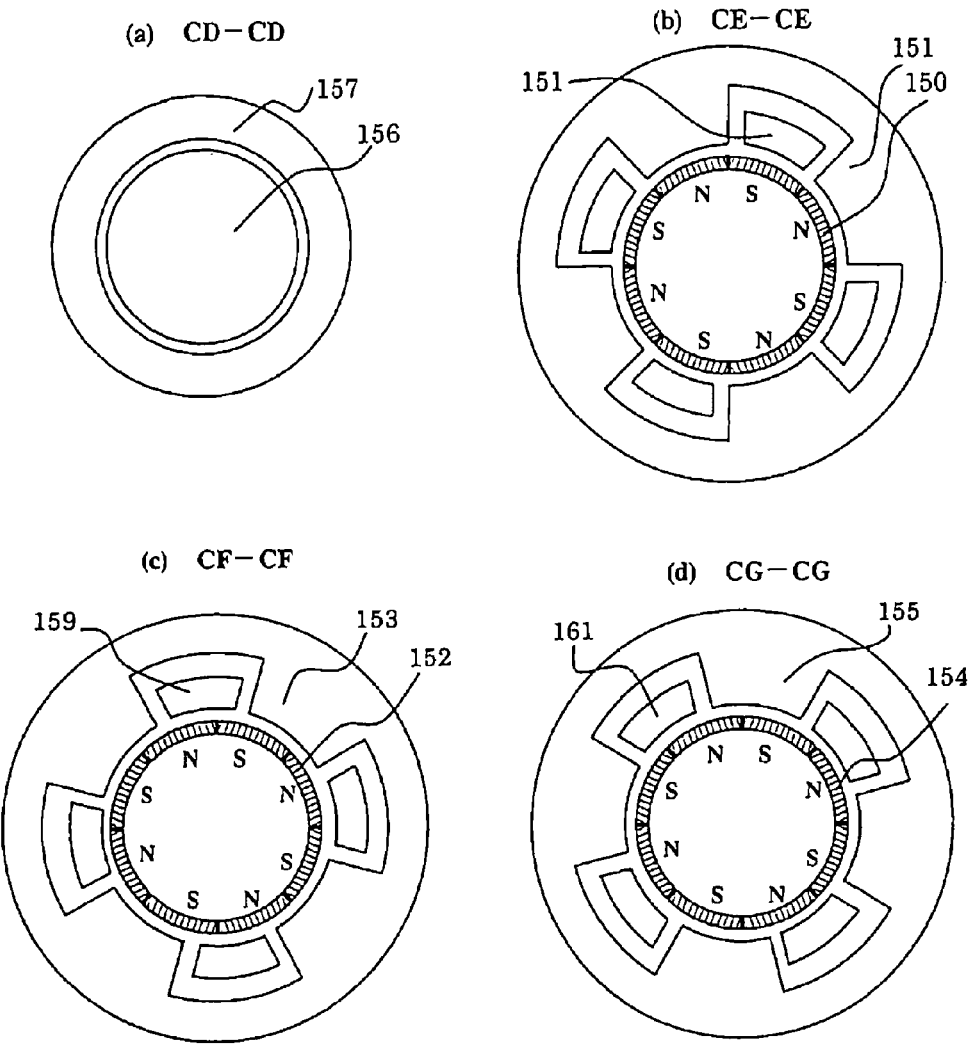
FIG. 30 illustrates cross-sectional configurations of the magnetic poles illustrated in FIG. 29.

FIG. 29 shows a motor obtained by additionally providing auxiliary magnetic paths 156 and 157, 158 and 159, as well as 160 and 161 to the three-phase motor shown in FIG. 28. Each of these pairs of magnetic paths is arranged so that the magnetic paths are closely opposed to each other through an air gap. Thus, magnetic fluxes can be comparatively easily passed between the stator and the rotor. Magnetic fluxes generated by permanent magnets 150, 152 and 154 may absorb harmful leaked fluxes that may otherwise be directed to stator poles 151, 153 and 155 to effectively enhance output torque. In particular, the torque enhancement effect may be greatly exerted as a motor is multipolarized and the rate of flux leakage is increased. FIG. 30 shows cross sections of individual portions.

Figure 31:
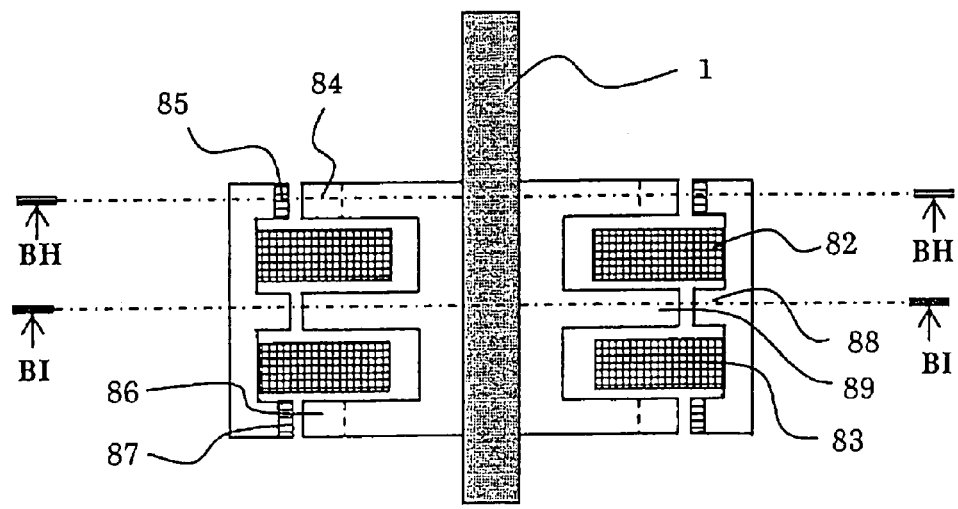
FIG. 31 is a schematic vertical cross section of a three-phase motor having loop windings.
Figure 32:
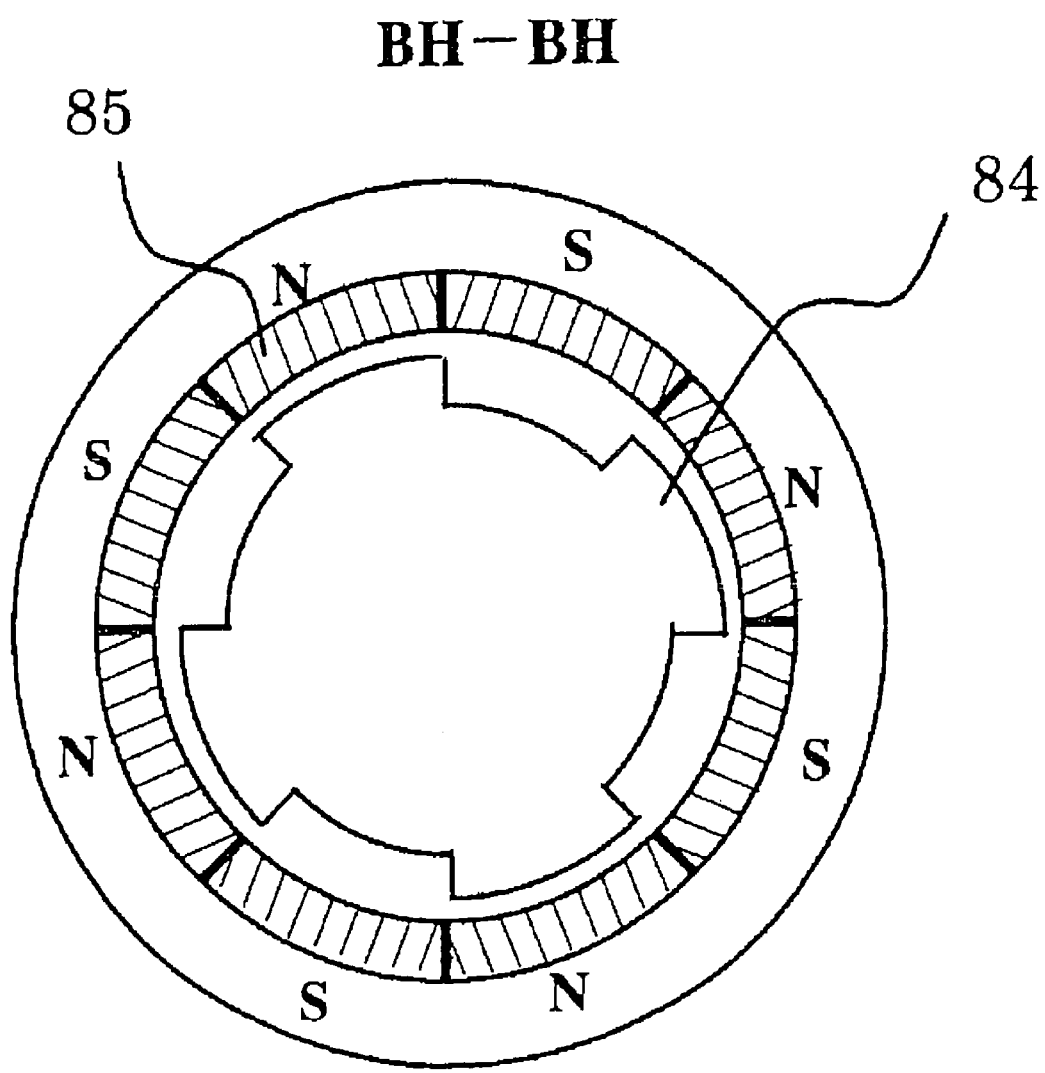
FIG. 32 illustrates a cross-sectional configuration of the magnetic poles illustrated in FIG. 31.
Figure 33:
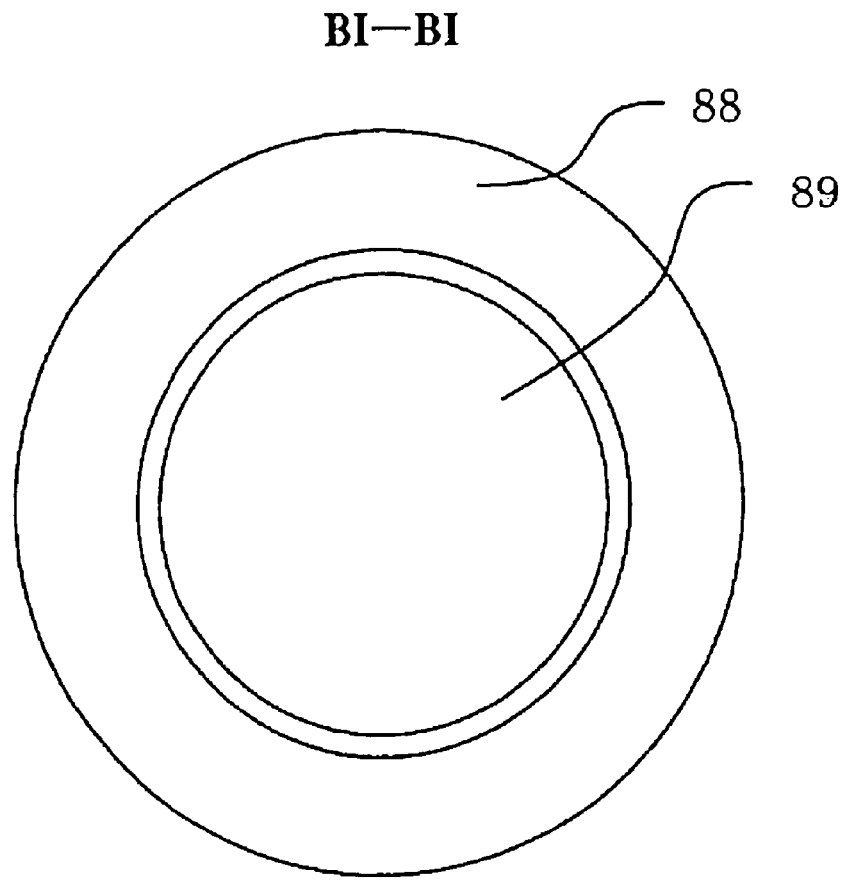
FIG. 33 illustrates a cross-sectional configuration of the magnetic poles illustrated in FIG. 31.

FIG. 31 shows an example of a three-phase motor which is a modification of the three-phase motor shown in FIG. 28. FIGS. 32 and 33 show cross sections of the motor shown in FIG. 31. Indicated by numerals 84 and 85 are A-phase rotor and stator poles, respectively. FIG. 31 shows an example where permanent magnets are attached to the stator side. Axially center poles indicated by numerals 88 and 89 are structured by soft magnetic portions RSP1 and SSP1, respectively. The soft magnetic portion RSP1 is magnetically coupled to the back yoke of the rotor and is opposed to a soft magnetic portion of the stator through an air-gap portion between the rotor and the stator. The soft magnetic portion SSP1 is magnetically coupled to the back yoke portion of the stator and is opposed to a soft magnetic portion of the rotor through a small air-gap portion between the rotor and the stator. Thus, a structure is provided in which magnetic fluxes can comparatively easily pass between the stator and the rotor. The magnetic poles at the axial ends are imparted with U and W phases and are configured to operate with a phase difference of 120° in electrical angle and thus to operate as a three-phase motor. Measures that can be taken for enhancing torque may be to provide an improvement as explained referring to the motor models shown in FIGS. 20 and 28. The phase difference between the U- and W-phases at the axial ends is not limited to 120° but may have other angles than 120°, which may also enable operation. In particular, a phase difference of 90° in electrical angle may be regarded as being realizing a two-phase motor. In this way, design can be prepared by freely changing the phase difference from 0° to 180°.

One modification of the motor shown in FIG. 31 may be obtained by increasing an axial width of the U-phase poles 84 and 85 as much as possible so as to increase magnetic fluxes of the U-phase poles as much as possible for maximal generation of torque and power, while decreasing an axial width of the W-phase poles 86 and 87 as much as possible so as to be utilized in generating start-up torque at the time of start-up, for example. With this configuration, the windings 82 and 83 may both be utilized at the time of start-up, but the winding 82 is chiefly utilized at high-speed rotation for torque and power generation. Thus, outputs of average torque and average power may be maximized. In this case, the motor can be driven, for example, by a two- or three-phase inverter, or by two single-phase inverters.

The motor may also be operated as a three-phase motor by attaching permanent magnets, such as permanent magnets 85, to the stator poles. Alternatively, magnetic circuits may additionally be provided, the magnetic circuits corresponding to the auxiliary magnetic paths 156 and 157, 158 and 159, as well as 160 and 161 as shown in FIG. 29.

FIGS. 34, 35, 36 and 37 show examples of a two-phase motor, with various modes. FIG. 40 shows examples of various transverse cross sections of the motors shown in FIGS. 34 to 39.

Figure 34:
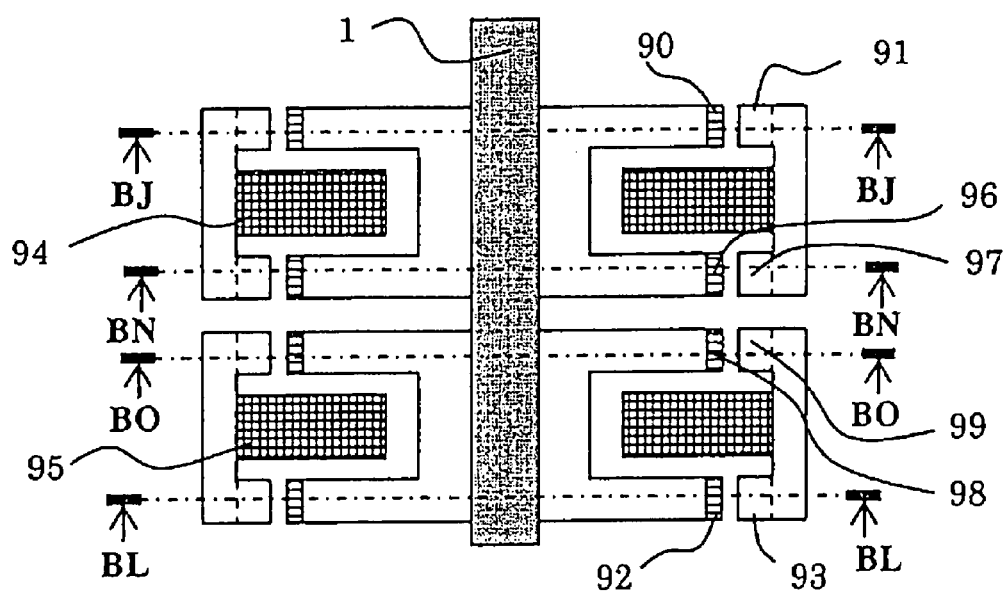
FIG. 34 is a schematic vertical cross section of a two-phase motor having loop windings.

In a vertical cross section of a motor shown in FIG. 34, indicated by numerals 91 and 97 are A-phase stator poles, by 90 and 96 are A-phase rotor poles, and by 94 is a B-phase winding. Further, indicated by numerals 93 and 99 are B-phase stator poles, by 92 and 98 are B-phase rotor poles, and by 95 is a B-phase winding. The phases A and B are configured to have a phase difference of 90° in electrical angle. The configurations of the phases A and B are magnetically separated from each other in the rotor shaft direction, and thus can independently generate torque through electromagnetic operation. FIG. 40 shows cross sections of various portions.

Figure 35:
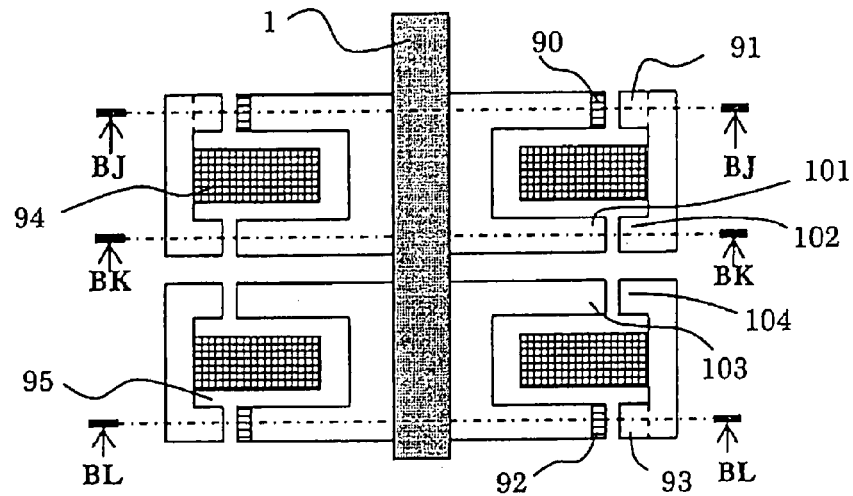
FIG. 35 is a schematic vertical cross section illustrating a two-phase motor having loop windings.

In a motor shown in FIG. 35, indicated by numerals 102 and 104 are magnetic paths for passing magnetic fluxes of the stator, and by 101 and 103 are magnetic paths for passing magnetic fluxes of the rotor. Comparing with the motor shown in FIG. 34, the magnetic paths of the motor shown in FIG. 35 are configured as shown in FIG. 33 and are made of a soft magnetic material that permits magnetic fluxes to pass between the stator and the rotor. Accordingly, no torque is generated at the magnetic paths 102 and 104 and thus the width thereof in the rotor shaft direction can be made comparatively small.

Figure 36:
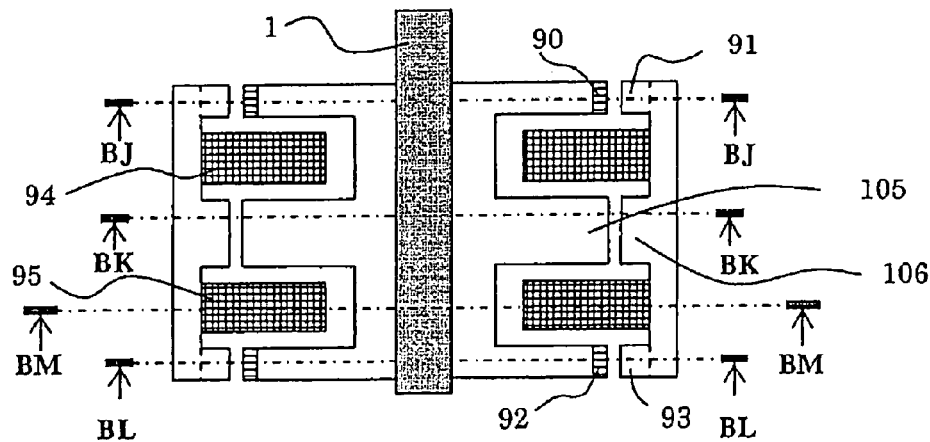
FIG. 36 is a schematic vertical cross section illustrating a two-phase motor having loop windings.

In a two-phase motor shown in FIG. 36, a magnetic path 106 for passing fluxes of the stator and a magnetic path 105 for passing fluxes of the rotor are in intimate contact with each other or are combined for use for the phases A and B. In this portion, magnetic resistance between the stator and rotor is small to provide a structure where the electromagnetic effects of the phases A and B are unlikely to be exerted to each other.

Figure 37:
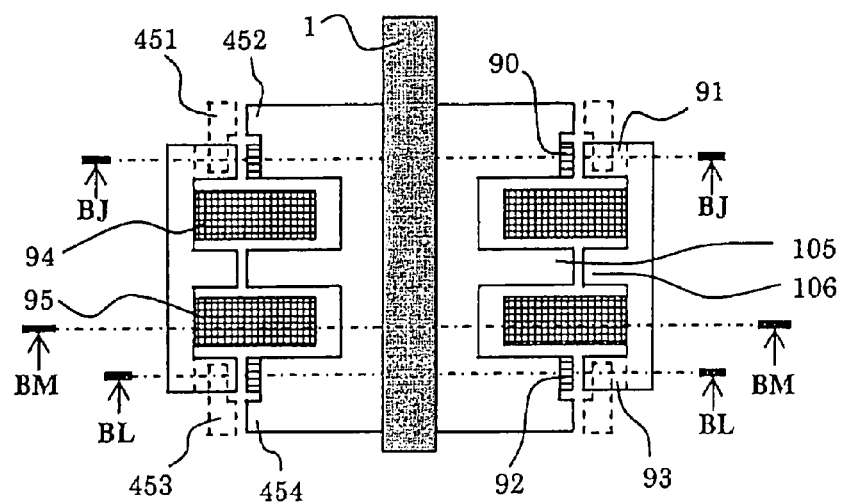
FIG. 37 is a schematic vertical cross section illustrating a two-phase motor having loop windings.
Figure 38:
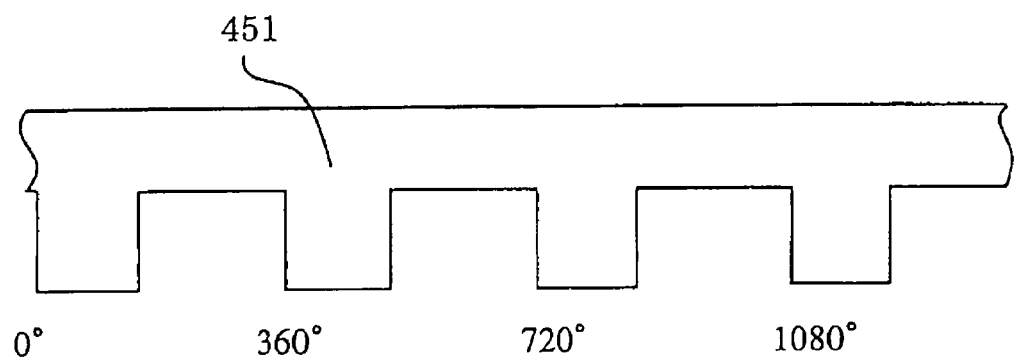
FIG. 38 is a linear development of magnetic flux inducing means.

FIG. 37 shows an example provided with magnetic flux inducing means MRN451, 452, 453 and 454. In the vicinities of the rotor and stator poles, these means direct flux components φRN of a phase which is differentiated by about 180° in electrical angle from magnetic fluxes φN of the relevant phase. FIG. 38 is a linear development a circumferential configuration of the magnetic flux inducing means MRN451. The horizontal axis indicates the circumferential direction in electrical angle, and the vertical axis indicates the rotor shaft direction.

Figure 39:
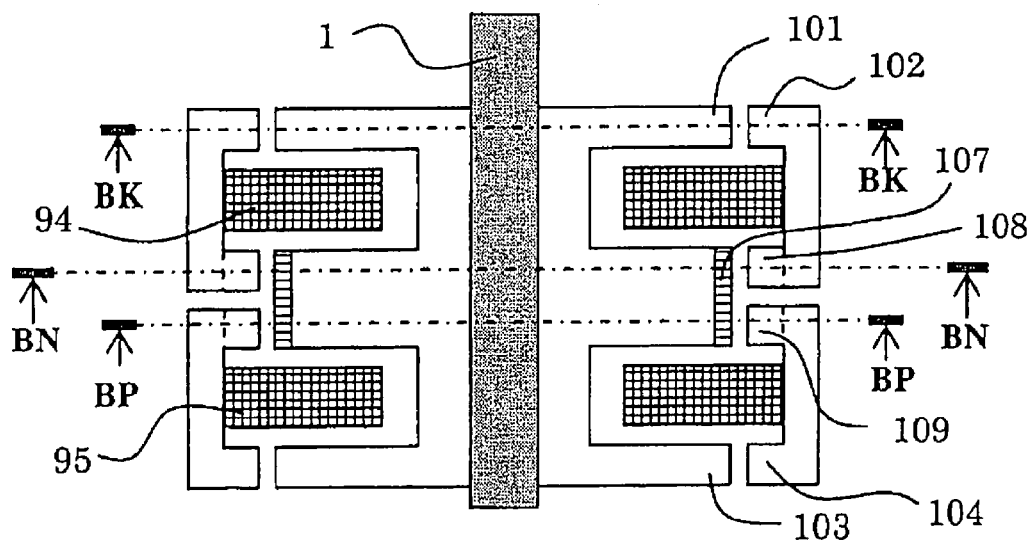
FIG. 39 is a schematic vertical cross section illustrating a two-phase motor having loop windings.
Figure 40:
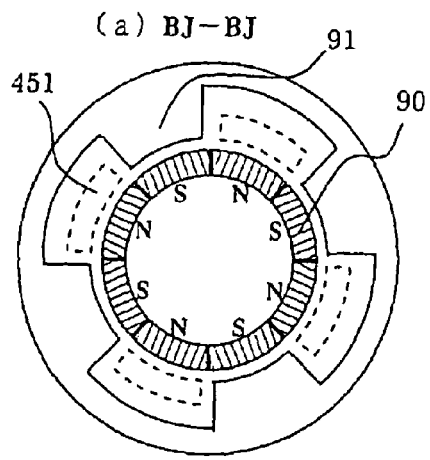
FIG. 40 illustrates cross-sectional configurations of the magnetic poles of the motors illustrated in FIGS. 34 to 39.
Figure 40:
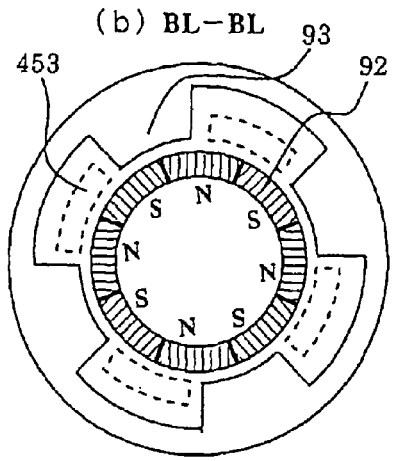
Figure 40:
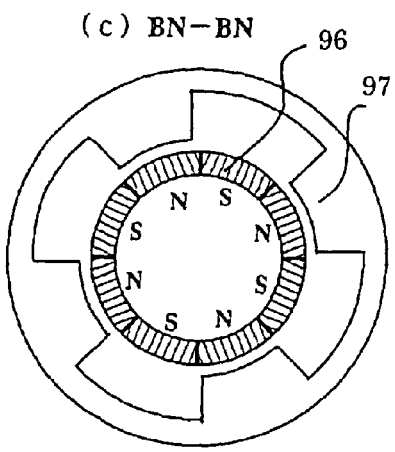
Figure 40:
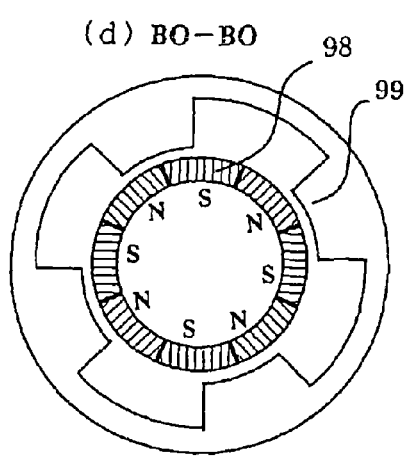
Figure 40:
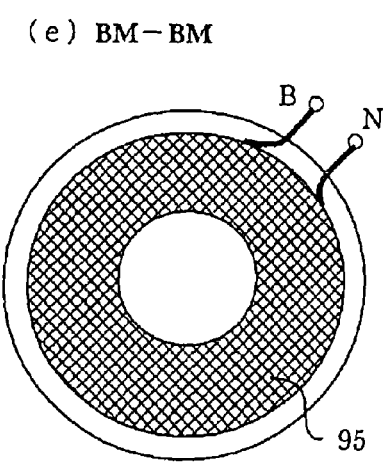
Figure 40:
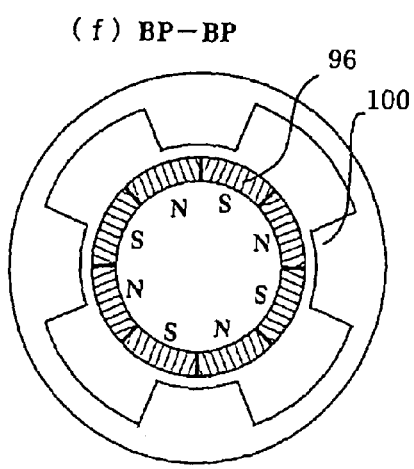

Comparing with the motor shown in FIG. 36, a motor shown in FIG. 39 is provided with rotor poles 107 which are an integration of A- and B-phase rotor poles and thus are shared between the phases A and B. Contrarily, magnetic paths 102 and 104 for passing fluxes of the stator, and magnetic paths 101 and 103 for passing fluxes of the rotor are separately arranged at both ends in the rotor shaft direction. In the motor shown in FIG. 39, the end portions in the rotor shaft direction merely permits passage of magnetic fluxes and does not allow large magnetomotive force to work thereon. Thus, the magnetic paths 102 and 104 of the stator can also serve as a motor case. Accordingly, the motor has a characteristic that the size can be readily reduced. Further, the magnetic flux inducing means as shown in FIG. 37 may also be loaded to increase torque. The phase difference between the phases A and B of the two-phase motor is not limited to 90°. In motors utilizing permanent magnets as shown in FIG. 39, average torque may be increased by making the phase difference larger than 90°, whereby interlinked fluxes in the phases A and B may advantageously be increased. In this case, however, since torque ripple may become large, some measures for reducing torque ripple, such as amplitude modulation of each phase current, may be taken as need arises.

Figure 41:
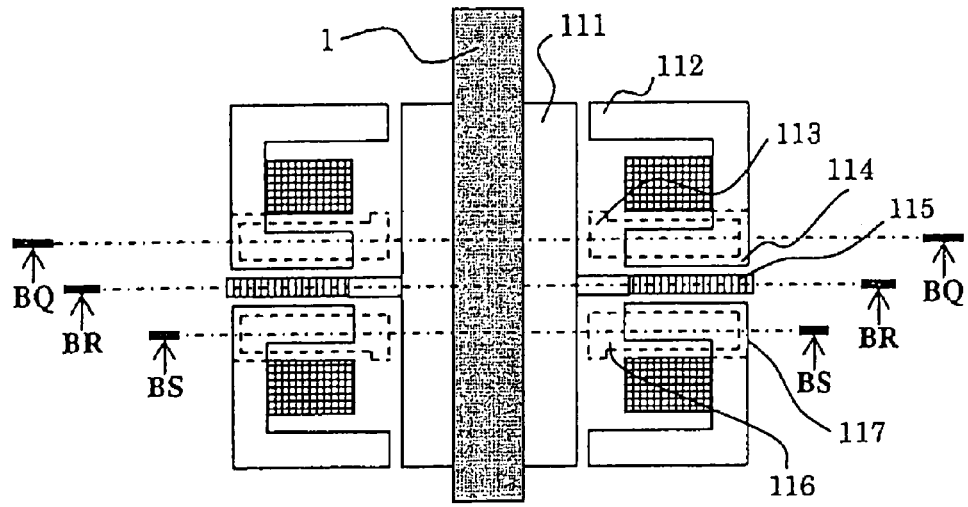
FIG. 41 is a schematic vertical cross section illustrating a two-phase motor having loop windings.
Figure 42:
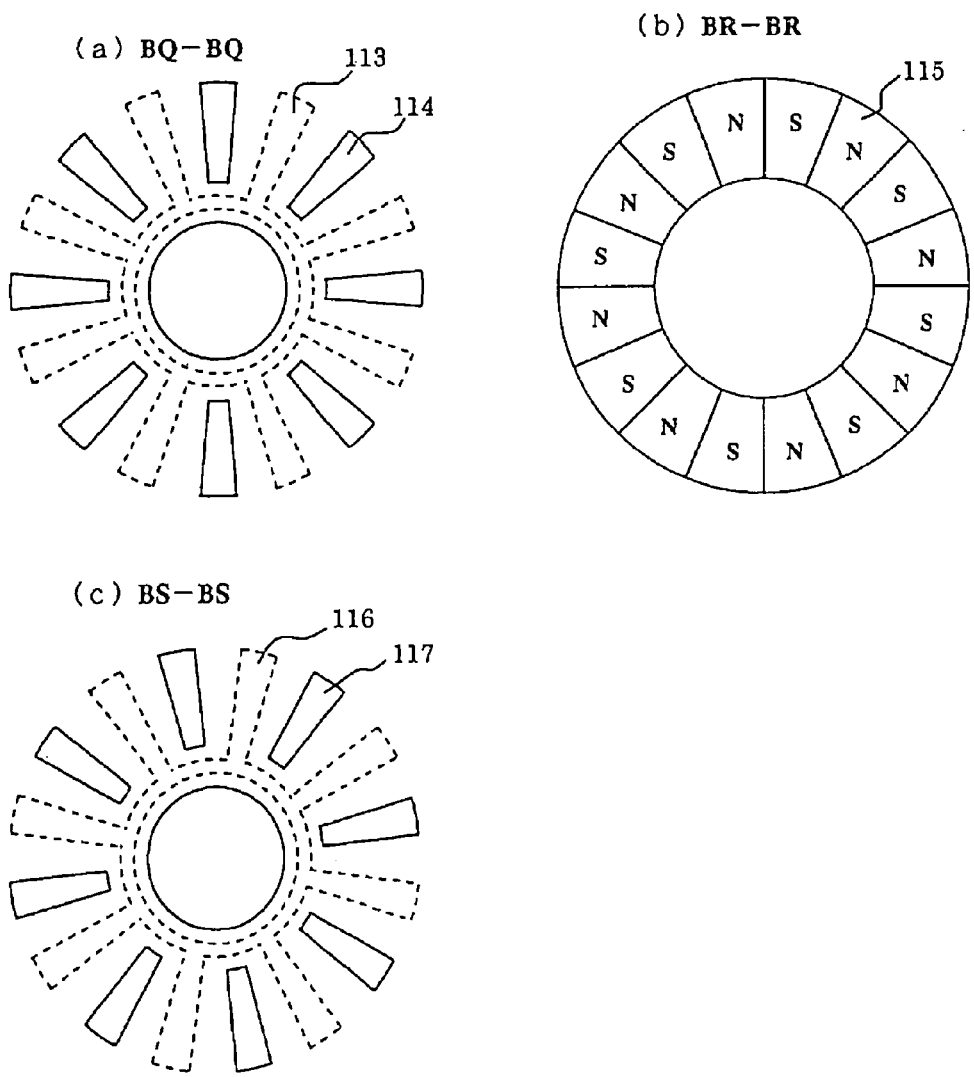
FIG. 42 illustrates cross-sectional configurations of the magnetic poles illustrated in FIG. 41.

FIG. 41 shows a two-phase motor in which stators of two phases are arranged in the rotor shaft direction sandwiching disk-like permanent magnets. FIG. 42 shows cross sections of the motor shown in FIG. 41. With respect to permanent magnets 115 shown by (b) of FIG. 42, A-phase stator poles 114 shown by (a) of FIG. 42 and B-phase stator poles 117 shown by (c) of FIG. 42 have a relative phase difference of 90° in electrical angle. Magnetic fluxes that pass through magnetic flux inducing means 113 and 116 of both of the phases are configured to be directed to a rotor 111. The characteristic of the motor shown in FIG. 41 is that it has an arrangement that the magnetic fluxes that pass through the permanent magnets are passed through both the stator and the rotor, so that the same magnets can be effectively and efficiently used by the two phases. Typically, since two-phase motors have a phase difference of 90°, it is difficult to effectively use common magnets. However, in case of the motor shown in FIG. 41, efficient use of the magnets can be realized because the magnetic fluxes on the front side of the magnets are utilized by the phase A, and those on the rear side are utilized by the phase B.

Figure 43:
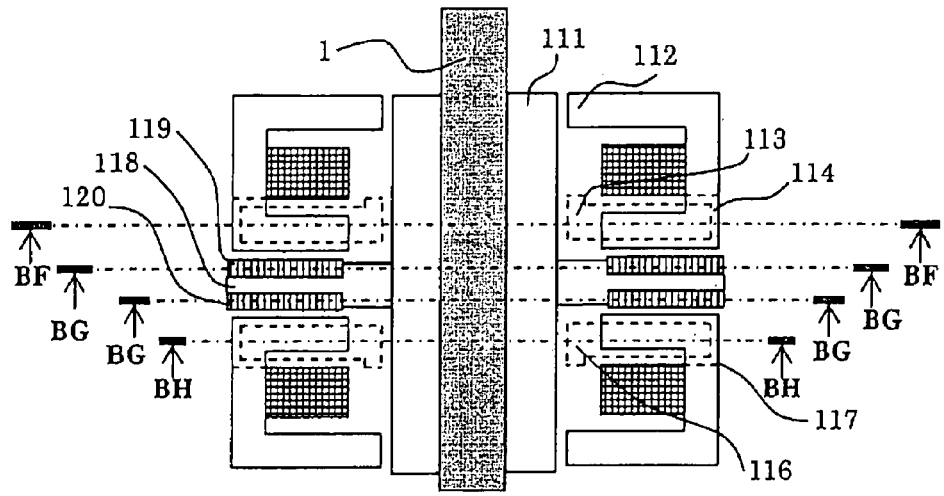
FIG. 43 is a schematic vertical cross section illustrating a two-phase motor having loop windings.
Figure 44:
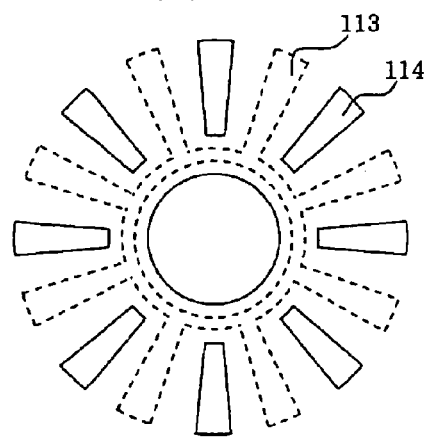
FIG. 44 illustrates cross-sectional configurations of the magnetic poles illustrated in FIG. 43.
Figure 44:
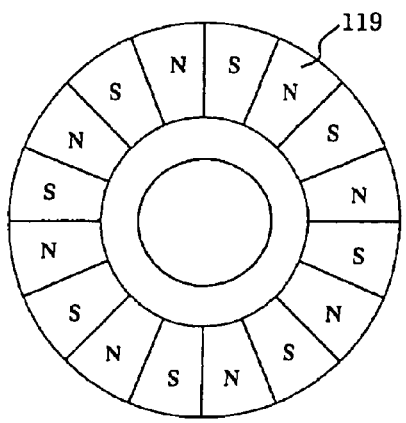
Figure 44:
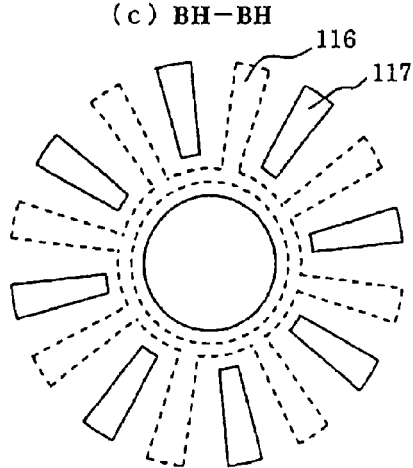

Comparing with the motor shown in FIG. 41, FIG. 43 shows an example, in which two sets of permanent magnets 119 and 120 are arranged at the center portion with a soft magnetic back yoke 118 being sandwiched therebetween. FIG. 44 shows cross sections of the motor shown in FIG. 43. In this configuration, magnetic fluxes can be present via the back yoke 118 without the need of the magnetic flux inducing means served by magnetic poles 113 and 116. Therefore, this motor can function as a two-phase motor. However, arranging these magnetic poles 113 and 116 may reduce unnecessary flux leakage to thereby enhance torque much more. The soft magnetic portion 118 also serves as a reinforcement member for firmly fixing the permanent magnets 119 and 120 to the rotor.

The motor configuration of FIG. 43 can also constitute a three-phase motor configuration. Specifically, it may be so configured that the stator poles 114 are arranged in a phase of U-phase fluxes, the stator poles 117 are arranged in a phase of W-phase fluxes, and the remnant magnetic fluxes are directed to the rotor 111 through the magnetic poles 113 and 116 as the magnetic flux inducing means. With this configuration, magnetic fluxes can be distributed to three directions, i.e. both ends of the motor in the rotor shaft direction and the center portion, being imparted with a phase difference of 120° from each other. Thus, the motor will have a configuration that can efficiently utilize the magnetic fluxes of the permanent magnets.

Figure 45:
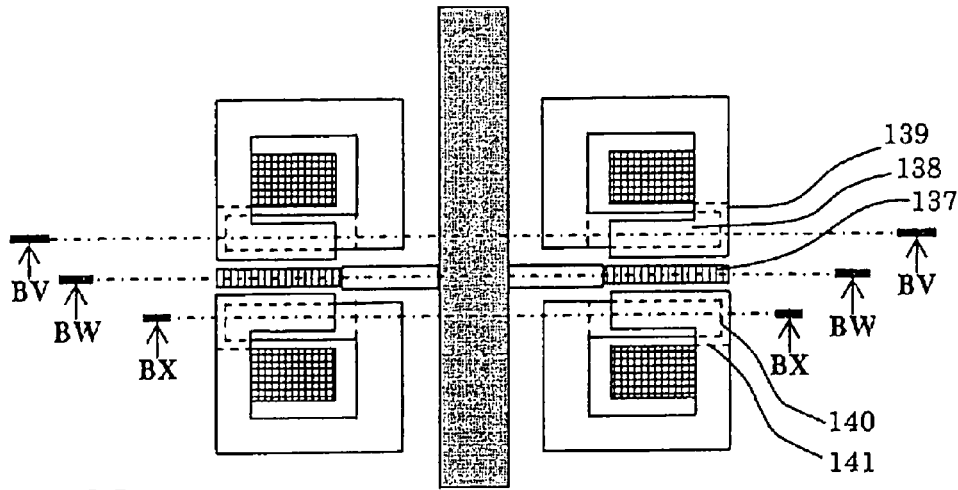
FIG. 45 is a schematic vertical cross section illustrating a two-phase motor having loop windings.
Figure 46:
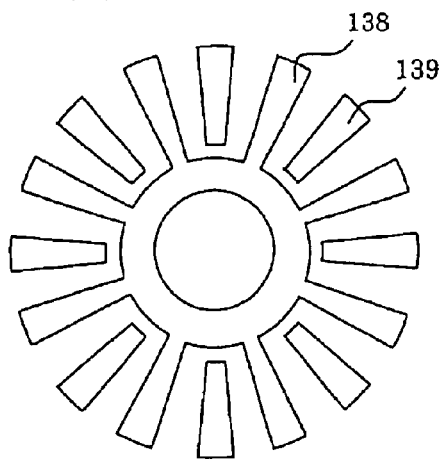
FIG. 46 illustrates cross-sectional configurations of the magnetic poles illustrated in FIG. 45.
Figure 46:
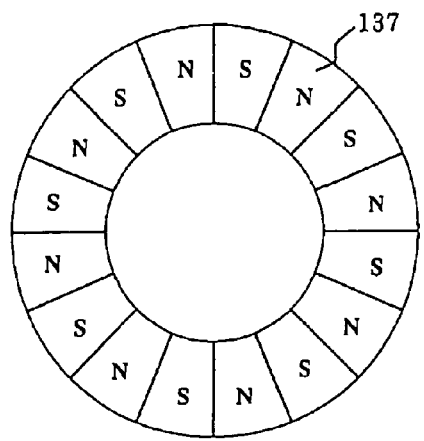
Figure 46:
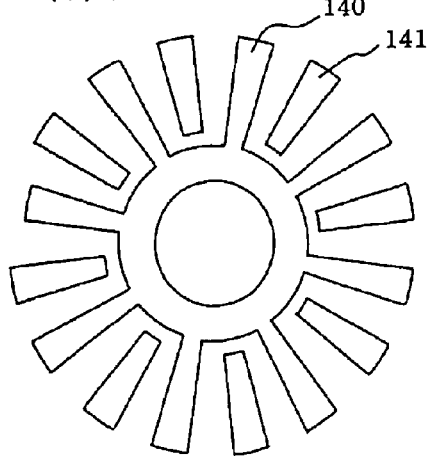

Comparing with the motor shown in FIG. 41, FIG. 45 shows an example of a two-phase motor in which the rotor 111 of FIG. 41 has been removed to structure magnetic paths only with the stator side. FIG. 46 shows cross sections of the motor. Indicated by numeral 139 are A-phase stator poles, and by 138 are stator poles having a phase difference of 180°. Indicated by numeral 141 are B-phase stator poles, and by 140 are stator poles having a phase difference of 180°. Comparing with the motor shown in FIG. 41, this motor does not require the magnetic flux inducing means and thus can be simplified. Other characteristics of this motor are analogous to those of the motor shown in FIG. 41.

Figure 47:
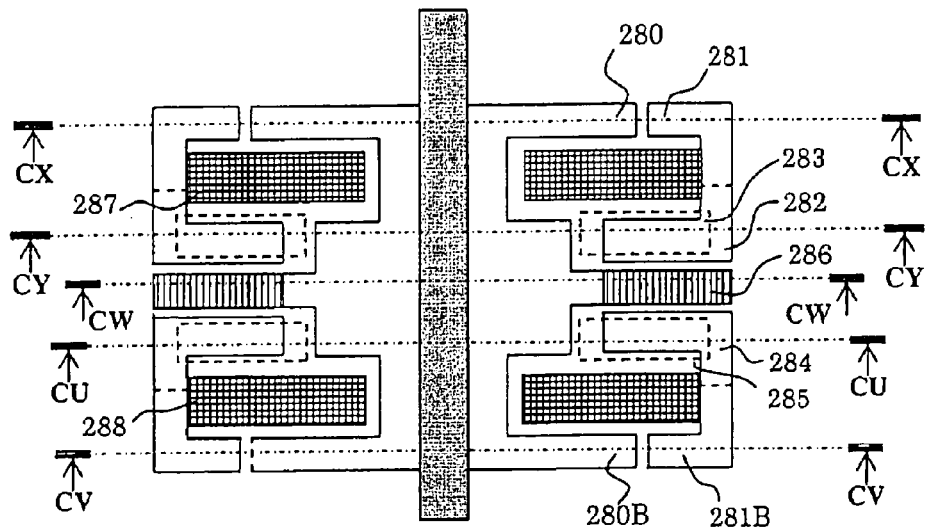
FIG. 47 is a schematic vertical cross section illustrating a three-phase motor having loop windings.
Figure 48:
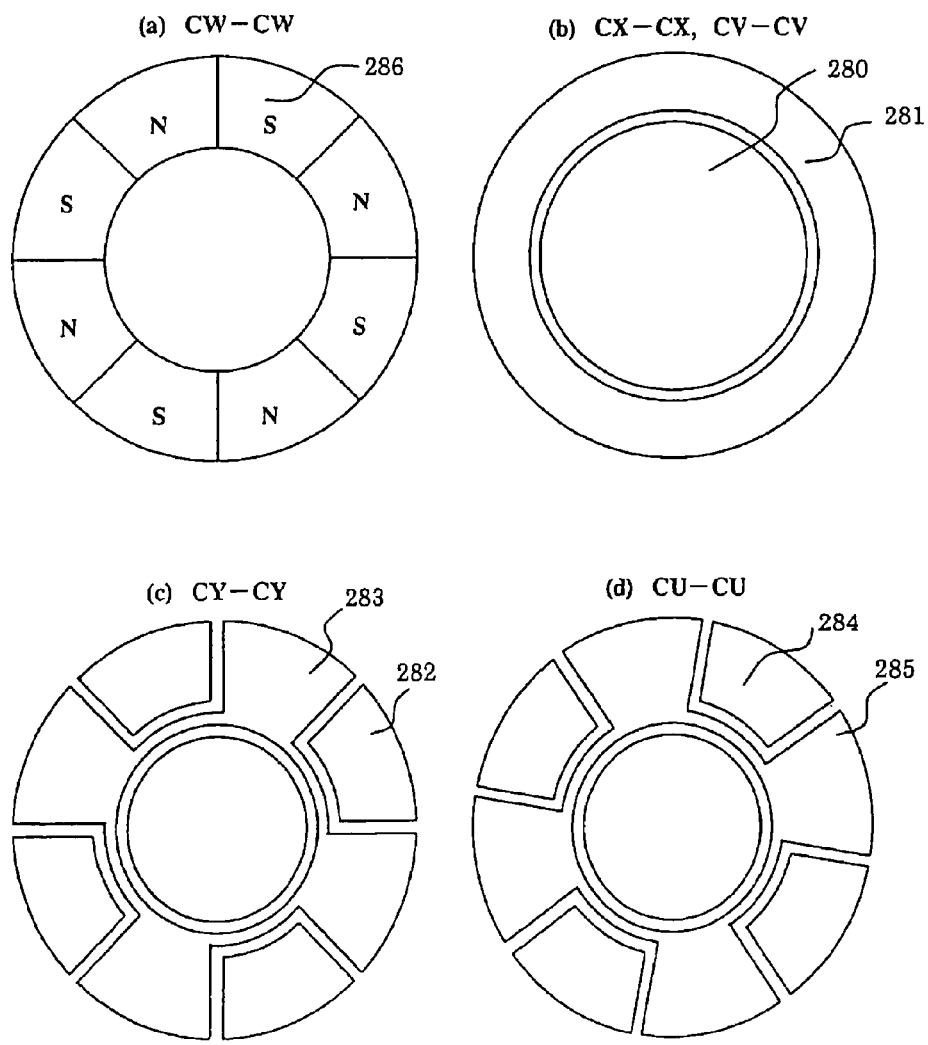
FIG. 48 illustrates cross-sectional configurations of the magnetic poles illustrated in FIG. 47.

FIG. 47 shows a modification of the motor shown in FIG. 41, including magnetic flux inducing means 283 and 285 and magnetic paths 280, 281, 280B and 281B with modified arrangement in positions and shapes.

Figure 49:
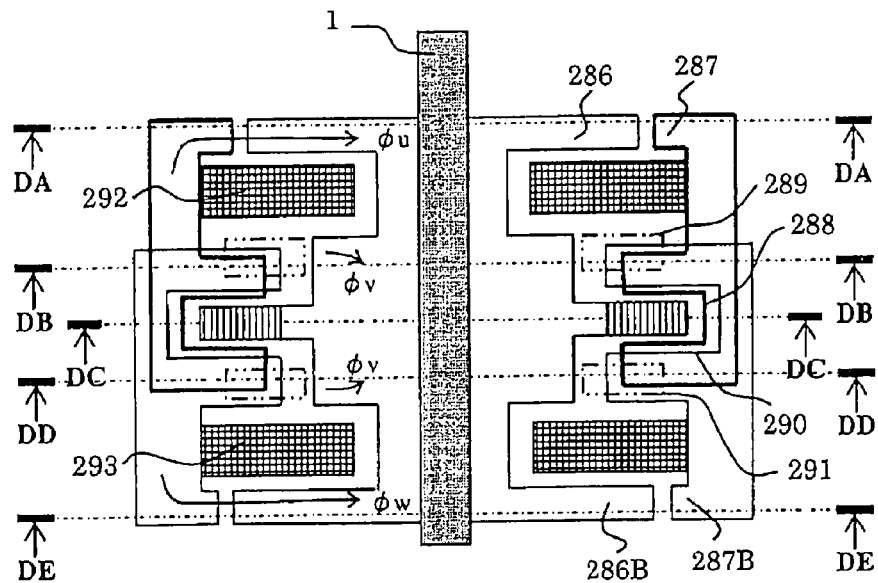
FIG. 49 is a schematic vertical cross section illustrating a three-phase motor having loop windings.
Figure 50:
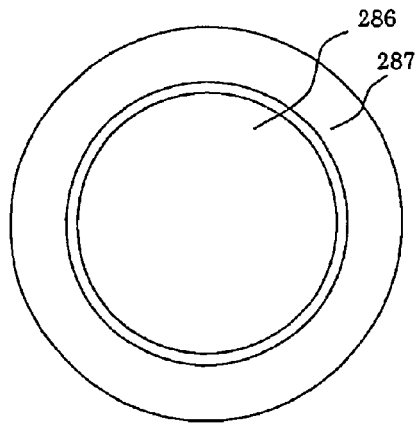
FIG. 50 illustrates cross-sectional configurations of the magnetic poles illustrated in FIG. 49.
Figure 50:
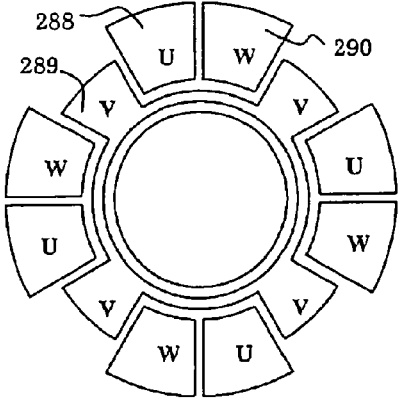
Figure 50:
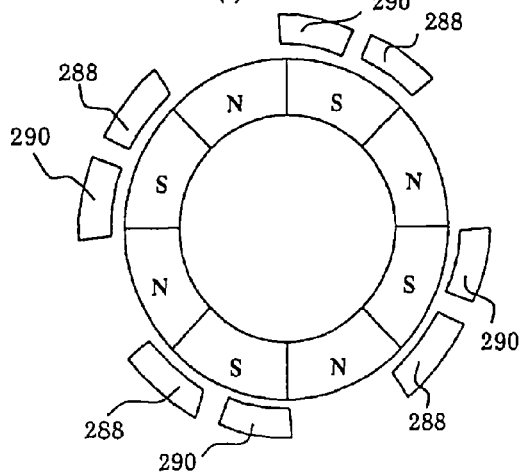
Figure 50:
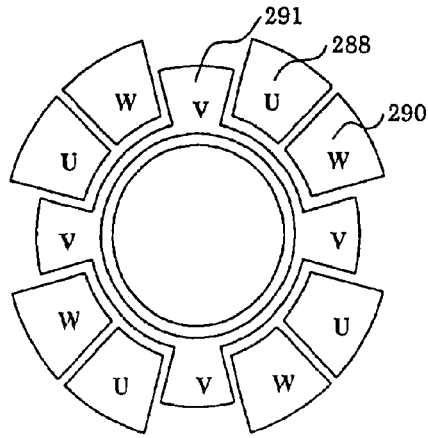
Figure 51:
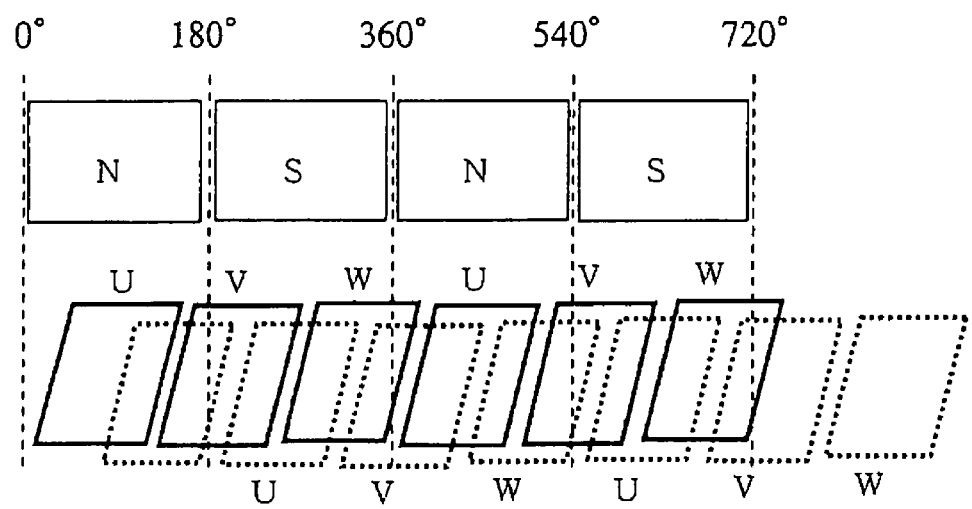
FIG. 51 is a linear development of the magnetic poles illustrated in FIG. 49.

FIG. 49 shows an example of a three-phase motor based on the motor shown in FIG. 47, in which U-, V- and W-phase fluxes are drawn from both of the front and rear sides of permanent magnets 286 and used being separated. This motor is structured so that the magnetic fluxes at both axial sides of the disk-like permanent magnets can be effectively utilized for torque generation. For example, since U-phase fluxes are produced at both surfaces of the magnets with a phase difference of 180° in electrical angle, U-phase stator poles 288 may be arranged at both surfaces of the magnets to direct the U-phase fluxes toward magnetic paths 286 and 287. Thus, the motor has a structure in which the current supplied to a winding 292 is adapted to exert electromagnetic effects. The same applies to the phase W. That is, W-phase fluxes may be drawn from both surfaces of the magnets, so that stator poles 290 can direct the W-phase fluxes toward magnetic paths 286B and 287B. Thus, the current supplied to a winding 293 is adapted to exert electromagnetic effects. V-phase flux components are configured to be directed to the side of the rotor, passing through stator poles 289 and 291. FIG. 50 shows cross sections of various portions. FIG. 51 is a circumferential linear development, illustrating an arrangement relationship between the permanent magnets and the stator poles of the individual phases. Solid lines indicate the U-, V- and W-phase stator poles on one side of the permanent magnets, and broken lines indicate the U-, V- and W-phase stator poles on the other side of the permanent magnets. As can be seen, the U-phase poles, for example, are arranged at positions so as to have a phase difference of 180° in electrical angle between the front and rear sides of the magnets. The motor configuration shown in FIG. 49 can effectively utilize the magnetic fluxes at the front and rear of the magnets, and thus can increase continuous torque. However, there may be a problem that the motor will have a complicated structure.

Figure 52:
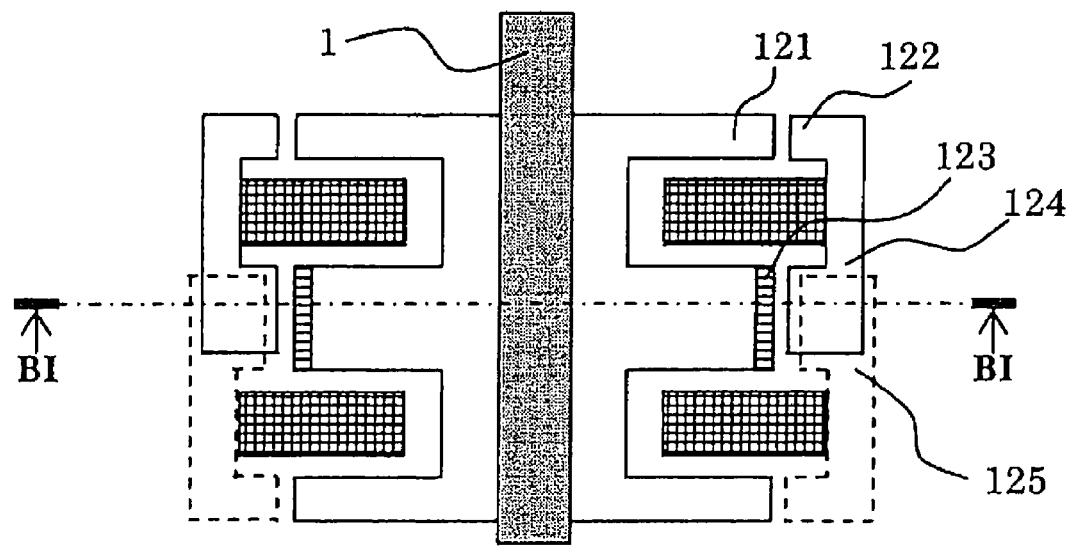
FIG. 52 is a schematic vertical cross section illustrating a two-phase motor having loop windings.
Figure 53:
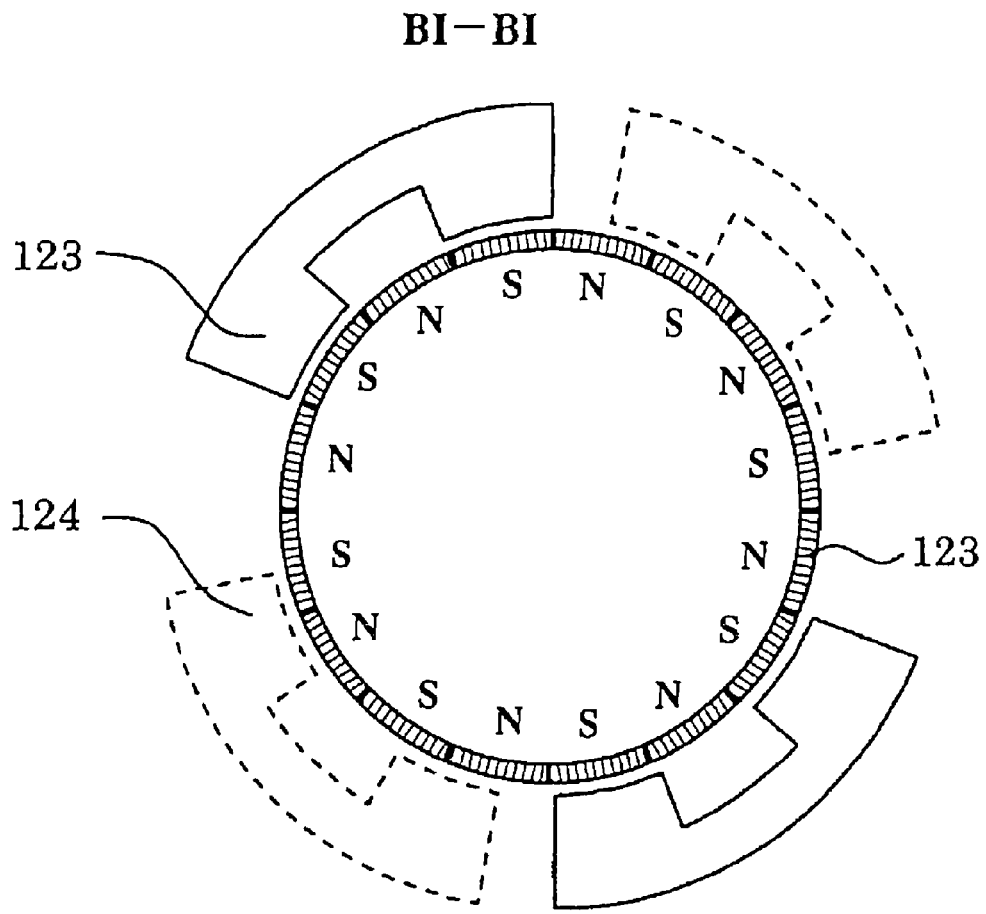
FIG. 53 illustrates a cross-sectional configuration of the magnetic poles illustrated in FIG. 52.

FIG. 52 shows an example of a two-phase motor. Indicated by a numeral 124 are A-phase stator poles, by 125 are B-phase stator poles and by 123 are permanent magnets constituting rotor poles. Phases A and B are arranged so as to have a phase difference of about 90° in electrical angle. FIG. 53 is the cross section.

Figure 54:
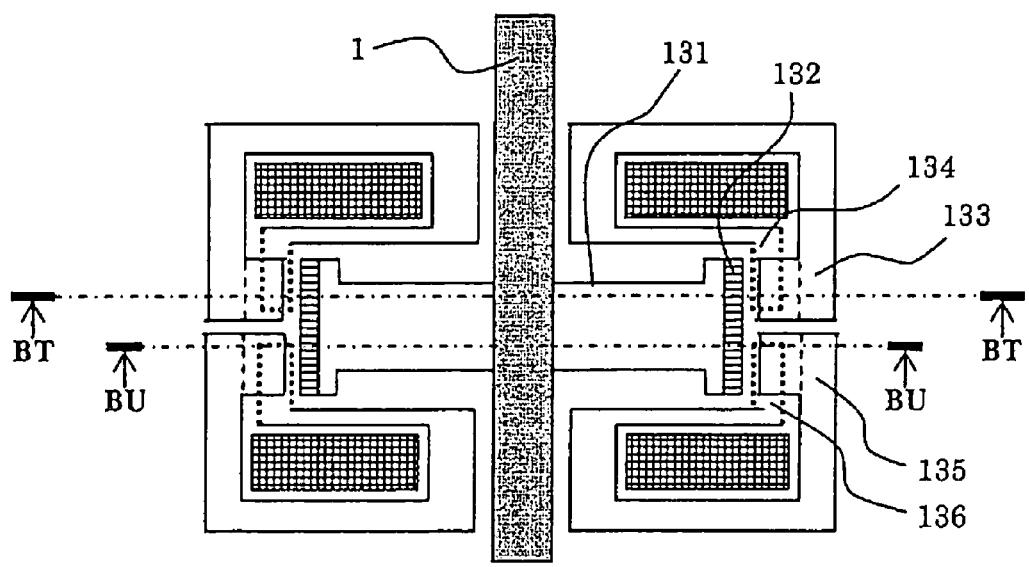
FIG. 54 is a schematic vertical cross section illustrating a two-phase motor having loop windings.
Figure 55:
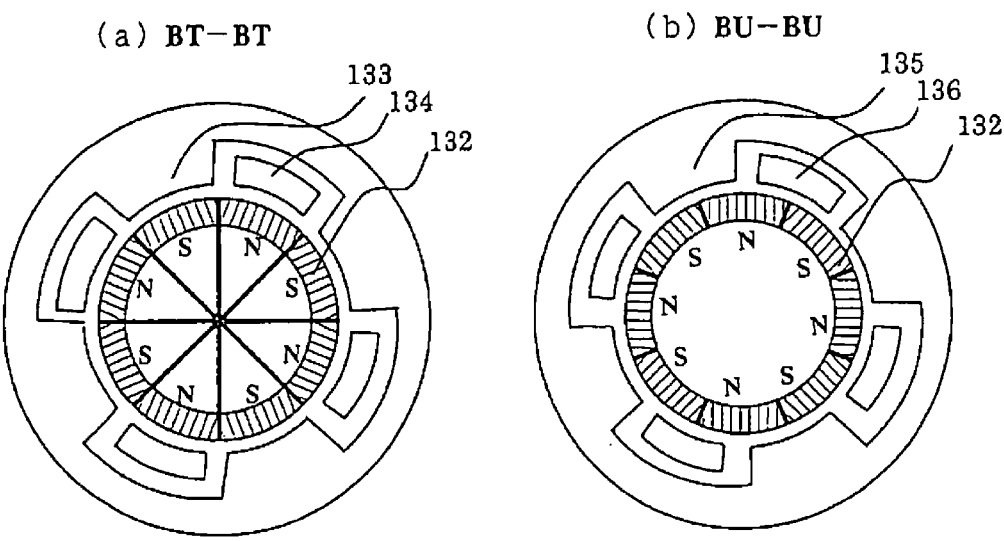
FIG. 55 illustrates cross-sectional configurations of the magnetic poles illustrated in FIG. 54.

FIG. 54 shows an example of a two-phase motor, in which both of the phases are arranged with a phase difference of about 90° in electrical angle. FIG. 55 shows the cross sections. This motor can be operated as a three-phase motor by imparting both phases with a phase difference of about 120° in electrical angle in the same fashion as the two-winding three-phase motor described above.

Figure 56:
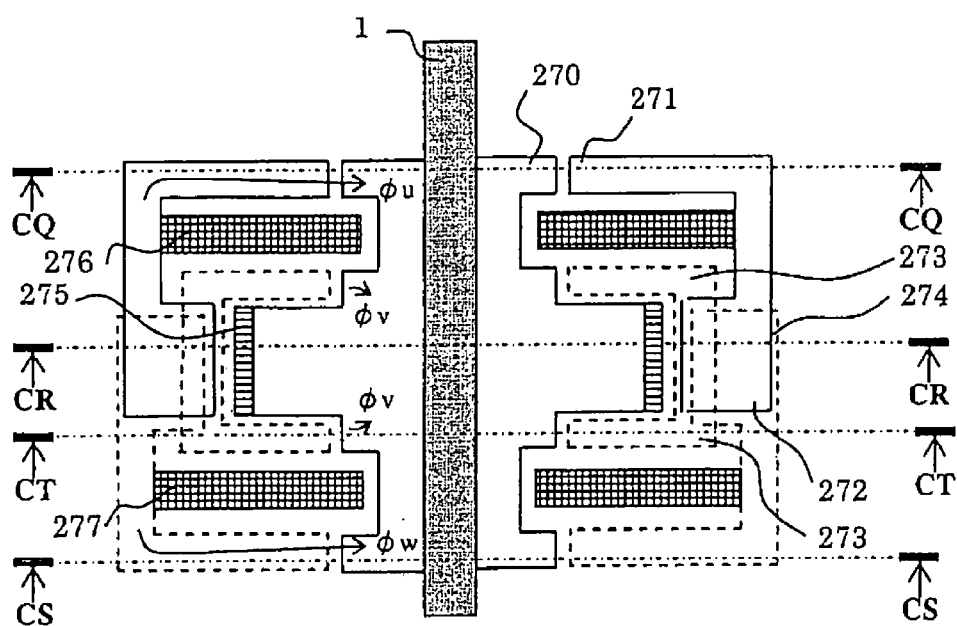
FIG. 56 is a schematic vertical cross section illustrating a three-phase motor having loop windings.
Figure 57:
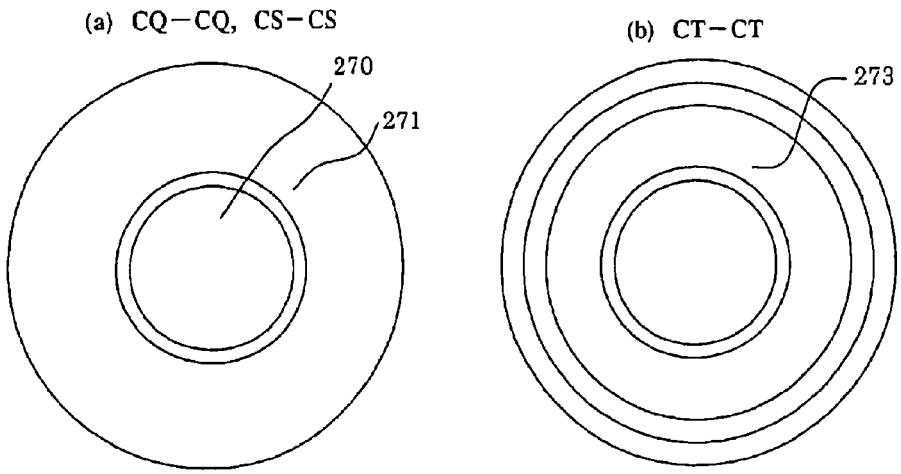
FIG. 57 illustrates cross-sectional configurations of the magnetic poles illustrated in FIG. 56.

FIG. 56 shows an example of a three-phase motor, in which both phases are arranged with a phase difference of about 120° in electrical angle. FIG. 57 shows the cross sections. In the motor, U-phase stator poles 272, V-phase stator poles 273 and W-phase stator poles 274 are imparted with a relative phase difference of 120° in electrical angle.

Figure 58:
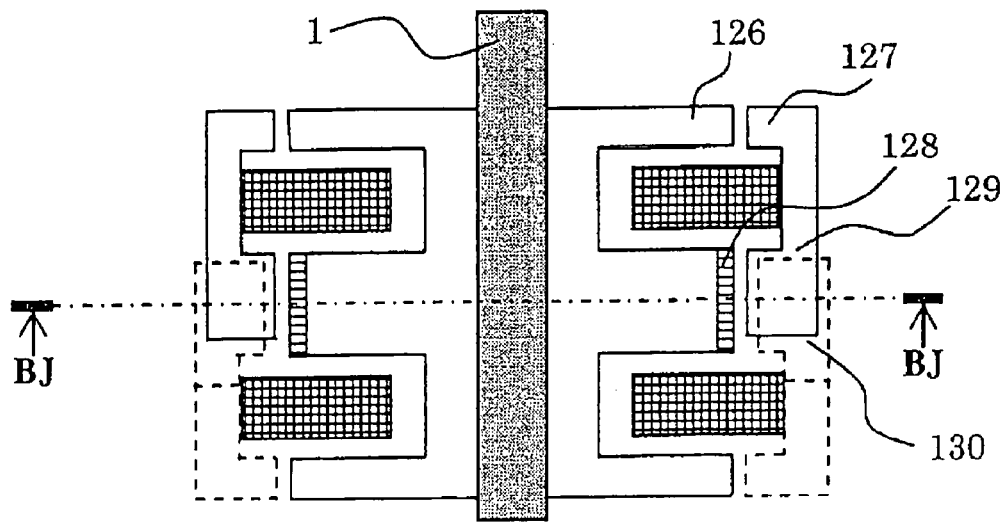
FIG. 58 is a schematic vertical cross section illustrating a two-phase motor having loop windings.
Figure 59:
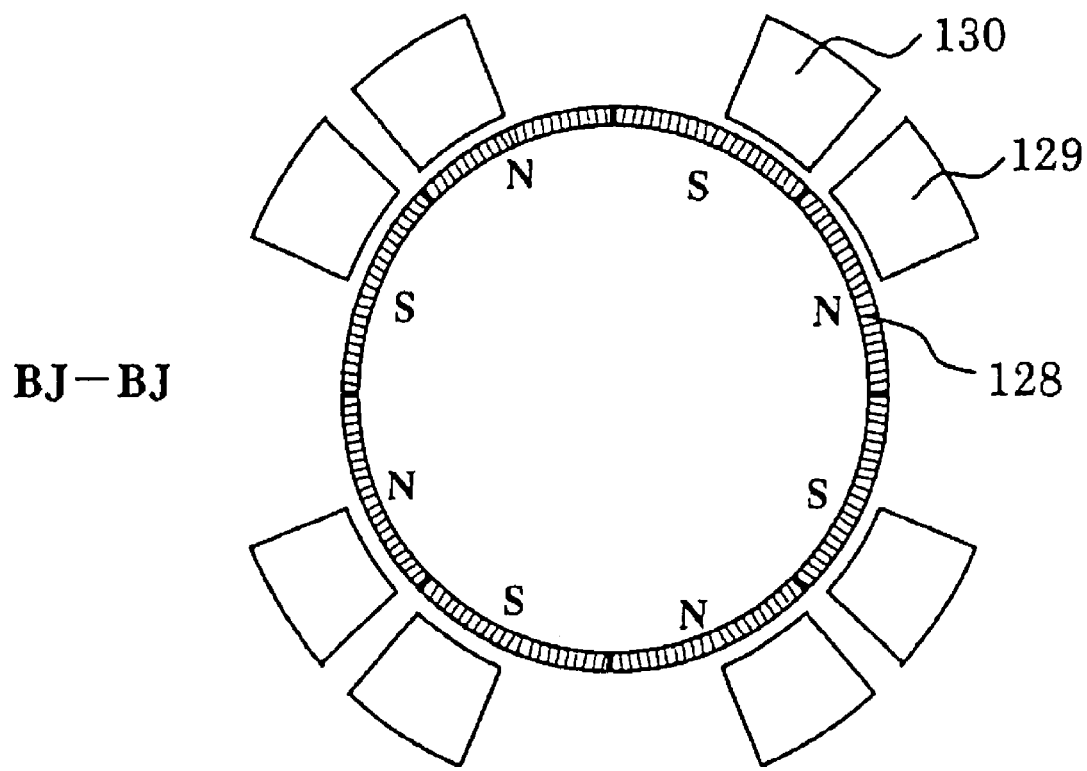
FIG. 59 illustrates a cross-sectional configuration of the magnetic poles illustrated in FIG. 58.
Figure 60:
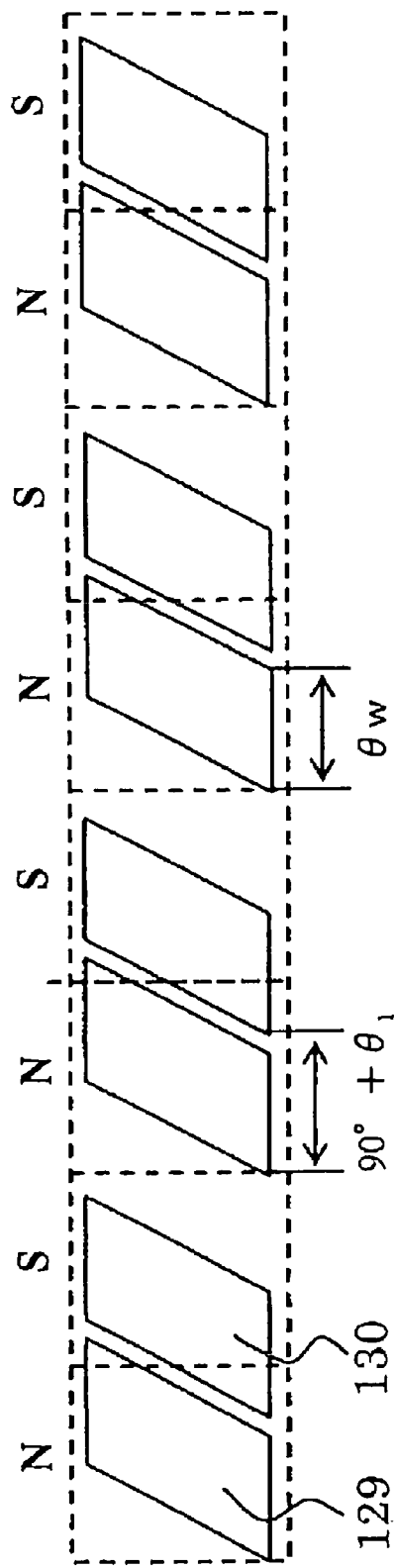
FIG. 60 is a linear development of the magnetic pole configuration illustrated in FIG. 58.
Figure 61:
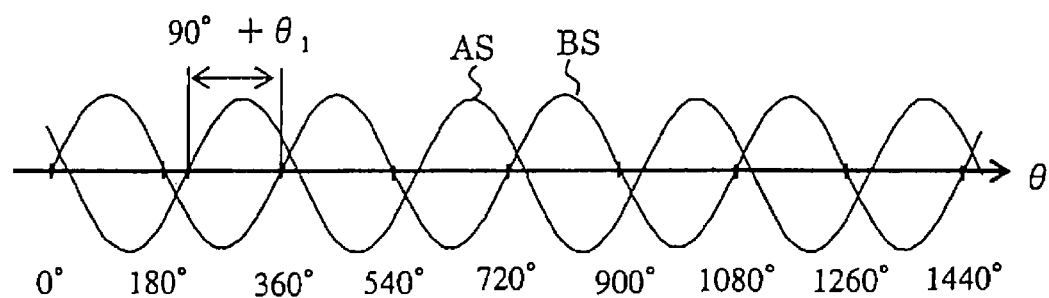
FIG. 61 illustrates voltages and currents of the windings of the motor illustrated in FIG. 58.

FIG. 58 shows an example of a two-phase motor having phases A and B, and FIG. 59 shows its cross section. FIG. 60 is a circumferential linear development illustrating a positional relationship between stator poles 129 and 130 for both of the phases. FIG. 61 shows an example of an induced voltage AS of the phase A and an induced voltage BS of the phase B. There is a problem that the A- and B-phase stator poles are close to each other and causes confliction. If the phase difference is 90°, there may be a problem that a circumferential width θw of the stator poles will be reduced. On the other hand, if the structure is of increasing the phase difference between both phases, which difference is expressed by (90°+θ1)≈θw, and of increasing the average torque, torque output may be small at some rotational angles. This may be raise a problem that the motor cannot be started up depending on the rotational angle at the time of start up, or torque pulsation may become large. In lots of applications, start-up torque is 20% of rated torque. Therefore, when a phase difference (90°+θ1) between the both phases is 170° or less, and some current capacity of the inverter is allowed for, the motor can be started up with the torque of 20% of the rated torque even when started up from a worst rotational position. Further, in a simple theory, maximum average output torque can be obtained when the phase difference (90°+θ1) between the both phases is 180° and the circumferential width of each stator pole of both phases is 180°. In this case, studying the correlation between the pole width θw and the obtainable torque: the pole width θw for winding coefficient ¾ in simple theory is 97.20; and, when the width is 100° or more, average torque which is 75% or more of the maximum torque that can be theoretically calculated, may be obtained. As a result, when 100°≦(90°+θ1)≦170° is satisfied, start-up torque, which is 20% or more of the rated torque, may be obtained. As to the average torque as well, 75% or more of a principally maximum value may be obtained.

Figure 62:
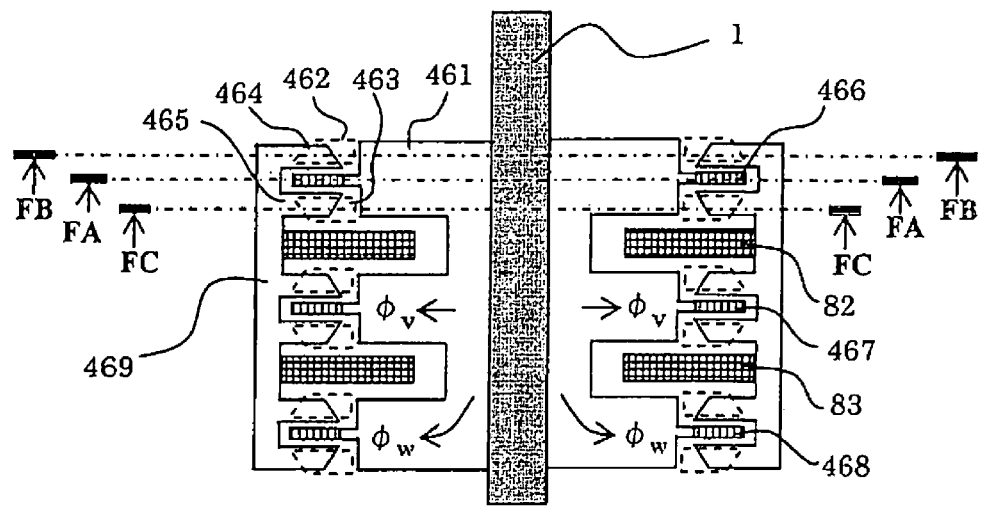
FIG. 62 is a schematic vertical cross section illustrating a three-phase motor having loop windings.
Figure 63:
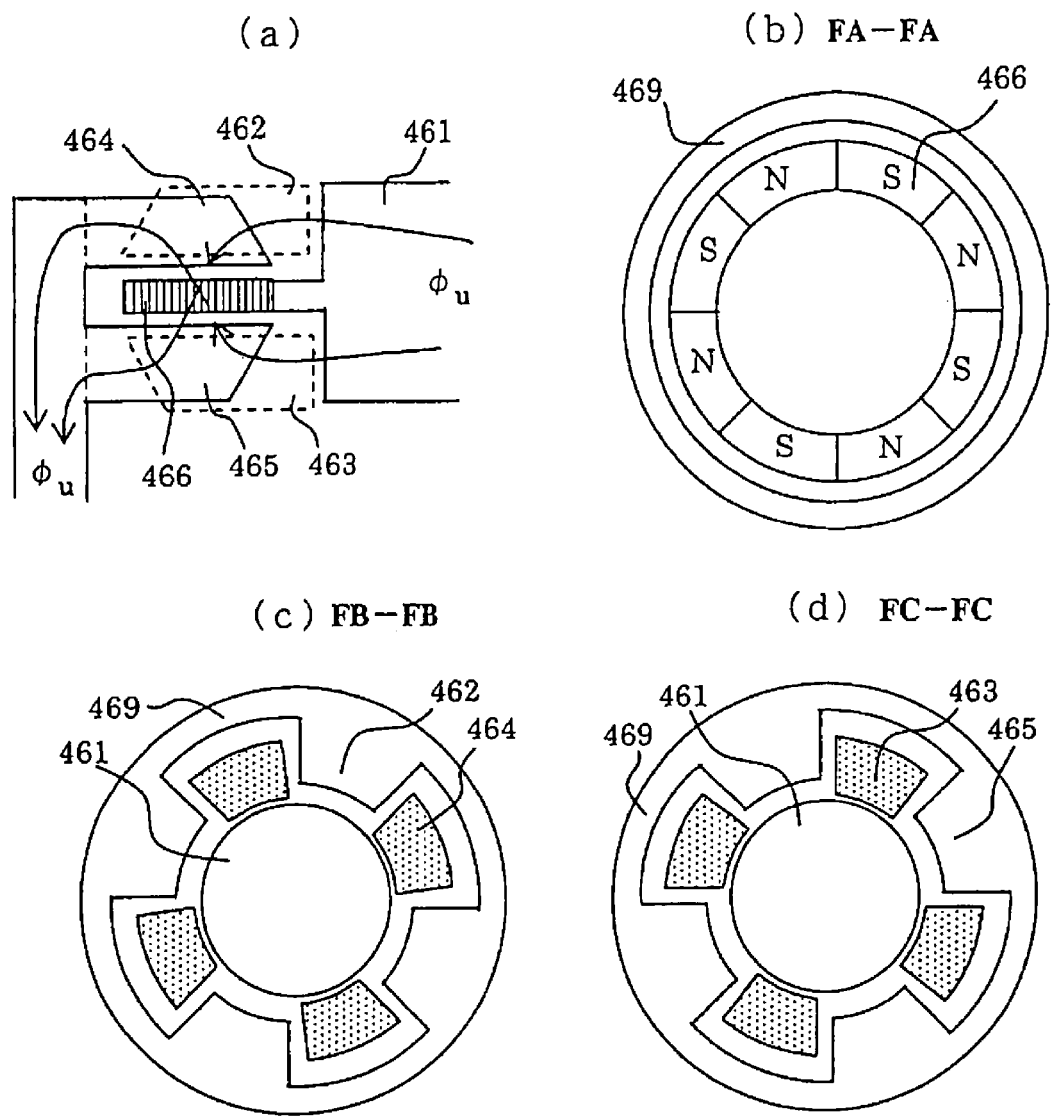
FIG. 63 illustrates cross-sectional configurations of the magnetic poles illustrated in FIG. 62.

FIG. 62 shows an example of a three-phase motor of the present invention. FIG. 63 shows by (a) an enlarged view of the U-phase stator and rotor poles. FIG. 63 shows by (b), (c) and (d) cross sections of some portions. Indicated by 466 are disk-like permanent magnets whose magnetic fluxes at both of front and rear surfaces are utilized. Specifically, portions indicated by numerals 464 and 465 direct U-phase fluxes. Further, portions indicated by numerals 462 and 463 direct fluxes, which are reverse of those of the phase U, to a rotor 461 through a comparatively small air-gap portion. In this way, magnetic fluxes at both surfaces of the magnets can be effectively utilized. Also, a U-phase winding 62 may be arranged being extended to the inside of the rotor to increase a cross-sectional area of the winding and thus to enable generation of large continuous torque. Similar to the phase U, effective electromagnetic effect can be exerted as to the phases V and W by individually utilizing the magnetic fluxes at front and rear surfaces of permanent magnets 467 and 468. As have been described referring to the motor shown in FIGS. 27 and 28, currents of windings 82 and 83 can be controlled by supplying three-phase currents to these two windings by composing them as in the case of two-phase currents. As a result, the magnetic poles of the three phases can be applied with three-phase magnetomotive forces.

This motor can be modified into a two-phase motor by changing the V-phase poles to a simple soft magnetic opposed faces or by changing the relative phase difference between the phases U and W to 90°.

Figure 64:
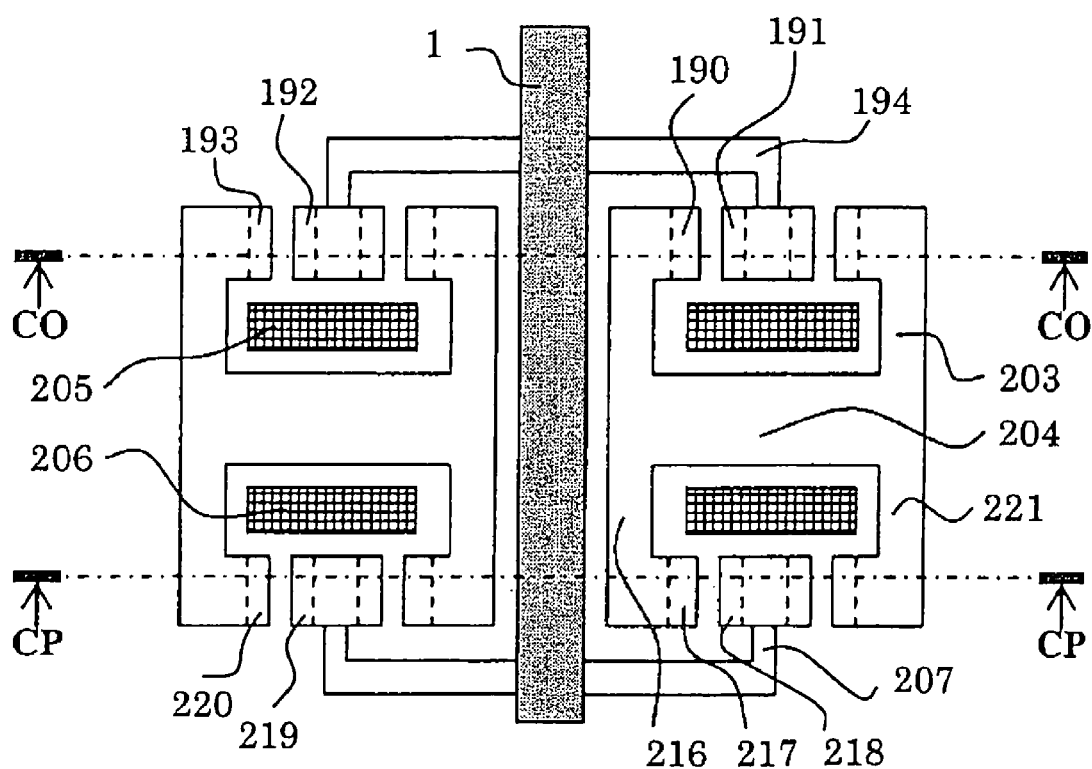
FIG. 64 is a schematic vertical cross section illustrating a two-phase motor having loop windings.
Figure 65:
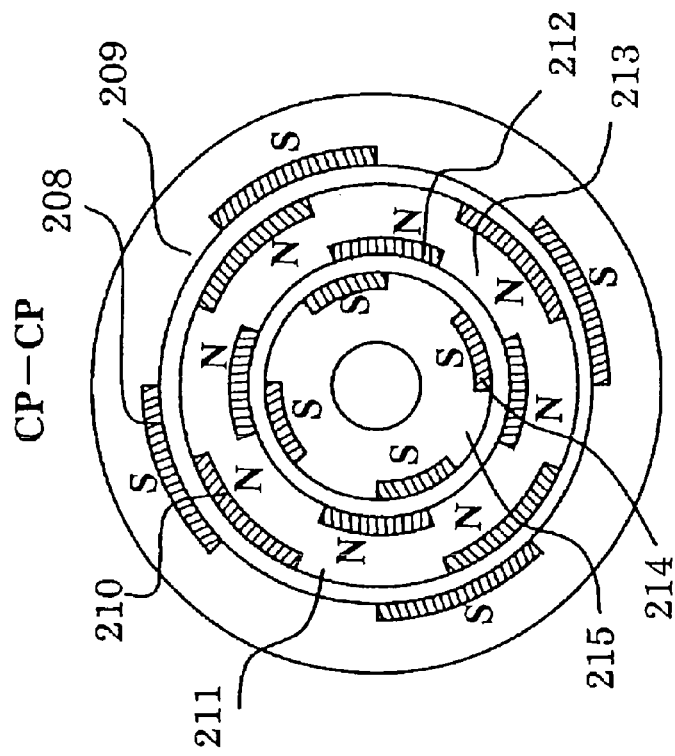
FIG. 65 illustrates cross-sectional configurations of the magnetic poles illustrated in FIG. 64.
Figure 65:
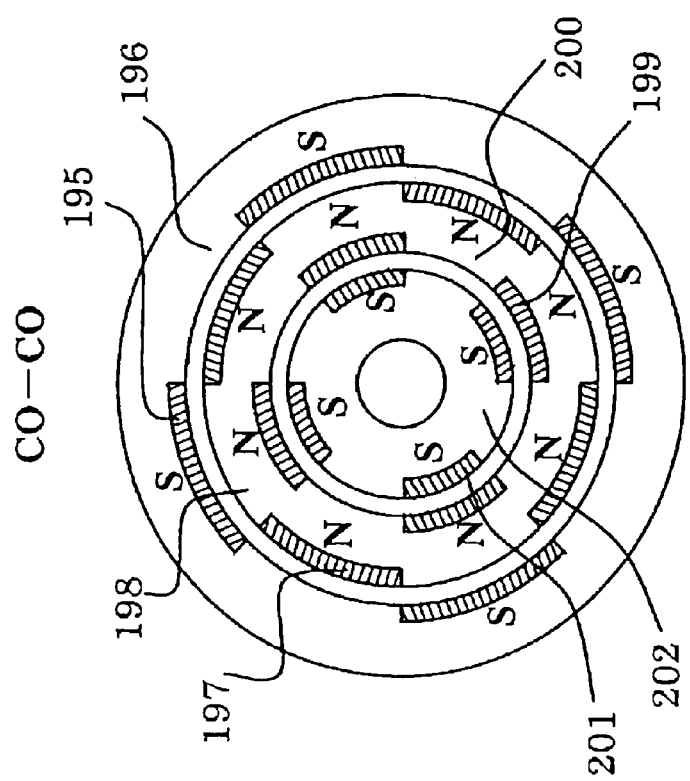

FIG. 64 shows an example of a two-phase motor of the present invention. FIG. 65 shows cross sections of the motor. Indicated by numerals 194 and 207 are supports of the rotor and by 192 and 219 are rotors. In permanent magnets 199 and 201, N-poles are oriented from the inner-diameter side toward the outer-diameter side. A cross section taken along a line CO-CO shown by (a) of FIG. 65 will be explained. In the inner-diameter side magnetic circuit at this rotational position, the permanent magnets 199 and 201 are radially opposed to and aligned with each other, and soft magnetic portions 200 and 202 are also opposed to each other, providing a condition where magnetic fluxes can freely make a traverse. Thus, no torque is generated in the inner-diameter portion. On the other hand, in the outer-diameter side magnetic circuit, as to permanent magnets 195 and 197, N-poles are oriented toward the inner-diameter side. Also, since both of the permanent magnets 195 and 197 are opposed to the soft magnetic portions 198 and 196, respectively, N-poles are oriented toward the inner-diameter side by the magnets 195 and 197 throughout the circumference. As a result, when the CO-CO cross section is seen as a whole as well, magnetic fluxes pass from the outer-diameter side to the inner-diameter side. This relationship will be reversed when the rotor 194 is rotated by 180° in electrical angle. Then, when the CO-CO cross section is seen as a whole, N-poles are oriented toward the outer-diameter side from the inner-diameter side, meaning that magnetic fluxes are passed in that direction. In this way, it is so configured that magnetic fluxes that pass from the inner-diameter side to the outer-diameter side are fluctuated with the rotation. A magnetomotive force can be applied to this magnetic circuit by a winding 205 to generate torque.

A cross section taken along a line CP-CP shown by (b) of FIG. 65 shows a state where the rotor has been rotated clockwise by 90° in electrical angle from the state shown in the CO-CO cross section so as to have a phase difference of 90°. The electromagnetic effect can be exerted in completely the same fashion as in the state of the CO-CO cross section. In the inner-diameter side magnetic path, indicated by numerals 212 and 214 are permanent magnets whose N-poles are oriented toward the outer-diameter side, and by 213 and 215 are soft magnetic portions. In the outer-diameter side magnetic circuit, indicated by numerals 208 and 210 are permanent magnets whose S-pole is directed toward the outer-diameter side, and by 209 and 211 are soft magnetic portion. Thus, the two-phase motor is constituted by both of the magnetic poles and both of the windings.

In a motor of this structure, the substantially entire surfaces of the operating magnetic circuits are opposed to each other, causing very few flux leakage from spaces. Further, flux leakage from between the phases of the stator poles is also small owing to the separation between the stator poles. In addition, the each magnetic path can provide a degree of freedom in varying its cross-sectional area as need arises. Also, the winding of each of the phases is simply structured, while ensuring a sufficient conductive cross-sectional area. Thus, this motor has a characteristic that it can obtain output of large maximum torque and output of large continuous torque.

FIG. 64 has shown the two-phase motor with an arrangement of two sets of magnetic path configurations including the permanent magnets. Alternately, however, three sets of similar magnetic path configurations may be arranged to constitute a three-phase motor.

Figure 66:
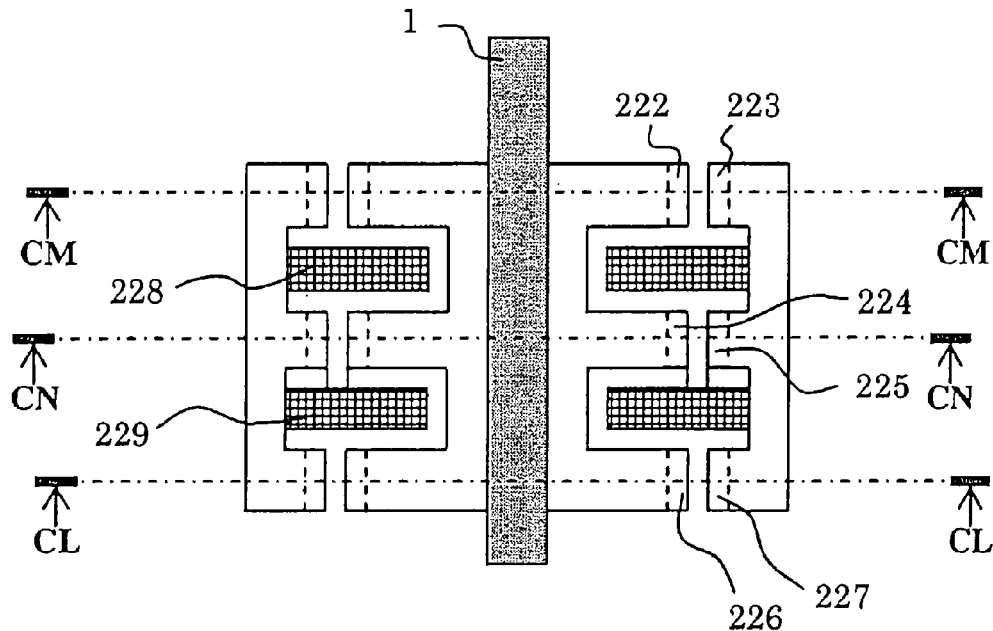
FIG. 66 is a schematic vertical cross section illustrating a three-phase motor having loop windings.
Figure 67:
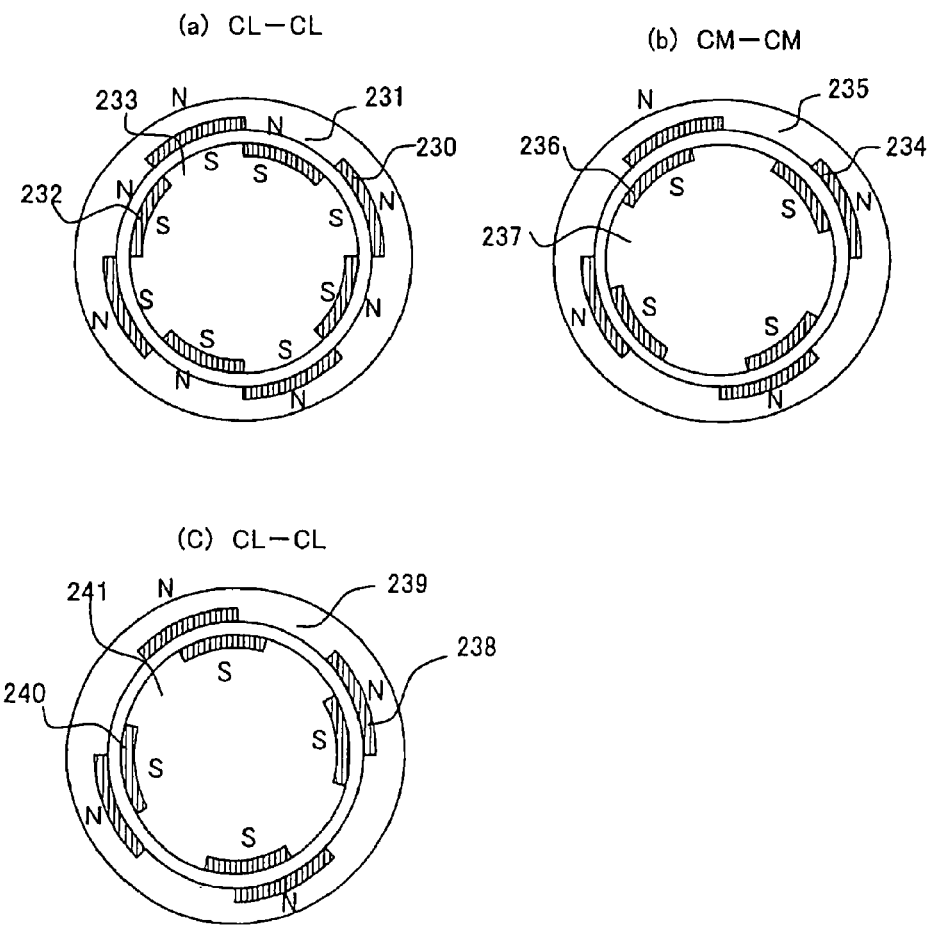
FIG. 67 illustrates cross-sectional configurations of the magnetic poles illustrated in FIG. 66.

FIG. 66 shows an example of a three-phase motor of the present invention. FIG. 67 shows cross sections of some portions at certain rotational positions. Each of the stator and rotor poles shown in FIG. 67 has a configuration analogous to that of the motor shown in FIG. 65, being imparted with phases U, V and W. Thus, magnetic fluxes of the individual phases are configured to fluctuate with the rotation of the rotor shaft 1. Indicated by numeral 222 are U-phase rotor poles, by 223 are U-phase stator poles, by 224 are V-phase rotor poles, by 225 are W-phase stator poles, by 226 are W-phase rotor poles, by 227 are W-phase stator poles and by 228 and 229 are windings.

FIG. 67 shows by (a) an example of a cross section of the phase U. In this rotational position, permanent magnets 230 and 232 are at different rotational positions from each other. Since soft magnetic members 231 and 233 are arranged as shown, the permanent magnets 230 and 232 may allow the magnetic fluxes to pass from the inner-diameter side to the outer-diameter side throughout the entire circumference. Large magnetic fluxes are passing from the inner-diameter side to the outer-diameter side. FIG. 67 shows by (b) the V-phase poles. Comparing with the phase U, the rotor has been positioned being rotated clockwise by 120° in electrical angle. Soft magnetic portions 235 and 237 are opposed to each other halfway to provide a little degree of freedom in the direction of the magnetic fluxes. FIG. 67 shows by (c) the W-phase poles. Comparing with the phase U, the rotor has been positioned being rotated clockwise by 240° in electrical angle. Soft magnetic portions 239 and 241 are opposed to each other halfway to provide a little degree of freedom in the direction of the magnetic fluxes. Such magnetic fluxes are permitted to fluctuate with the rotation to allow the windings 228 and 229 to apply three-phase magnetomotive forces to the respective three-phase magnetic circuits, thereby constituting the three-phase motor.

The configurations of the magnetic paths shown in FIGS. 64 to 67 are characterized in that the magnetic fluxes do not vary in a sinusoidal manner but contain a lot of harmonic components. Accordingly, torque ripple is caused. One approach for resolving this may be to modify the shapes of each magnet and each soft magnetic portion in the rotor shaft direction in such a way that the magnetic fluxes may sinusoidally be varied. Alternatively, the radial shapes of the stator and rotor poles that face with each other may be modified for the modification of the air gap, whereby the fluctuation of the magnetic fluxes with rotation may be made sinusoidal. Other approaches may include further multipolarizing the three-phase motor to cancel the harmonic components. Multipolarization may also reduce the torque ripple.

Figure 68:
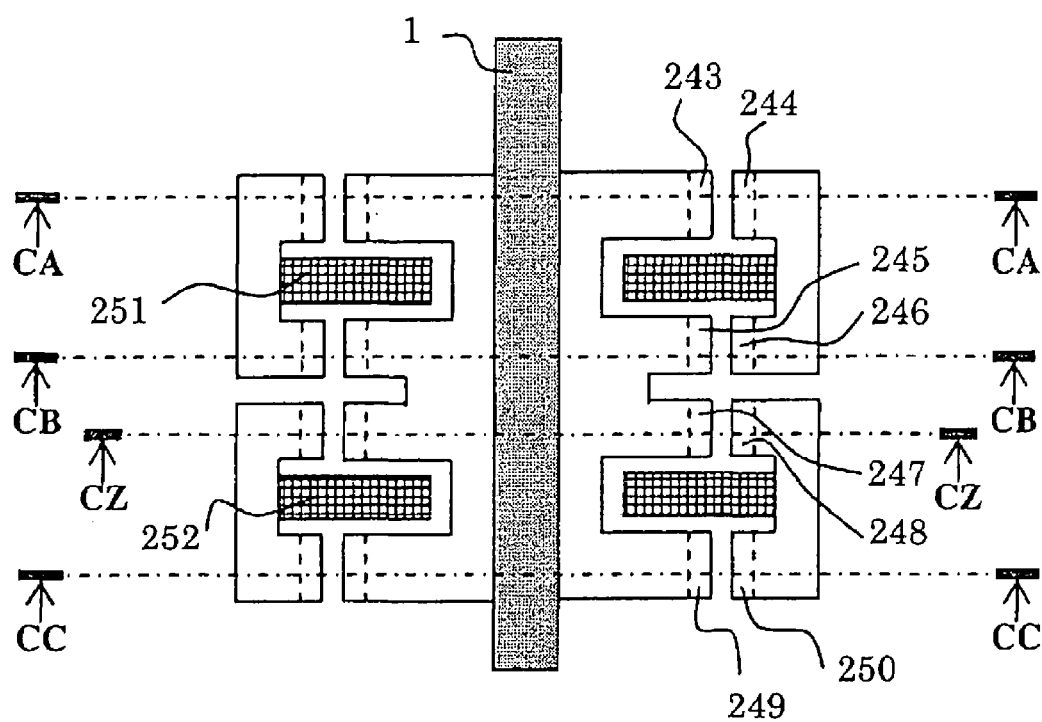
FIG. 68 is a schematic vertical cross section illustrating a two-phase motor having loop windings.
Figure 69:
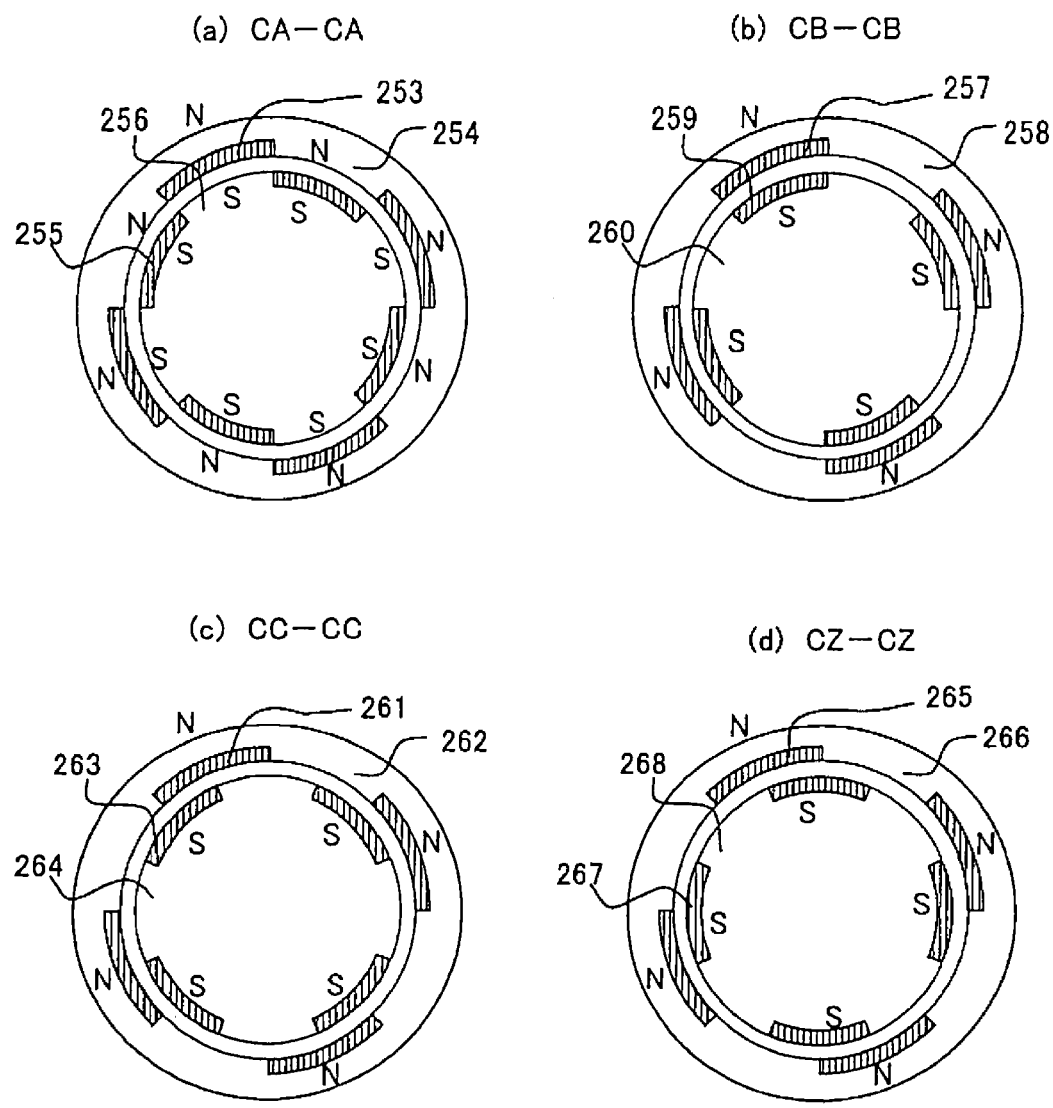
FIG. 69 illustrates cross-sectional configurations of the magnetic poles illustrated in FIG. 68.

FIG. 68 shows an example of a two-phase motor of the present invention. FIG. 69 shows cross sections of the motor. Magnetic paths shown in CA-CA and CB-CB cross sections constitute phase A, and magnetic paths shown in CC-CC and CZ-CZ cross sections constitute phase B. This configuration is an example showing that no magnetic interference occurs between the phases A and B. Indicated by numeral 244 are A-phase stator poles and by 243 are rotor poles. Indicated by 246 are also A-phase stator poles and by 245 are rotor poles. As can be seen from the cross sections shown by (a) and (b) of FIG. 69, it is so configured that there may be a difference of 180° in electrical angle in a facing relationship between magnets and soft magnetic portions. In the rotational positions shown in FIG. 69, magnetic fluxes pass from the side of the rotor poles 243 to the side of the stator poles 244, and further pass through the stator poles 246 and the rotor poles 248 and return to the rotor poles 243. A relationship is established so that a rotation of 180° in electrical angle may completely reverse the fluctuation direction of the magnetic fluxes. The same relationship is established in B-phase stator poles 248 and 250 as well as B-phase rotor poles 247 and 249. These phases have a relative phase difference of 90° with respect to the phase A. Indicated by numerals 253, 255, 257, 259, 261, 263, 265 and 267 are permanent magnets. Indicated by numerals 254, 256, 258, 260, 262, 264, 266 and 268 are soft magnetic portions.

Figure 70:
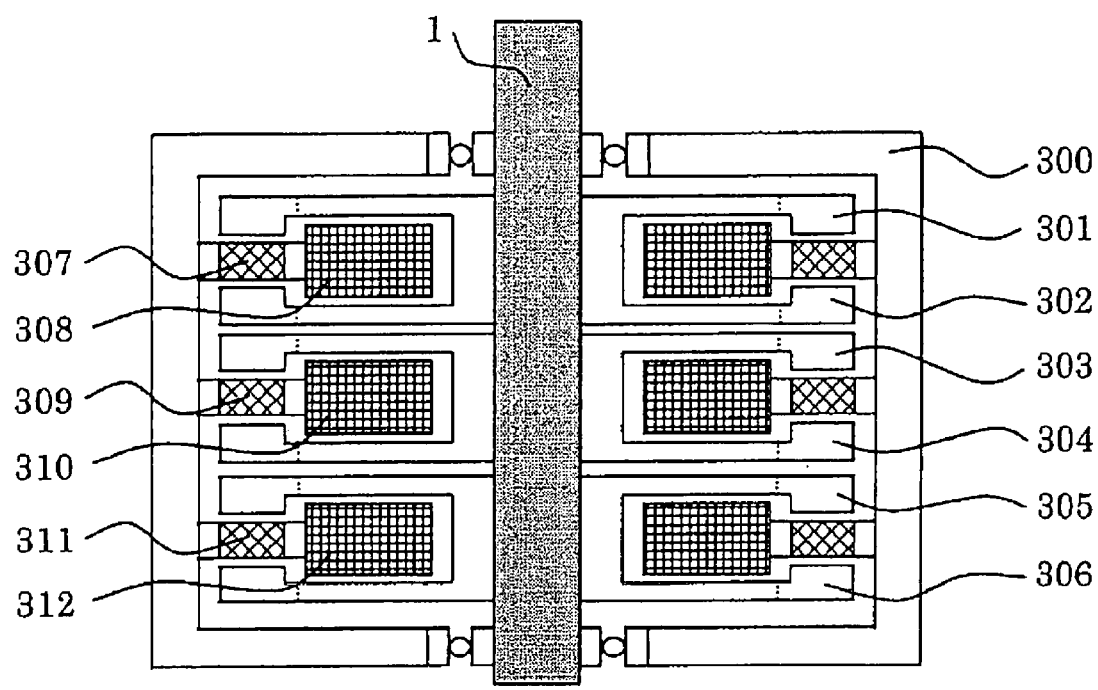
FIG. 70 is a schematic vertical cross section illustrating a three-phase motor having loop windings.
Figure 71:
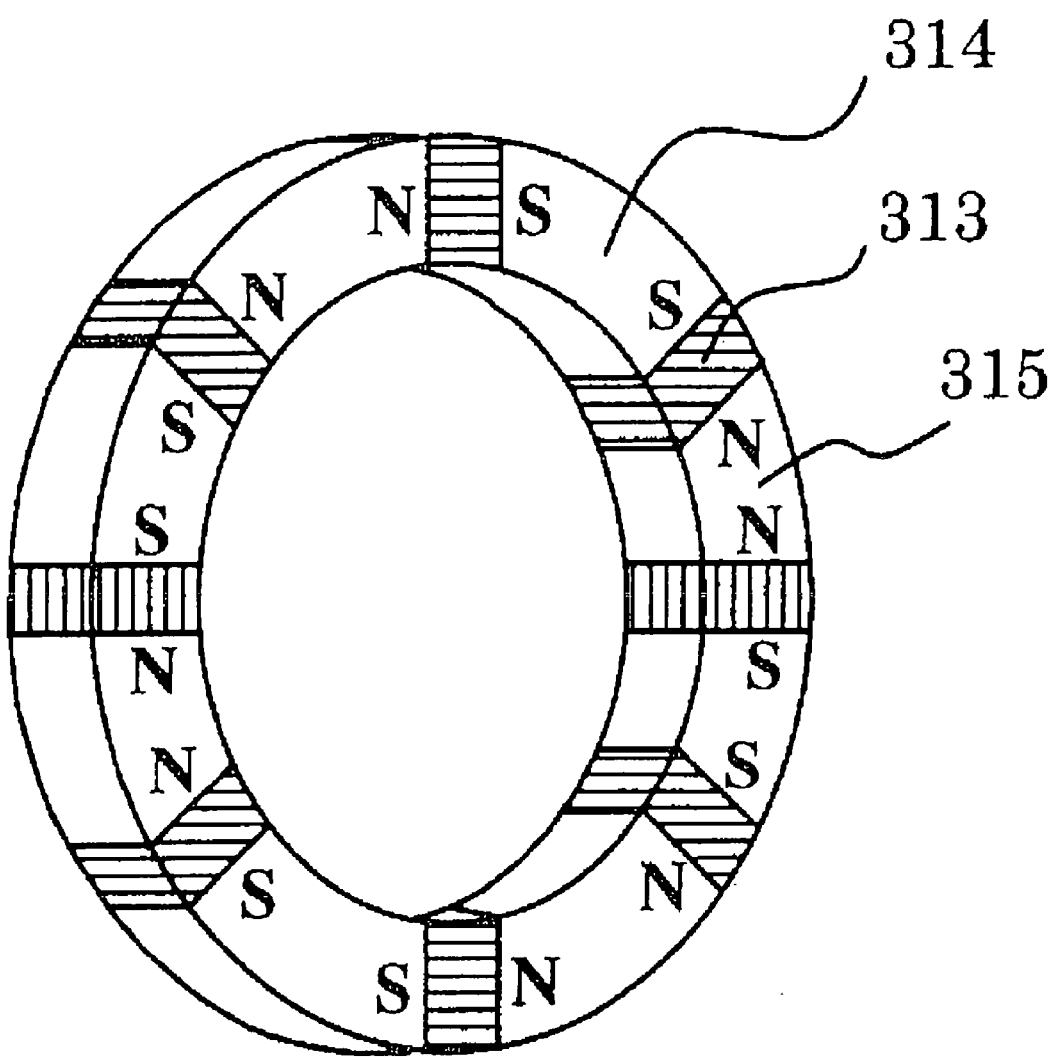
FIG. 71 illustrates a cross-sectional configuration of the magnetic poles illustrated in FIG. 70.
Figure 72:
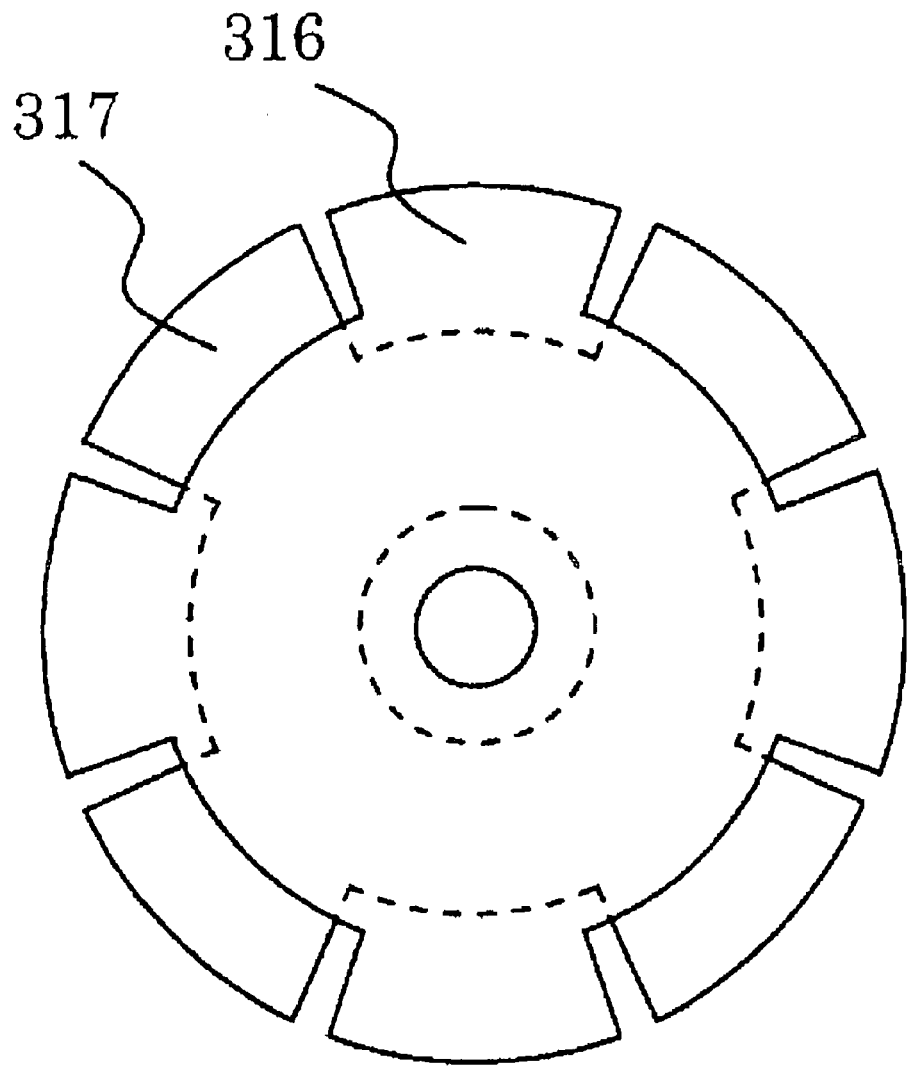
FIG. 72 illustrates a cross-sectional configuration of the magnetic poles illustrated in FIG. 70.

FIG. 70 shows an example of a three-phase motor of the present invention. Indicated by numerals 307, 309 and 311 are U-, V- and W-phase stator poles. Indicated by numerals 301 and 302 are U-phase rotor poles, by 303 and 304 are V-phase rotor poles, and by 305 and 306 are W-phase stator poles. FIG. 71 is a perspective view of the stator poles 307 taken out of the motor. Permanent magnets 313 are directed, in their magnetic poles, as shown in the figure, with soft magnetic portions 314 being S-poles and soft magnetic portions 315 being N-poles. Since both of the N- and S-poles are soft magnetic portions, the stator poles may have magnetic poles in four directions. FIG. 72 shows an example of a side view of rotor poles. As shown in the figure, rotor poles of each of the phases have an indented configuration with a phase difference of 180° in electrical angle. Accordingly, combination of these rotor poles with the stator poles shown in FIG. 71 can provide a structure in which magnetic fluxes passing therethrough may fluctuate with the rotation of the rotor. Thus, torque can be generated by supplying a current to a U-phase winding 308 with a suitable phase and by applying a magnetomotive force to the U-phase stator poles 301 and 302 as well as the rotor poles 307. The phases V and W are configured in the same way. The individual phases are structured so as to be magnetically separated from each other. Also, the relative phase of the rotor and stator is differentiated between the U-, V- and W-phase configurations by 120° to constitute the three-phase motor.

It may be effective to arrange permanent magnets at the inner-diameter and outer-diameter sides of the soft magnetic portions 314 and 315 for coverage thereof, being oriented to the direction of reducing flux leakage. Thus, flux leakage from the soft magnetic portions of the stator poles may be reduced and the characteristics of the motor will be improved. It may also be effective to arrange a conductor LLF for reducing flux leakage, in a space between rotor poles 316 and 317, by attaching it to the rotor. The conductor LLF exerts remarkable effect of reducing flux leakage, because, when magnetic fluxes are increased/decreased in passing through the conductor LLF, eddy currents are produced so as to prevent the increase/decrease of the leaked fluxes. However, since excessively close arrangement will cause too much loss of eddy currents, appropriate distance and shape are required. The conductor LLF is preferably made of a nonmagnetic material. In the motor configuration shown in FIG. 70, the rotor and stator may be reversely modified. Also, the motor may be multipolarized to increase torque. In case of the motor configuration shown in FIG. 70, it may be preferable that members located near the magnetic poles, a motor case 300 and the like are made of a nonmagnetic material.

Figure 73:
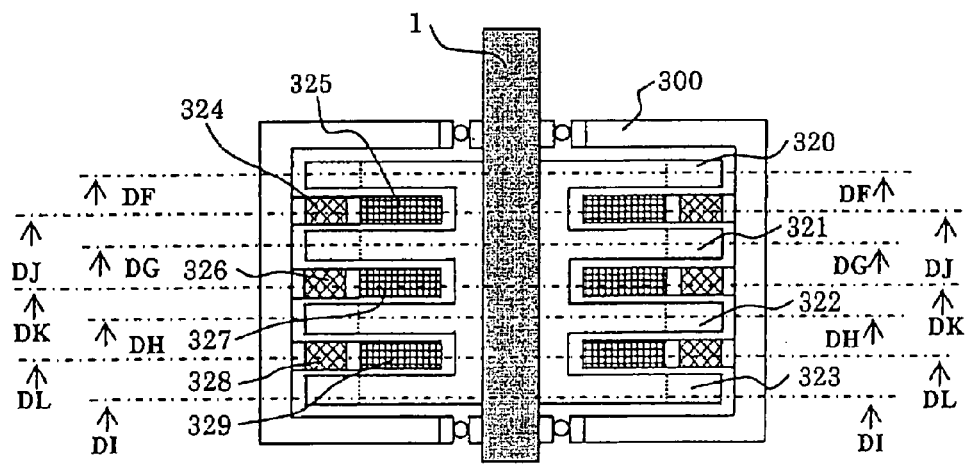
FIG. 73 is a schematic vertical cross section illustrating a three-phase motor having loop windings.
Figure 74:
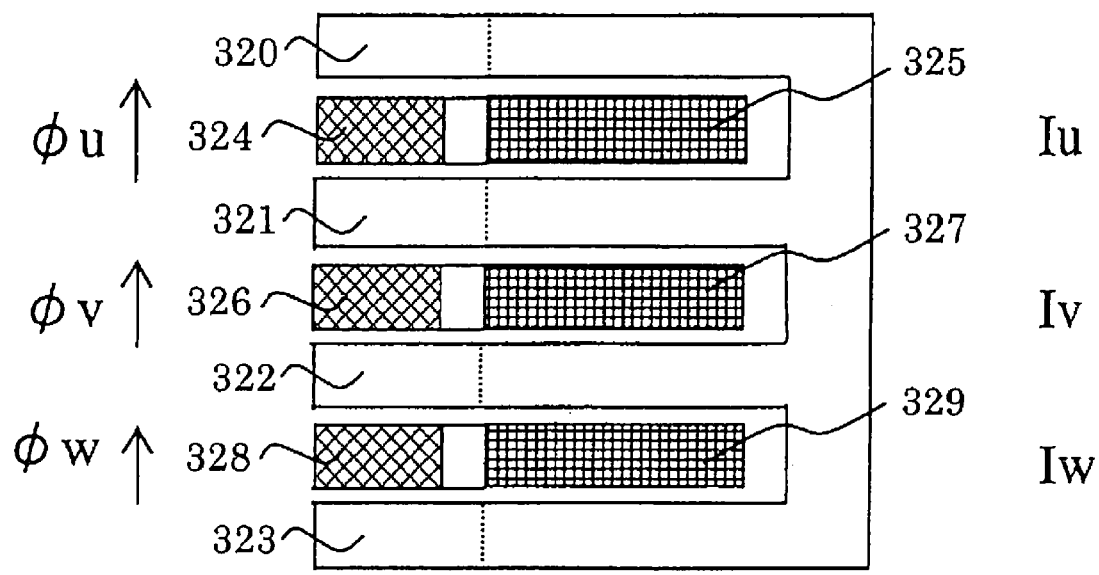
FIG. 74 illustrates a relationship between the fluxes and the currents illustrated in FIG. 73.
Figure 75:
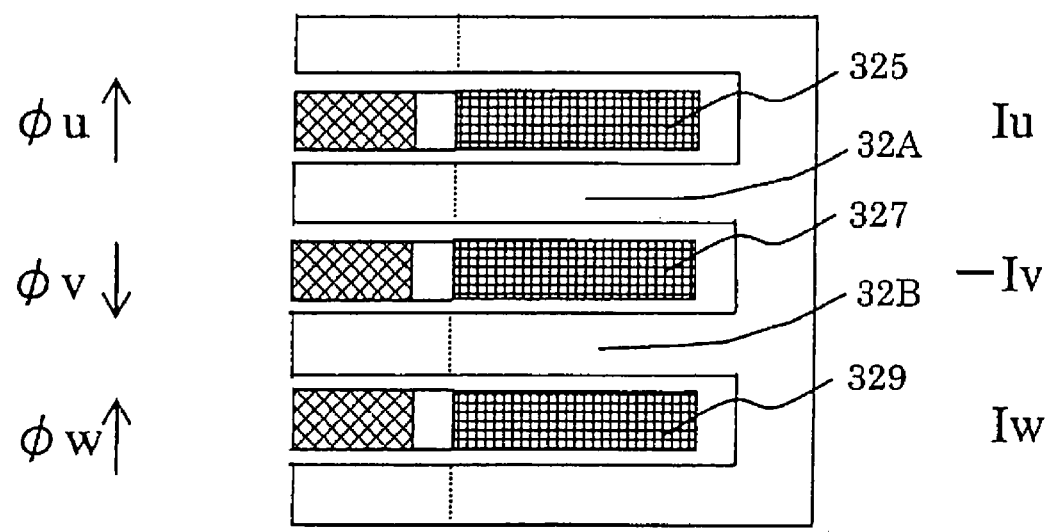
FIG. 75 illustrates a relationship between the fluxes and the currents illustrated in FIG. 73.
Figure 76:
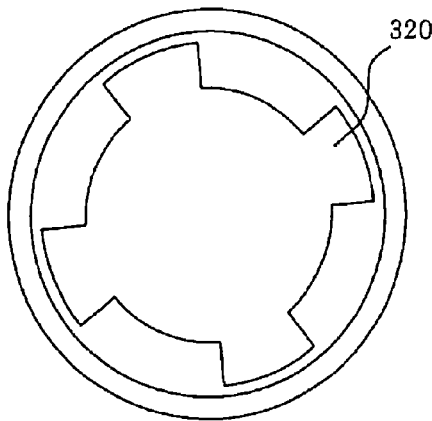
FIG. 76 illustrates cross-sectional configurations of the magnetic poles illustrated in FIG. 73.
Figure 76:
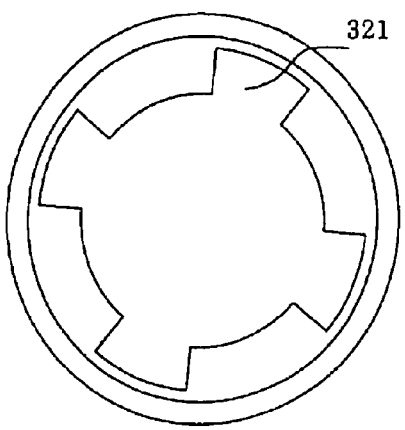
Figure 76:
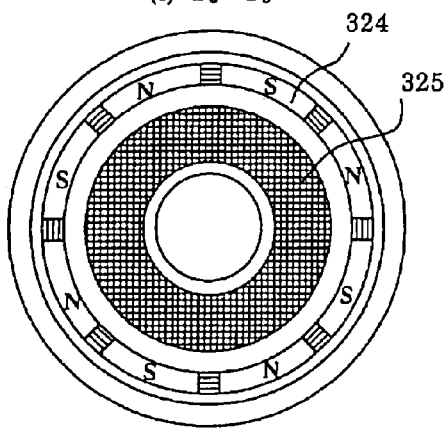
Figure 76:
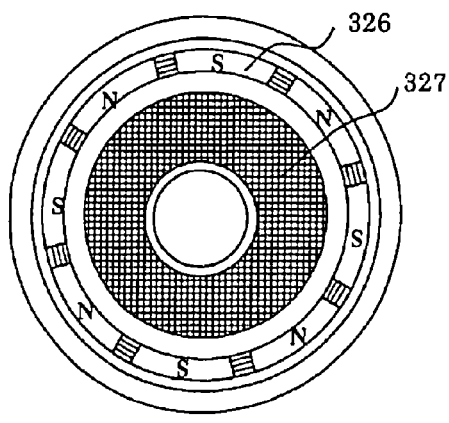
Figure 76:
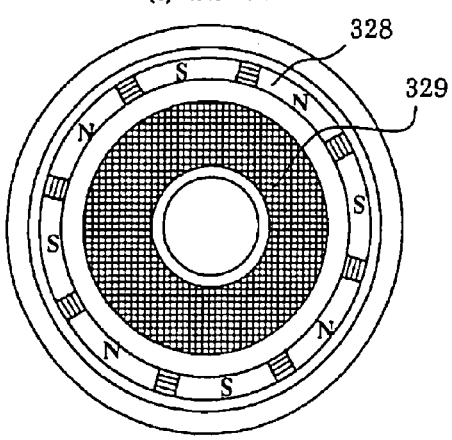

Comparing with the motor shown in FIG. 70, FIG. 73 shows a motor having a structure in which the soft magnetic portions of the rotor in the phases U, V and W are linked with each other. The motor structure is simplified. FIGS. 74 and 75 show partially enlarged views of the motor shown in FIG. 73. FIG. 76 shows cross sections of the motor.

FIG. 74 shows a partially enlarged view of the motor shown in FIG. 73. The figure additionally indicates magnetic fluxes φu, φv and φw of the individual phases, as well as currents Iu, Iv and Iw supplied to the windings. In FIG. 75, the direction of the flux φv and the direction of the current Iv of the motor shown in FIG. 74 are reversed. This arrangement may reduce the size of the magnetic fluxes passing through magnetic paths 32A and 32B by a factor of 1/1.732. Thus, the cross-sectional areas of the magnetic paths 32A and 32B can be narrowed (or made small).

Figure 77:
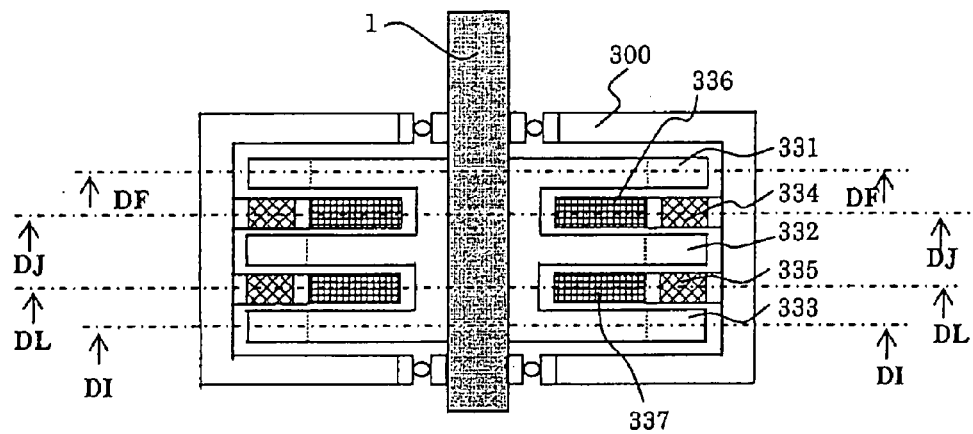
FIG. 77 is a schematic vertical cross section illustrating a three-phase motor having loop windings.
Figure 78:
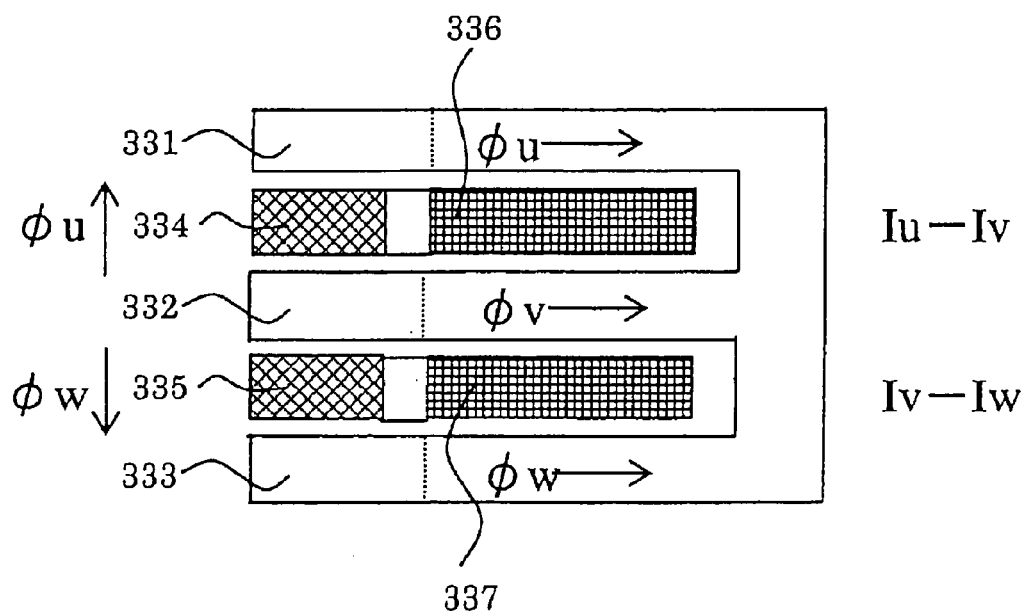
FIG. 78 illustrates a cross-sectional configuration of the magnetic poles illustrated in FIG. 77.

FIG. 77 shows an example of a three-phase motor having a configuration in which two sets of stator poles and rotor poles have a phase difference of 120° in electrical angle. FIG. 78 shows a partially enlarged view of the motor. Center magnetic poles 332 shown in FIG. 77 have a little complicated configuration. The upper part of the configuration in the paper plane has a shape of the cross section taken along the line DG-DG of FIG. 73 and the lower part of the configuration in the paper plane has a shape of the cross section taken along the line DH-DH. In FIG. 77, shapes of other parts are the same as those of the corresponding parts of FIG. 73. Cross sections of portions of the motor are as shown in FIG. 76. The magnetic fluxes φu, φv and φw are as shown in FIG. 78, and currents of windings 336 and 337 are indicated by Iu-Iv and Iv-Iw, respectively.

The two sets of stator poles and rotor poles of the motor shown in FIG. 77 may be configured to have a phase difference of 90° in electrical angle to constitute a two-phase motor.

Figure 79:
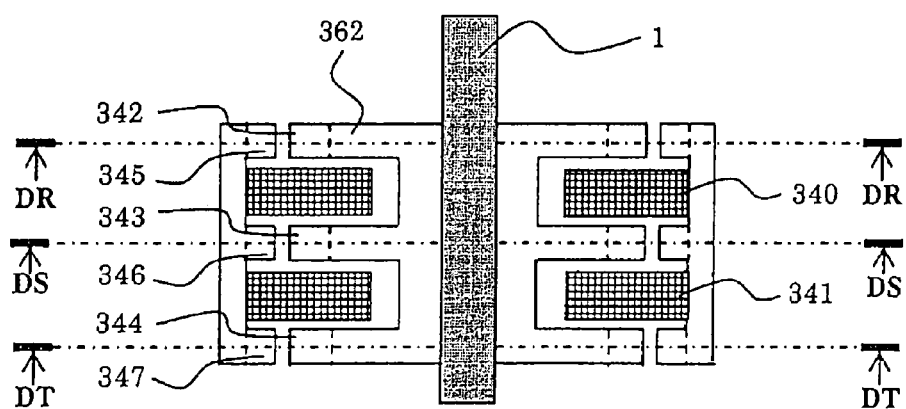
FIG. 79 is a schematic vertical cross section illustrating a three-phase motor having loop windings.
Figure 80:
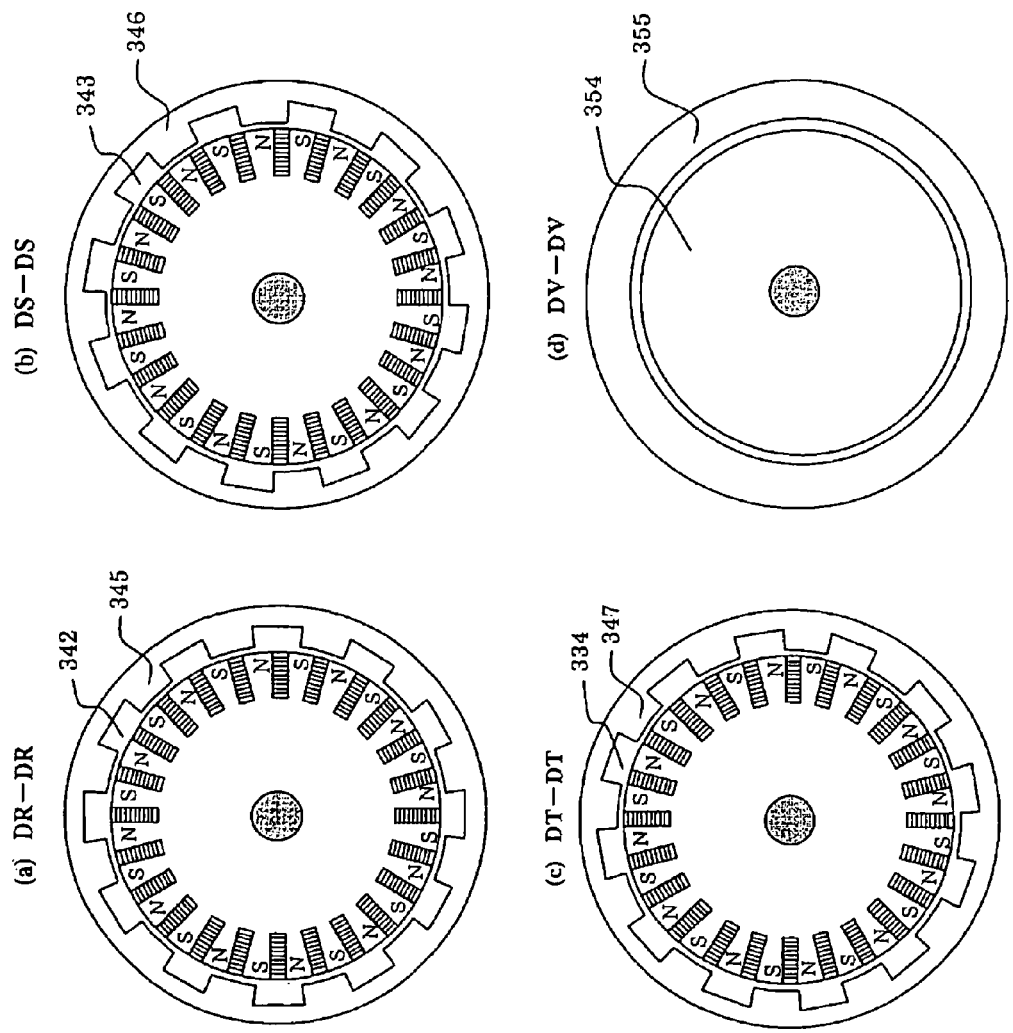
FIG. 80 illustrates cross-sectional configurations of the magnetic poles illustrated in FIG. 79.
Figure 83:
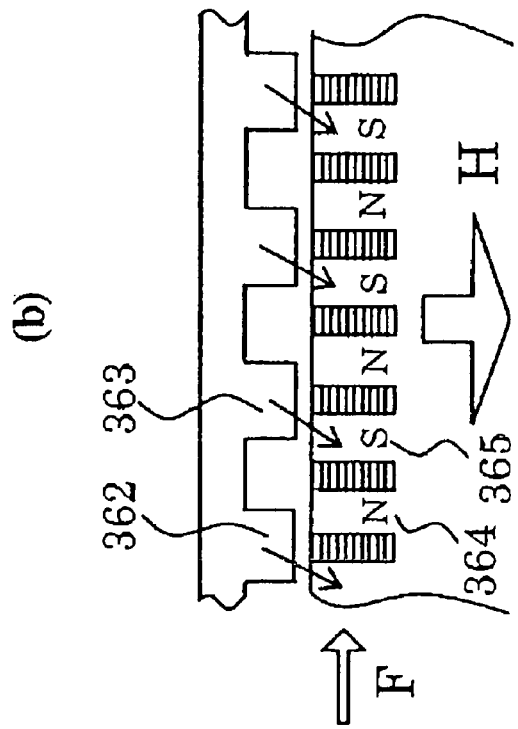
FIG. 83 illustrates relationships between magnetomotive force, magnetic fluxes and torque of the motor illustrated in FIG. 81.
Figure 83:
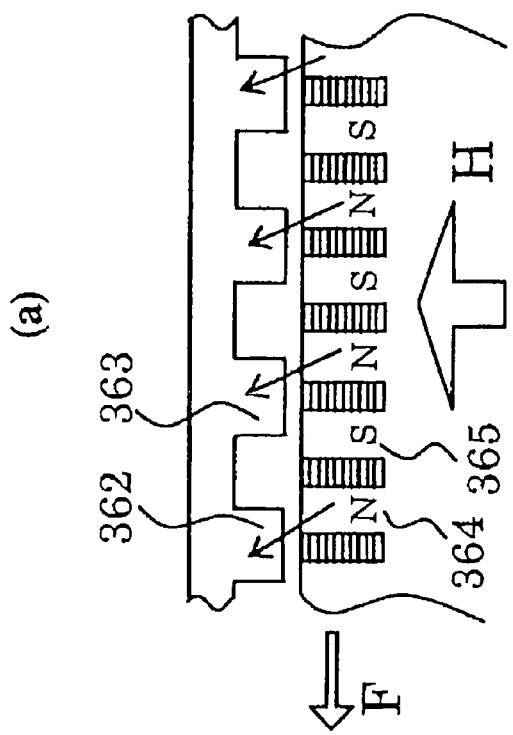

FIG. 79 shows an example of a three-phase motor of the present invention. FIG. 80 shows by (a), (b) and (c) cross sections of some portions. The operation of these rotor poles and stator poles are shown by (a) and (b) of FIG. 83. As shown, the motor is adapted to control directions of torque generation by utilizing that the paths of magnetic fluxes are varied as shown by the arrows according to the direction in which a magnetomotive force is applied, even when the relative positions of the rotor and the stator are the same. Thus, the direction of torque generation can be varied according to the direction of currents to be excited. By providing such a structure to each of the three phases as show in FIGS. 79 and 80, the three-phase motor configuration can be achieved.

In this case, the individual salient stator poles are able to generate both positive and negative torque at the same rotational position of the rotor. Accordingly, comparing with a reluctance motor whose rotor and stator both have salient poles, torque can be generated approximately by a factor of two.

This motor has a characteristic that, when no magnetomotive force is applied, magnetic fluxes that work on the stator are decreased, and thus that so-called drag torque is small and accordingly iron loss is small. In addition, comparing with a surface-magnet type motor, induced voltage of this motor is small when no current is supplied. Accordingly, this motor has a characteristic of readily enabling high-speed rotation at a specified number of revolutions or more.

Figure 81:
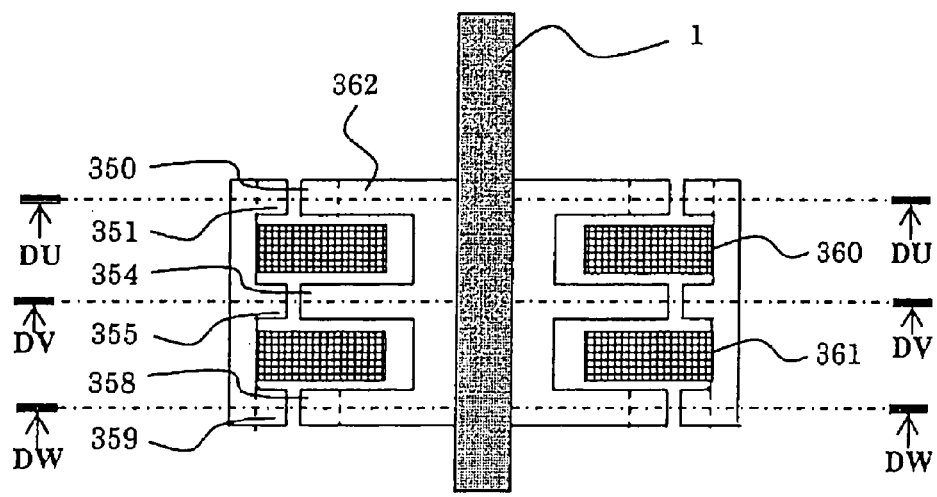
FIG. 81 is a schematic vertical cross section illustrating a two-phase motor having loop windings.
Figure 82:
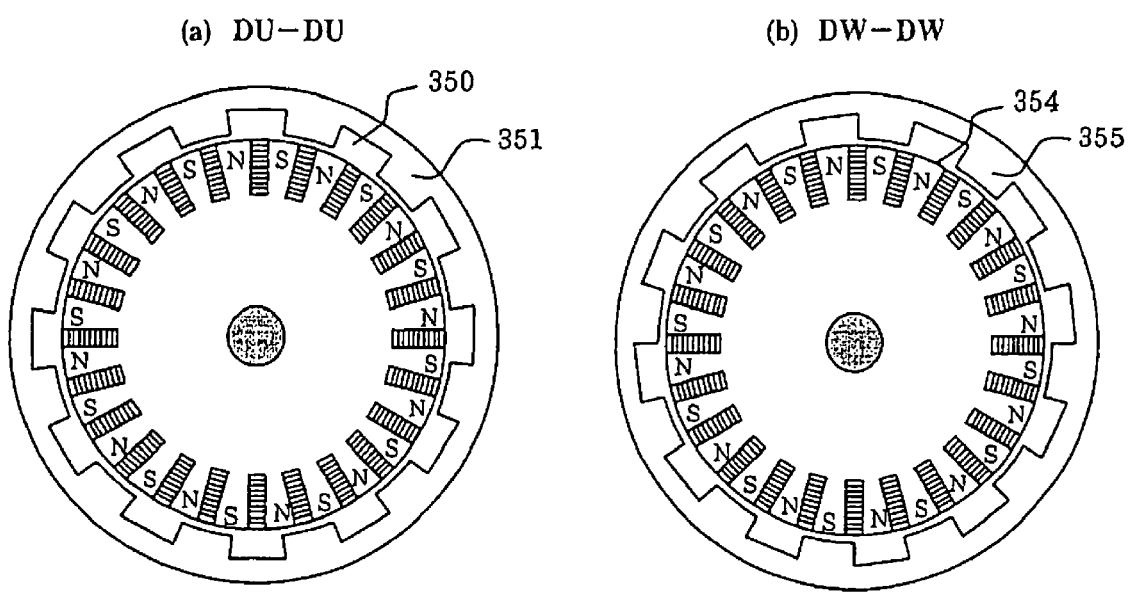
FIG. 82 illustrates cross-sectional configurations of the magnetic poles illustrated in FIG. 81.

FIG. 81 shows an example of a two-phase version of the motor shown in FIG. 79. FIG. 82 and (d) of FIG. 80 show cross sections of the motor. The phase difference between the two phases is 90°.

Figure 84:
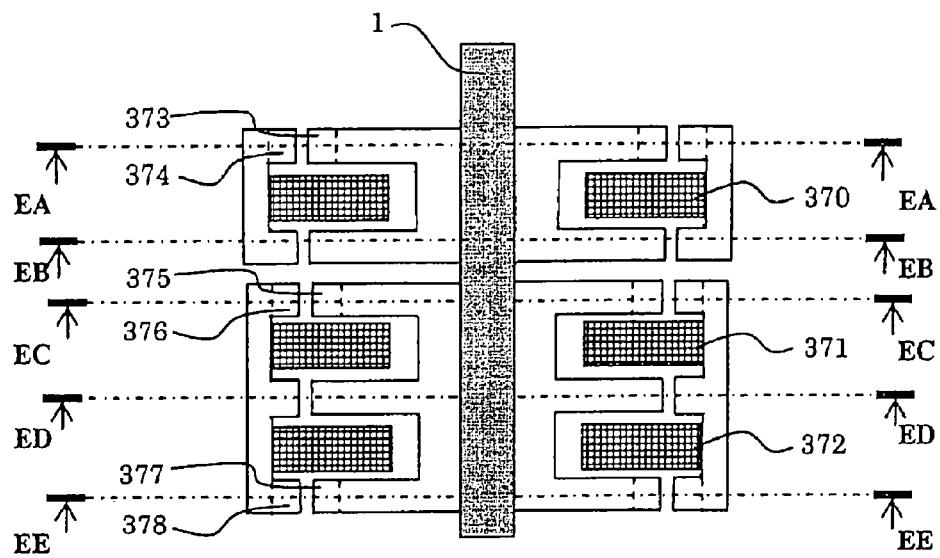
FIG. 84 is a schematic vertical cross section illustrating a three-phase motor having loop windings.
Figure 85:
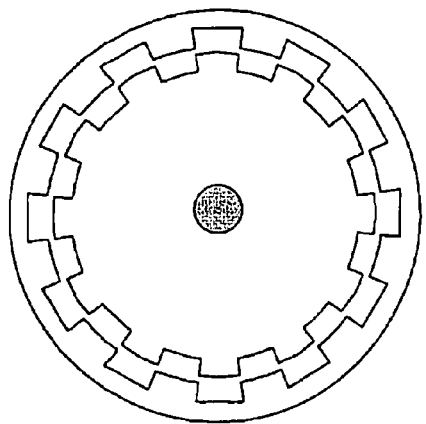
FIG. 85 illustrates cross-sectional configurations of the magnetic poles illustrated in FIG. 84.
Figure 85:
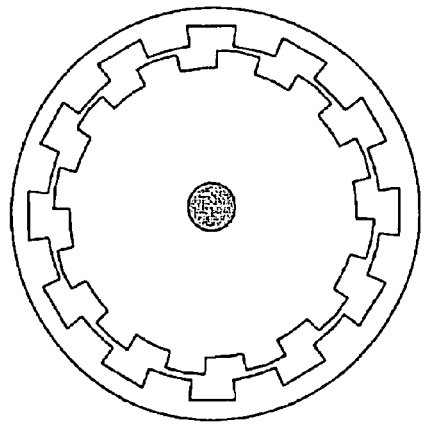
Figure 85:
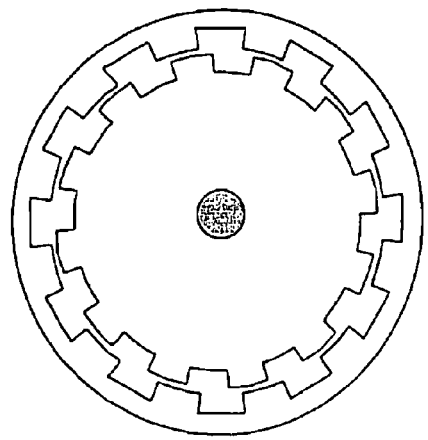
Figure 85:
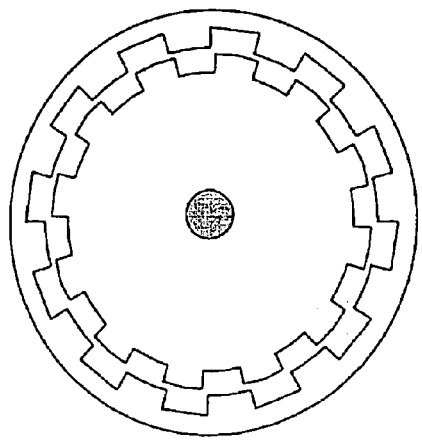

FIG. 84 shows a three-phase motor applying reluctance torque. FIG. 85 shows cross sections of the motor. Stator poles 374, 376 and 378 as well as rotor poles 373, 375 and 377 have indented shapes of the same angular frequency. Thus, the torque generated by the attraction force of the magnetic circuits, that is, the reluctance torque, is imparted with continuing rotation.

Figure 86:
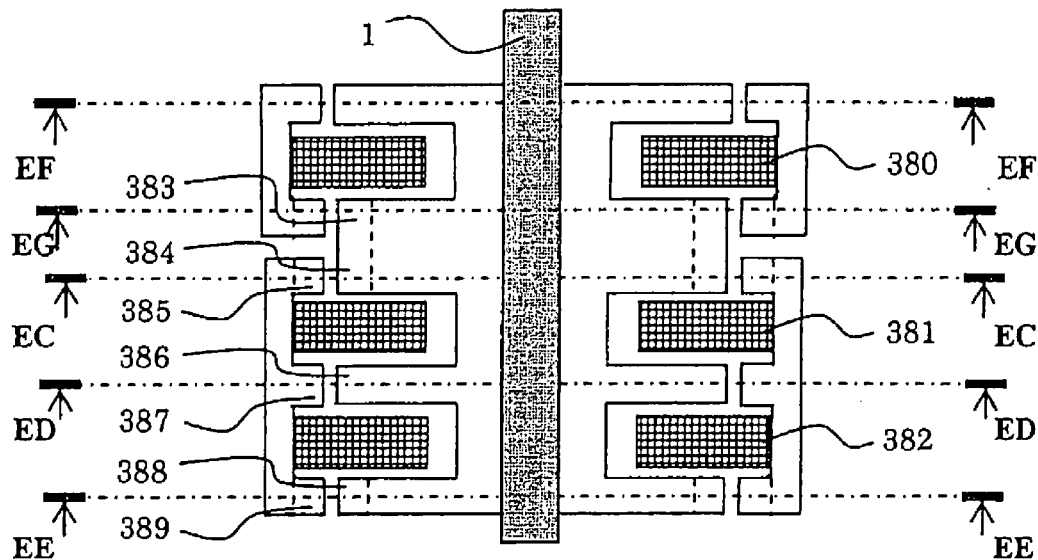
FIG. 86 is a schematic vertical cross section illustrating a three-phase motor having loop windings.

FIG. 86 shows a modification of the motor shown in FIG. 84.

Figure 87:
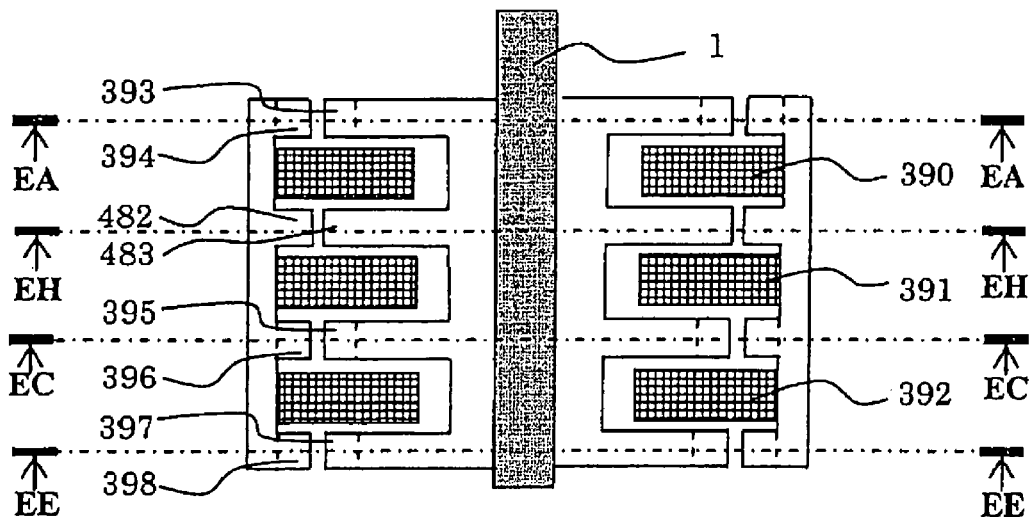
FIG. 87 is a schematic vertical cross section illustrating a three-phase motor having loop windings.

FIG. 87 shows an example of a three-phase motor having a configuration and operation different from those of the motor shown in FIG. 84. The operation of U-phase poles 393 and 394 as well as W-phase poles 397 and 398 is substantially the same as the operation of the example shown in FIG. 86. However, the operation of V-phase poles 395 and 396 is a little different. In order to have the V-phase poles 395 and 396 generated with torque, currents are reversely supplied to windings 391 and 392. It is required, in this case, that no unnecessary and harmful torque is adapted to be generated in the W-phase poles 397 and 398 while torque is generated in the V-phase poles 395 and 396.

Figure 88:
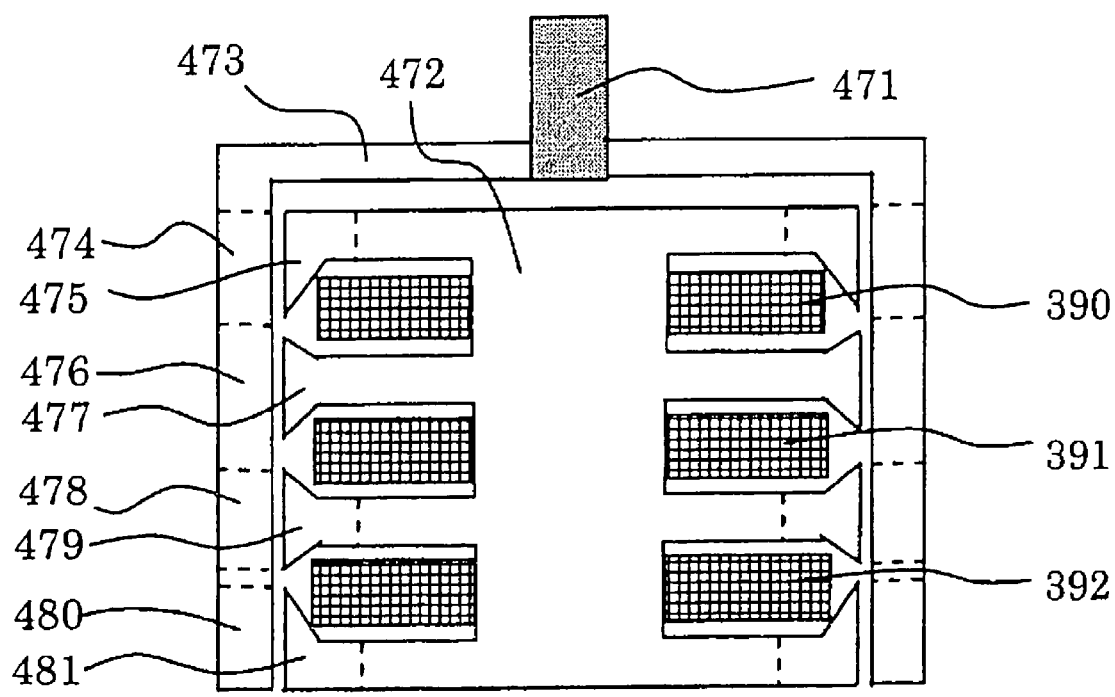
FIG. 88 is a schematic vertical cross section of a three-phase outer-rotor motor having loop windings.

FIG. 88 shows an example of a so-called outer-rotor motor in which the rotor is arranged at the outer-diameter side. In this example, an axial width of each of the magnetic poles of the individual phases can be readily increased to enhance torque.

Figure 89:
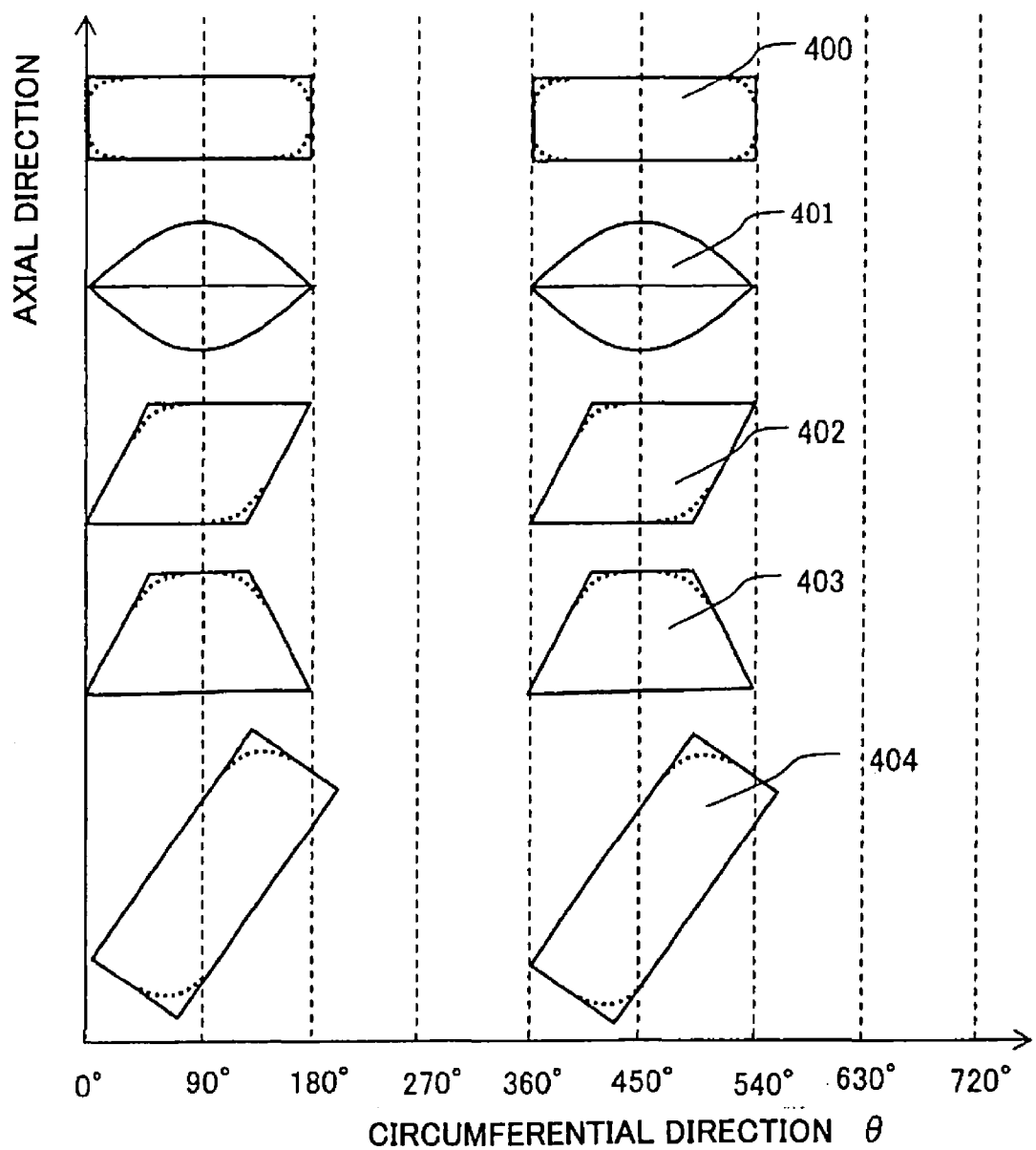
FIG. 89 illustrates examples of shapes of the magnetic poles of the present invention.

FIG. 89 shows examples of configurations of the stator and rotor poles. For the sake of providing the description using a simplified configuration, most of the examples of the motors of the present invention have been described, referring to circumferential linear developments in each of which each magnetic pole has a rectangular shape with a width of 180° in electrical angle, as indicated by numeral 400 in FIG. 89. However, the stator and rotor poles may have configurations in which each magnetic pole has a sinusoidal shape as indicated by numeral 401, a rhomboid shape as indicated by numeral 402, a trapezoidal shape as indicated by numeral 403, a skewed rectangular shape as indicated by numeral 404, or the like. In order to realize smoother rotation, the sinusoidal shape 401 may often be preferable. In particular, the rhomboid shape 402 and the trapezoidal shape 403, which are quite close to a sinusoidal waveform, may exert characteristics closer to those of the sinusoidal shape by having the corners rounded as indicated by broken lines. Also, in the motor examples, the circumferential width of a magnetic pole in its shape has mostly been exemplified with an electrical angle ranging from 120° to 180°. However, the width is not particularly limited to this. In order to increase the winding coefficient, however, 180° may be preferable.

Figure 90:
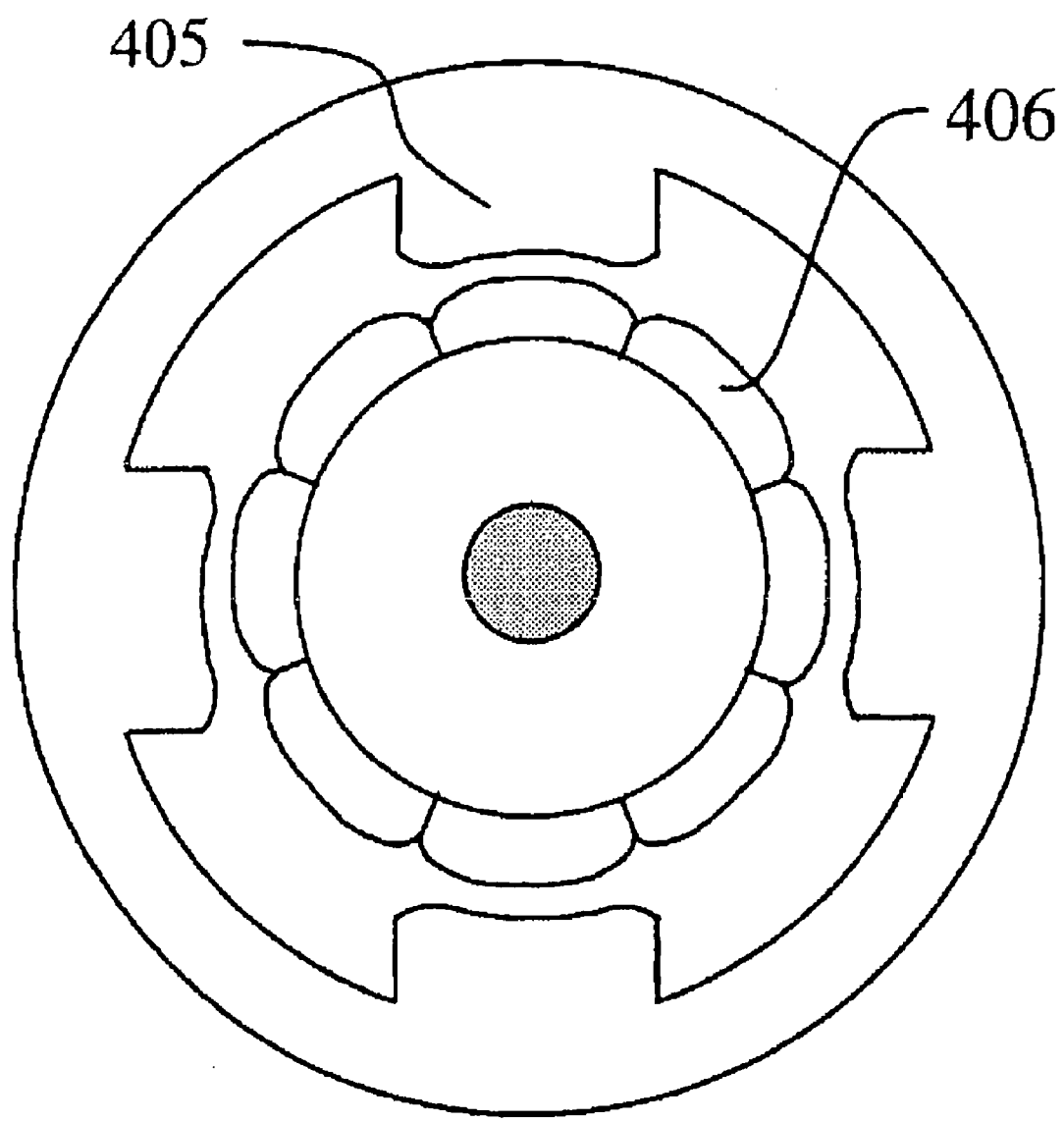
FIG. 90 illustrates a lateral configuration of stator poles and rotor poles.

FIG. 90 shows an example of a transverse cross section of a motor. Circumferentially rounded shapes of the stator and rotor poles as shown in the figure will reduce torque ripple. These rounded shapes will also mitigate the extremely large rate of change of magnetic fluxes in the radial direction, so as to be an appropriate level, thereby mitigating the rate of change of the attraction force in the radial direction and thus reducing vibration.

Figure 91:
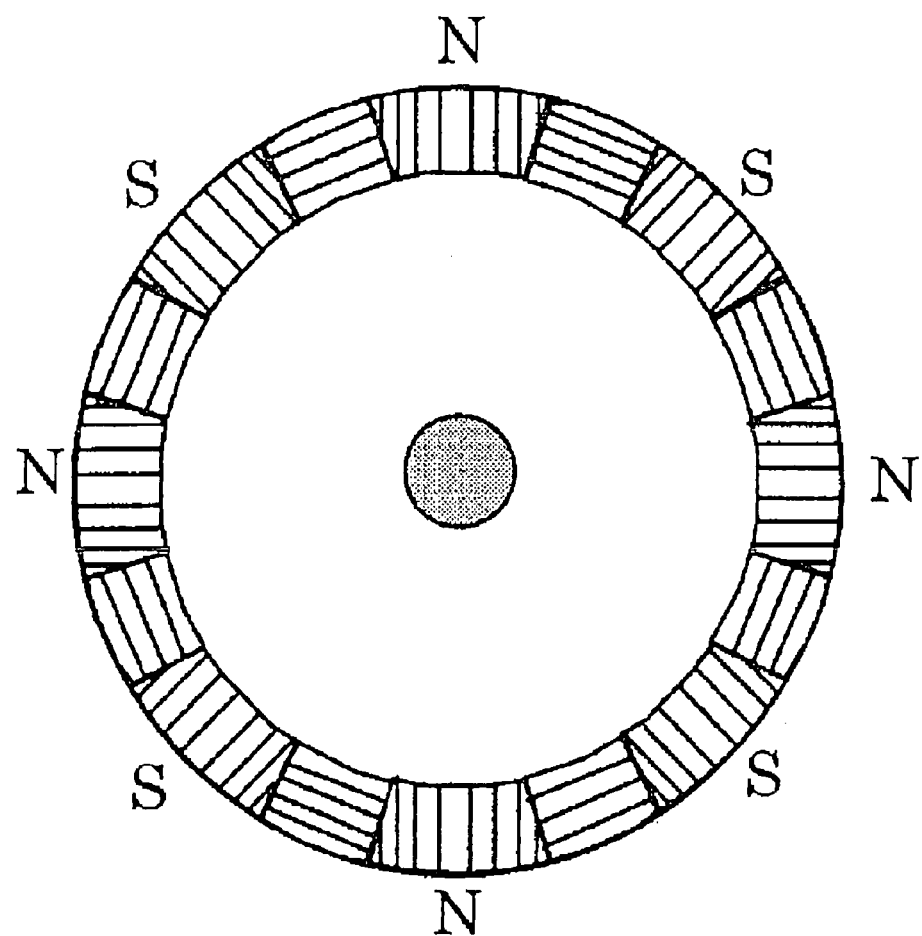
FIG. 91 illustrates an example of an arrangement/structure of permanent magnets for a rotor.

FIG. 91 shows an example of arranging permanent magnets into the so-called Halbach structure. This structure may allow a center portion of each magnetic pole to have high flux density, while allowing a boundary portion between the magnetic poles to direct magnetic fluxes along the circumference. Utilization of magnetic poles of a motor will enable enhancement of motor torque and reduction of torque ripple. As an example for obtaining characteristics analogous to the Halbach structure, a structure may be employed, in which anisotropy of the permanent magnets is allowed to be directed to the center of the magnets, that is, a structure of so-called polar anisotropy. Thus, an effect analogous to the Halback structure can be obtained. Various pole configurations, as well as the rotor structures as shown in FIGS. 14 to 19, 111 and 112 can also be applied to the present invention.

Figure 97:
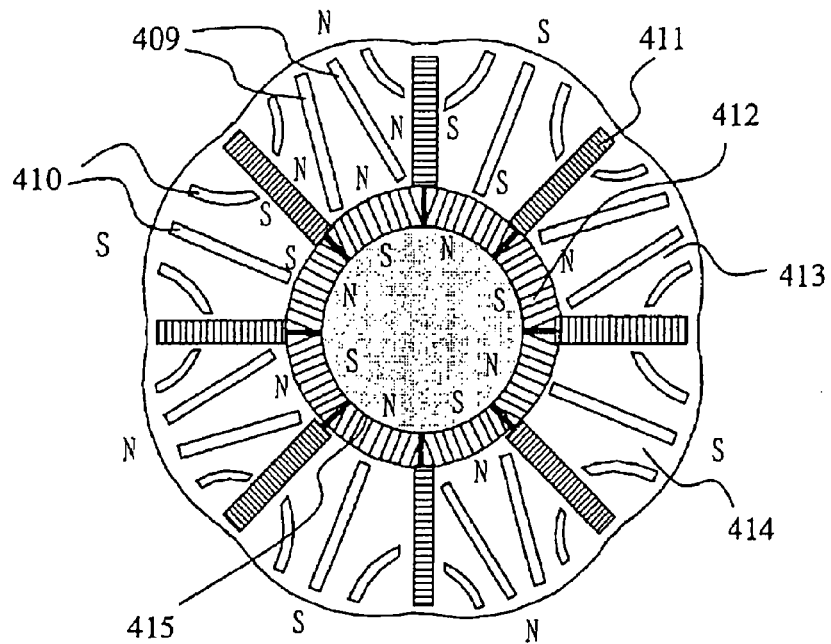
FIG. 97 is a transverse cross section illustrating a structure of a rotor.

FIG. 97 shows an example of a rotor which is devised to enhance magnetic density on the rotor surface and to bring the flux distribution close to sinusoidal distribution along the circumference as much as possible. Indicated by numerals 411 and 412 are permanent magnets of high flux density. Each magnet is oriented to a direction for obtaining the polarity of each rotor pole as indicated in the figure. Slits 409 and 410 are provided for enhancing circumferential rotational-position dependency of each magnetic flux in soft magnetic portions 413 and 414. An outer periphery of the rotor has a smoothly indented shape so that the length of an air gap between the stator and the rotor pole will be made small in the vicinity of the center of the rotor pole and that the air gap will be made large in the vicinity of a boundary between the rotor poles. Variation in the arrangement of the slits may readily contribute to adjusting flux distribution. Also, fine adjustment of the slit positions in each magnetic pole may reduce cogging torque, torque ripple or the like.

Figure 92:
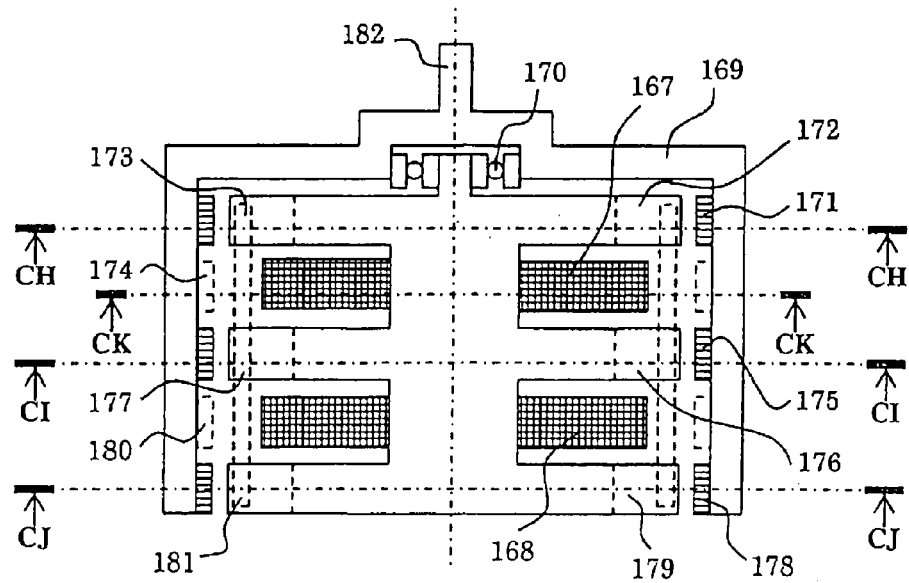
FIG. 92 is a schematic vertical cross section illustrating a three-phase outer-rotor motor having loop windings.
Figure 94:
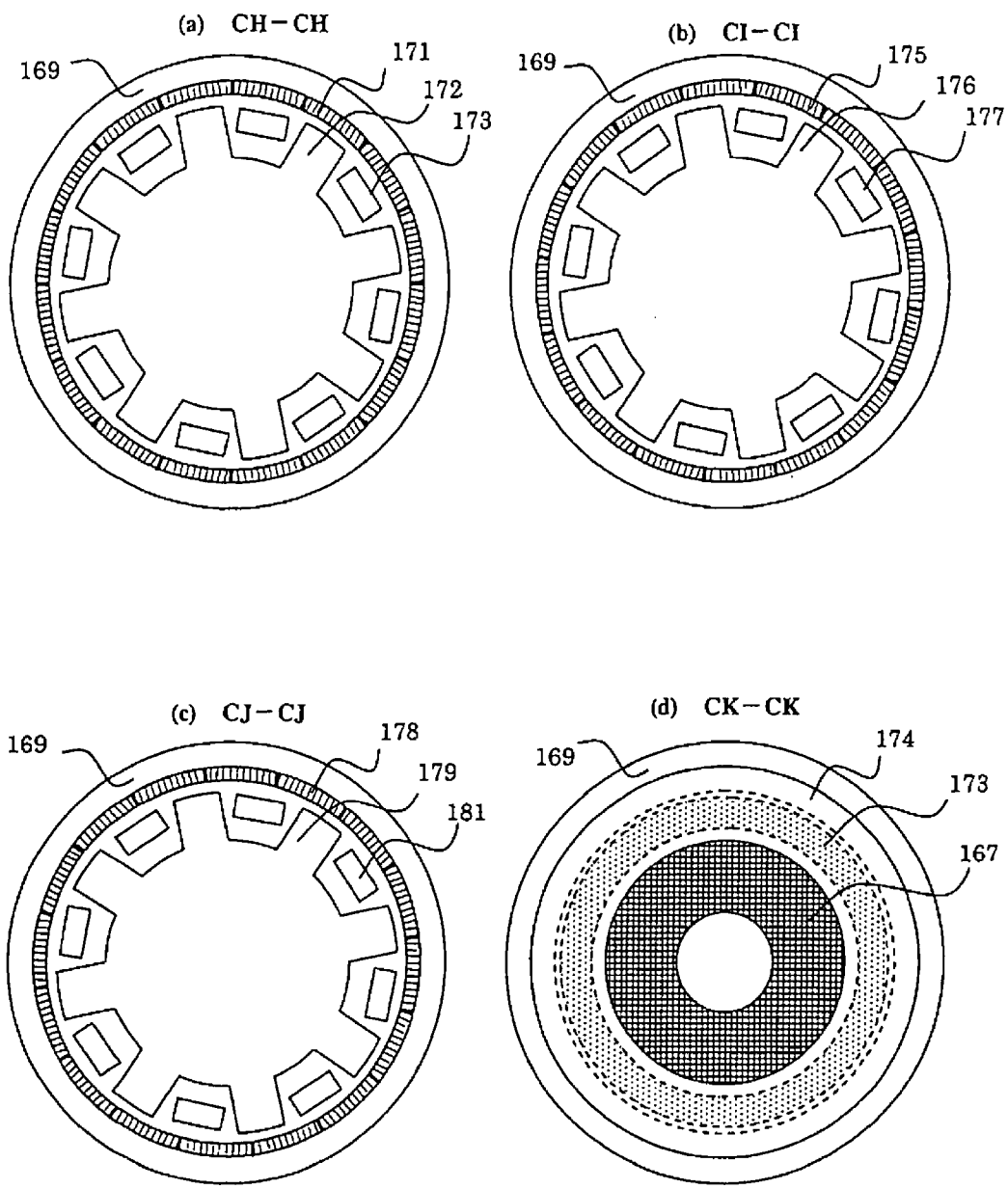
FIG. 94 illustrates cross-sectional configurations of the magnetic poles illustrated in FIG. 92.

FIG. 92 shows an example of a so-called outer-rotor motor in which the rotor is arranged at an outer-diameter side. FIG. 94 shows cross sections of some portions. Two windings 167 and 168 are provided. As in the case of the three-phase motor described above, this motor is a two-winding three-phase motor. In particular, indicated by numeral 173 is magnetic flux inducing means for directing magnetic fluxes that are unnecessary and harmful for the phases. By linking the three phases U, V and W, more simplification can be attained than in the magnetic paths 156 and 157, for example, shown in FIG. 29 to thereby realize reduction in the size of the motor. The same structure can be realized in a two-phase motor, although the structure has to be devised so that the magnetic path at the center portion can be axially and radially separated while crossing.

Figure 93:
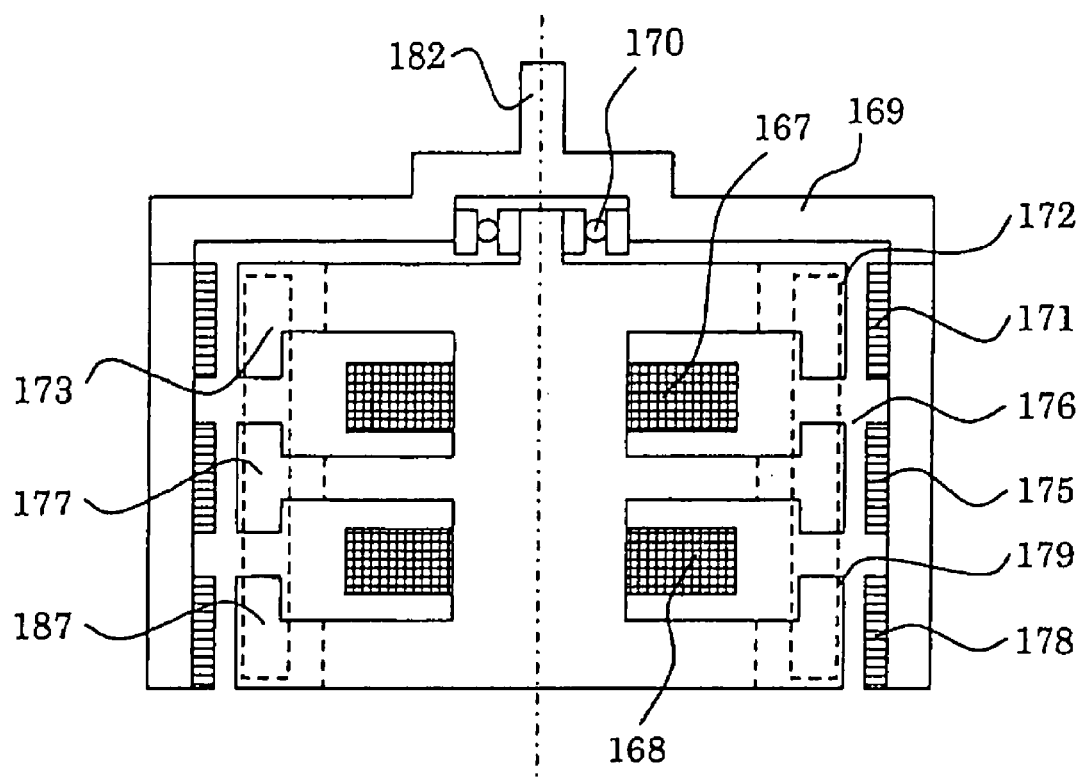
FIG. 93 is a schematic vertical cross section illustrating a three-phase outer-rotor motor having loop windings.

FIG. 93 shows an example of a motor obtained by increasing the axial width of each magnetic pole shown in FIG. 92 for the enhancement of torque.

Figure 95:
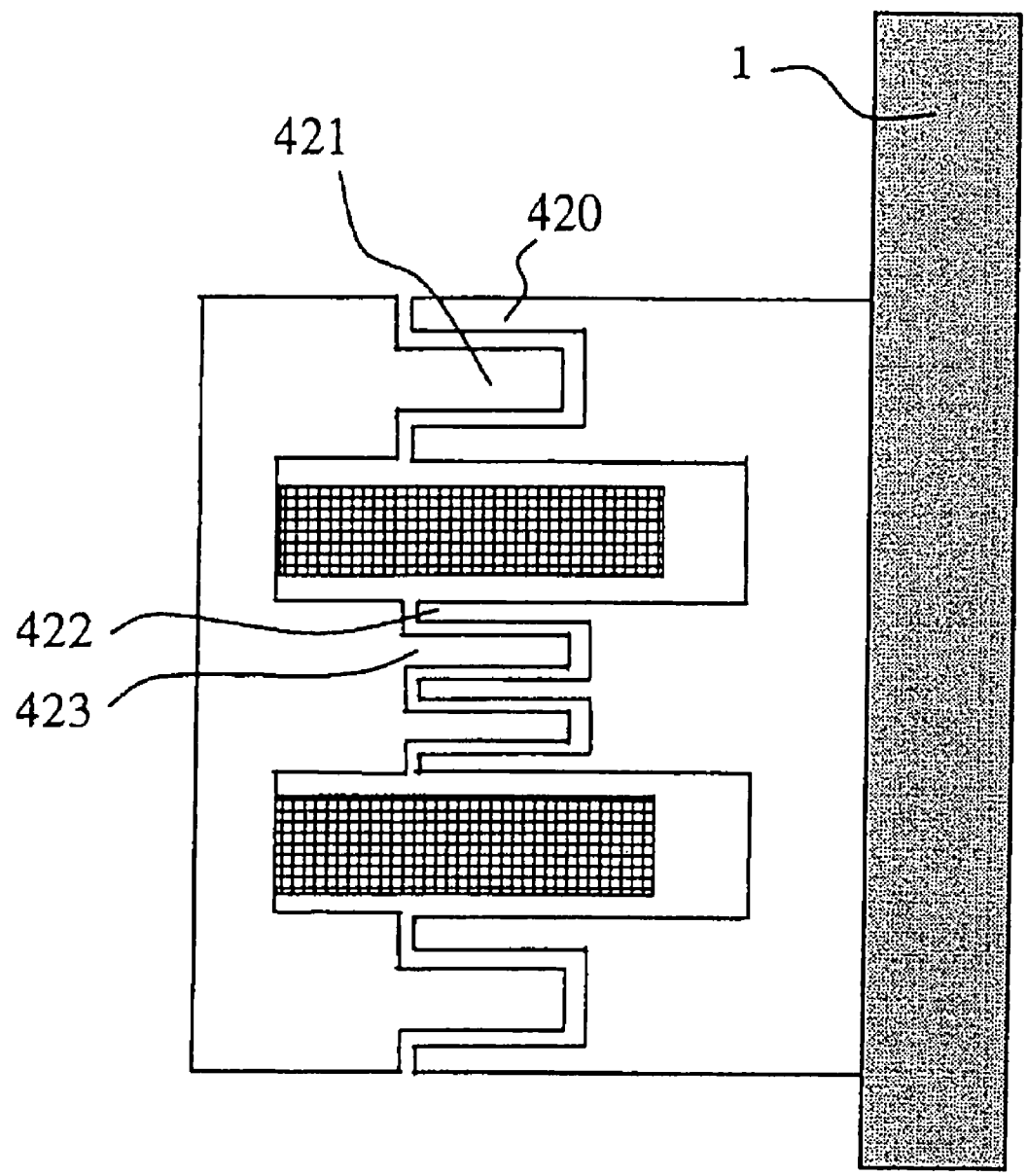
FIG. 95 illustrates shapes of stator poles and rotor poles.
Figure 96:
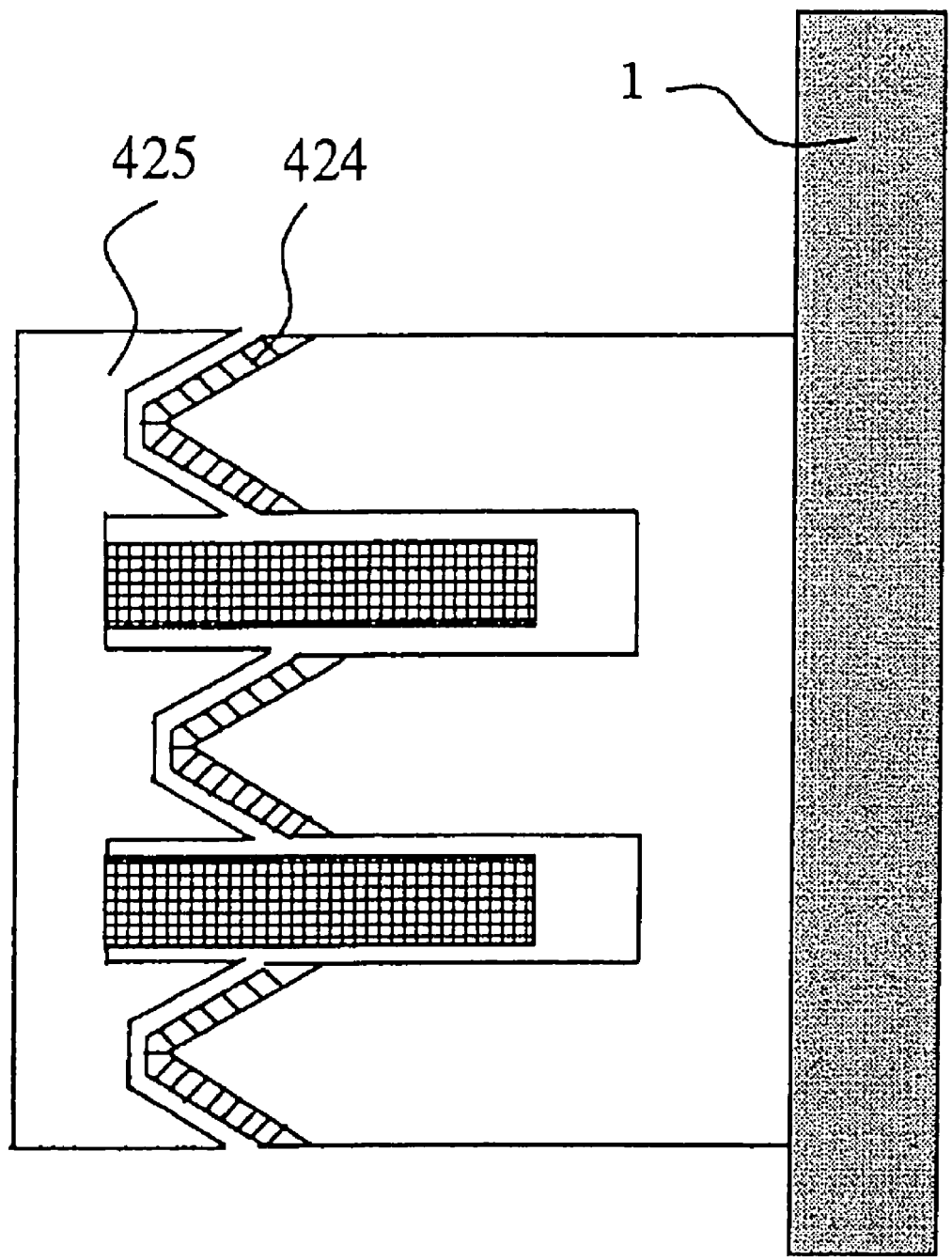
FIG. 96 illustrates shapes of stator poles and rotor poles.

Hereinafter will be described a method for attaining high torque and high output in the motor of the present invention. Generally, torque of a motor is in proportion to a rotation rate $d\phi/d\theta$ of a magnetic flux $\phi$ that interlinks with a winding. Indicated by $\theta$ is a rotation angle of the rotor. Specific examples of motor structures for increasing this $d\phi/d\theta$ are shown in FIGS. 95 and 96, which structures have been obtained by modifying the salient rotor poles 50, 54 and 58 and the salient stator poles 51, 55 and 59 of the motor shown in FIG. 28, for example. A requirement for increasing the flux $\phi$ that passes through each salient pole of the individual phases is to obtain a structure in which: facing area between the salient stator and rotor poles is large; and the magnetic circuits in other portions of the motor are not magnetically saturated.

In the motor shown in FIG. 95, in order to increase the facing area between each salient rotor pole 420 and each salient stator pole 421, the cross section of each salient stator pole in the rotor shaft direction has a projected shape as shown in FIG. 95, and the cross section of each salient rotor pole in the rotor shaft direction has a recessed shape as shown in FIG. 60. Comparing with the motor shown in FIG. 28, the structure of the motor shown in FIG. 95 allows the facing areas between the salient stator and rotor poles to be large. Accordingly, the rotation rate $d\phi/d\theta$ can be made large to thereby increase torque.

In the motor shown in FIG. 96, the cross sections of salient rotor and stator poles 424 and 425 in the rotor shaft direction have a trapezoidal shape close to a triangular shape as shown in FIG. 96. This structure can also exert the same effect as in FIG. 60 in a simple theory. Considering the magnetic saturation in and in the vicinities of the salient rotor poles, the shapes shown in FIG. 61 are better in that they are unlikely to cause magnetic saturation.

Figure 98:
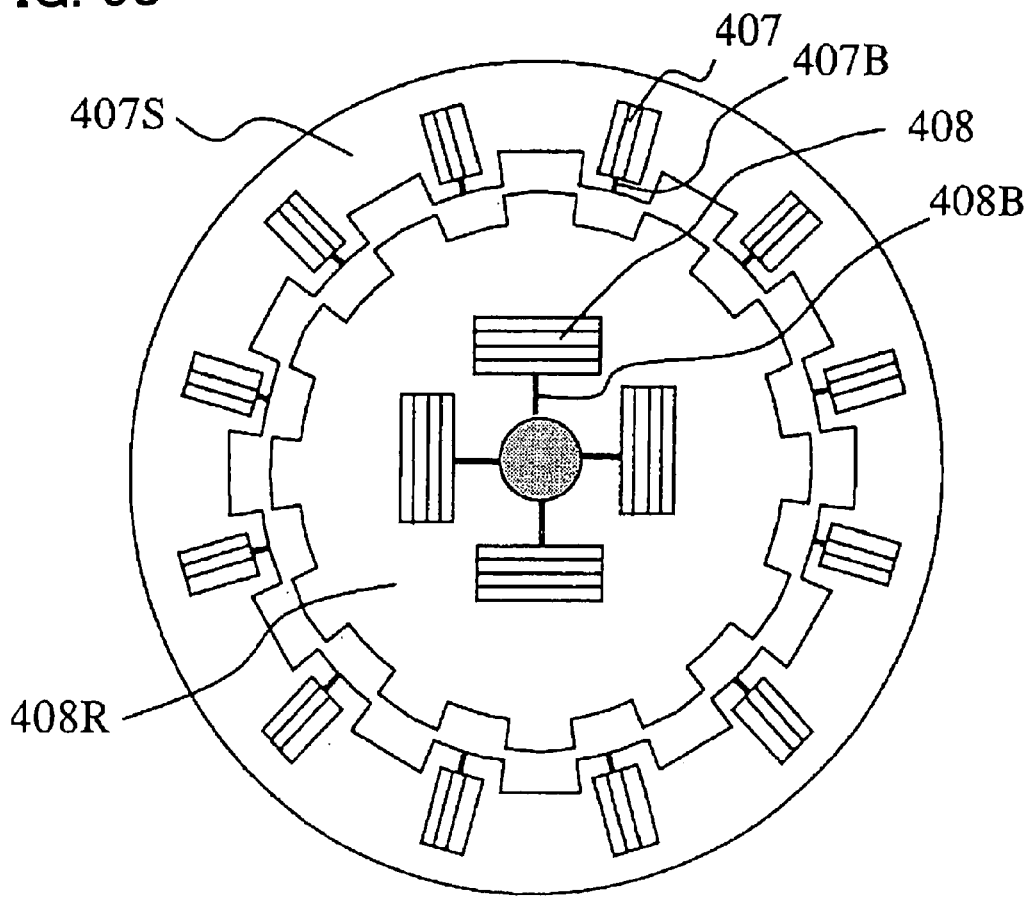
FIG. 98 illustrates a structure of a motor in which electromagnetic steel plates are combined.

Hereinafter will be described an example of a magnetic circuit configuration of the soft magnetic portions in the inventive motor. FIG. 98 shows an example of a transverse cross section of a motor shown in FIGS. 20 and 87, for example. One characteristic of these inventive motors is a structure in which magnetic fluxes move up and down in the rotor shaft direction in the stator and the rotor. The conventional motors have been configured utilizing planar and two-dimensional magnetic fluxes for flattened electromagnetic plates. As one aspect of the present invention, including the matters described above as well, the present invention can be regarded as suggesting a new motor structure excluding the constraint of the conventional motors. Thus, in the inventive motor, it is required to realize a magnetic circuit which will tolerate increase/decrease of magnetic fluxes in three-dimensional directions including the rotor shaft direction, and will cause small eddy currents and low iron loss.

Indicated by 407S in FIG. 98 is a core of the stator. The core has a structure in which disk-like electromagnetic plates are stacked along the rotor. Thus, the magnetic fluxes passing through this stator core 407S can be freely present without generating excessive eddy currents in the circumferential and radial directions and thus can be increase/decreased. Indicated by 408R is a rotor core similar to the stator core 407S. Magnetic fluxes of the rotor core 408R can be freely present without generating excessive eddy currents in the circumferential and radial directions and thus can be increase/decreased. However, when the magnetic fluxes are increased/decreased in the rotor shaft direction, both of them generate eddy currents in the electromagnetic steel plates, which is led to a problem of causing large iron loss.

Figure 99:
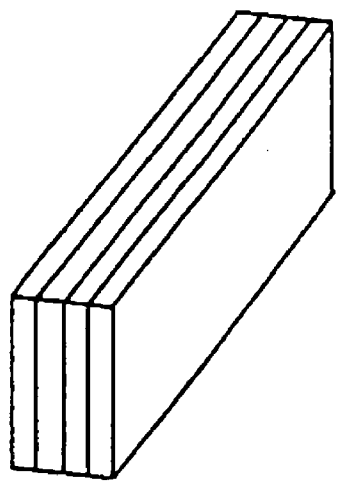
FIG. 99 illustrates a configuration of stacked electromagnetic steel plates.

Indicated by numerals 407 and 408 are members in which the electromagnetic steel plates as shown in FIG. 99 are stacked. The arrangement of such members at portions of the motor shown in FIG. 98 in the rotor shaft direction, may realize increase/decrease of the magnetic fluxes in the rotor shaft direction without generating excessive iron loss. In this case, however, cut surfaces 407B and 408B are required to be provided in order to have the eddy currents hardly generated in the electromagnetic steel plates 407S and 408R being caused by the increase/decrease of the magnetic fluxes in the rotor shaft direction. These cut surfaces may be formed at various positions in the cores 407S and 408R so as not to coincide with each other when stacked in the rotor shaft direction. Thus, magnetic fluxes can smoothly pass through the inside of the electromagnetic steel plates 407S and 408R, and at the same time, the motor strength can be readily enhanced.

Figure 100:
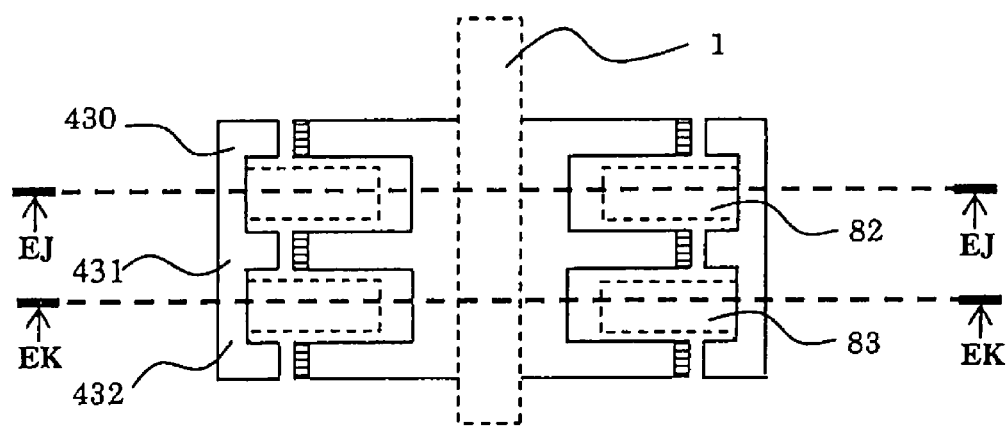
FIG. 100 is a vertical cross section illustrating a motor whose soft magnetic portions are made up of dust cores.

FIG. 100 shows a configuration example in which the soft magnetic portions of the motor shown in FIG. 28 are made up of dust cores. Assemblage of the stator and rotor cores will be facilitated by fabricating these cores by parting them at the portions indicated by broken lines EJ-EJ and EK-EK. A core 430, winding 82, core 431, winding 83 and core 432 may be stacked and assembled in this order. The same applies to the rotor core. By providing a structure where steps for assemblage are formed at mating surfaces of the cores, for example, the motor strength may be ensured. Formation of the soft magnetic portions of the motor core with dust cores, may enable three-dimensional increase/decrease of magnetic fluxes, which is preferable for the configuration of the inventive motor. Dust cores have a good material yield because they can be fabricated by molding with the use of a metal mold. In particular, the characteristics can be readily exhibited in small motors.

Figure 101:
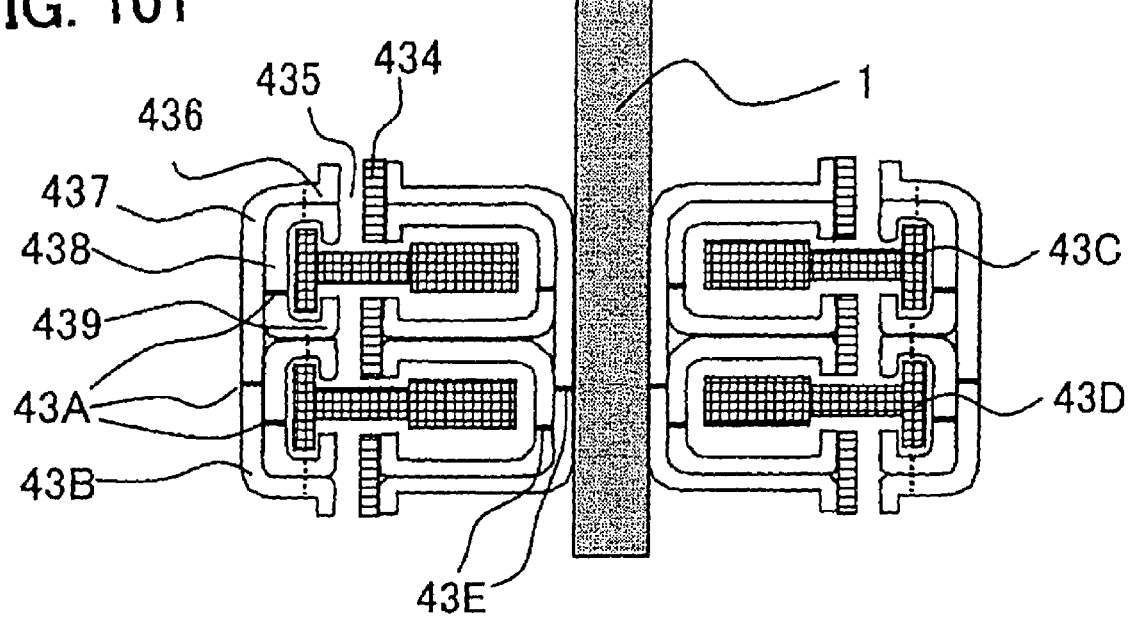
FIG. 101 is a vertical cross section illustrating a motor, in which soft magnetic portions are made up of molded electromagnetic steel plates.

FIG. 101 shows an example of fabricating the inventive motor by using parts that are obtained by drawing electromagnetic plates with the use of a metal mold. The description hereinafter will be given on the fabrication. The basic electromagnetic configuration is the same as that of the motor shown in FIG. 28. Indicated by numeral 434 are A-phase rotor poles, by 436 are A-phase salient stator poles and by 435 are in-between air-gap portions. Indicated by 439 are B-phase stator poles and by 43B are C-phase stator poles. The circumferential side configurations of them are as shown in FIG. 30, which are indicated by broken lines at the stator poles in FIG. 101. Indicated by 43C and 43D are windings.

The motor exemplified in FIG. 101 is made up of electromagnetic steel plates which are molded into the salient stator poles, stator back yoke, rotor poles and rotor back yoke, and a rotor shaft 1. To facilitate molding and assemblage, the electromagnetic steel plates have been divided at joints 43A, 43E and the like before being butted. A magnetic path in each of the parts is structured by two electromagnetic steel plates. Each butting portion is adapted not to coincide with a butting portion of the adjacent electromagnetic steel plate to attain a structure in which magnetic fluxes can sneak around from the adjacent electromagnetic steel plate in response to the resistance variation caused by the air gap at the butting portion. Thus, increase of magnetic resistance, and variation of magnetic resistance caused by the variation of butting accuracy, can be reduced.

The butting portions can be removed from the rotor by using a method where bobbins are mounted after the rotor-side electromagnetic steel plates are assembled to the rotor shaft 1, followed by imparting each of the bobbins with turns of winding from its outer periphery. Other methods may be devised in the order of assembling the winding coils and in the molding of the electromagnetic steel plates to remove the butting portions.

The motor shown in FIG. 101 can be fabricated by cutting and drawing the electromagnetic steel plates by using a metal mold, whereby the productivity can be enhanced and the cost can be reduced. Particularly high productivity can be attained for small motors having magnetic paths each of which has a width that can be constituted with a single electromagnetic steel plate. The qualities of the electromagnetic steel plates used for the motors are required to be not only excellent in the electromagnetic properties but also excellent in the molding properties.

Figure 102:
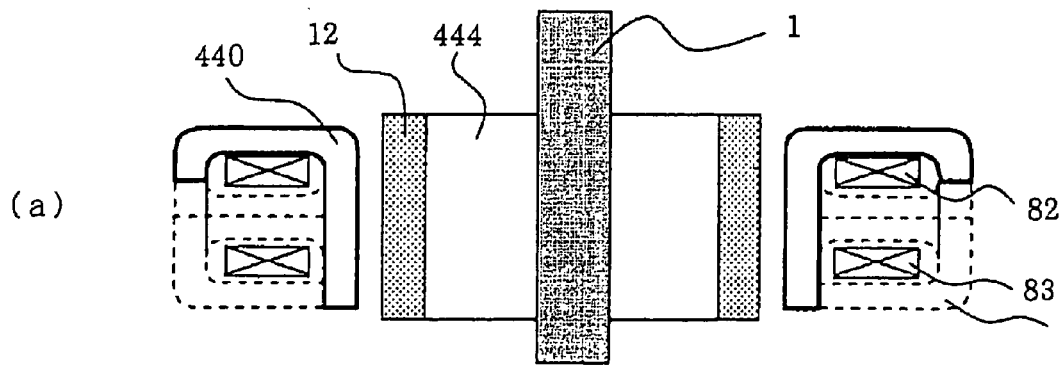
FIG. 102 illustrates vertical cross sections of motors, in each of which soft magnetic portions are made up of molded electromagnetic steel plates.
Figure 102:
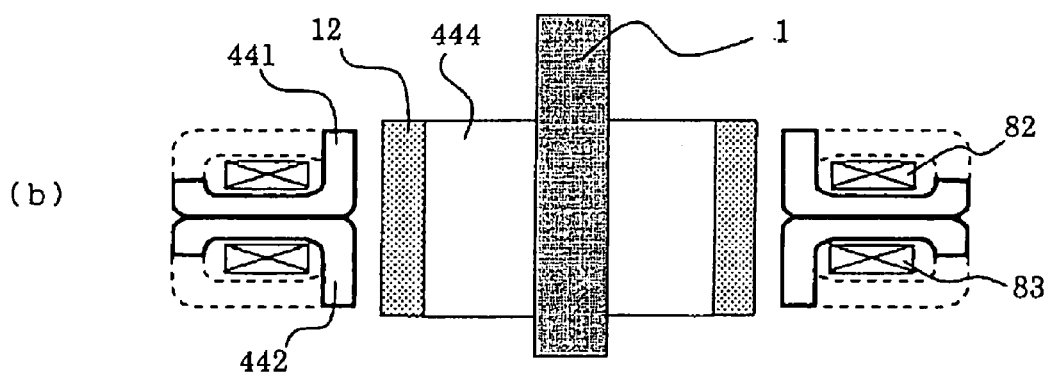
Figure 102:
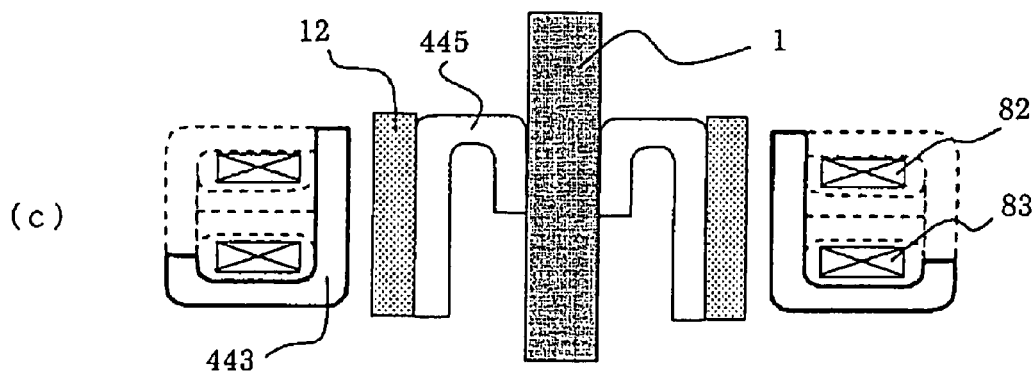

FIG. 102 shows by (a), (b) and (c) examples of motors which employ configurations 440, 441, 442, 443 and 445 in which electromagnetic steel plates are bent. Indicated by numeral 12 are permanent magnets and by 82 and 83 are windings.

The motor configurations shown in FIGS. 101 and 102 are only examples. Each of the parts fabricated with the electromagnetic steel plates may have a shape and a structure that are considered in the feasibility of the drawing process and the convenience of assemblage of the rotor shaft 1 and the winding 553 as well as other components, such as the bearings and the motor case. Each of the parts may be configured to have three or more electromagnetic steel plates.

Figure 103:
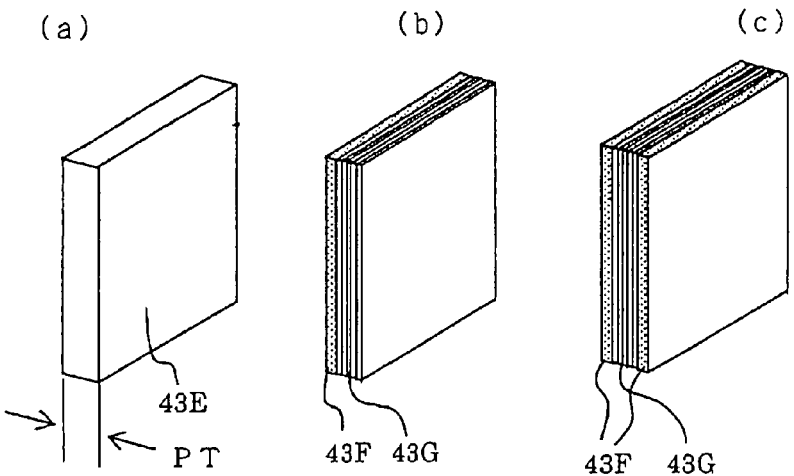
FIG. 103 illustrates examples of structures, in which electromagnetic plates and amorphous metal are stacked.

Hereinafter will be described a soft magnetic material constituting the inventive motor, with reference to the drawings. FIG. 103 shows by (a) an amorphous stack. Amorphous, or amorphous metal, has small iron loss and thus is excellent in high-frequency properties. However, considering the properties, i.e. of being a soft magnetic material of a thin film with a thickness of about 25 micrometers, better fabrication efficiency of motors may be attained by stacking the amorphous films by using an adhesive or the like to obtain a stack 561 having a thickness of a certain level, and then performing processing and assembling. A normal electromagnetic steel plate 562 may be pasted on one side or both sides of the amorphous stack 561 to obtain a figure as shown by (b) or (c) of FIG. 103, followed by processing and assembling. By pasting the electromagnetic steel plate(s) 562 on the amorphous stack 561, the composite material can be obtained, or amorphous can be stacked onto a base of the electromagnetic steel plate 562 having a strength of a certain level. This composite material exerts good punching quality in a punching process performed by using a metal pattern. For example, a motor completed using this composite material will have composite characteristics, i.e. a characteristic of high flux density inherited from the electromagnetic steel plate 43F and a characteristic of low iron loss inherited from the amorphous stack 43G.

Specific measures for realizing three-dimensional magnetic paths may include use of a dust core as a soft magnetic material member of the inventive motor. Dust cores have no limitation in the flux directions.

Figure 104:
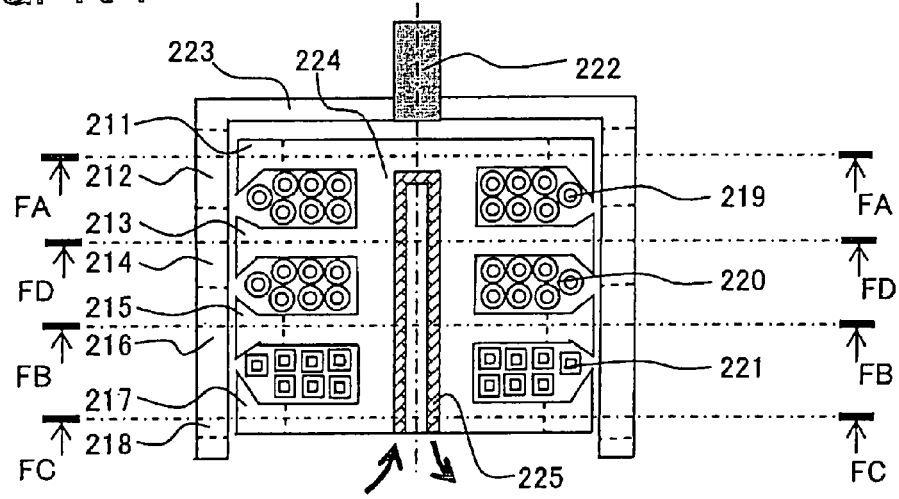
FIG. 104 illustrates windings structured with metal pipes, and a cooling structure.
Figure 105:
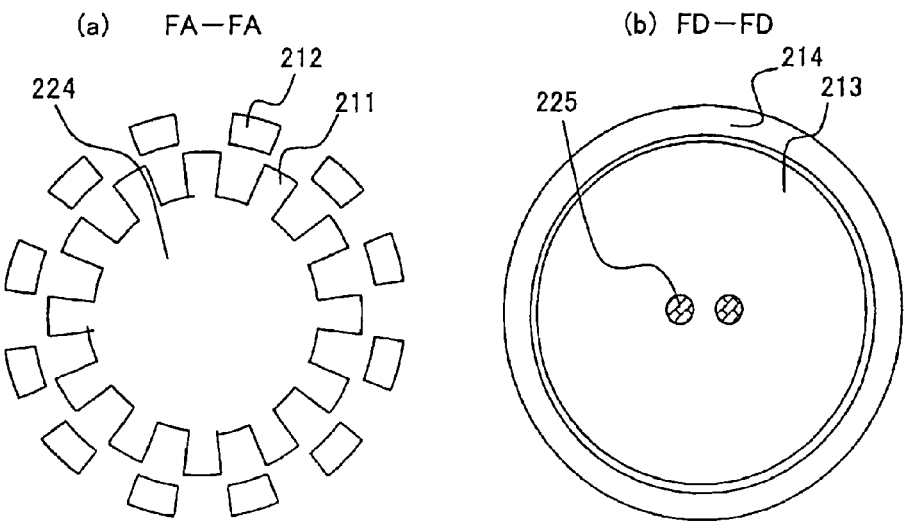
FIG. 105 illustrates cross-sectional configurations of the magnetic poles illustrated in FIG. 104.

FIG. 104 shows a motor having a configuration for forcedly cooling windings 219, 220 and 221. FIG. 104 shows an example in which the windings 219, 220 and 221 are made up of metal pipes having circular or square cross sections. Cooling gases or liquid, or mixtures, such as mist, may be passed through a center hole of each of these metal pipes to cool the motor. Cross sections of some portions are shown in FIG. 105.

Suitable materials for the metal pipes include copper and aluminum. Copper has high electrical conductivity but has large specific gravity. Therefore, when weight is highly required to be reduced, aluminum or aluminum alloy may be used. Since the electrical conductivity of aluminum is not so high as copper, the problem of heat generation may be covered by the metal pipes and the cooling medium. The winding 221 of FIG. 104 shows an example of a square metal pipe. Comparing with a circular metal pipe, the square metal pipe can more effectively utilize the spaces between the turns of the winding located in a slot.

In case of a conventional motors as shown in FIGS. 128 and 129, use of a copper pipe as a winding has not been practical because of the use of small-diameter windings. For multipolarization of such conventional motors, as can be imagined from their cross sections, each space of a slot for arranging a winding may necessarily become further smaller. However, the motor of the present invention can structurally facilitate multipolarization of the motor. In addition, the multipolarization does not entail reduction of the slot form for arranging each loop winding. The slot form remains unchanged. The voltage of a winding is in proportion to an angle rate $d\Psi/d\theta$ of the number of interlinked fluxes $\Psi$. Accordingly, multipolarization will allow the angle rate $d\Psi/d\theta$ of the number of interlinked fluxes $\Psi$ to become large in proportion to the number of poles, necessitating reduction in the number of turns of each phase winding. As a result, multipolarization of the inventive motor can reduce the number of turns of each winding. Thus, the winding to be provided at each slot in FIG. 104 may have a large diameter comparing with the conventional motor. Further, the inventive motor can use simple loop windings. Consequently, the motor of the present invention can practically install a winding of a metal pipe that can also serve as a cooling mechanism. It should be appreciated that the method of performing both current supply and cooling with a metal pipe, can be applied to various motors of the present invention.

The cooling method utilizing a conductor of a metal pipe may involve a problem of electrical insulation. Therefore, a configuration using a cooling medium of high electrical insulating properties may be preferable. Use of high-pressure air as a cooling medium requires a filter for avoiding entry of foreign matters. Use of cooling water requires a scheme for keeping the electrical conductivity of the water at a low level. Use of cooling oil is comparatively easy because oil has low electrical conductivity. An end of each winding is connected with a power supply line. In addition to that, an end of each winding requires treatment that enables charge and discharge of a cooling medium while keeping the electrical insulation at a certain level.

Figure 106:
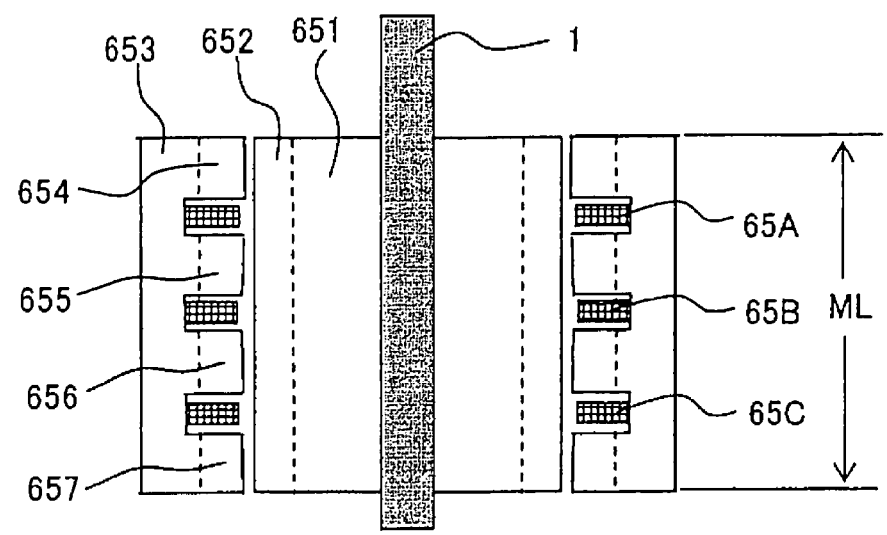
FIG. 106 is a schematic vertical cross section illustrating a four-phase motor having loop windings.

Hereinafter, an explanation will be given on an example of a motor of the invention, and on a length MLP of each stator pole in the rotor shaft direction, in each of the phases of the motor. FIG. 106 shows a four-phase motor having an arrangement order of the stator poles different from that of the motor shown in FIG. 20. Indicated by numeral 654 are A-phase stator poles and by 655 are C-phase stator poles having a phase difference of 180° in electrical angle from the phase A. In this arrangement of the stator poles, the relationship between the stator poles and spaces are mutually reversed, making it easy to change the stator pole and winding configurations. Similarly, indicated by numeral 656 are B-phase stator poles and by 657 are D-phase stator poles having a phase difference of 180° in electrical angle from the phase B. Indicated by 65A, 65B and 65C are windings arranged between the stator poles. Indicated by numeral 651 is a back yoke of the rotor, and by 651 are rotor poles.

Figure 107:
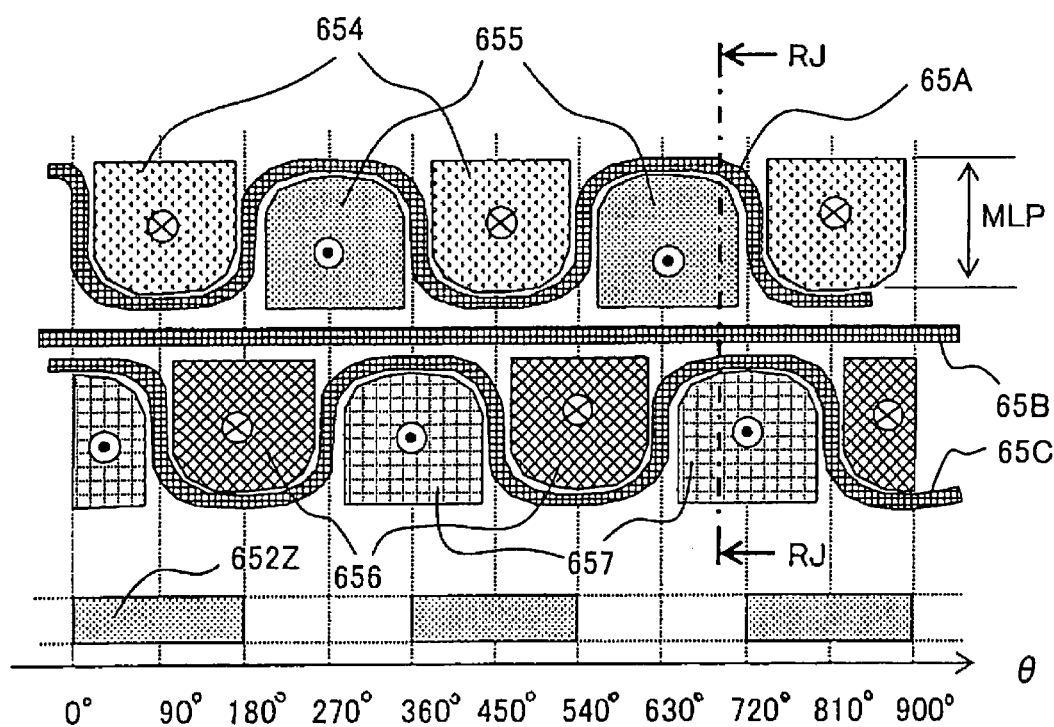
FIG. 107 is a linear development of an inner peripheral configuration of a stator of a four-phase motor having loop windings.

FIG. 107 shows a motor in which the stator poles of the motor shown in 106 are developed in the rotor shaft direction. Specifically, FIG. 107 is a linear development of a circumferential configuration of individual portions in an air-gap plain where the stator and the rotor face with each other. The horizontal axis indicates a rotational angle θ in electrical angle, and the vertical axis indicates the rotor shaft direction. As described above, each of the stator poles of each phase has a larger configuration in rotor shaft direction than the configuration shown in FIG. 65, being mutually protruded toward adjacent stator poles. When a length of the stator shown in FIGS. 106 and 107 in the rotor shaft direction is ML, a length of each stator pole in the rotor shaft direction is MLP, and the number of phases N is "4", a relation MLP>ML/N=MLP/4 is established. While the cross section shown in FIG. 106 has this relation MLP>ML/N=MLP/4 because of the necessity of spaces for the windings, the mutual protrusion toward the adjacent stator poles in FIG. 107 can allow the length MLP to be large. Positive and negative marks indicated at the salient stator poles in FIG. 107 indicate the directions for passing the magnetic fluxes.

Thus, the reason for making large the length MLP of each salient stator pole in the rotor shaft direction is that a rotation rate $d\phi/d\theta$ of the magnetic flux $\phi$ interlinking with each salient stator pole and winding is required to be increased to increase torque generation of the motor. The stator pole configurations of the inventive motors provided so far may be modified in the similar fashion.

Indicated by 651 is a rotor and by 652 are rotor poles each of which is extended throughout the rotor shaft direction. In the motor shown in FIG. 107, the rotor poles have the same phase along the circumference. Further, one set of the rotor poles is shared between the opposed two sets of salient stator poles. Indicated by 652Z in FIG. 66 are ranges of N-poles of the salient rotor poles 652.

FIG. 107 shows that the winding 65B has a simple loop shape. Each of the windings 65A and 65C also has a loop shape but is wavy in the rotor shaft direction because adjacent stator poles are mutually protruded in the rotor shaft direction. Although the length of the windings 65A and 65C becomes large, the rotation rate $d\phi/d\theta$ of the interlinked magnetic flux $\phi$ can be raised.

Currents to be supplied to the windings 65A, 65B and 65C of the motor shown in FIGS. 106 and 107 correspond to the current vectors indicated by vectors C, (−C−D)/2 and D, respectively, at (c) of FIG. 23. The current passed through the winding 65B is slightly small and has amplitude which is 0.707 of other currents.

The arrangement/configuration of the stator shown in FIG. 107 can allow the windings to be arranged between the stator poles in such a way as to reduce flux leakage between the stator poles. Further, most of the rotor surface is covered with the stator poles for effective utilization. Furthermore, each magnetic path is structured so that the cross-sectional area can be appropriately enlarged. Thus, torque can be effectively generated.

Figure 108:
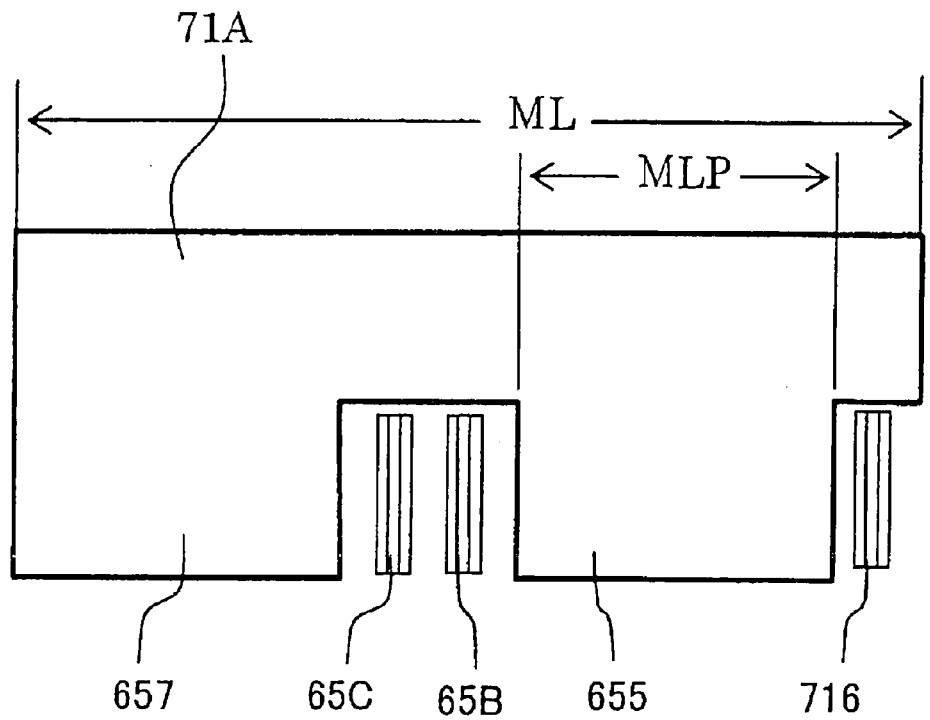
FIG. 108 is a vertical cross section of the stator illustrated in FIG. 107.

With reference to FIGS. 108 and 109, hereinafter will be described a method for reducing flux leakage between the stator poles by the shapes and arrangement of the windings. FIG. 108 shows a cross section taken along a line RJ-RJ of FIG. 107, in which identical portions are indicated by the identical references. Indicated by 71A is a back yoke of the stator. Indicated by numeral 655 is a cross section of the B-phase salient stator pole and by 657 is a cross section of the D-phase salient stator pole. Indicated by 716, 65B and 65C are cross sections of the windings. As shown by (a) of FIG. 109, the configuration of each of these windings is an example of turning a flattened conductor three times.

These windings of the individual phases are arranged so as to block the stator poles of the individual phases. The magnetomotive force of each winding is configured to work in the vicinity of an end portion of each of the stator poles of the phase, so that the magnetomotive force can exert effects from the stator pole to the side of the rotor. As a result, flux leakage from between stator poles of different phases can be significantly reduced. Also, for example, a flattened winding 718 shown by (a) of FIG. 109 may permit eddy currents as shown by arrows 65F to be induced when flux leakage as shown by an arrow 65E is increased. The eddy currents have an effect of preventing the fluxes 65E from increasing to thereby reduce the flux leakage 65E from between the stator poles of different phases.

The winding configuration of the inventive motor is not limited to the one shown by (a) of FIG. 109, for example, but may be radially divided as shown by (b) of FIG. 109. Practically, a flattened winding with a width of a degree that would not generate excessive eddy currents 65F may be preferable. The currents passing through parts of the winding 718 resultantly form a combined current of the eddy current shown by the arrow 71C and the phase current supplied to the winding 718. The configuration of the phase windings is not limited to the one as shown in FIG. 73. Each winding may only have to be arranged up to the vicinity of an opening portion of the stator poles so as to exert an effect of reducing flux leakage between the stator poles of different phases.

FIG. 110 shows an example of a structure in which circumferential interval of the magnetic poles of the individual phases is rendered to be 240° in electrical angle, with three stator poles being arranged within a range of 720° in electrical angle. This structure is based on the motor shown in FIG. 1, or the motor having a stator pole configuration as shown in FIGS. 10 to 13, each showing a linear development of a configuration at an air-gap plane between the U-, V- and W-phase stator poles and the rotor. Substantial technical issues in such motors include: reduction of flux leakage between stator poles; reduction of magnetic saturation in each magnetic path; and increase of torque by increasing the axial width of each stator pole and increasing the winding coefficient. As one approach for resolving these issues, the arrangement/configuration of the stator poles shown in FIG. 110 is effective.

FIG. 111 shows an example where nine stator poles are arranged within a range of eight rotor poles. This example exerts the same effect as the example of FIG. 110. In this example, one stator pole has a large electrical angular width. Also, a plurality of stator poles of the same phase are arranged in different phases in terms of electrical angle, leading to exerting effect of reducing torque ripple. In this way, for the number of poles P of the rotor, the number of the stator poles is rendered to be (P×N/2) or less, where N is the number of phases. Thus, torque can be enhanced and torque ripple can be reduced.

Figure 112:
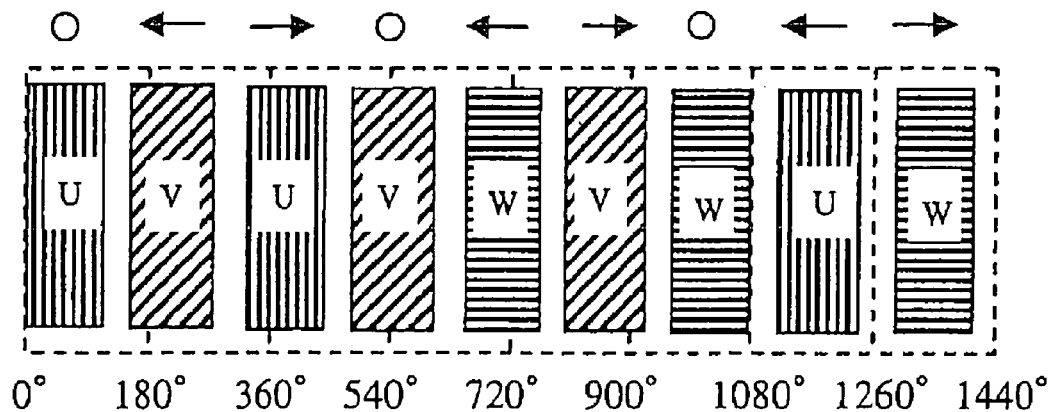
FIG. 112 illustrates a concept of shifting positions in the rotational direction of the individual stator poles of the motor illustrated in FIG. 111, in a direction for increasing torque.

FIG. 112 shows the arrangement of the stator poles shown in FIG. 111 with further improvement. By shifting stator poles in the direction shown by arrows, the circumferential positions of the stator poles are allowed to be close to the center of the relevant phase to thereby increase torque. The circumferential positions of the individual stator poles may be shifted for the purpose of reducing torque ripple.

Figure 113:
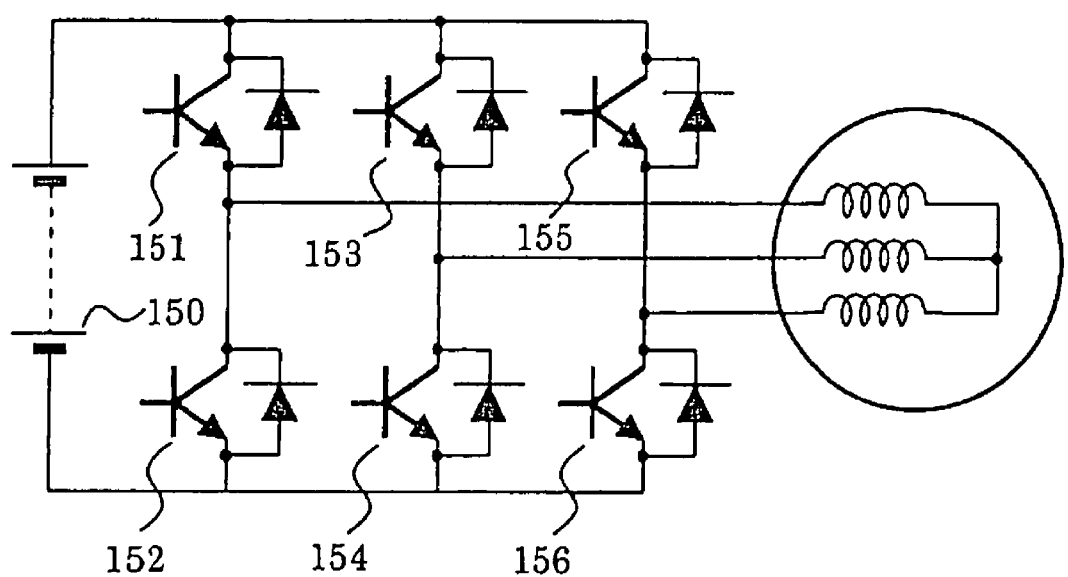
FIG. 113 illustrates a relationship between a three-phase AC inverter and a three-phase motor.

FIG. 113 shows a very typical three-phase inverter for a three-phase motor and three windings of the three-phase motor.

Figure 114:
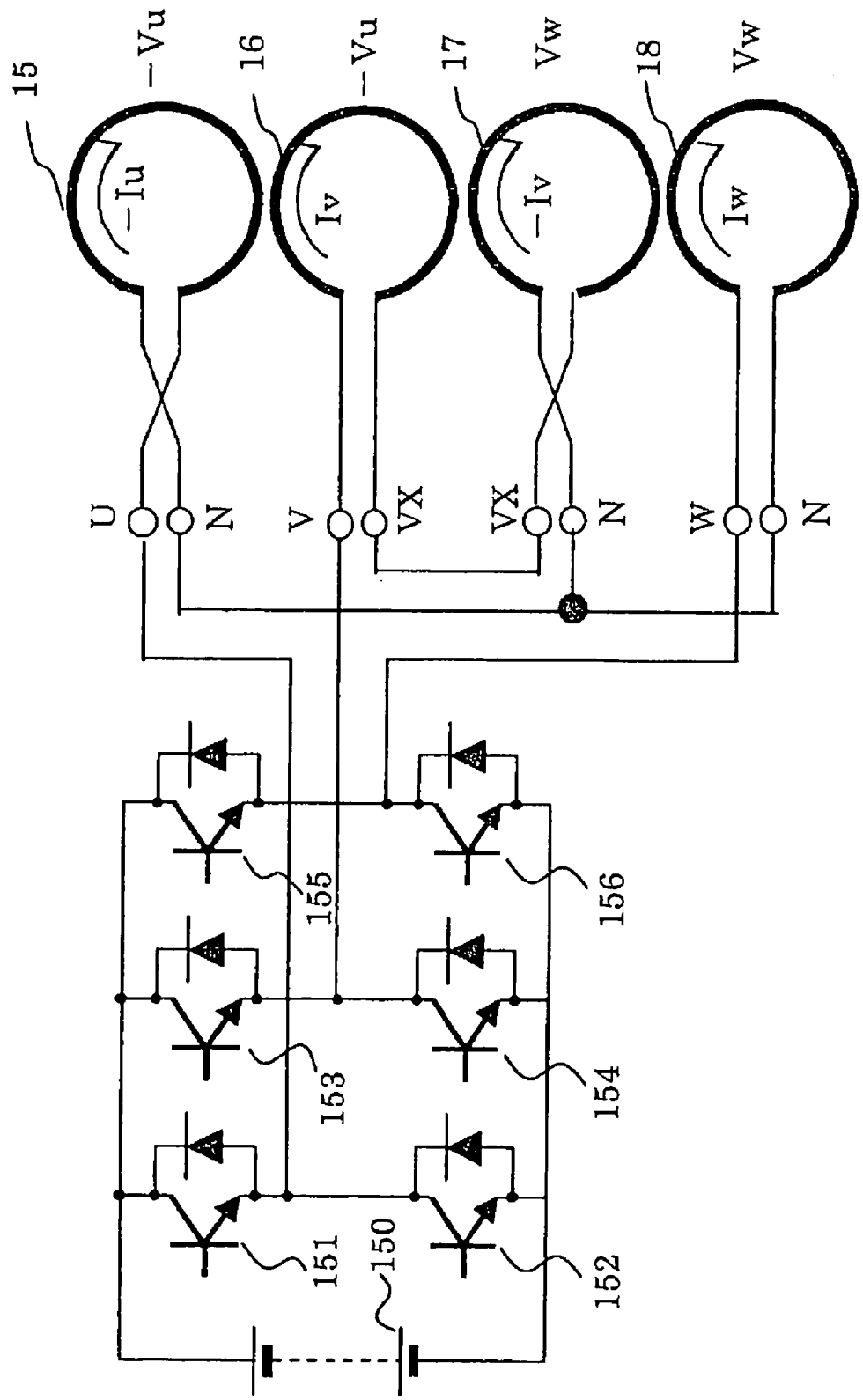
FIG. 114 illustrates a connecting relationship for driving a three-phase motor having four windings, such as the motors illustrated in FIGS. 1 and 27, by using a three-phase inverter.

FIG. 114 shows a way of connecting a three-phase inverter for driving the motor shown in FIGS. 1 and 6 and four windings of the three-phase motor, and connection between the motor and the three-phase inverter. The connection of the motor shown in FIG. 29, for example, may also be performed in the same way.

Figure 115:
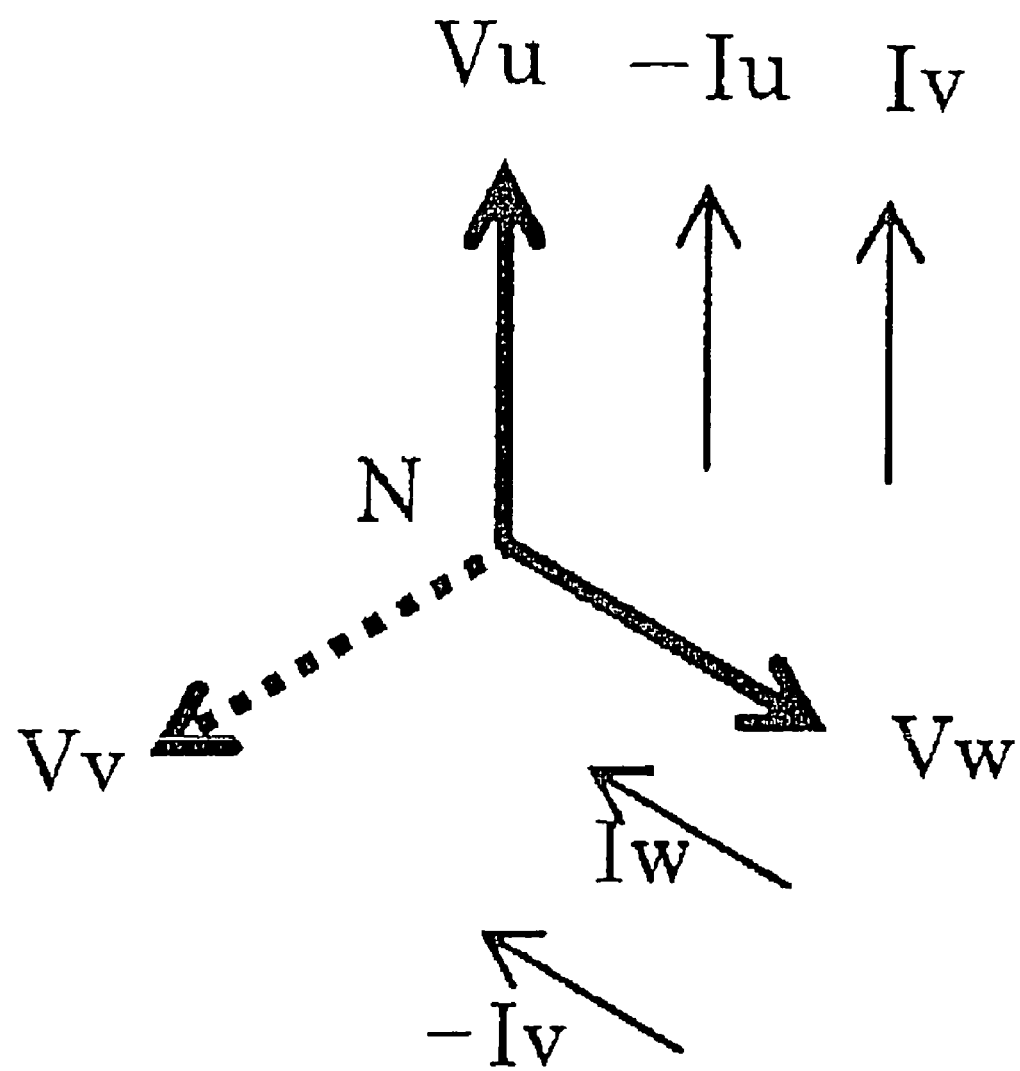
FIG. 115 illustrates voltages and currents of the four windings illustrated, for example, in FIGS. 1 and 27.
Figure 116:
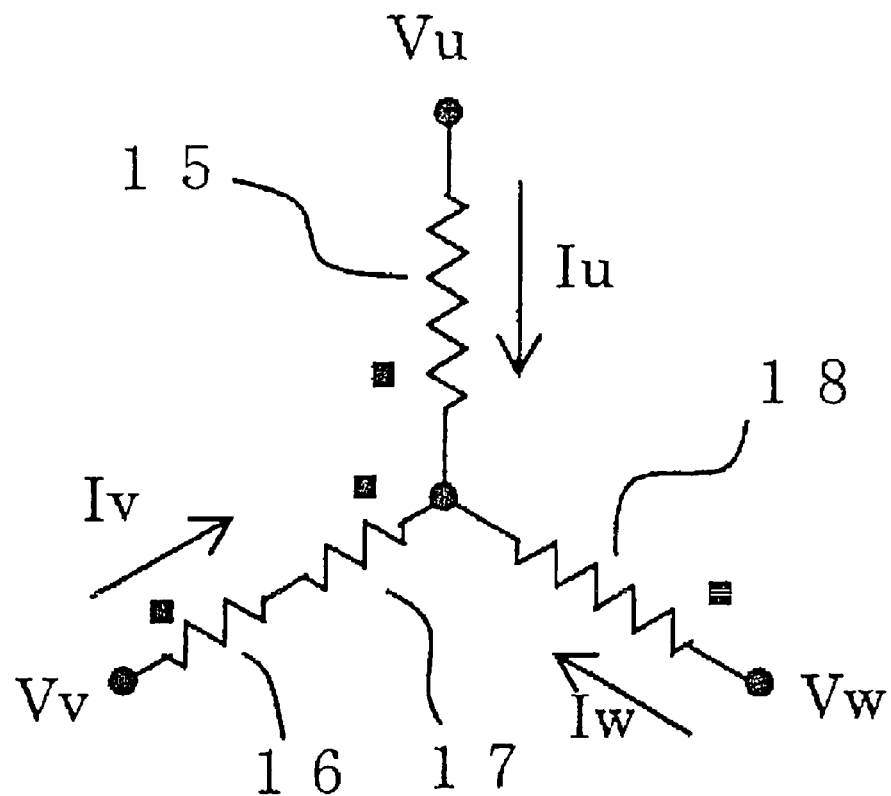
FIG. 116 illustrates a connecting relationship and currents of the four windings illustrated, for example, in FIGS. 1 and 27.

FIG. 115 shows a relationship between voltages and currents in this case, and FIG. 116 shows a connecting relation between the windings.

Figure 117:
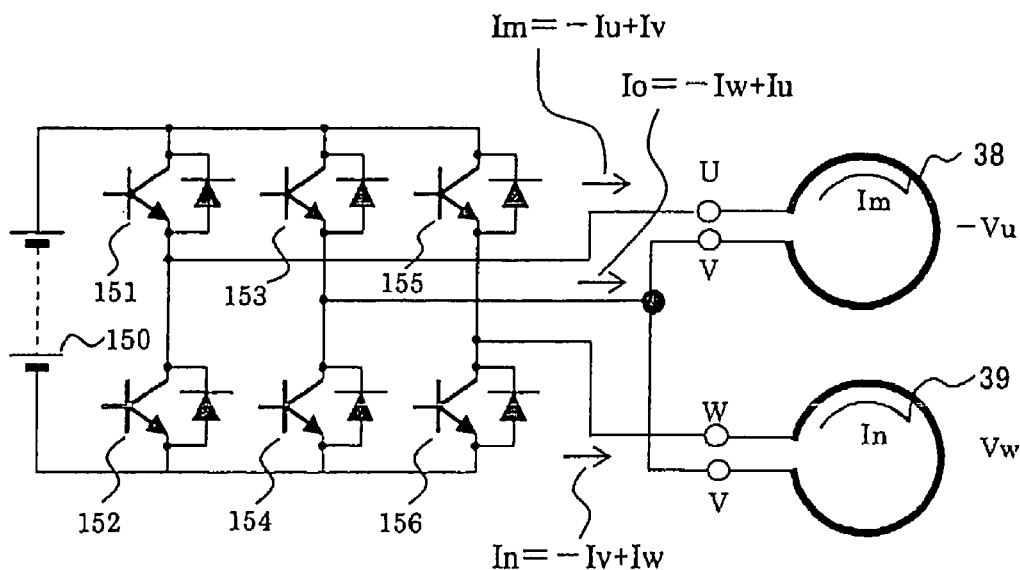
FIG. 117 illustrates connection for driving a three-phase two-winding motor illustrated, for example, in FIGS. 7 and 28, by using a three-phase inverter.
Figure 118:
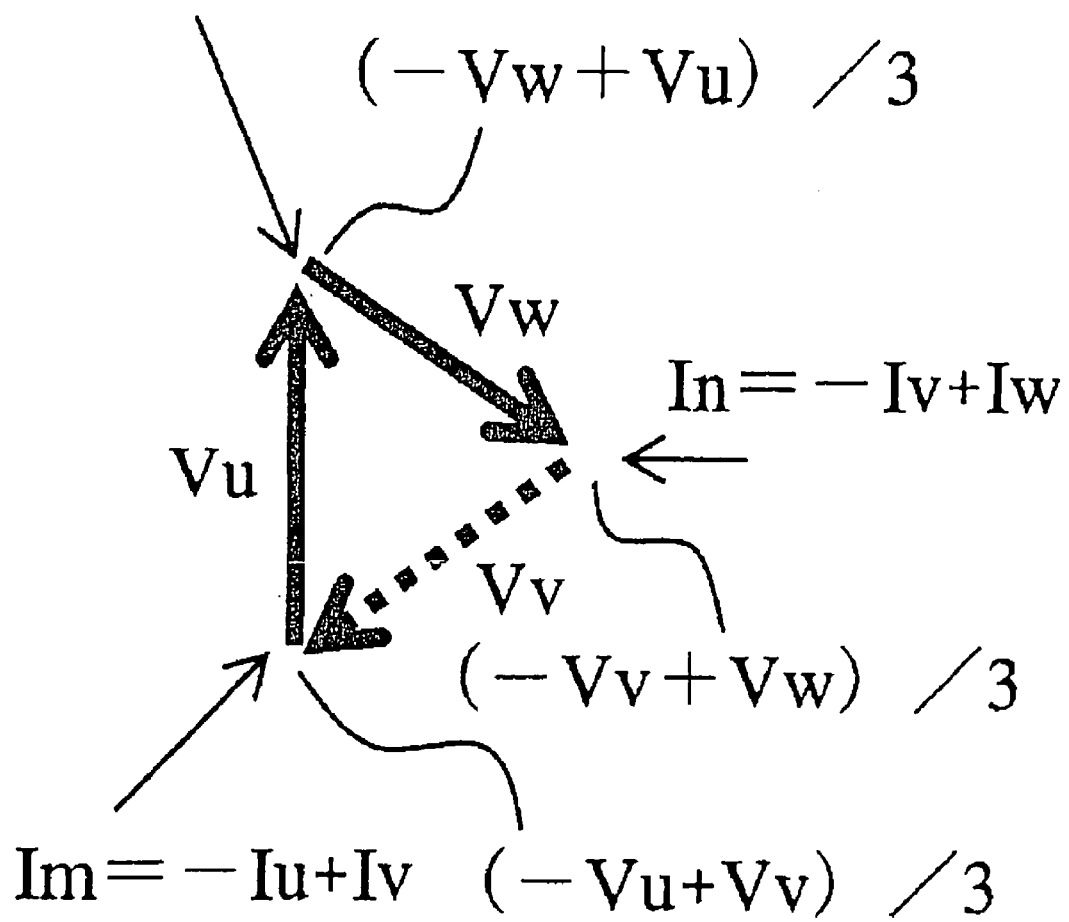
FIG. 118 illustrates voltages and currents of the two windings illustrated, for example, in FIGS. 7 and 28.
Figure 119:
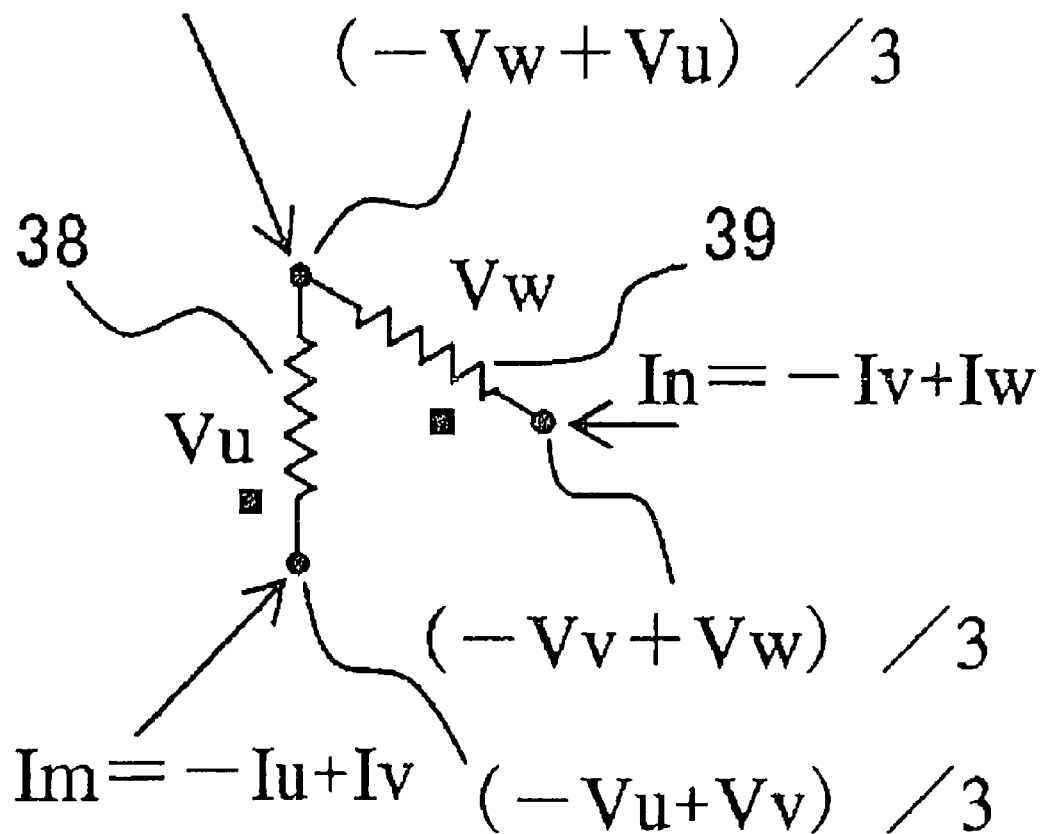
FIG. 119 illustrates a connecting relationship and currents of the two windings illustrated, for example, in FIGS. 7 and 28.

FIG. 117 shows a connecting relationship for a three-phase inverter when driving, for example, the motor of FIG. 7, which is a two-winding version of the motor shown in FIG. 1, the motor shown in FIG. 28, or the motor shown in FIG. 62. FIGS. 118 and 119 show a relationship between voltages and currents of the windings, and a relationship between winding connecting methods and currents. The motor shown in the figures is a three-phase two-winding motor. A winding corresponding to a voltage Vv shown by a broken line is absent. The three-phase inverter may just supply currents Im=−Iu+Iv, Io=−Iw+Iu and In=−Iv+Iw to the individual terminals. The windings are delta-connected with one of the windings being absent. The indicated voltages are relative voltages provided on the assumption that the center voltage of the delta connection is zero volt. Although only two windings are present, an effect of three-phase AC motor is obtained in terms of voltages and currents.

Figure 120:
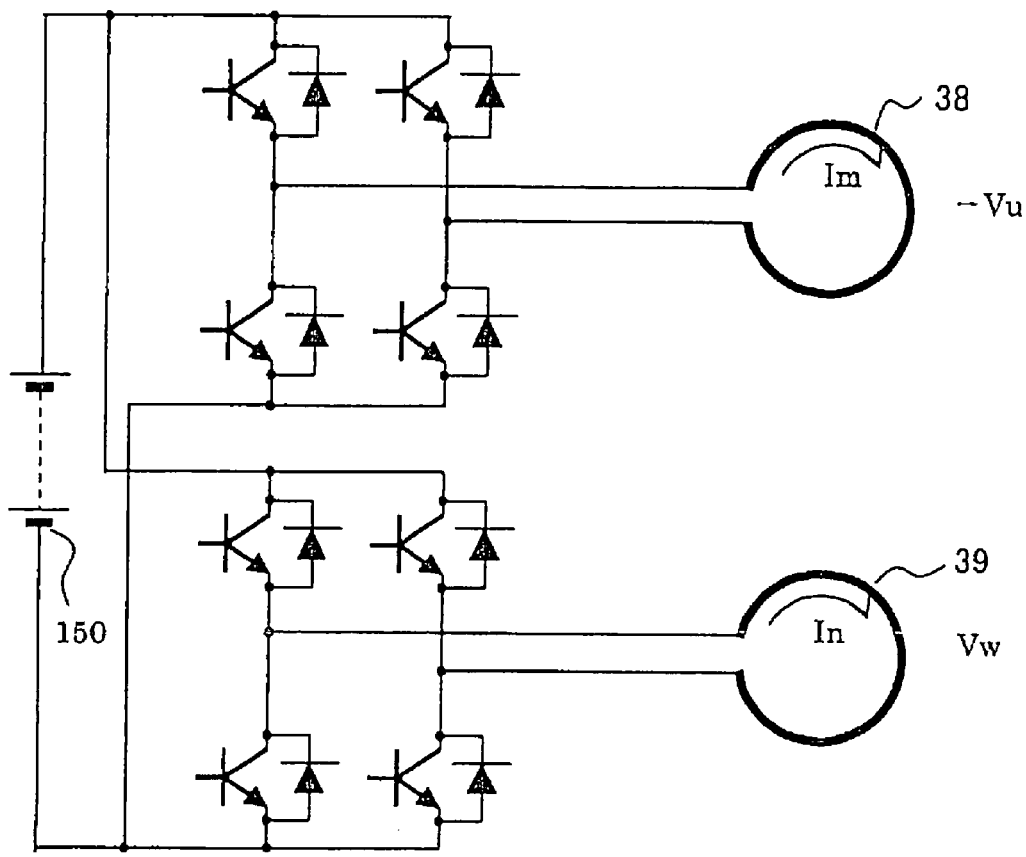

FIG. 120 shows an example of an inverter for driving the motor of FIG. 7, which is a two-winding version of the motor shown in FIG. 1, or the motor shown in FIG. 28. The example is configured to use two single-phase inverters connected in parallel. Such a configuration may completely eliminate a relative limiting relationship between the currents Im and In. Thus, currents of the same phases as those of the respective terminal voltages of the motor may be supplied, so that high efficient driving can be attained, with the power factors of the respective phases being maximum. Driving the individual phases with a sine wave may cause some rotational angles to have large output-torque and output and some to have small output-torque and output. However, by correcting the current amplitude by that much, for example, uniform torque and output can be obtained.

Use of the drive circuit shown in FIG. 113 may increase the degree of freedom in designing a motor. For example, the circumferential pole width of the phases U and W may be expanded and the pole width of the phase V may be narrowed. Alternatively, the three phases may be shifted along the circumference from the 120°-pitch position.

Alternatively, since a plurality of stator poles of the same phase are arranged along the circumference, it may be so configured that the three phases may be shifted along the circumference from the 120°-pitch position, so that a sum of the magnetic fluxes of the same-phase poles throughout the circumference may be equal to that of the original basic phase. This configuration may increase the degree of freedom in design. For example, it may be possible to provide sufficiently large gaps for reducing the particularly problematic flux leakage from between adjacent stator poles. It may also be possible to reduce torque ripple by removing the harmonic components from the voltages and torque, which components are caused by the arrangement of stator poles of a certain phase in a different phase. In addition, it may be possible to improve the winding coefficient by optimizing the stator pole width. In this case, the normal three-phase inverter shown in FIG. 110 may be utilized.

Examples of various modes of the present invention have so far been described. Various modifications may be made in the present invention, and such modifications are intended also to be included in the present invention. For example, as to the number of phases, the description has mostly involved three and six phases, but the present invention may be applicable to two, four, five and seven phases, as well as multiple phases having further number of phases. In small-capacity machinery, the number of parts is desired to be small from the viewpoint of cost and thus small number of phases, i.e. two or three phases, may be advantageous. However, from the viewpoint of torque ripple or from the viewpoint, for example, of the maximum current limitation of a single-phase power device in large-capacity machinery, large number of phases may sometimes be advantageous. The number of magnetic poles may also not be limited. In the motor of the present invention, in particular, large number of magnetic poles may principally advantageous. It is desirable, however, to select an appropriate number of magnetic poles depending on applications and motor sizes, in consideration, for example, of physical limitation, adverse effects such as of flux leakage, increase of iron loss due to multipolarization, and limitation in the control unit due to multipolarization. Some rotor types have been shown in FIGS. 14 to 19, 111 and 112. However, the present invention is applicable to various types of rotors, such as a winding field rotor in which windings are provided at the rotor, or a so-called claw pole rotor in which field windings fixed at axial ends are provided to produce magnetic fluxes at the rotor through gaps. There is also no limitation in the types and shapes of the permanent magnets.

The motor of the present invention may be applicable to various motor modes. For example, the motor of the present invention may be modified into an inner-rotor motor having a cylindrical air gap, when the air gap is expressed by the air-gap shape between the stator and rotor, or an outer-rotor motor, or an axial-gap motor having a disk-like air-gap shape. The inventive motor may also be applicable to a motor shape with a slightly tapered cylindrical air gap. In this case, in particular, the length of the air gap may be varied by axially shifting the stator and the rotor, leading to possible variation of the magnitude of the magnetic fields and possible variation of the voltages. This variable gap may realize constant output control.

A motor may be fabricated by incorporating a plurality of motors including the inventive motor. For example, two motors may be arranged at inner- and outer-diameter sides, or a plurality of motors may be axially arranged in series. Alternatively, the inventive motor may be configured with a portion thereof being omitted and removed. As the soft magnetic members, amorphous electromagnetic steel plates, dust cores obtained by molding powdered soft iron, or the like may be usable other than the normal silicon steel plates. For small motors, in particular, electromagnetic steel plates may be subjected to punching, bending and forging processes to form three-dimensional parts and to obtain a motor partially shaped as described above.

As to the motor windings, the above description mostly involved loop windings. However, the windings may not necessarily have a circular shape, but may more or less be modified so as to have, for example, an elliptical or polygonal shape, or a partially wavy shape in the rotor shaft direction depending on the convenience of magnetic circuits. Alternatively, where loop windings having a phase difference, for example, of 180° are arranged in the stator, a closed circuit may be formed by connecting semicircular windings to different semicircular windings that have a phase difference of 180°, so that the loop windings can be modified into semicircular windings. The windings may be further divided for modification into arc windings. The description so far has been provided on motors each of which is configured to have loop windings arranged in respective slots. Alternatively, however, a structure with no slot may be provided, where thin windings are arranged near a rotor-side surface, to thereby obtain a so-called coreless motor. As to the currents to be supplied to the motor, the above description has been provided on the assumption that the individual phases have sinusoidal currents. However, control may be performed using currents having various waveforms other than the sinusoidal wave form. These motors with these various modifications are intended to be included in the present invention, as far as the spirit of the present invention is kept up.

The present application is based on Japanese Patent Application No. 2005-131808 (filed Apr. 28, 2005), Japanese Patent Application No. 2005-144293 (filed May 17, 2005), Japanese Patent Application No. 2005-151257 (filed May 24, 2005) and Japanese Patent Application No. 2005-208358 (filed Jul. 19, 2005), the disclosures of which are all incorporated herein by reference.

The invention related to the present application should be defined only by the claims, and thus should not be construed as being limited to the embodiments or the like described in the specification and the drawings.

The invention claimed is:

1. A multiphase electric motor comprising:
a rotor having rotor pole groups, in which N-poles and S-poles are alternately arranged in a circumferential direction of the rotor;
a stator opposed to the rotor via an air gap provided between the rotor and the stator, the stator having an N number (N is a positive integer) of stator pole groups associated to individual phases of the motor and respectively arranged in an axial direction of the motor, each of the stator pole groups being arranged in a circumferential direction of the stator, corresponding stator poles of different individual phases being arranged to be offset from each other in the circumferential direction of the stator by a certain electric angle; and
a 2N number of substantially looped windings arranged between the stator pole groups for the individual phases and at ends in an axial direction of the rotor,
wherein the rotor pole groups are arranged opposed to the stator pole groups for the individual phases.

2. A multiphase electric motor comprising:
a rotor having rotor pole groups, in which N-poles and S-poles are alternately arranged in a circumferential direction of the rotor;
a stator opposed to the rotor via an air gap provided between the rotor and the stator, the stator having an N number (N is a positive integer) of stator pole groups associated to individual phases of the motor and respectively arranged in an axial direction of the motor, each of the stator pole groups being arranged in a circumferential direction of the stator, corresponding stator poles of different individual phases being arranged to be offset from each other in the circumferential direction of the stator by a certain electric angle; and
a 2N number of substantially looped windings arranged between the stator pole groups for the individual phases and at ends in an axial direction of the rotor,
wherein the rotor pole groups are arranged opposed to the stator pole groups for the individual phases,
the rotor has an outer circumferential surface facing the air gap, the outer circumferential surface of the rotor having a plurality of recesses formed inward in a radial direction of the rotor, and
the looped windings are fixed to the stator and all or a portion of the looped windings are arranged to be extended into respective ones of the plurality of recesses.

3. The motor according to claim 1, wherein:
among the looped windings for the individual phases, two or more looped windings located in the same space are combined into a single looped winding;
the looped windings comprise:
an N−1 number of substantially looped windings arranged between the N number of stator pole groups for the individual phases; and
the substantially looped windings provided, in the axial direction of the rotor, on both outer sides, respectively, of the N number of stator pole groups of the individual phases, or a substantially looped winding provided, in the axial direction of the rotor, on one side of the N number of stator pole groups, the looped winding being obtained by combining the two looped windings provided at both sides, respectively, in the axial direction of the rotor into a single looped winding.

4. The motor according to claim 3, wherein the looped windings are arranged only inside of the stator pole groups in the axial direction of the rotor.

5. The motor according to claim 4, wherein the stator pole groups include two stator pole groups that are adjacent to each other and have a phase difference of about 180°.

6. A three-phase AC motor having phases U, V and W, wherein the motor comprises:
   a rotor having rotor pole groups, in which N-poles and S-poles are alternately arranged in a circumferential direction of the rotor;
   a stator opposed to the rotor via an air gap provided between the rotor and the stator, the stator having three stator pole groups for the respective phases U, V and W associated to the respective phases of the motor and respectively arranged in an axial direction of the motor, each of the stator pole groups being arranged in a circumferential direction of the stator, corresponding stator poles of different of the respective phases being arranged to be offset from each other in the circumferential direction of the stator by a certain electric angle; and
   looped windings for the phases U and V and looped windings for the respective phases V and W arranged between the stator pole groups for the respective phases in an axial direction of the rotor, with looped windings for the same phase being arranged at ends in the axial direction of the rotor,
   wherein the stator pole group and the rotor pole group for each phase are arranged being opposed to each other via the air gap, and separated from other stator pole groups and other rotor pole groups for other phases.

7. The motor according to claim 4, wherein
   the rotor has a back yoke and a soft magnetic portion magnetically linked to the back yoke,
   the stator has a back yoke and a soft magnetic portion magnetically linked to the back yoke of the stator, the soft magnetic portion of the stator being opposed to the soft magnetic portion of the rotor through the air gap, and
   magnetic fluxes passing through the stator poles and the rotor poles of each phase of the individual phases are adapted to make a closed magnetic circuit by allowing the magnetic fluxes to pass through the soft magnetic portions of both the stator and rotor.

8. The motor according to claim 4, wherein the motor comprises magnetic flux inducing means located in the vicinity of the rotor poles and the stator poles for one specified phase of the individual phases of the motor, the magnetic flux inducing means directing magnetic flux components having a phase difference of about 180° in electrical angle from a magnetic flux in the one specified phase which passes through the stator poles for the one specified phase, and further directing the flux components to a soft magnetic portion linked to a back yoke of the rotor.

9. The motor according to claim 4, wherein the rotor pole groups are magnetically shared among the individual phases, the rotor pole groups are configured including permanent magnets and structured so as to utilize magnetic fluxes at both front and rear surfaces of the permanent magnets, and
   the stator pole groups for the individual phases are arranged to be opposed to the rotor pole groups.

10. The motor according to claim 4, wherein the stator pole groups constitute a looped magnetic path going around the looped winding of the relevant one of the individual phases.

11. The motor according to claim 4, wherein the rotor pole groups are magnetically shared among the individual phases of the motor, the rotor pole groups being configured to include permanent magnets to provide an alternation of N- and S-poles in the circumferential direction of the rotor, and
    the stator pole groups are arranged to be opposed to the rotor pole groups, with magnetic poles of the stator pole groups for the individual phases being selectively arranged at circumferential rotational positions of the stator such that magnetic fluxes of the individual phases are induced.

12. The motor according to claim 4, wherein the rotor pole groups are magnetically shared among the individual phases, the rotor pole groups being configured to include permanent magnets to provide an alternation of N- and S-poles in the circumferential direction of the rotor, and
    the stator pole groups are arranged to be opposed to the rotor pole groups, with magnetic poles of the stator pole groups for the individual phases being arranged at circumferential rotational positions of the stator at an electrical angular pitch of 360° such that magnetic fluxes of the individual phases are induced.

13. The motor according to claim 4, wherein the motor is a two-phase motor having first and second phases and a circumferential phase difference between magnetic pole groups for the first phase and magnetic pole groups for the second phase in the stator pole groups range from 100° or more to 170° or less.

14. The motor according to claim 4, wherein the rotor pole groups are arranged for the individual phases, the rotor pole groups are configured including permanent magnets and structured so as to utilize magnetic fluxes at both front and rear surfaces of the permanent magnets, and
    the stator pole groups for the individual phases are arranged being opposed to the rotor pole groups.

15. The motor according to claim 4, wherein the rotor pole groups comprise soft magnetic portions and permanent magnet portions, which are located alternately in the circumferential direction of the rotor, the permanent magnets having poles oriented to a direction perpendicular to the circumferential direction of the rotor, and
    the stator pole groups comprise soft magnetic portions and permanent magnet portions, which are located alternately in the circumferential direction of the stator, the permanent magnets having magnetic poles oriented to a direction perpendicular to the circumferential direction of the stator, and the stator pole groups are arranged to be opposed to the rotor pole groups.

16. The motor according to claim 4, wherein the rotor pole groups comprise soft magnetic portions and permanent magnet portions, which are located alternately in the circumferential direction of the rotor, the permanent magnets having magnetic poles oriented to a direction of the soft magnetic portions, and the soft magnetic portions provide an alternation of N- and S-poles in the circumferential direction of the rotor.

17. The motor according to claim 4, wherein the rotor pole groups comprise soft magnetic portions and permanent magnet portions, which are located alternately in the circumferential direction of the rotor, the permanent magnet portions having magnetic poles oriented to a direction of the soft magnetic portions, the soft magnetic portions providing an alternation of N- and S-poles in the circumferential direction of the rotor and being magnetically coupled to each other, and the stator pole groups are arranged to be opposed to the rotor pole groups and are composed of salient soft magnetic portions arranged at an electrical angular pitch of 360°.

18. The motor according to claim 4, wherein the rotor magnetic pole groups are provided with indented soft magnetic portions formed in the circumferential direction of the rotor; and the stator magnetic pole groups are provided with indented soft magnetic portions formed in the circumferential direction of the stator.

19. The motor according to claim 4, wherein the motor is structured such that either a length perpendicular to the circumferential direction of the motor at a plane where magnetic poles of the rotor pole groups and magnetic poles of the stator pole groups are opposed to each other, or a size of the air gap between the rotor and the stator, are smoothly changed in the circumferential direction.

20. The motor according to claim 4, wherein the rotor is arranged on an outer peripheral side of the motor and the stator is arranged on an inner peripheral side of the motor so that the rotor is located radially outside the stator.

21. The motor according to claim 4, wherein the rotor pole groups have magnetic poles opposed to magnetic poles of the stator pole groups via the air gap, and mutually opposing portions of the magnetic poles of both the rotor and stator pole groups are given one or more indents.

22. The motor according to claim 4, wherein the motor has soft magnetic portions composed of first electromagnetic steel plates and the first electromagnetic steel plates are arranged in a direction perpendicular to the axial direction of the motor, while second electromagnetic steel plates are arranged at a hole or recessed portion of the first electromagnetic steel plates in a direction crossing the first electromagnetic steel plates.

23. The motor according to claim 4, wherein the motor has members obtained by subjecting soft magnetic metal powder to compression molding.

24. The motor according to claim 4, wherein the rotor and the stator have magnetic paths of portions or all of which are composed of parts fabricated by subjecting electromagnetic steel plates to a press molding process or a bending process.

25. The motor according to claim 4, wherein the motor has portions made of soft magnetic members obtained by stacking electromagnetic steel plates and amorphous films on one another.

26. The motor according to claim 4, wherein portions or all of the looped windings of the motor are composed of metal pipes serving as conductors, the motor further comprising a cooling mechanism having a structure in which liquid or gas is passed through the metal pipes.

27. The motor according to claim 4, wherein the motor is produced such that a relation MLP>ML/SN is established, where ML is a length of the stator in the axial direction of the motor, SN is the number of stator pole groups, each stator pole group having a plurality of salient poles arranged along the circumference of the stator at substantially the same electrical angle, and MLP is a length of each stator pole group in the axial direction of the motor.

28. The rotor according to claim 4, wherein each of the stator pole groups has salient stator poles having indents thereon and each of the looped windings has substantially a looped shape imparted with a wavy form in the axial direction of the motor, in conformity with the arrangement of the salient stator poles and the indents of the salient stator poles in the axial direction of the motor with respect to each of the individual phases for the motor.

29. The motor according to claim 4, wherein each of the looped windings is produced as a flattened wire.

30. The motor according to claim 4, wherein the stator pole groups have stator poles for a same phase which are arranged at an electrical angular pitch of 720°.

31. The motor according to claim 4, wherein the motor is an N-phased P-pole motor, and a number of stator poles in each of the stator pole groups is less than P×N/2.

32. The motor according to claim 4, wherein the stator pole groups have magnetic poles arranged in the circumferential direction of the stator with substantially an even interval therebetween, the magnetic poles being imparted with phases close to each other in terms of electrical angle, and positions of the magnetic poles in the circumferential direction of the stator being shifted so as to improve a power factor.

33. The motor according to claim 4, wherein the motor is a two- or three-phase motor and the looped windings have two looped windings in the two- or three-phase motor which are connected in series with each other, with three points consisting of both ends and a connecting portion being connected to outputs of a three-phase inverter to effect control.

34. An electric motor comprising:
an N-phase motor according to claim 4; and
an N number (N is a positive integer) of voltage-variable units, each voltage-variable unit including two serially connected power elements capable of on/off control of currents, the power elements being directly or indirectly connected to terminals of a power source,
wherein an N number of terminals are connected to the N number of voltage-variable units to control voltages and currents, the N number being a sum of an (N−1) number of terminals in a star connection of the windings of the N-phased motor and a center point of the star connection.

35. An electric motor comprising:
an N-phase (N is a positive integer) motor according to claim 4; and
an N number of voltage-variable units, each voltage-variable unit including two serially connected power elements capable of on/off control of currents, the power elements being directly or indirectly connected to terminals of a power source,
wherein an N number of terminals are connected to the N number of voltage-variable units to control voltages and currents, the N number being a sum of an (N−2) number of terminals at connecting points in a delta connection of an (N−1) number of windings via terminals thereof and two terminals at a portion in which the $N^{th}$ winding is to be arranged.

* * * * *